(12) United States Patent
Garg et al.

(10) Patent No.: US 12,093,100 B2
(45) Date of Patent: Sep. 17, 2024

(54) HIERARCHICAL POWER MANAGEMENT APPARATUS AND METHOD

(71) Applicant: Intel Corporation, Santa Clara, CA (US)

(72) Inventors: Vivek Garg, Folsom, CA (US); Ankush Varma, Portland, OR (US); Krishnakanth Sistla, Portland, OR (US); Nikhil Gupta, Portland, OR (US); Nikethan Shivanand Baligar, Hillsboro, OR (US); Stephen Wang, Hillsboro, OR (US); Nilanjan Palit, Northborough, MA (US); Timothy Yee-Kwong Kam, Portland, OR (US); Adwait Purandare, Hillsboro, OR (US); Ujjwal Gupta, Hillsboro, OR (US); Stanley Chen, Portland, OR (US); Dorit Shapira, Portland, OR (US); Shruthi Venugopal, Hillsboro, OR (US); Suresh Chemudupati, Austin, TX (US); Rupal Parikh, Hillsboro, OR (US); Eric Dehaemer, Shrewsbury, MA (US); Pavithra Sampath, Hudson, MA (US); Phani Kumar Kandula, Hillsboro, OR (US); Yogesh Bansal, Beaverton, OR (US); Dean Mulla, Saratoga, CA (US); Michael Tulanowski, Fort Collins, CO (US); Stephen Paul Haake, Sunnyvale, CA (US); Andrew Herdrich, Hillsboro, OR (US); Ripan Das, Beaverton, OR (US); Nazar Syed Haider, Fremont, CA (US); Aman Sewani, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 17/033,753

(22) Filed: Sep. 26, 2020

(65) Prior Publication Data

US 2022/0100247 A1 Mar. 31, 2022

(51) Int. Cl.
*G06F 1/28* (2006.01)
*G06F 1/30* (2006.01)
*G06F 13/20* (2006.01)

(52) U.S. Cl.
CPC ............ *G06F 1/28* (2013.01); *G06F 1/30* (2013.01); *G06F 13/20* (2013.01); *G06F 2213/40* (2013.01)

(58) Field of Classification Search
CPC ..................................... G06F 1/28; G06F 1/30
See application file for complete search history.

(56) References Cited

U.S. PATENT DOCUMENTS 6,389,493 B1  5/2002  Barkley et al.
7,213,084 B2  5/2007  Ogilvie et al.
(Continued)

FOREIGN PATENT DOCUMENTS

CN        103326714        9/2013
KR    10-2012-0030763 A    3/2012
WO        2019212541      11/2019

OTHER PUBLICATIONS

International Search Report and Written Opinion mailed Jan. 17, 2022 for International Application No. PCT/US2021/052085, 9 pages.
(Continued)

*Primary Examiner* — Mark A Connolly
(74) *Attorney, Agent, or Firm* — NICHOLSON DE VOS WEBSTER & ELLIOTT LLP

(57) ABSTRACT

Hierarchical Power Management (HPM) architecture considers the limits of scaling on a power management con-
(Continued)

troller, the autonomy at each die, and provides a unified view of the package to a platform. At a simplest level, HPM architecture has a supervisor and one or more supervisee power management units (PMUs) that communicate via at least two different communication fabrics. Each PMU can behave as a supervisor for a number of supervisee PMUs in a particular domain. HPM addresses these needs for products that comprise a collection of dice with varying levels of power and thermal management capabilities and needs. HPM serves as a unified mechanism than can span collection of dice of varying capability and function, which together form a traditional system-on-chip (SoC). HPM provides a basis for managing power and thermals across a diverse set of dice.

15 Claims, 66 Drawing Sheets

(56) References Cited

U.S. PATENT DOCUMENTS

| | | | |
|---|---|---|---|
| 7,421,601 B2 | 9/2008 | Bose et al. | |
| 7,509,506 B2 | 3/2009 | Bahali et al. | |
| 7,895,458 B2 | 2/2011 | Kim | |
| 8,364,997 B2 | 1/2013 | Tian et al. | |
| 8,448,001 B1 | 5/2013 | Zhu et al. | |
| 8,595,721 B2 | 11/2013 | Nayar et al. | |
| 8,700,926 B2 | 4/2014 | Gargash et al. | |
| 8,826,047 B1 | 9/2014 | Zhu et al. | |
| 8,892,931 B2 | 11/2014 | Kruglick | |
| 8,928,678 B2 | 1/2015 | Wang et al. | |
| 8,977,871 B2 | 3/2015 | Tang et al. | |
| 8,984,313 B2 | 3/2015 | Bhandaru et al. | |
| 8,990,591 B2 | 3/2015 | Zuo | |
| 9,268,395 B2 | 2/2016 | Lee et al. | |
| 9,310,867 B2 | 4/2016 | Brinks et al. | |
| 9,323,316 B2 | 4/2016 | Bhandaru et al. | |
| 9,348,656 B2 | 5/2016 | Presant et al. | |
| 9,461,594 B2 | 10/2016 | Tabei | |
| 9,501,129 B2 | 11/2016 | Sistla et al. | |
| 9,507,405 B2 | 11/2016 | Krishnaswamy et al. | |
| 9,619,240 B2 | 4/2017 | Kruglick | |
| 9,645,935 B2 | 5/2017 | Bose et al. | |
| 9,891,690 B2 | 2/2018 | Kim et al. | |
| 9,921,935 B2 | 3/2018 | Chang | |
| 9,998,401 B2 | 6/2018 | Khare et al. | |
| 10,642,338 B2 | 5/2020 | Kurian et al. | |
| 10,671,404 B2 | 6/2020 | Muralidhar et al. | |
| 10,739,844 B2 | 8/2020 | Nge et al. | |
| 10,749,506 B2 | 8/2020 | Hoberman et al. | |
| 2005/0251775 A1 | 11/2005 | Wood | |
| 2011/0153288 A1 | 6/2011 | Bhattacharya et al. | |
| 2012/0072743 A1* | 3/2012 | Lee | G06F 1/3287 713/300 |
| 2013/0262826 A1 | 10/2013 | Gendler et al. | |
| 2014/0149757 A1* | 5/2014 | Suurballe | G06F 1/3209 713/300 |
| 2016/0154449 A1 | 6/2016 | Lim et al. | |
| 2016/0224098 A1 | 8/2016 | Gendler et al. | |
| 2017/0085081 A1 | 3/2017 | Elsayed et al. | |
| 2017/0308155 A1 | 10/2017 | Lu et al. | |
| 2019/0007747 A1 | 1/2019 | Bernat et al. | |
| 2019/0094949 A1 | 3/2019 | Kurian et al. | |
| 2019/0155658 A1 | 5/2019 | Cheng et al. | |
| 2019/0384348 A1 | 12/2019 | Srinivasan et al. | |
| 2020/0089308 A1 | 3/2020 | Dai et al. | |
| 2020/0192462 A1 | 6/2020 | Kuehnis et al. | |
| 2020/0210332 A1 | 7/2020 | Steiner et al. | |
| 2020/0264691 A1 | 8/2020 | Kurian et al. | |

OTHER PUBLICATIONS

Thomas Burd et al., "Zeppelin": An SOC for Multichip Architectures, IEEE Journal of Solid-State Circuits, vol. 54, No. 1, Jan. 2019, 11 pages.

International Preliminary Report on Patentability mailed Apr. 6, 2023 for International Application No. PCT/US2021/052085, 6 pages.

Andre et al., "DUF : Dynamic Uncore Frequency scaling to reduce power consumption", 2020. hal-02401796v2. https://hal.archives-ouvertes.fr/hal-02401796v2. (9 pages).

Choi et al., "Dynamic Voltage and Frequency Scaling based on Workload Decomposition", ISLPED '04. 2004 Proceedings of the International Symposium on Low Power Electronics, & Design 2004 (Feb.) DOI: 10.1109/LPE.2004.1349330. (17 pages).

Jung et al., "Continuous Frequency Adjustment Technique Based on Dynamic Workload Prediction1", Published in: 21st International Conference on VLSI Design (VLSID Jan. 4-8, 2008). DOI: 10.1109/VLSI.2008.98. Hyderabad, India. (6 pages).

* cited by examiner

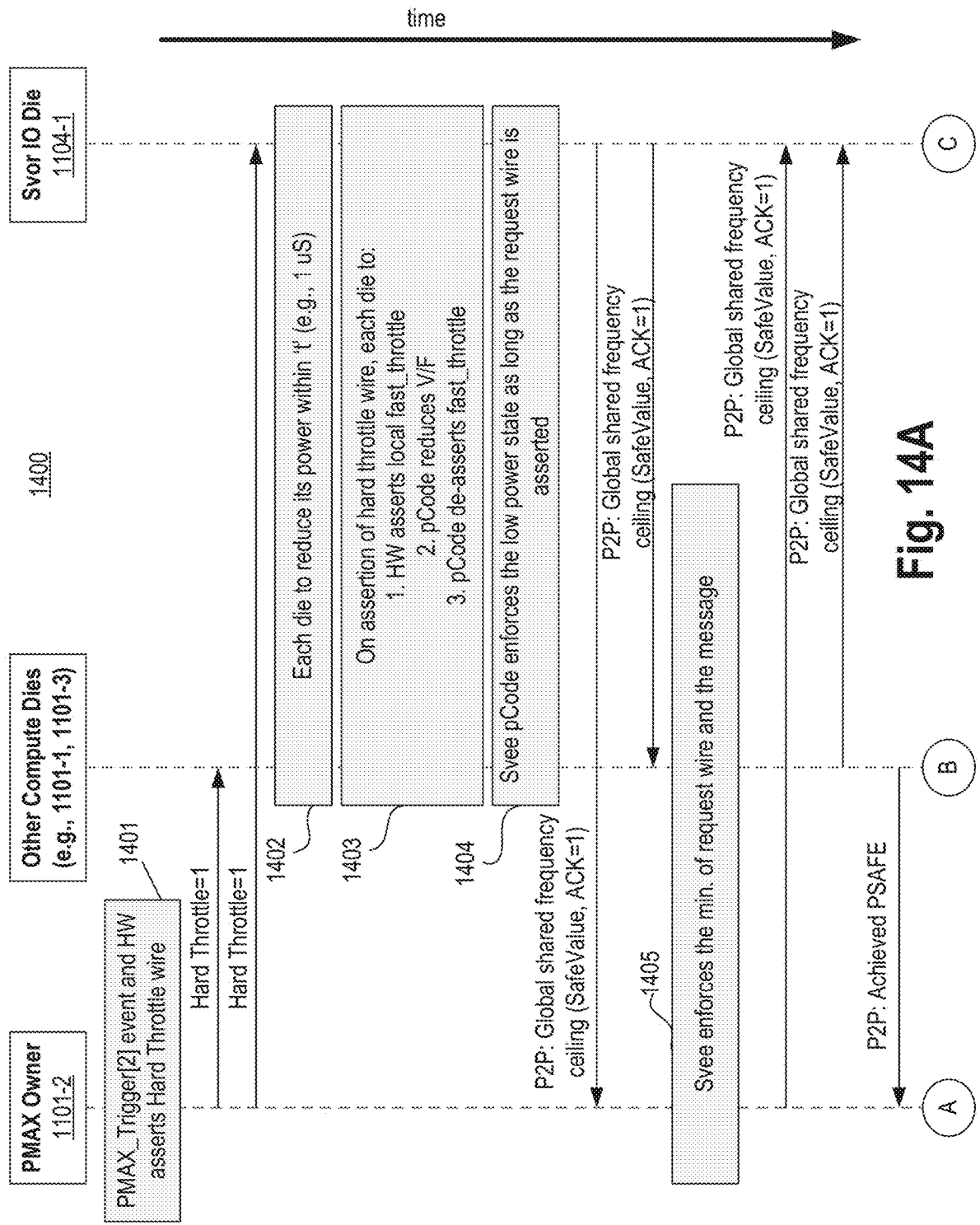

1500

If ##throttled_cycles >= threshold
　　HW generates pCide fastpath
　　pCode reads throttled)cycles counter. Counter is clear on Read If ##throttled_cycles/elapsed_time <= pCode_threshold
　　Throttling is within accepted limits. No need to lower frequency if time_since_last_ceiling_increase > up_hysteresis
　　　　reset up_hysteresis
　　　　global_shared_frequency_ceiling += freq_inc (clip at P01)
　　　　send as PerfGrant If ##throttled_cycles/elapse_time > pCode_threshold
　　Throttling is more than acceptable limits. Need to lower frequency if time_since_last_ceiling_decrease > down_hysteresis
　　　　reset down_hysteresis
　　　　global_shared_frequency_ceiling -= freq_inc (clip at P01)
　　　　send as PerfGrant

Fig. 15

```
###HW
If fast_throttle[1]
    [no explicit Svee action required] Apply proportional throttling as part of PWM pCode
If PerfGrant (global_shared_freq_ceiling)
    Clip WP1.F with global_shared_freq_ceiling
```

| PM_GENERIC_INTFC | sb | sb | sb | sb | sb | sb | sb | sb | Line # | Type |
|---|---|---|---|---|---|---|---|---|---|---|
| | Fabric Domain Ratio Status 0 | Fabric Domain Ratio Status 1 | Fabric Domain Ratio Status 2 | Fabric Domain Ratio Status 3 | Fabric Domain Ratio Status 4 | Fabric Domain Ratio Status 5 | Fabric Domain Ratio Status 6 | Fabric Domain Ratio Status 7 | 1 | RO |
| | Fabric Domain Ratio Status 8 | Fabric Domain Ratio Status 9 | Fabric Domain Ratio Status 10 | Fabric Domain Ratio Status 11 | Fabric Domain Ratio Status 12 | Fabric Domain Ratio Status 13 | Fabric Domain Ratio Status 14 | Fabric Domain Ratio Status 15 | 2 | RO |
| | Fabric Domain Ratio MAX LIMIT 0 | Fabric Domain Ratio MAX LIMIT 1 | Fabric Domain Ratio MAX LIMIT 2 | Fabric Domain Ratio MAX LIMIT 3 | Fabric Domain Ratio MAX LIMIT 4 | Fabric Domain Ratio MAX LIMIT 5 | Fabric Domain Ratio MAX LIMIT 6 | Fabric Domain Ratio MAX LIMIT 7 | 3 | RW |
| | Fabric Domain Ratio MAX LIMIT 8 | Fabric Domain Ratio MAX LIMIT 9 | Fabric Domain Ratio MAX LIMIT 10 | Fabric Domain Ratio MAX LIMIT 11 | Fabric Domain Ratio MAX LIMIT 12 | Fabric Domain Ratio MAX LIMIT 13 | Fabric Domain Ratio MAX LIMIT 14 | Fabric Domain Ratio MAX LIMIT 15 | 4 | RW |
| | Fabric Domain Ratio MIN LIMIT 0 | Fabric Domain Ratio MIN LIMIT 1 | Fabric Domain Ratio MIN LIMIT 2 | Fabric Domain Ratio MIN LIMIT 3 | Fabric Domain Ratio MIN LIMIT 4 | Fabric Domain Ratio MIN LIMIT 5 | Fabric Domain Ratio MIN LIMIT 6 | Fabric Domain Ratio MIN LIMIT 7 | 5 | RW |
| | Fabric Domain Ratio MIN LIMIT 8 | Fabric Domain Ratio MIN LIMIT 9 | Fabric Domain Ratio MIN LIMIT 10 | Fabric Domain Ratio MIN LIMIT 11 | Fabric Domain Ratio MIN LIMIT 12 | Fabric Domain Ratio MIN LIMIT 13 | Fabric Domain Ratio MIN LIMIT 14 | Fabric Domain Ratio MIN LIMIT 15 | 6 | RW |
| | UFS_MODE_SELECT [0:2] | | | | | | | | 7 | RW |

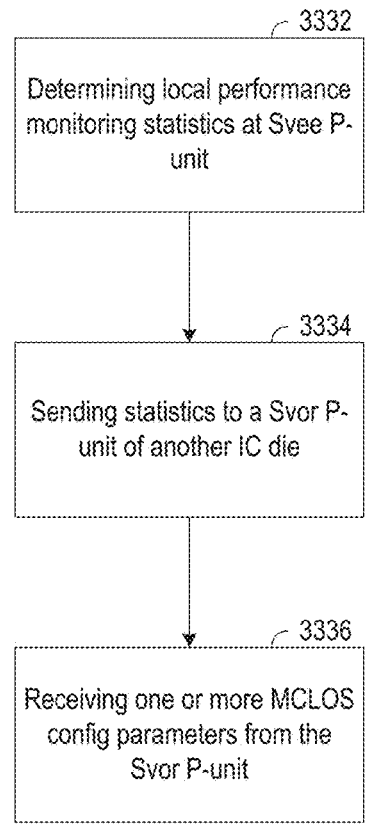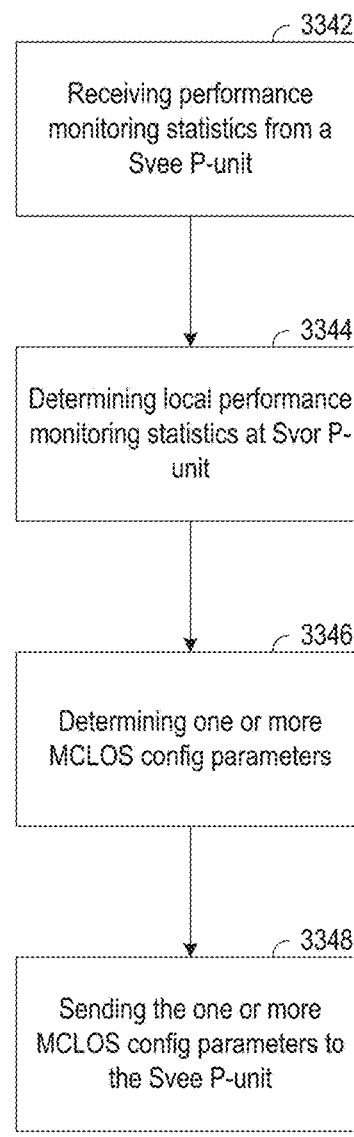
Fig. 33B
Fig. 33C

HIERARCHICAL POWER MANAGEMENT APPARATUS AND METHOD

BACKGROUND

Traditional power and thermal management techniques view the package and die boundaries as one and the same. SoCs are rapidly going down a path of incorporating multiple dice in the package. This trend is being driven by a multitude of factors: i) Integrating multiple functions in a package; ii) Disaggregation for yield enhancement; iii) 3D stacking for form factor; and iv) Leveraging base and special function (e.g. IO) die for building short time-to-market (TTM) derivative products.

Independent of the product level motivation for multiple die in package, fundamental requirements for managing power and thermal for an SoC include: i) Enable operation within the specified platform constraints; ii) Present a consolidated package view to the platform; iii) Expose software manageable domains and relevant telemetry and controls to enable software/platform guided optimization; and iv) Use the available resources to maximize Power and Performance (PnP) for the SoC.

With the advent of integration of non-traditional functions (e.g. accelerators) within a processor package, and the shift to die disaggregation to enable large system-on-chips (SoCs), power and thermal management of these SoCs has become a challenge.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 14A-B illustrate a PMAX flow, in accordance with some embodiments.

FIG. 15 illustrates a p-code pseudocode executed by a supervisor p-unit for multi-threshold PMAX detection and management, in accordance with some embodiments.

FIG. 16 illustrates a p-code pseudocode executed by a supervisee p-unit for multi-threshold PMAX management, in accordance with some embodiments.

FIG. 24 illustrates a table illustrating a difference between accurately calculated values and approximated values for DC OFF of a throttling duty cycle for the same predetermined range of range of local die and remote die frequency values shown in Table of FIG. 22, in accordance with some embodiments.

FIG. 30 illustrates a user interface for setting power constraints for a communication fabric having two or more performance level domains, in accordance with some embodiments.

FIGS. 33A-33C illustrate flow diagrams each showing features of a respective method to communicate class of service information between integrated circuit chips according to a corresponding embodiment.

DETAILED DESCRIPTION

Figure 1A:
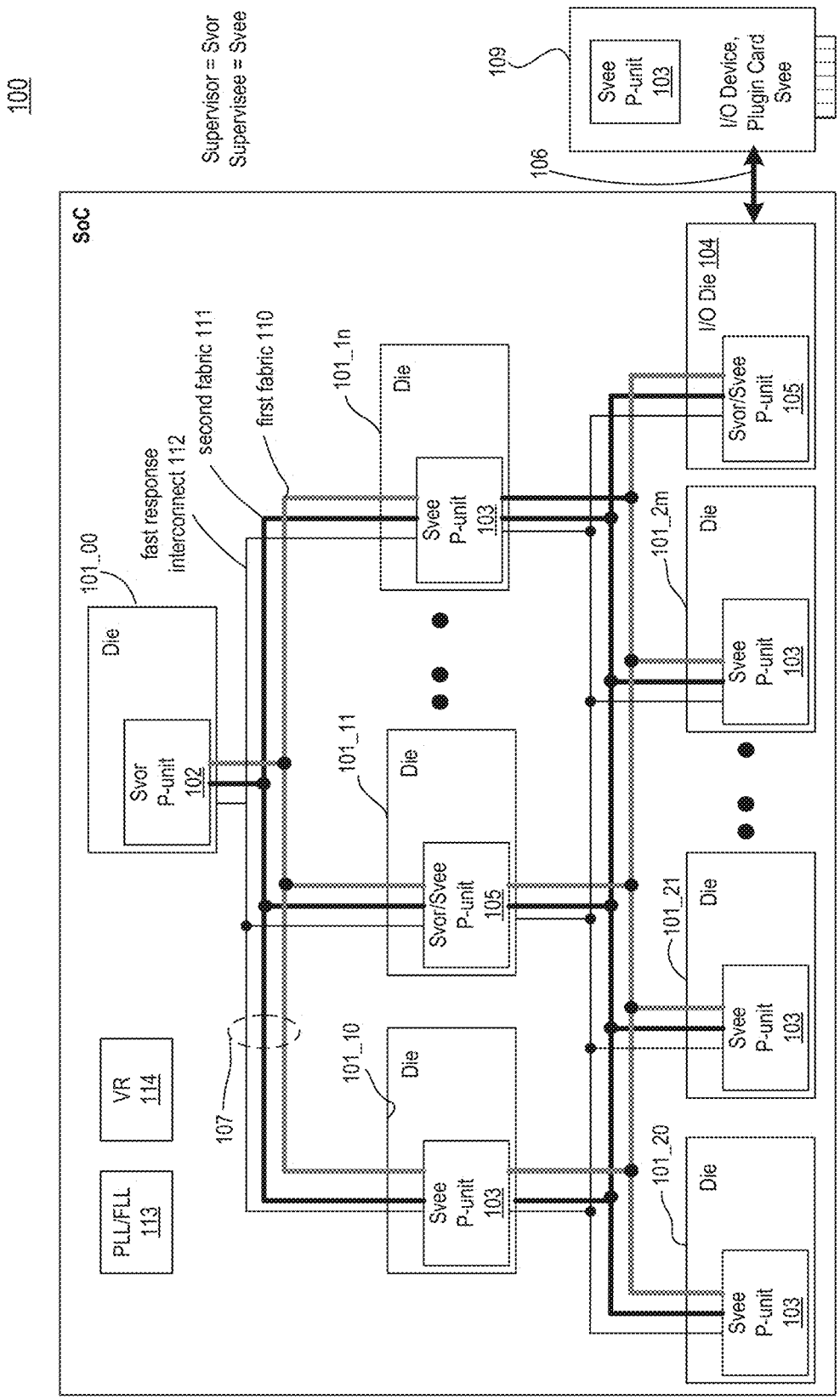
FIGS. 1A-B illustrate multi-chip modules with hierarchical power management (HPM) apparatus, in accordance with some embodiments.

The Hierarchical Power Management (HPM) architecture of various embodiments considers the limits of scaling on a power management controller, the autonomy at each die, and provides a unified view of the system to a platform. HPM architecture addresses these needs for products that comprise a collection of dice with varying levels of power and thermal management capabilities and needs. It serves as a unified mechanism that can span collections of dice of varying capabilities and functions. Among other things, HPM can provide a basis for managing power, performance and thermals across a diverse set of dice.

Efficient integration of non-traditional (core and graphics) functions into the SoC requires robust power management (PM) support in each integrated function. Functions like networking components, field programmable gate array (FGPA), compression, crypto, Queue Management, etc. can be added as a companion die in the package. These components may share power delivery and thermal footprint with a primary die (e.g., compute die). HPM provides the infrastructure to manage power, performance and thermals for these added functions and more importantly provides a way for a power management controller to be an entity responsible for enforcing platform level constraints. HPM infrastructure of various embodiments is not limited to die packages but rather, the same methodologies and mechanisms can be deployed to interact with, for example, end point integrated functions (e.g., discrete cards, accelerator or memory cards, etc.) connected via interfaces such as Compute Express Link (CXL) and/or other interconnection schemes.

HPM of various embodiments builds a capability and infrastructure that allows for package level management within a platform, while still catering to islands of autonomy that might exist across constituent dies in a package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate dies, and even accelerators connected via CXL (e.g., Flexbus) that may be inside the package, or in a discrete form factor.

There are many technical effects of the various embodiments. For example, HPM enables designers to meet the goals of scalability, modularity, and late binding. HPM also allows Power Management Units (PMU) functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a single PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect. An interface may include logic and I/O driver/receiver to send and receive data over the interconnect or one or more wires.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Figure 1B:
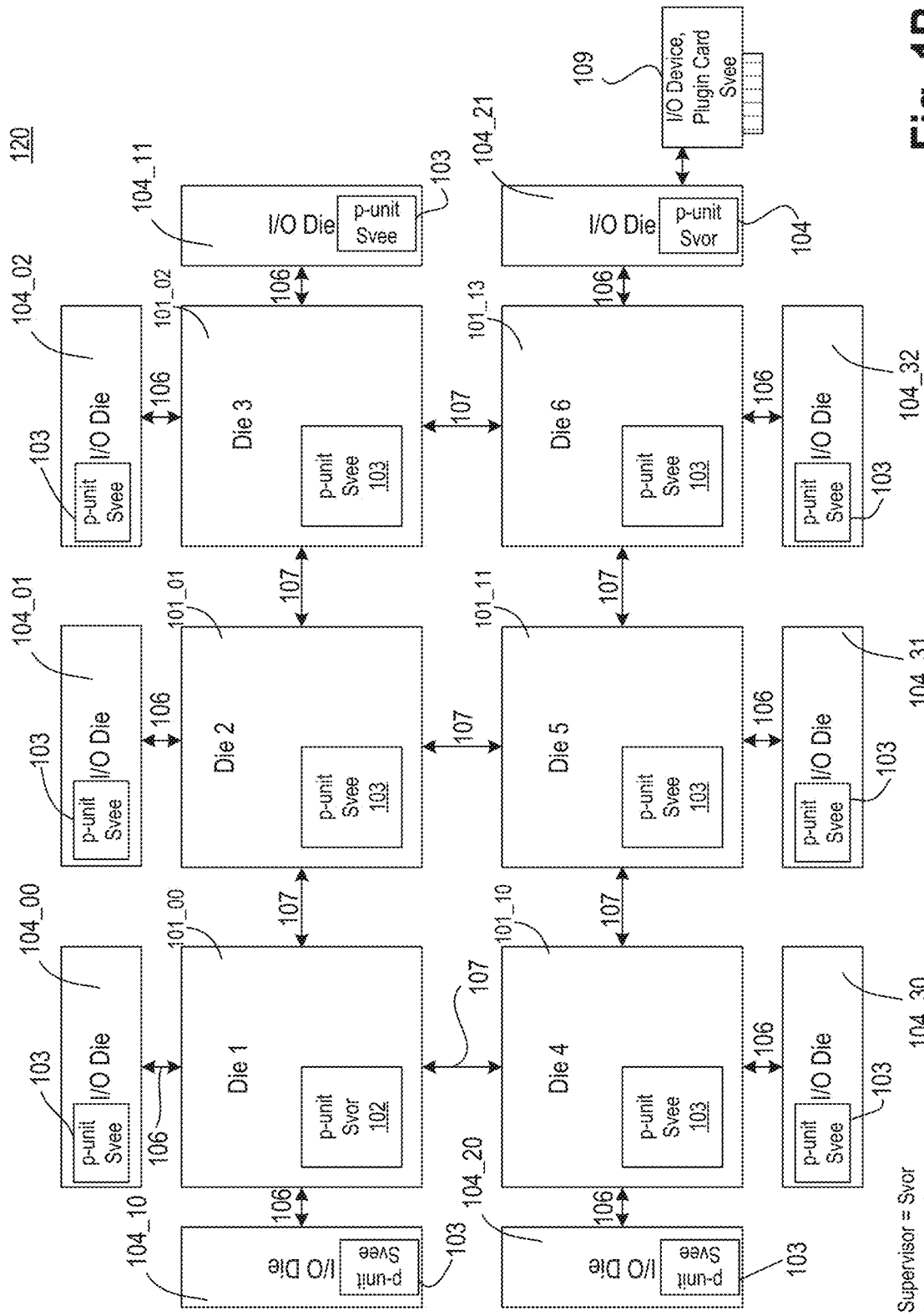

FIGS. 1A-B illustrate multi-chip module 100 and 120, respectively with hierarchical power management (HPM) apparatus, in accordance with some embodiments. FIGS. 1A-B show concepts where HPM is applied to a variety of domains. Power management here is configured and arranged in a hierarchical structure. Multi-chip module 100 comprises a number of dies including processor dies (e.g., 101_00, 101_10, 101_11, . . . 101_1n, 101_20, 101_21, . . . 101_2m, where 'n' and 'm' are numbers greater than 1) and I/O dies (e.g., 104_01, 104_02, 104_10, 104_20, 104_11, 104_21, 104_30, 104_31, 104_32), power control units (p-units) 102, 103, and 105, I/O interconnect 106, communication network 107 having fabrics 110, 111 and interconnect 112, phase locked loop (PLL) or frequency locked loop (FLL) 113, and voltage regulator 114. For simplicity sake, compute or processor dies are referred by their general identifier 101 while I/O dies are referred by their general identifier 104.

In various embodiments, each die (or dielet) includes a power management unit (PMU) or p-unit. For example, processor dies 101 can have supervisor p-unit 102, supervisee p-unit 103, or a dual role supervisor/supervisee p-unit 105. In some embodiments, I/O die 104 has its own dual role p-unit such as supervisor and/or supervisee p-unit 105. The p-units in each die can be instances of a generic p-unit. In one such example, all p-units have the same capability and circuits, but are configured (dynamically or statically) to take a role of a supervisor, supervisee, and/or both. In some embodiments, p-units 102, 103, or 105 for compute dies 101 are instances of a compute p-unit while p-units 102, 103, or 105 for IO dies 104 are instances of an IO p-unit different from the compute p-unit. Depending on the role, p-unit acquires specific responsibilities to manage power of the multichip module and/or computing platform. While various p-units are described for dies in a multichip module or system-on-chip 100 or 120, a p-unit can also be part of an external device such as I/O device 109.

Here, the various p-units do not have to be the same. The HPM architecture can operate very different types of p-units. One common feature for the p-units is that they are expected to receive HPM messages and are expected to be able to comprehend them. In some embodiments, p-unit of IO dies may be different than the p-unit of the compute dies. For example, the number of register instances of each class of register in the IO p-unit is different than those in the p-units of the compute dies 101. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit 102, supervisee p-unit 103 or with a dual role of supervisor/supervisee 105. For example, p-unit 108 is a supervisee p-unit for supervisor 102 while p-unit 108 is a supervisor p-unit for supervisee 109, where supervisee p-unit resides in I/O device plugin card 109. As such, p-units can perform roles of supervisor or supervisee for various domains.

In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by supervisor p-unit 102 to supervisee p-units 103. For example, supervisor p-unit 102 learns of the workload (present and future) of each die, power measurements of each die, and other parameters (e.g., platform level power boundaries) and determines new power limits for each die. These power limits are then communicated by supervisor p-units 102 to the supervisee p-units 103 via one or more interconnects and fabrics 106 and 107. In some embodiments, fabric 107 indicates a group of fabrics and interconnect including first fabric 110, second fabric 111, and fast response interconnect 112. In some embodiments, first fabric 110 is used for common communication between supervisor p-unit 102 and supervisee p-unit 103. These common communications include change in voltage, frequency, and/or power state of a die which is planned based on a number of factors (e.g., future workload, user behavior, etc.). In some embodiments, second fabric 111 is used for higher priority communication between supervisor p-unit 102 and supervisee p-unit 103. Example of higher priority communication include a message to throttle because of a possible thermal runaway condition, reliability issue, etc. In some embodiments, fast response interconnect 112 is used for communicating fast or hard throttle of all dies. In this case, a supervisor p-unit may send a fast throttle message to all other p-units, for example. In some embodiments, fast response interconnect 112 is a legacy interconnect whose function can be performed by second fabric 111.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

Figure 2:
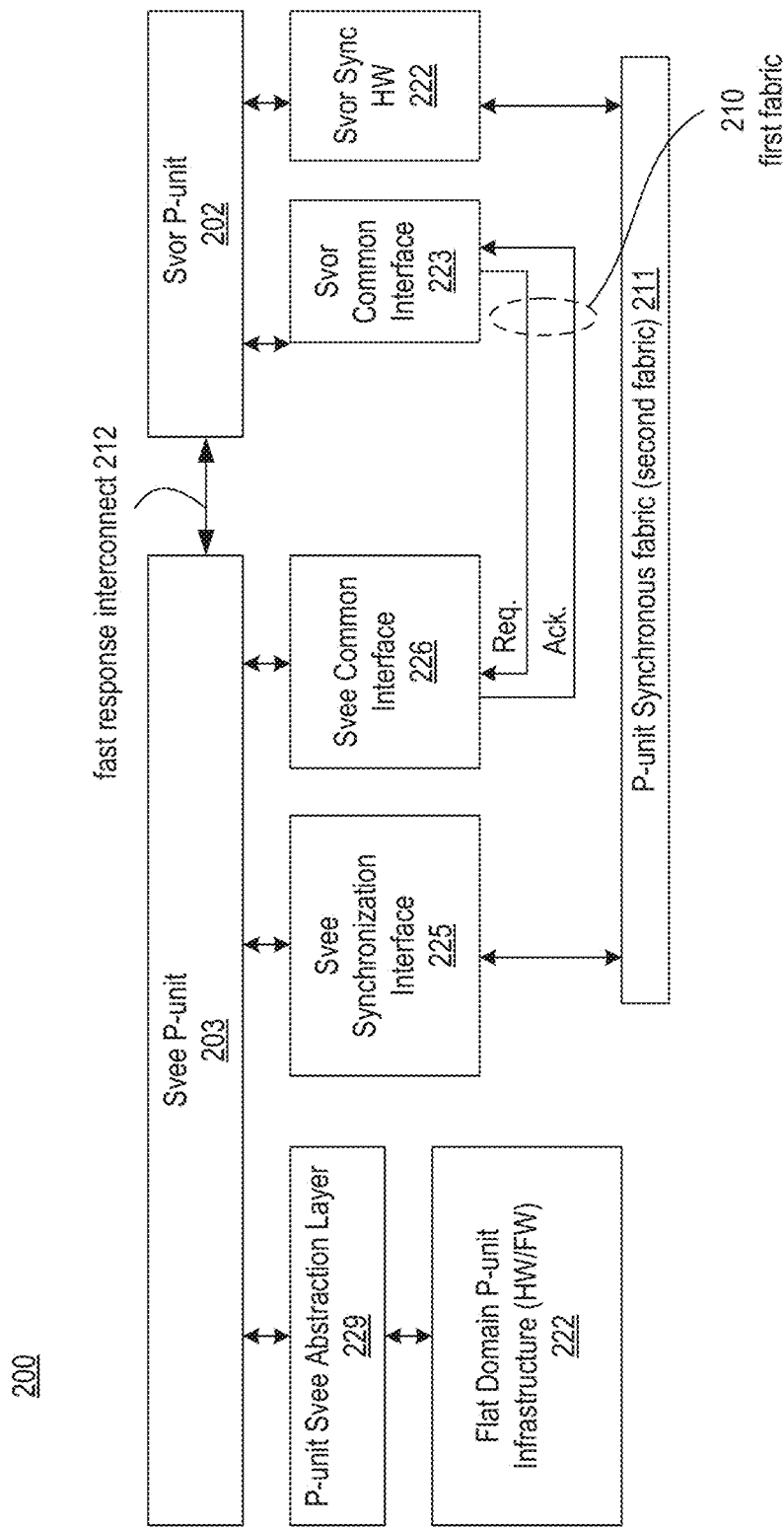
FIG. 2 illustrates a hierarchical stack of components for HPM, in accordance with some embodiments.

FIG. 2 illustrates hierarchical stack 200 of components for HPM, in accordance with some embodiments. HPM has multiple components comprising autonomous power management (PM) domains, fabrics enabling communication between PM domains, and algorithms to facilitate efficient usage and partitioning of resources. HPM builds on a layer of infrastructure to facilitate the communication between the supervisor and supervisee p-units, 202 (e.g., 102) and 203 (e.g., 103), respectively, and defines primitives to enable distributed management of the functions incorporated into a package. The functionality of supervisor 202 adds a package level management layer which evolves from the monolithic package level functions. The functionality of supervisee p-unit 203 remains the same as the native capability that is implemented, except for the HPM communication.

In some embodiments, supervisor p-unit 202 includes supervisor common interface 223 to communicate with supervisee p-unit 203 via common fabric 210 (e.g., first fabric 110). In some embodiments, supervisor p-unit 202 comprises synchronization hardware (HW) 222 for communicating with supervisee p-unit 204 via synchronous fabric 211 (second fabric 211). In some embodiments, the communication can go over either fabrics 210 or 211 depending on the SoC's power and performance targets and urgency.

In some embodiments, supervisee p-unit 203 includes supervisee synchronization interface 225 to communicate with supervisor p-unit 202 via second fabric 211 (e.g., second fabric 111). In some embodiments, supervisee p-unit 202 includes supervisee common interface 226 to communicate with supervisor interface 223 via first fabric 210 (e.g., first fabric 110). In some embodiments, first fabric 210 is used for non-urgent communication while second fabric 211 is used for urgent communication between supervisor p-unit 202 and supervisee p-unit 203. First fabric 210 uses a request and acknowledgement handshake protocol which has inherent messaging delay. In some embodiments, a dedicated wire 212 (e.g., wire 112), separate from fabrics 210 and 211, is provided for fast response interaction between supervisor 202 and supervisee 203 p-units. Fast response wire 212 can be used for sending information about maximum power, electrical attributes (e.g., load current), thermal triggers, etc. for supervisor 202 to take quick action.

In some embodiments, supervisee p-unit 203 includes abstraction layer 229 and flat domain infrastructure 222 (firmware and hardware). Abstraction layer 229 and flat domain infrastructure 222 are used for power and thermal management. For example, abstraction layer 229 and flat domain infrastructure 222 allow a supervisee device to have a notion of a work-point which gets delivered to hardware functions that are responsible for getting the voltage and frequency for a domain to the desired operating point. Work-point can be a message on an internal fabric, or a register write, or a set of wires to a voltage regulator and phase locked loop (PLL), either directly or via an intermediate adapter. Intellectual property (IP) blocks are informed about the voltage and/or frequency change so they can prepare for it.

Figure 3:
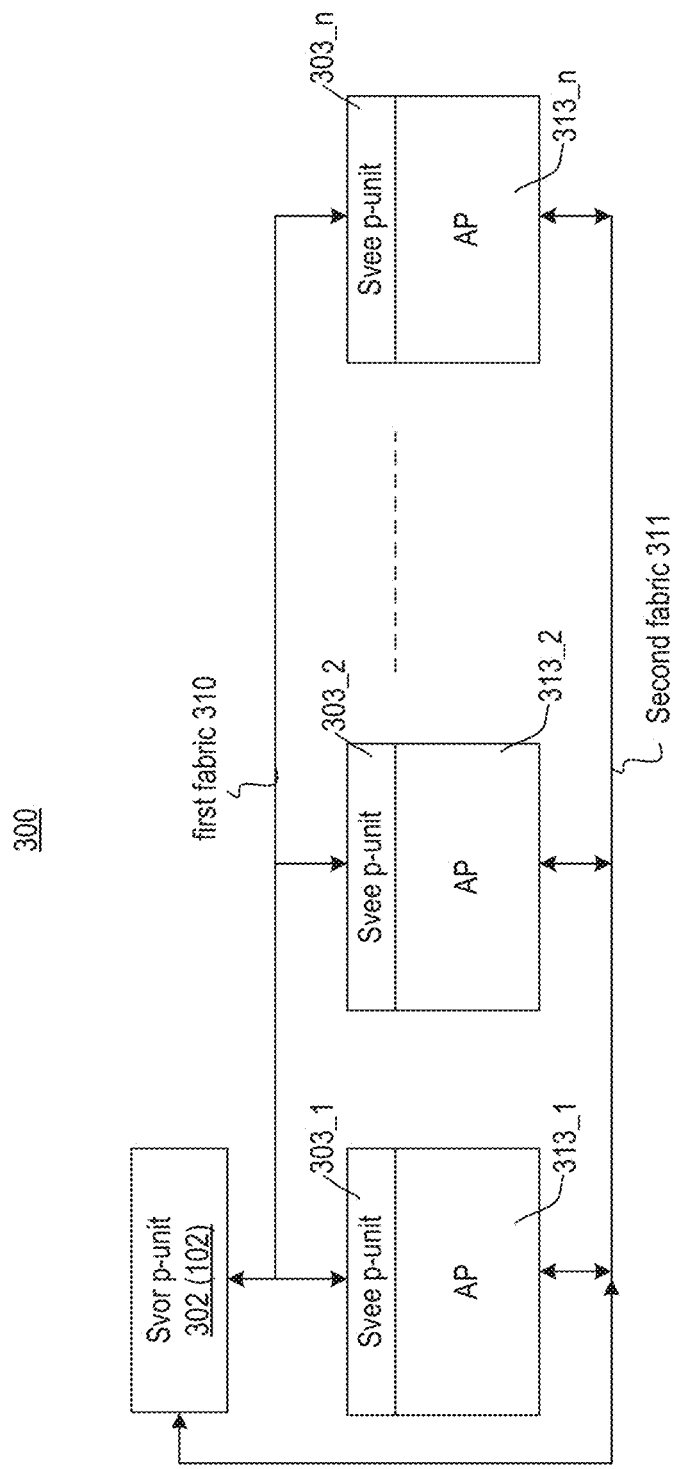
FIG. 3 illustrates two communication fabrics between supervisor and supervisee power management components, in accordance with some embodiments.

FIG. 3 illustrates functional HPM architecture 300 with two communication fabrics 210 and 211 between supervisor p-unit 302 (e.g., 201) and supervisee p-units 303_1, 303_2, . . . 303_n, in accordance with some embodiments. The supervisee p-units are generally referred here as p-unit 303 (e.g., same as 103 or 203). Each function that is integrated into the package can be independent in its power management and thermal functions. These independent functions are referred here as Autonomous Perimeters (APs). APs have a local PM controller (or p-unit) responsible for managing the work-point for all the local intellectual property (IP) blocks in the domain similar to flat or monolithic PM. In this example, supervisee p-unit 301_1 has associated AP 313_1, supervisee p-unit 301_2 has associated AP 313_2, and supervisee p-unit 301_n has associated AP 313_n. In one instance, p-unit 303_1 services power management and thermal constraints for AP 313_1. An AP is generally identified by reference label 313. These supervisee p-units 303 communicate with the supervisor p-unit 302 to participate in the package level flow to ensure compliance to platform constraints. In some embodiments, an AP may comprise one or more dies. In that case, multiple supervisee p-units 303 report to a supervisor p-unit 302. In some embodiments, an AP 313 is limited to an individual die.

In various embodiments, peer-to-peer (P2P) fabric(s) are provided between the various instances of APs allow to for communication between APs (e.g., communication between APs 313 of each supervisee 302). In some embodiments, P2P fabric(s) comprise a common fabric 310 (e.g., first fabric 110 or 210) for regular non-urgent communication between supervisor p-unit 302 and supervisee p-unit 303. In some embodiments, first fabric 310 (e.g., common fabric) allows each AP 313 to present its needs to supervisor p-unit 302, and allows supervisor p-unit 302 to send the constraints to each AP 313.

APs also use this common fabric interface 310 to send telemetry such as temperature, energy consumption, number of enabled cores, IP license levels, etc. to supervisor p-unit 302, so that supervisor p-unit 302 can make informed decisions about the constraints it is providing to the APs 313. This also enables supervisor p-unit 302 to present a consolidated view of the package to the platform controller. An example of common fabric 310 includes IOSF-SB, netspeed Crux, Arm APB/AXI, or some other industry standard network which allows connection between all the APs.

In some embodiments, P2P fabric(s) include a dedicated fabric 311 (e.g., second fabric 111 or 211). Second fabric 311 can be a virtual channel in another fabric, or it can even be mapped into the coherent fabric. Second fabric 311 is a synchronization fabric that provides tight synchronization between supervisor p-unit 302 and supervisee p-units 303. Urgent messages such as IccMax rating of a domain may need to be communicated with lowest latency to supervisor p-unit 302 from supervisee p-unit 303 so that supervisor p-unit 302 may avoid damaged caused by current higher than IccMax for a particular domain under supervisee p-unit 303. Such urgent messages are communicated via second fabric 311 to avoid traffic on first fabric 310.

In some embodiments, the P2P fabric(s) provide a maximum bound on the end-to-end message latency on this network. The P2P fabric also guarantees that HPM messages will make forward progress and that they do not have dependencies on other classes of traffic, and can meet the availability constraints. In some embodiments, the P2P fabric supports a credit exchange flow to enable support for PMUs in APs that have limited amount of buffering available to sink HPM commands.

Table 1 shows a sampling of commands that can be sent over P2P fabric.

TABLE 1

| HPM Message | Purpose of Message | Usage Model |
| --- | --- | --- |
| SET_PREF_LIMIT | Used to send performance targets to supervisee | In response to the performance request (PERF_REQ), IccMax, and/or power balancing |
| SET_POWER_LIMIT | Used to explicitly set PL1 and/or PL2 limits, if desired | In response to RAPL (running average power limit) changes or power balancing |
| ICC_REQUEST | Used to communicate an IccMax Limit | In response to workload or licensing changes |
| SET_ICC_LIMIT | Used to send IccMax target to supervisee | In response to IccMax configuration changes, or IccMax balancing |
| ICC_LIMIT_ACK | Used to indicate to supervisor that recipient is now observing the new budget | Acknowledge (Ack) for the SET_ICC_LIMIT message |
| TELE_APL | Used to report performance loss for each constraint | Telemetry information which is periodically sent |
| PERF_REQUEST | Used for hardware performance (HWP) (not used by CD) | HOW change in supervisee die |
| PERF_BIAS_REQUEST | Used for performance balancing | In response to workload or licensing changes, or priority changes |

TABLE 1-continued

| HPM Message | Purpose of Message | Usage Model |
|---|---|---|
| PERF_GRANT | Used to send performance target to supervisee | In response to change in constraints or rebalance requests |
| VOLTAGE_REQUEST | Used to request voltage changes for a specific rail | Reset, ITD, PkgC |
| VOLTAGE_GRANT | Used to indicate to supervisee the voltage level for a specific rail | In response to VOLTAGE_REQIEST from any supervisee |
| HGS_UPDATE_ACK | Used to indicate which fields in the HGS (hardware guided scheduling) table are updated | In response to HGS_GO_UPDATE command from supervisor |
| HGS_GO_UPDATE | Used to direct supervisee to update HGS table | Periodic task from supervisor |
| EPB_HINT | Used to send EPB updates | Upon change in EPB |
| EPB_GRANT | Send consolidated EPB range to leaves | In response to EPB_HINT message from any supervisee |
| THERMAL_REQUEST | Throttle assist request | In response to unmanageable thermal condition in some supervisee |
| TELE_ENERGY_CONSUMED | Sampled energy telemetry | periodic |
| TELE_THROTTLE_COUNT_THERMAL | Thermal throttled cycles telemetry | periodic |
| TELE_THROTTLE_COUNT_POWER | TDP throttled cycles telemetry | periodic |
| TELE_THROTTLE_COUNT_ICCMAX | ICCMAX throttle cycles telemetry | periodic |
| TELE_THERMAL | Temperature telemetry | periodic |
| ADR | ADR request and acknowledgement | In response to an ADR event |
| RESET_PREP | Warm reset request and acknowledgement, PkgS | In response to warm reset, PkgS |
| PMREQ | Inter-tile PM request (OMReq) or PM response (PMRsp) | PkgC |
| CD_INFO | Supervisor requesting CD info | Once at reset |
| SYNC_RESOURCE_FLOW_ID | Indication to supervisee regarding the next flow that is to be synchronized | Reset, PkgC, GV, other TBD flows |
| MD_CD_READY | Reset coordination messages intended to be sent on early SB | Reset time handshakes |
| CD_POC | POC info targeted to supervisee | Once at reset |

Here, sideband (SB) refers to non-primary fabric used for configuration, register accesses, etc. Here, power on configuration (POC) is strap information from platform components which is used to convey the platform information to a processor (e.g., CPU) for consumption during reset/boot flow. Here, Asynchronous Data Refresh (ADR) generally refers to a feature on a processor (e.g., CPU) which preserves certain processor state(s) in memory on a power fail event. Here, Energy Perf Bias (EPB) generally refers to a setting from an operating system which provides a hint to bias a power management policy towards performance or energy efficiency. Here, Inverse Temp Dependence (ITD) generally refers to a phenomenon where lowering temperature requires higher supply voltage for the processor to be able to operate at the same frequency. Here, package C-state (PkgC) is an idle power flow which kicks in when processor cores and compute engines go idle, and an entire package (having the processor cores and compute engines) is taken into a low power state. Here, Companion Die (CD) generally refers to a die used for non-core functions like accelerators (crypto, compression, network, etc.). CD maybe a die in the package connected to the main die (MD) via one or more fabrics. MD is typically a compute die and CD is typically a non-core function. MD and CD are typically not symmetric. A package can comprise a collection of compute and I/O dies (which may be symmetric with respect to their PM capability) and additional CDs (which have limited PM capability—hence asymmetric to MDs).

The communication between the HPM domains is used for several purposes. There are commands for initialization, discovery, reset, budget management, resource balancing, resource management, policy management, telemetry exchange. Not every HPM domain needs to support all the capabilities; however, there is a minimum set of capabilities that may be supported by all domains. Companion dice can decide on how much resources to invest in HPM depending on their needs and the SoC goals.

In various embodiments, synchronization layer or fabric 311 is provided between the p-units as a lean (e.g., low bandwidth) mechanism to create tight low latency synchronization between APs 313. Such constructs may be used for power management flows where low latency synchronization is needed to move budgets arounds or to resolve resource dependencies. In some embodiments, fabric 311 is low latency, and it works in conjunction with the P2P layer or fabric messaging which indicates the macro flow for which the synchronization layer is being used.

One implementation of the synchronization fabric 311 can be a set of daisy chained signals spanning each die. While this adds a bit of propagation delay to the transport, it removes the loading concerns for these signals, and the fabric can be scaled to a large number of dielets.

Figure 4:
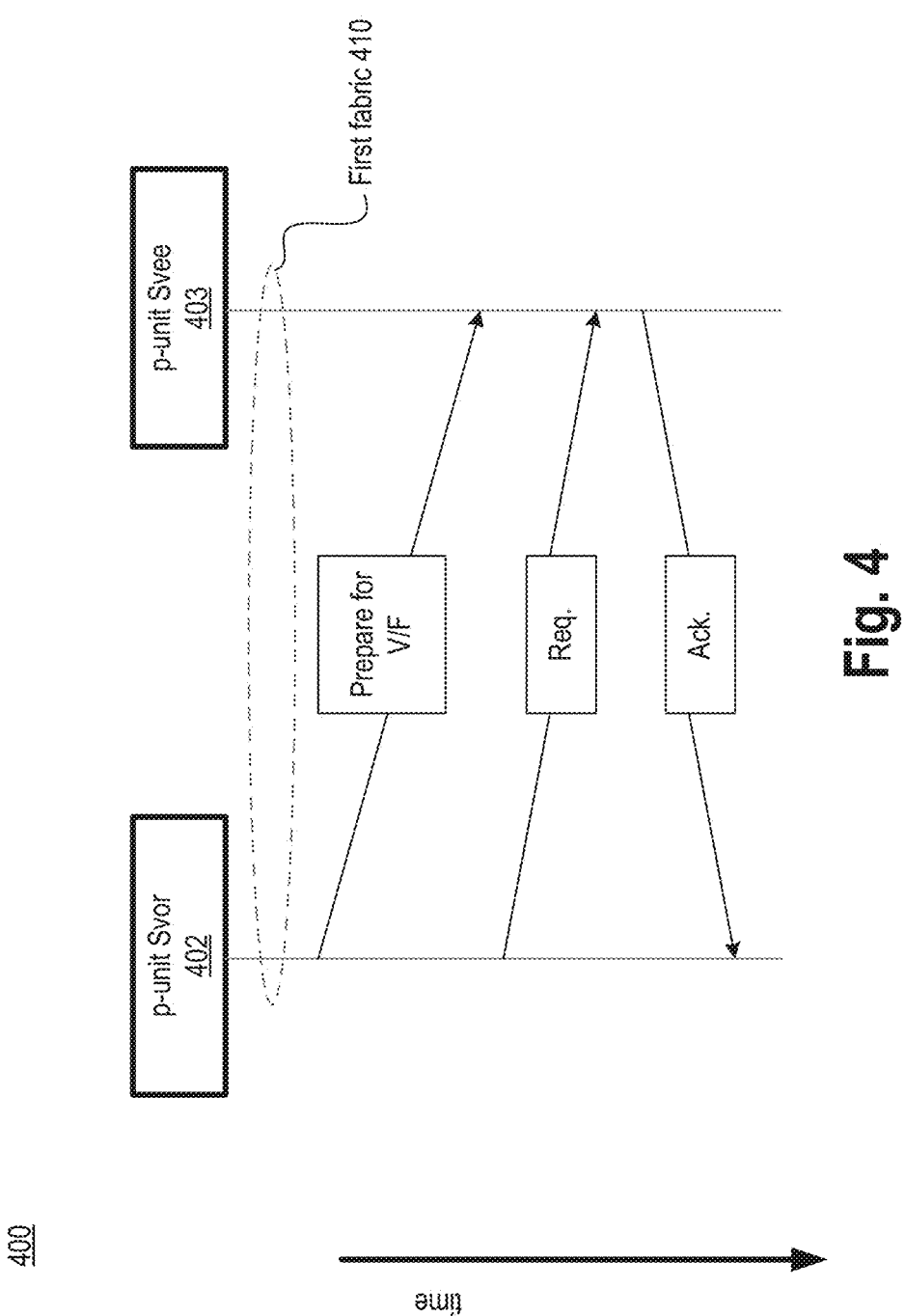
FIG. 4 illustrates a message protocol between supervisor and supervisee power management components, in accordance with some embodiments.

FIG. 4 illustrates message protocol 400 between supervisor and supervisee power management components, in accordance with some embodiments. FIG. 4 shows a DVFS (dynamic voltage and frequency scaling) flow over time that is coordinated across the dielets via first fabric 410 (e.g., 110, 210, 310) between supervisor p-unit 402 (e.g., 102, 202, 302) and supervisee 403 (e.g., 103, 203, 303). Other example usages include reset synchronization, Iccmax budget balancing, workload balancing, PkgC, error signaling, and probe mode. In some embodiments, the availability of fabric 410 is limited to on-pkg HPM domains.

Communication channel through fabric 410 between supervisor 403 and supervisee 403 indicates the flow that is being synchronized. Fabric 410 carries the specifics of which flow or step is being synchronized. In some embodiments, specific actions taken by supervisee p-units is specified for each event. In some embodiments, supervisor-to-supervisee request (Req.) channel is used to synchronize the starting point of the flow (e.g., dispatcher trigger). In some embodiments, fabric 410 is used to send and receive request (Req.) and acknowledgement (Ack.) messages. In some embodiments, fabric 410 is connected from supervisor p-unit 402 to all supervisee p-units.

For example, fabric 410 includes a channel configured as a daisy chain to reduce loading from all the supervisee p-units connected to it. The message protocol between supervisor 402 and supervisee 403 involves requests and acknowledgement handshakes. In some embodiments, fabric 410 includes a wire that is supervisee-to-supervisor Ack channel. This channel is used by supervisor p-unit 402 to determine when every supervisee p-unit has reached the end of a current phase. This channel is daisy chained wire with level signaling, in accordance with some embodiments.

While message protocol 400 shows supervisor p-unit 402 initiating the communication with supervisee p-unit 403 to instruct supervisee p-unit 402 to prepare to operate with a particular voltage and/or frequency targets, sending requests to supervisee p-unit 403, and receiving acknowledgement from supervisee p-unit 403, the communication can be modified. For example, supervisee p-unit 403 can request supervisor p-unit 402 permission to run at a particular voltage and/or frequency (V/F), and supervisor p-unit 402 grants or rejects that request.

In some embodiments, the need for synchronization in flows crossing die boundaries is not a requirement. It is an optimization that can provide tighter coupling and control over cross-die flows. Whether synchronization (e.g., request-acknowledgement handshake) is deployed or not is an SoC choice made based on its power and performance (PnP) goals. It is a tool available in the HPM toolbox that can be utilized by an SoC if desired.

In some embodiments, supervisor p-unit 402 is a top-level or grand supervisor p-unit or HPM supervisor p-unit which has all p-units under its' domain or AP. In one such embodiments, supervisor p-unit 402 has an algorithmic layer which is responsible for enforcing package level constraints. These constraints are typically Pmax, Iccmax, TDP, and Thermals, etc. Platform specifies that the package is to consume no more than the TDP level of power. In some embodiments, supervisor p-unit 402 implements a RAPL (Running Average Power Limit) algorithm which considers the energy consumed in all the APs and non-AP functions as well. Supervisor p-unit 402 is also responsible for ensuring that the total Iccmax requirement from all the components under its supervision does not exceed the specification of a voltage regulator providing the supply. In some embodiments, supervisor p-unit 402 implements a global EDP (Electrical Design Point) budgeting algorithm that allocates a portion of the current to each component. There are numerous other functions that are carried out in supervisor p-unit 402 for hierarchical PM.

Table 2 lists some of the flows that are implemented to facilitate the coordination between the supervisor p-unit 402 and its supervisee p-units 403.

TABLE 2

| Feature | Organization | Comments |
|---|---|---|
| IccMax, Pmax, LIMCA (what is LIMCA) | Hierarchical | Globally budgeted; Locally enforced; request/grant message (including MIN_REG). Global throttling wire from shared single Pmax Protector IP. |
| Turbo Ratio Limits | Distributed | Locally enforced. Dependencies: high volume manufacturing (HVM); HGS, OS, bin split, performance |

TABLE 2-continued

| Feature | Organization | Comments |
|---|---|---|
| Voltage management (shared rails) | Hierarchical | Used for shared external; Request/grant message for coordination |
| PkgC/PkgS | Hierarchical | Existing inter-socket message encapsulated in new cross-tile message |
| Mesh GV | Hierarchical | Coordinated global flow to accommodate limited decoupling across mesh domains |
| PnP slow limits, configuration (RAPL, Uncore Frequency Scaling (UFS), performance P-limit, Energy Efficient Turbo (EET), HWP, Intel Speed Select (ISS), HGS, PBF, Flex Radio, Config Thermal Design Power (TDP)) | Hierarchical | pCode enhancements that leverage common set of infrastructure capabilities; PERF_REQ messages for cross-die frequency coordination |
| DRAM, RAPL, DRAM thermal | Hierarchical | Local enforcement, global coordination |

Here, EET refers to Energy Efficient Turbo where instead of going into turbo when operation system (OS) requests for it, the power management controller makes a judicious choice to go into turbo mode if there is performance benefit expected from the frequency increase. Here, turbo generally refers to an operating frequency higher than a nominal frequency designated for a processor.

Various building blocks of HPM are described with reference to servers. However, the embodiments are not limited to such and are applicable to any computing platform. In some embodiments, each AP (core dielet) in the server SoC has its own p-unit. Any companion dice or function specific dielet may or may not have a powerful power management unit. In some embodiments, the integrated dielets are connected via the P2P fabric which provides the transport layer. The P2P protocol may not be tied to a specific type of transport layer.

The P2P commands sent from the supervisee p-units can technically be sent by a software entity, e.g. a software driver which is responsible for managing the function being integrated into a package. For such cases, an MMIO (memory mapped IO) accessible path is enabled for the device drivers, so that they can provide the P2P commands to supervisor p-unit 403. An SOC can choose which P2P commands and capabilities are exposed to a driver. Once the commands are received, they can be processed normally without necessarily caring for whether a software (SW) entity or a hardware (HW) agent send the command pCode (firmware that runs on the p-unit) can optionally implement filtering for certain commands received from an SW driver.

HPM of various embodiments hides the die hierarchy inside the package from the platform. The platform interaction is with the HPM supervisor p-unit 402. Supervisor p-unit 402 is responsible for providing package level consolidated telemetry to the platform. Also, the platform may control the entire package from a single control interface hosted in HPM supervisor p-unit 402. This allows the platform to be oblivious to the number of die and the partitioning of the silicon inside the package, and thus decouples the silicon partitioning decisions from platform design.

Platform level control entities such as DPTF (Dynamic Platform and Thermal Framework) and node manager can use the telemetry and exposed controls to guide the algorithmic optimization policies of HPM supervisor p-unit 402.

In various embodiments, the hierarchy inside the package is exposed to the platform and software. HPM exposes a physical domain which corresponds to a package level aggregation function useful for package level reporting of physical parameters, e.g. package temperature, package energy consumption, etc. HPM also exposes one or more software domains. Platform interfaces like PECI (Platform Environment Control Interface) are envisioned to be virtualized, so that the SW domain scoped services are directed to the respective p-unit representing the SW domain. Physical scoped services are directed to package HPM supervisor p-unit 402. Similarly, the MSR (model-specific register) space is partitioned into physical and SW domain scopes, and are directed to the appropriate p-unit.

Figure 5:
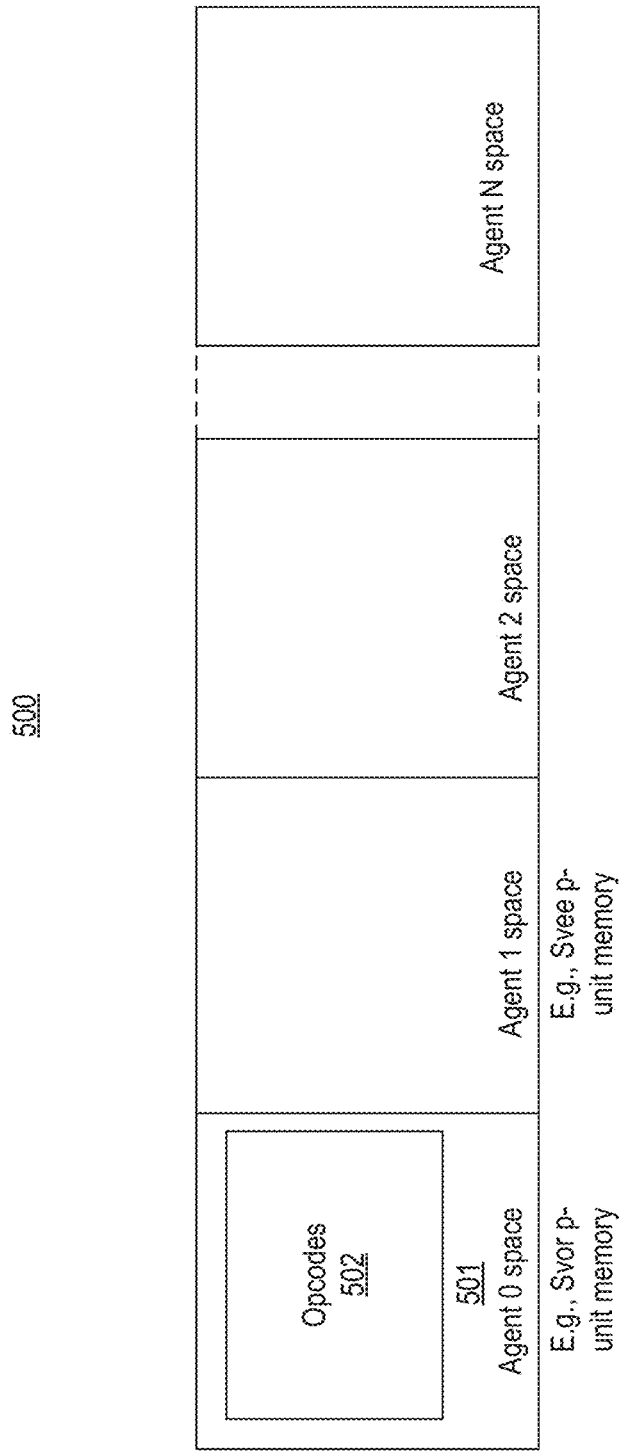
FIG. 5 illustrates a memory partitioned for the supervisor and supervisee power management components, in accordance with some embodiments.

FIG. 5 Illustrates memory 500 partitioned for the supervisor and supervisee p-units, in accordance with some embodiments. In some embodiments, each p-unit has a dedicated memory 501 (e.g., static random-access memory (SRAM)) that can sink the HPM messages coming over the P2P fabric (e.g., fabrics 110 and 111). In one example, the P2P fabric messages can carry up to 256 logical opcodes 502, thus allowing reasonable room for growth. In some examples, the SRAM is provisioned with an ability to sink a message of each type from up to 16 agents, thus enabling support for a total of 15 dielets, CDs, or CXL devices.

In some embodiments, a p-unit is equipped to decode the message type and deposits the messages in the SRAM, and notifies the p-unit firmware (pCode) that a new message has arrived. pCode can then process the messages at its convenience. Such an implementation can help eliminate the need for flow control and improve the throughput of P2P fabric significantly. The protocol allows for flow control messages to be sent to manage the P2P fabric in case the agents are not fully provisioned and only have a limited buffer to receive P2P messages. In some embodiments, the supervisor p-unit and symmetric dielets (i.e. APs with a p-unit) are always fully provisioned and as a result the supervisor and supervisee p-units (or agents) may not have a need for implementing flow control when sending messages between them.

However, in some SoC definitions, dielets with possibly different p-unit versions may be forced to be in a single package. In such a case, these p-units may have varying degrees of capability and flow control may become necessary even between p-units. The flow control constructs are defined to be general and can be used for HPM communication with any AP. In some embodiments, memory 500 is a contiguous memory which is partitioned for each AP including supervisor p-unit and supervisee p-units. In some embodiments, memory 500 is part of a last level cache (LLC) in a die. In some embodiments, memory 500 is one of level-3 or level-2 cache of a die. In some embodiments, an SoC may have a dedicated memory unit which is partitioned and available for the p-units to use.

To facilitate messaging between multiple p-units, some memory storage is allocated for p-unit to p-unit (P2P) communication. This storage is further divided to allocate each p-unit some dedicated space. When a p-unit sends a message to another p-unit, the sender's message is stored into its' dedicated region in memory. Within a p-unit's dedicated region (Agent space), the addresses are further divided to allocate space for each supported message type.

Figure 6:
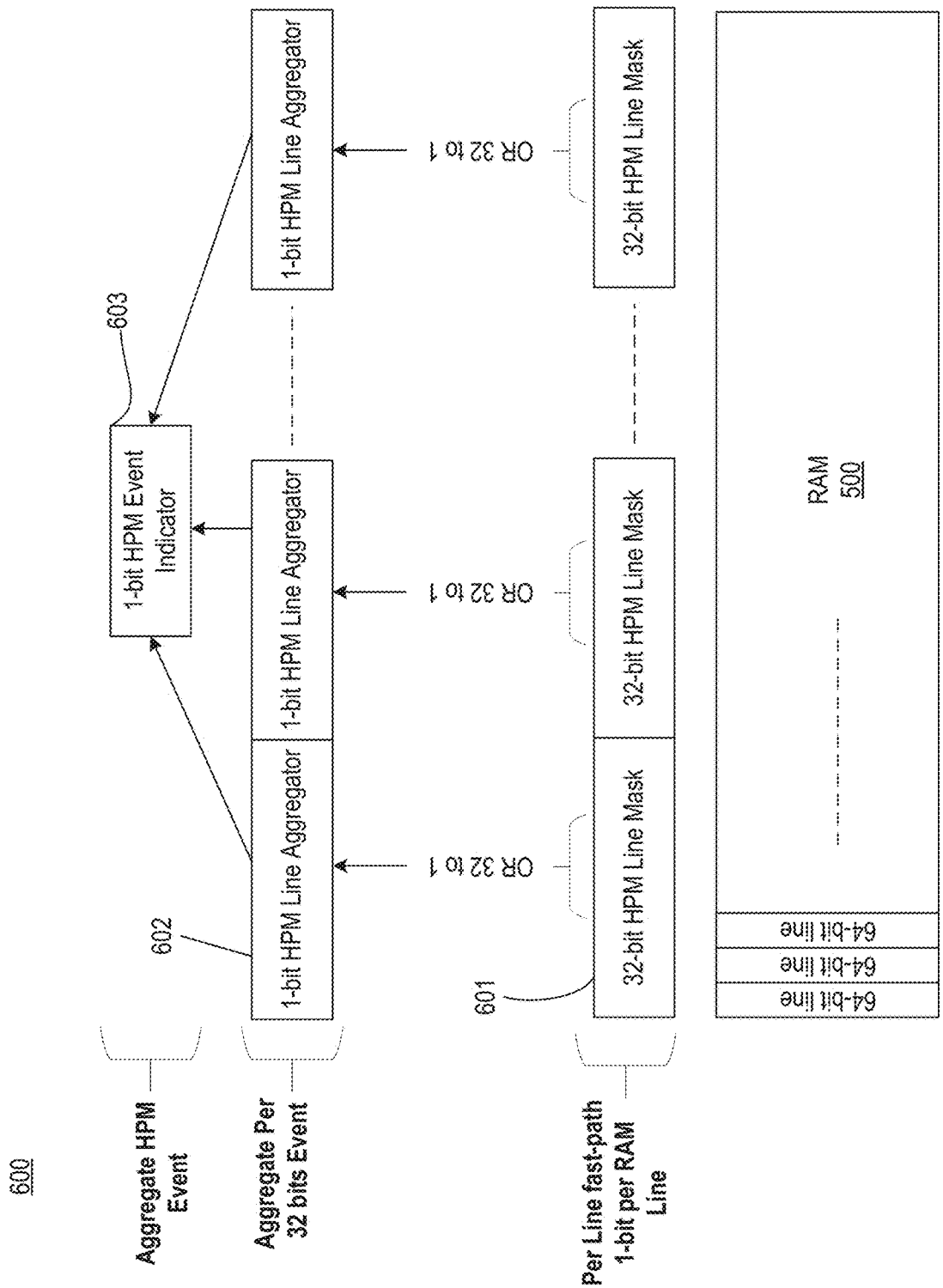
FIG. 6 illustrates a communication protocol for the memory of FIG. 5, in accordance with some embodiments.

FIG. 6 illustrates communication protocol 600 for memory 500 of FIG. 5, in accordance with some embodiments. Updates to memory space 500 result in a hierarchical aggregation of event signals to indicate to the p-unit that the contents have been updated and that there are potential actions to take. The hierarchical aggregation of event signals comprises reading per line fast-path (e.g., 1-bit per line from RAM 500) resulting in 32-bit HPM line mask 601. These 32-bit HPM line masks are aggregated to 1-bit HPM line aggregator 602. The 1-bit HPM line aggregator 602 from 32-bit HPM line masks 601 are aggregated to a 1-bit HPM event indicator 603. By tracing backwards through the aggregation, the p-unit can identify which specific sender(s) and message(s) need to be looked at. In addition to message-based communication, there are also wire-based signals for latency sensitive events.

Figure 7:
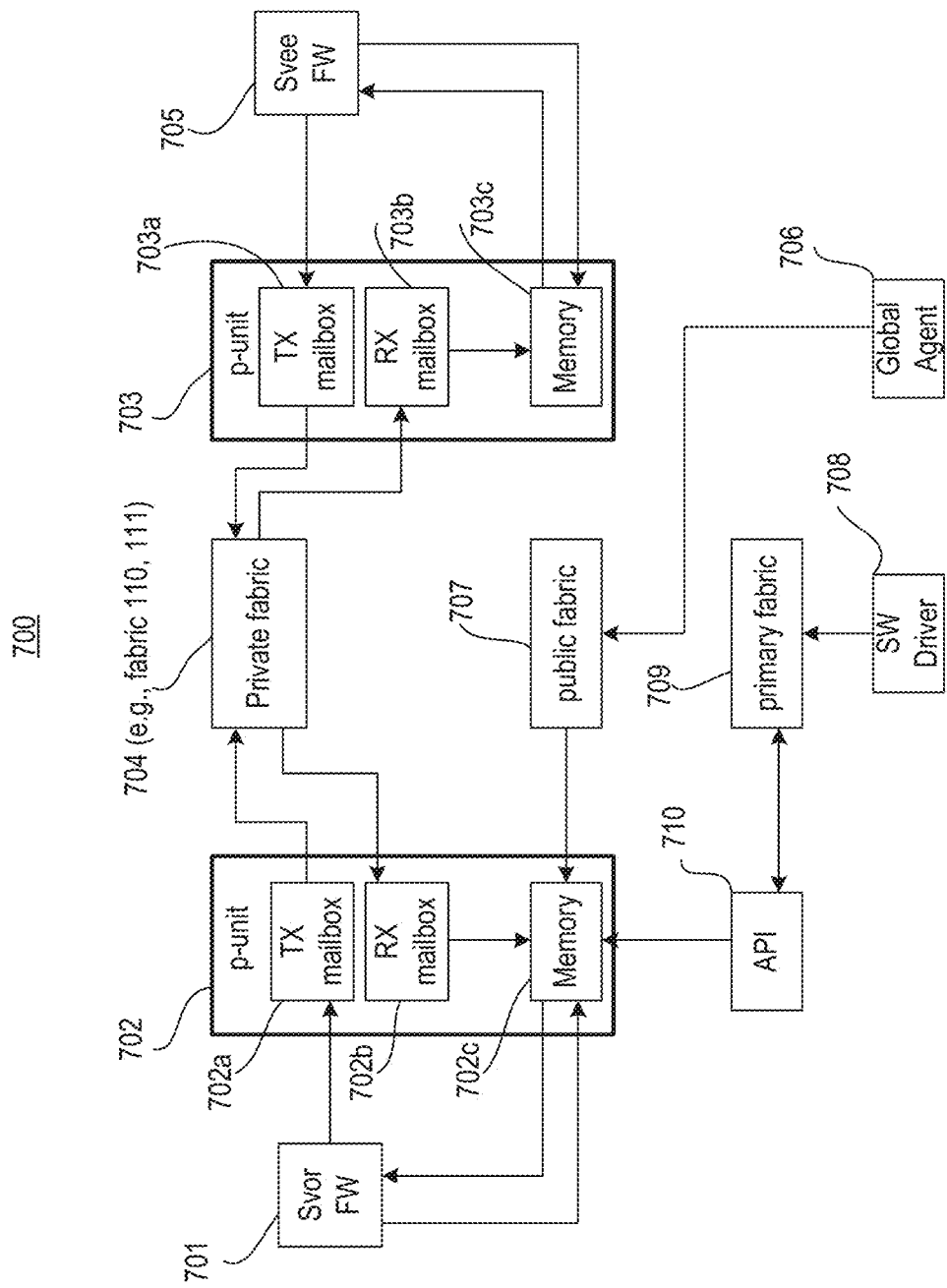
FIG. 7 illustrates a flowchart showing communication between supervisor and supervisee components of HPM, in accordance with some embodiments.

FIG. 7 illustrates flowchart 700 showing communication between supervisor and supervisee components of HPM, in accordance with some embodiments. While various blocks are shown in a particular order, the order can be modified. For example, some blocks perform operation in parallel while other blocks perform operations before others. For supervisor p-unit 702 (e.g., 102) to send a message to supervisee p-unit 703 (e.g., 103), supervisor firmware (FW) 701 sends the command to supervisor p-unit 702. Supervisor p-unit 702 includes a transmitter (TX) mailbox 702a, receiver (RX) mailbox 702b, and memory 702c (e.g., a portion of memory 500). Supervisor FW 701 sends the message to supervisor TX mailbox 702a to transmit the message via private fabric 704 (e.g., first fabric 110 and/or second fabric 111) to supervisee p-unit 703. Here, mailbox refers to a driver that may execute in kernel space. In some embodiments, supervisee p-unit 703 comprises TX mailbox 703a, RX mailbox 303b, and memory 703c (e.g., a portion of memory 500). The message from TX mailbox 702a is received by RX mailbox 703b. Upon receiving the message, RX mailbox 703b save the relevant portions of the message to memory 703c (e.g., a dedicated space of memory 500). The contents of memory 703c are accessible by supervisee FW 705.

In response to receiving the message from TX mailbox 702a, supervisee FW 705 confirms reception of the message by sending an Ack message to supervisor 702 via TX mailbox 703a. The Ack message is communicated to RX mailbox 702b via fabric 704. In some embodiments, any message from supervisee p-unit 703 to supervisor p-unit 702 is saved by RX mailbox 702c to this portion of memory 702c. Supervisor FW 701 then accesses memory 702c to determine next course of action. In various embodiments, supervisor p-unit 702 is accessible by a global agent 706 (e.g., platform supervisor agent) via public fabric 707. In some embodiments, public fabric 707 is same as second fabric 211. In some embodiments, public fabric 707 is in addition to the first fabric 110 and second fabric 111. In some embodiments, supervisor p-unit 702 is accessible by software drivers 708 via primary fabric 709 and application programming interface (API) 710.

Figure 8:
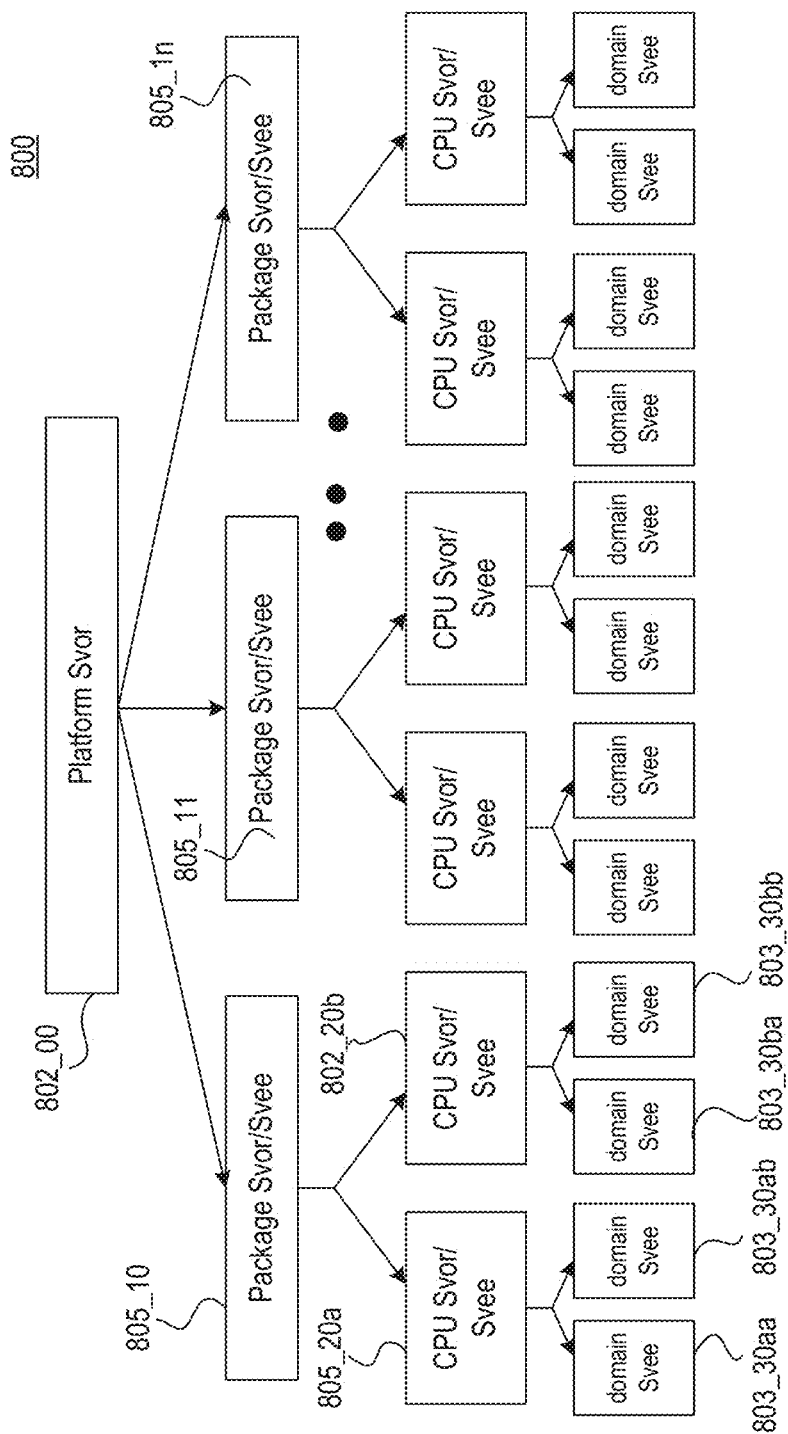
FIG. 8 illustrates a multi-level hierarchy of HPM, in accordance with some embodiments.

FIG. 8 illustrates multi-level hierarchy 800 of HPM, in accordance with some embodiments. To support control of shared resources and to present a monolithic view to the user, each p-unit can be configured with different personalities and arranged into a hierarchy, in accordance with some embodiments. Each level of the hierarchy is a supervisor p-unit of its local domain or AP and makes autonomous decisions within that domain, and a supervisee p-unit for the p-unit above it in the hierarchy. In this example, multi-level hierarchy 800 comprises platform supervisor p-unit 802_00 (e.g., 102) and package supervisor/supervisee p-units 805_00, 805_11, ... 805_1n, (where 'n' is a number) under platform supervisor 802_00. The supervisor/supervisee p-units are generally referred here as supervisor/supervisee p-units 805 (e.g., 105). Hierarchy 800 further comprises CPU supervisor/supervisee p-units under each package supervisor/supervisee p-unit 805. For example, package supervisor/supervisee p-unit 805_10 manages CPU supervisor/supervisee p-units 805_20a and 805_20b. Each CPU supervisor/supervisee p-unit manages its domain supervisee p-unit. For example, CPU supervisor/supervisee p-unit 805_20a manages supervisee 803_30aa and 803_30ab while supervisor/supervisee p-unit 805_20b manages supervisee 803_30ba and 803_30bb.

In various embodiments, flows or actions that require shared resources or that have impact beyond a local domain are sent up the hierarchy to the configured supervisor. For example, actions are sent up from domain supervisee p-unit 803_30aa to CPU supervisor/supervisee p-unit 805_20a, from CPU supervisor 805_20a to package supervisor/supervisee p-unit 805_10, and from package supervisor/supervisee p-unit 805_10 o platform supervisor p-unit 805_00. In some embodiments, a supervisor p-unit aggregates and takes the necessary actions from the flows or actions received from other supervisor/supervisee p-units under it. A supervisor p-unit's actions can include dictating down the hierarchy so that each lower level supervisor takes any necessary actions for propagating up further. In various embodiments, a p-unit can be configured with multiple personalities. For example, a p-unit can span multiple levels of the hierarchy.

In some embodiments, HPM extends to socket-to-socket, and not just one monolithic package with one or more dies. In various embodiments, HPM enables multiple HPM domains that can arbitrarily fit into or across physical boundaries based on implementation choice. In some embodiments, any supervisor p-unit in a hierarchy can direct any supervisor/supervisee p-unit under it directly without going through intermediate supervisor/supervisee p-units in that hierarchy. For example, platform supervisor p-unit 802_00 may direct power management of domain supervisee p-unit 803_30aa directly. While the example here shows two CPU supervisor/supervisee p-units under a package supervisor/supervisee p-unit, any number of CPU supervisor/supervisee p-units can be under a package supervisor/supervisee p-unit. The same holds for any other supervisor/supervisee p-unit.

Figure 9A:
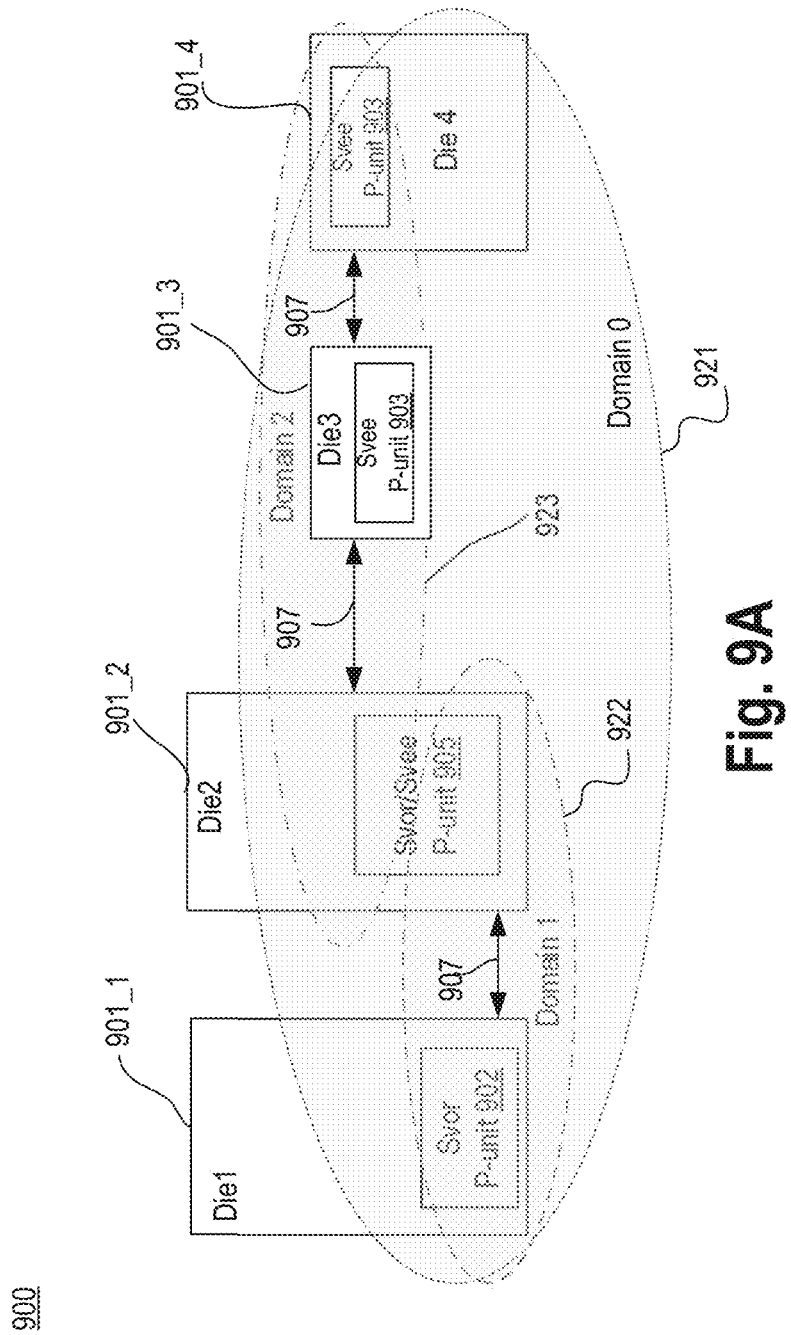
FIGS. 9A-B illustrate multiple supervisor power management components that manage a plurality of domains where some supervisor components are supervisee components of another supervisor component, in accordance with some embodiments.
Figure 9B:
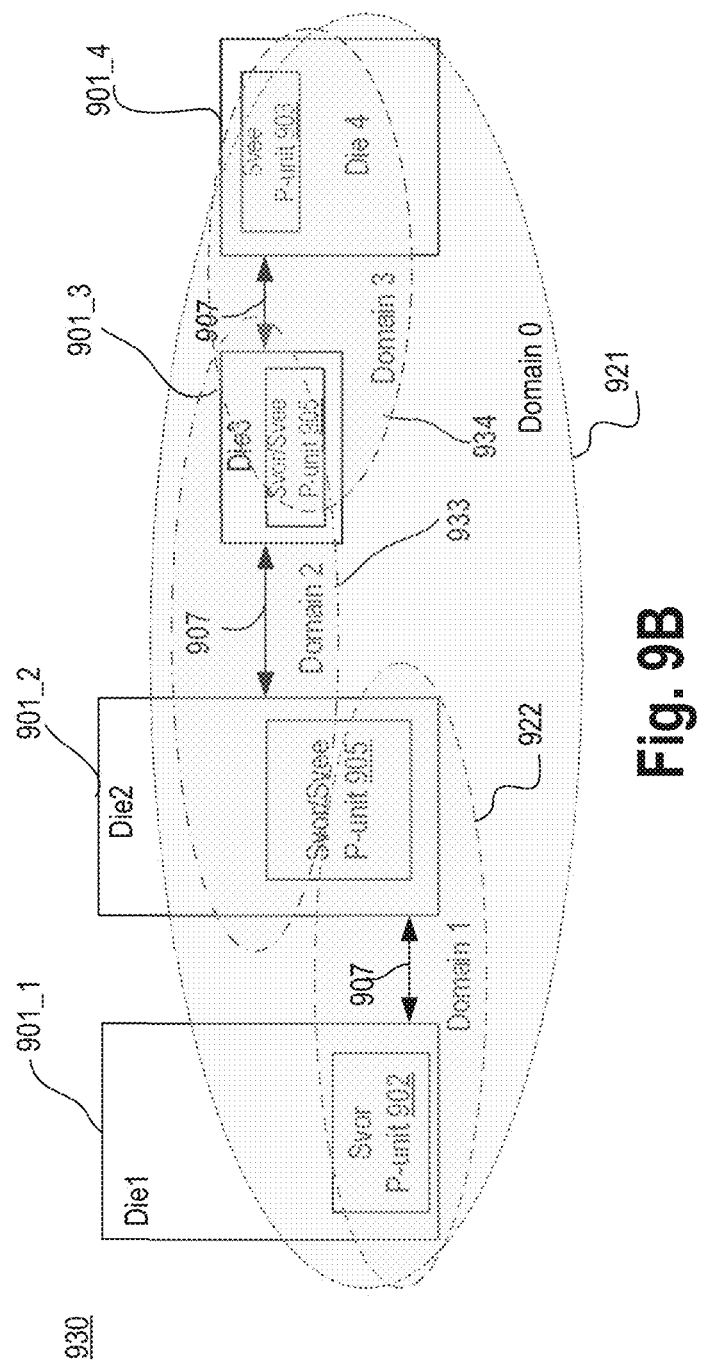

FIGS. 9A-B illustrates apparatuses 900 and 930, respectively, having multiple supervisor power management components that manage a plurality of domains where some supervisor components are supervisee components of another supervisor component, in accordance with some embodiments. In this case, the power management components are in dies connected in a chain formation via set of fabrics 907 (e.g., fabric 110, 111, and interconnect 112). For example, Die1 901_1 is connected to Die 2 901_2, Die2 901_2 is connected to Die3 901_3, and Die3 901_3 is connected to Die4 901_4. A die can belong to more than one HPM domains where it serves as a supervisor for downstream dice, and presents a unified view upstream towards the HPM supervisor p-unit in a domain where it is a supervisee p-unit.

In apparatus 900, supervisor p-unit 902 (e.g., 102) of Die1 901_1 has supervisor domain (as indicated by Domain 0 921) over other p-units including supervisor/supervisee p-unit 905 of Die2 901_2, supervisee p-unit 903 of Die3 901_3, and supervisee p-unit 903 of Die4 901_4. Here, supervisor p-unit 902 (e.g., 102) of Die1 901_1 and supervisor/supervisee p-unit 905 of Die2 901_2 correspond to domain 1 922. Supervisor/supervisee p-unit 905 of Die2 901_2 has dual role. For example, supervisor/supervisee p-unit 905 acts as supervisor for domain 2 923 which includes supervisee p-unit 903 of Die3 901_3 and supervisee p-unit 903 of Die4 901_4, and acts as supervisee for supervisor p-unit 902 of Die1 901_1.

Apparatus 930 has multiple supervisor power management components that manage a plurality of domains where some supervisor components are supervisee components of another supervisor component, in accordance with some embodiments. In this example, supervisor/supervisee p-unit 905 of Die2 901_2 acts as supervisor p-unit for supervisor/supervisee p-unit 905 of Die3 901_3 which is part of domain1 933. Continuing with this example, supervisor/supervisee p-unit 905 of Die3 901_3 also behaves as a supervisor, and as such supervisor/supervisee p-unit 905 of Die 3 acts as a supervisor p-unit for supervisee p-unit 903 of Die4 901_4, which is part of domain 3 934.

The following section discusses management of maximum power (PMAX) and maximum current (IccMax) limitations in an HPM architecture.

SoCs have specifications for PMAX and IccMax limitations. These limitations are based on real-world applications or benchmarks (such as applications, IccMax.App or PMAX.App) and malicious power virus applications (e.g., IccMax or PMAX). Here, PMAX is the maximum power drawn from the Platform power supply by the CPU package. This is defined as the product of MBVR (motherboard voltage regulator) voltage used by the processor package times the IccMax of the package. Here, IccMax of the package is defined as:

The virus dynamic capacitance Cdyn*Max_all_core_freq for the pkg*operating voltage of the core at that frequency.

Individual components of IccMax are calculated for all the components on the die and added together to come up with a die level IccMax estimate.

Power Supply Unit (PSU) based PROCHOT # assertion is typically set to take the power of a processor or SoC down to the (programmable) target P-state, which historically has been set to the minimum support P-state (Pn/Pm configurable). At this power state, the system severely degrades performance to reduce the current load and extend hold up time. PMAX Detector assertion caps the processor power down to Pthrottle/Psafe which is a higher performance level compared to Pn/Pm. Here, Pthrottle or Psafe performance level refers to a voltage and/or frequency operating level that meets the thermal and reliability constraints of a processor. Relatively little performance is shaved off the top, or clipped, to control peak power.

Maximum throttling through PROCHOT # assertion can be used for all use cases but this creates excessive performance degradation for some usage models. For example, the PSU detection hardware monitors an intrinsically filtered version of the PMAX event. If the PSU is sized down to support PMAX.App loading rather than the PMAX condition, considerable cost and area savings will be lost on the additional energy storage capacitors for the PSU to sustain the power surge for the duration of the delay in sensing the event. Another shortcoming of this scheme is that it can only respond to the total power (including all the CPUs and rest of the system) supported by the PSU. In the case where one CPU is processing a PMAX event while the other CPU is processing a real workload, undifferentiated power throttling will penalize the CPU processing a useful workload. Alternatively, an absence of power throttling response will not constrain the CPU with PMAX workload and allow valuable power to be wasted. In addition to suboptimal handling of the mentioned scenarios, the solution requires dedicated hardware and signaling overhead on the platform resulting in more cost and complexity SoCs have traditionally used single threshold or multi-threshold PMAX detector logic to trigger throttling when the current draw exceeds IccMax.App. PMAX detector logic senses the droop on input supply voltage (VccIN) voltage and throttles the core when the droop hits the single programmed Vtrip threshold (corresponding to IccMax.App or PMAX.App). Existing PMAX detector logic operate for monolithic SoCs that have a single power management unit (p-unit).

Existing PMAX detector logic are unable to manage power for hierarchical SoCs that have multiple p-units as it will lead to sub-optimality in terms of fragmentation and performance loss. Some power management tools like SIRP (SoC IccMax Reactive Protector) protect the SoC from power excursions caused by IccMax.App by aggregating current from all integrated voltage regulators (IVRs) and/or intellectual property blocks (IPs) in the SoC and induce throttling when the aggregate current exceeds IccMax.App. Both PMAX detector logic and SIRP protect two things: 1) IVR input Vmin violation due to $3^{rd}$ droop; and 2), platform power supply unit (PSU) by inducing SoC throttling above IccMax.App. Note that IVRs can include on-chip switch regulators such as buck converter and switch cap regulators, and non-switch regulators such as LDOs.

Detecting PMAX using PMAX.App or IccMax.App sensing is done at the package level i.e. aggregate of all the dies. However, sensing at package level (as against sensing at die level) can incur additional latency to throttle cores across all dies and may lead to violating the $3^{rd}$ droop time constant. But, if sensing is done at die level and not package level, then it can cause fragmentation losses which will result in suboptimal performance.

PMAX detector or SIRP of various embodiments detect and throttle cores within $3^{rd}$ droop time constant which can range from a few hundred nanoseconds to a microsecond depending on the settling time of adaptive voltage positioning (AVP) control or droop control. In HPM with multiple compute and IO dies, such mechanisms (e.g., PMAX detector or SIRP) detect PMAX.App or IccMax.App violations and may throttle all cores in the SoC within the $3^{rd}$ droop time constant, in accordance with some embodiments.

Some embodiments describe an apparatus and method to detect IccMax.App or PMAX.App excursions at a package level and throttle the compute IPs in SoCs that implement HPM. In various embodiments, the communication path to throttle the cores is optimized such that the detector-to-throttle path is completed within the $3^{rd}$ droop time constant. The apparatus and method of various embodiments ensure that there is minimal fragmentation loss on IccMax.App or PMAX.App in spite of the hierarchical nature of the SoC. Some embodiments also provide the communication and interface between supervisor and supervisee dies (or p-units) to adjust SoC frequency such that IccMax.App or PMAX.App violations are rare or non-existent.

There are many technical effects of the various embodiments. For example, there is little, if no, fragmentation loss using the PMAX detector of various embodiments. Also, the embodiments result in better controlled performance under electrical constraints. Other technical effects will be evident from the various figures and embodiments.

Figure 10:
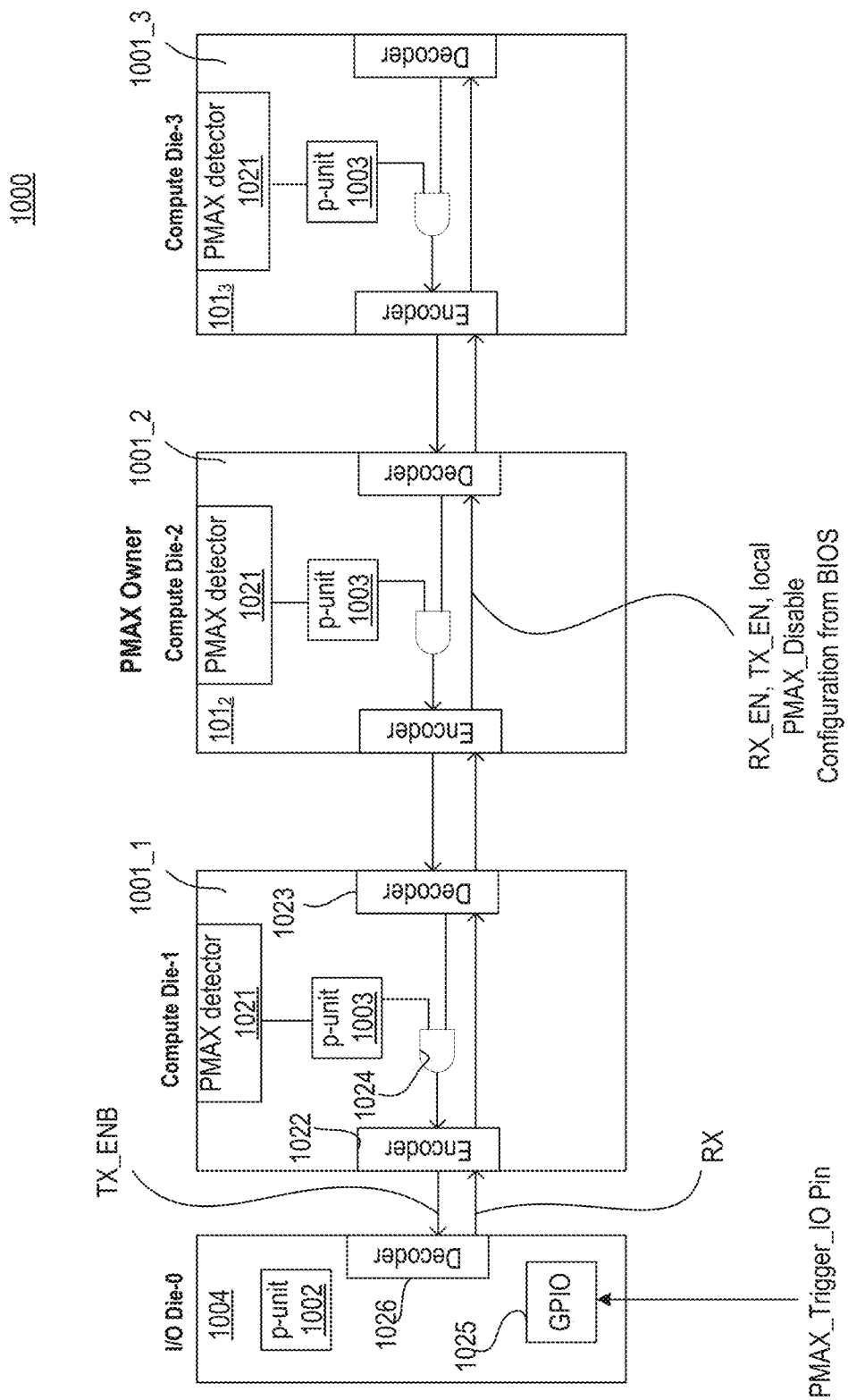
FIG. 10 illustrates a high-level HPM architecture with PMAX detector and IO connections, in accordance with some embodiments.

FIG. 10 illustrates a high-level HPM architecture 1000 with PMAX detector and IO connections, in accordance with some embodiments. In this example, I/O Die-0 1004 includes a supervisor p-unit 1002 (e.g., 102) while compute dies 1001_1, 1001_2, and 1001_3 have supervisee p-units 1003 (e.g., 103). I/O die 1004 includes general purpose I/O (GPIO) 1025, decoder 1026, and p-unit 1002.

While various embodiments here select I/O Die-0 1004 as the supervisor die having supervisor p-unit 1002, the HPM infrastructure has the flexibility to make any die in the package the supervisor. One reason for selecting p-unit 1002 of I/O Die-0 1004 as the supervisor p-unit is because there are certain components on an I/O die which connect to the platform, and thus it becomes a convenient place to consolidate platform connectivity. These various components include the SVID (serial voltage identification) interface which may be used to monitor the energy consumption of the package. As such, IO die 1004 is a good candidate for being the supervisor die (e.g., having supervisor p-unit), since the interfaces used and information that p-unit 1002 needs to gather is naturally available in the IO die.

As shown herein, PMAX Detection Circuits 1021 resides inside the processor dies and identifies a condition where the processor or SoC power exceeds the PMAX.App limit. PMAX Detection Circuits 1021 detects this condition by sensing (e.g., IVR input domain) VccIN voltage within a time constant of few hundred nanoseconds to microseconds depending on the platform AVP settling time. PMAX Circuit 1021 provides a faster detection and response to PMAX load event relative to legacy solutions that are implemented external to the processor or SoC.

The motherboard VR (Voltage Regulator) and CPU or SoC interaction is tied to the concept of AVP and load-line. For the current drawn by the CPU, the VccIN voltage is bounded by the maximum (max) and minimum (min) VccIN limits. These limits are in effect within a certain bandwidth of current changes in the processor. Within the bandwidth, the real-time VccIN voltage can be effectively mapped to IccIN through the loadline resistance value. The accuracy of this mapping is limited by a tolerance(s). PMAX Detection Circuit 1001 senses VccIN and indicates if IccIN has exceeded a (guard banded) PMAX.App threshold.

In this example, each compute die includes PMAX detector 1021, supervisee p-unit 1003, encoder 1022, decoder 1023, and logic 1024. In various embodiments, the IccMax limits are socket-level limits to protect platform electricals including motherboard voltage regulator (MBVR) current limits. The limits may be fuse-defined or defined by a user (e.g., via software or hardware interface). In various embodiments, the limits are expected to be enforced over timeframes of approximately 500 ns, for example. Shorter spikes are filtered out and may be considered acceptable under certain conditions. In some embodiments, the IccMax limit is programmable by users using Model Specific Register (MSR) (e.g., using VR_CURRENT_CONFIG.CURRENT_LIMIT register field).

In various embodiments, PMAX detector 1021 is enabled for a compute die based on its location relative to other compute dies. A compute die, which is between other computer dies or surrounded by other compute dies, is marked as the PMAX owner and its PMAX detector is enabled, in accordance with some embodiments. In this example, compute die-2 1001_2 which resides between compute die-1 1001_1 and compute die-3 1001_3 is the PMAX owner. In another example, a central compute die by location or position of the compute die relative to other compute dies is selected as the PMAX owner to keep throttle latencies symmetrical across the rest of the dies. However, any compute die can be a PMAX owner compute die. In some embodiments, signals originating from the PMAX owner compute die have a tree topology for addressing latency issues. In some embodiments, a fuse setting in the p-unit selects a PMAX owner compute die.

In various embodiments, PMAX detector 1021 of compute die-2 101$_2$ detects IccMax.App or PMAX.App excursions at a package level and throttles the compute IPs in SoCs that implement HPM. In some embodiments, the communication path to throttle the cores is optimized such that the detector-to-throttle path is completed within the 3$^{rd}$ droop time constant.

Voltage droops are voltage delivery failures in essence because of very high current draw from the circuits on a die. The droop event is a reduction in voltage on the voltage rail below a nominal voltage operating point. A voltage level below the nominal voltage operating point can result in a failure because the supply voltage is no longer sufficient to support the frequency of operation of various circuits. Droops are a function of the current draw and the resistance, inductance, and capacitance (RLC) characteristics of the die, package, and motherboard. When a large di/dt (current change) event occurs, there are three distinct voltage droop events that can be observed. These droops spread out over time—thus referred to as 1st, 2$^{nd}$, and 3$^{rd}$ droops. The first droop occurs very fast and extends up to few 10s of operating frequency cycles, and corresponds to the Die RLC parameters. The 2$^{nd}$ droop is typically few 10s of nanoseconds and is a function of the package RLC. The 3$^{rd}$ droop occurs 100s of nanoseconds and is a function of the motherboard RLC. Typically package and die constraints and limited availability of interconnect layers on the board leave the power delivery network vulnerable to droop events. Thus, the operating voltages are guard-banded to account for the droops when a high di/dt event occurs.

PMAX detector 1021 of compute die-2 1001_2 of various embodiments ensures that there is no fragmentation loss on IccMax.App or PMAX.App in spite of the hierarchical nature of the SoC. Some embodiments also provide the communication and interface between supervisor and supervisee dies (or p-units) to adjust SoC frequency such that IccMax.App or Fmax.App violations are rare or zero.

Single threshold PMAX detectors induce heavy hammer throttling that may have a huge performance penalty. Multi-threshold PMAX detection adds multiple droop thresholds. In some embodiments, PMAX detector 1021 is a multi-threshold detector. In one example, PMAX detector 1021 supports three trip thresholds of 1 MHz low-pass filtered input power supply VccIn. The trip thresholds can be independently programmed through fuses, in accordance with some embodiments. The trip levels can be used during high volume manufacturing (HVM) and aligned with platform PMAX.App and SoC IccMax.App and IccMax.Max specifications. In various embodiments, soft-throttling actions are taken for events below IccMax.App with the goal of reducing the number of events where the processor asserts hard electrical throttling. Soft throttling or progressive throttling kicks in before VccIn approaches the hard-throttling level, in accordance with some embodiments.

In some embodiments, PMAX detector 1021 includes a fast droop detector (FDD). The fast droop detector detects and triggers power reduction response on large first and/or second droop events in VccIn. The fast droop detector is designed to protect IVR Vmin specs during events such as a Power delivery Resonant Virus (PDRV). Here, Vmin refers to the minimum operating voltage below which the processor does not perform properly. The event (e.g., PDRV) is sensed within nanoseconds and fed to phase locked loops (PLLs) and/or frequency locked loops (FLLs). The PLLs/FLLs stretch and distribute the clocks out for power reduction within a time line (e.g., 1 ns). FDD trip point is fused by HVM in alignment with IVR Vmin specs.

As FDD feature is used to address 1$^{st}$ droops, the complete loop of detection to throttling is expected to be completed within the 1$^{st}$ droop time constant. In some embodiments, to meet this tight response time requirement with minimum trigger propagation latencies, PMAX detector 1021 having the FDD is positioned closer to the cores on the compute die. FDD allows the SoC to implement P0nmax frequency for performance improvement by detecting fast droop to push for higher PXn frequencies previously not attainable due to noise on VccIn. Here, PXn is a performance state, where X is a performance state case and 'n' refers to all cores. In this example, P0 refers to a turbo frequency which is higher than the base frequency at P1 state, P01 is a turbo frequency state with only one core enabled in that state, and P0max refers to all core turbo frequency state with a workload that has lower dynamic capacitance than nominal workload used to set P1 performance state. FDD protects against Vmin violations on the IVR input domain VccIn by quickly detecting droops and triggering a fast throttling action to rise out of the droop event.

In some embodiments, the droop is sensed and acted upon independently by each compute die. As such, FDD in each compute die is active while multi-threshold PMAX detector 1021 for the PMAX owner is active. Other multi-threshold PMAX detector 1021 (of non-PMAX owners) are inactive (e.g., by fuse). In various embodiments, HPM supervisor p-unit (e.g., p-unit 1002 of IO Die) is expected to be different than p-units of PMAX Owner (one of the compute dies). In some embodiments, there is a p-unit fuse to mark a particular p-unit as the PMAX Owner p-unit. The PMAX throttle wires originate from the PMAX owner compute die 1001_2 and broadcast to all compute dies and IO dies. In some embodiments, where some compute dies are disabled (e.g., due to a fault), PMAX owner may be assigned to a die different than the die which is surrounded by other disabled compute dies.

In various embodiments, each compute dies' p-unit 1003 gets the BIOS driven PMAX I/O configuration. This configuration is written to a dedicated physical space. In some embodiments, every compute die p-unit has two ports (RX_DATA, TX_ENB) on one end and another port (RX_DATA) on the opposite end. In some embodiments, an interface is provided to allow users (e.g., customers of the SoC) to inject PMAX events externally from the platform depending on sensing circuits in the platform. This external PMAX event can be injected into the SoC through a GPIO pin called PMAX_TRIGGER_IO, in accordance with some embodiments. GPIO is a bidirectional pin where default mode is an input mode.

In some embodiments, the PMAX_TRIGGER_IO pin is connected to the RX_DATA port of the PMAX owner p-unit 1003. When the platform asserts PMAX_TRIGGER_IO, the PMAX owner p-unit 1003 broadcasts Hard_Throttle to all dies. In some embodiments, the Hard_Throttle is issued over fast response interconnect 112. In some embodiments, the PMAX_TRIGGER_IO can also be configured to output mode by writing via BIOS to a specific bit in PMAX owner p-unit die 1003 (e.g., compute die 1001_2). This bit toggles the PMAX_TX_ENB port on the p-unit. This port drives wire to the TX_ENB port of the GPIO. When configured in TX mode, the platform can observe internal PMAX events over TX_DATA. In the HPM implementation of some embodiments, TX_DATA is connected to fast response interconnect 112 to carry Hard_Throttle. While the communication between encoder 1022, decoder 1023, and other wires (e.g., Hard_Throttle) are shown as specific communication, this communication can take place over one of fabrics 110 or 111.

Figure 11:
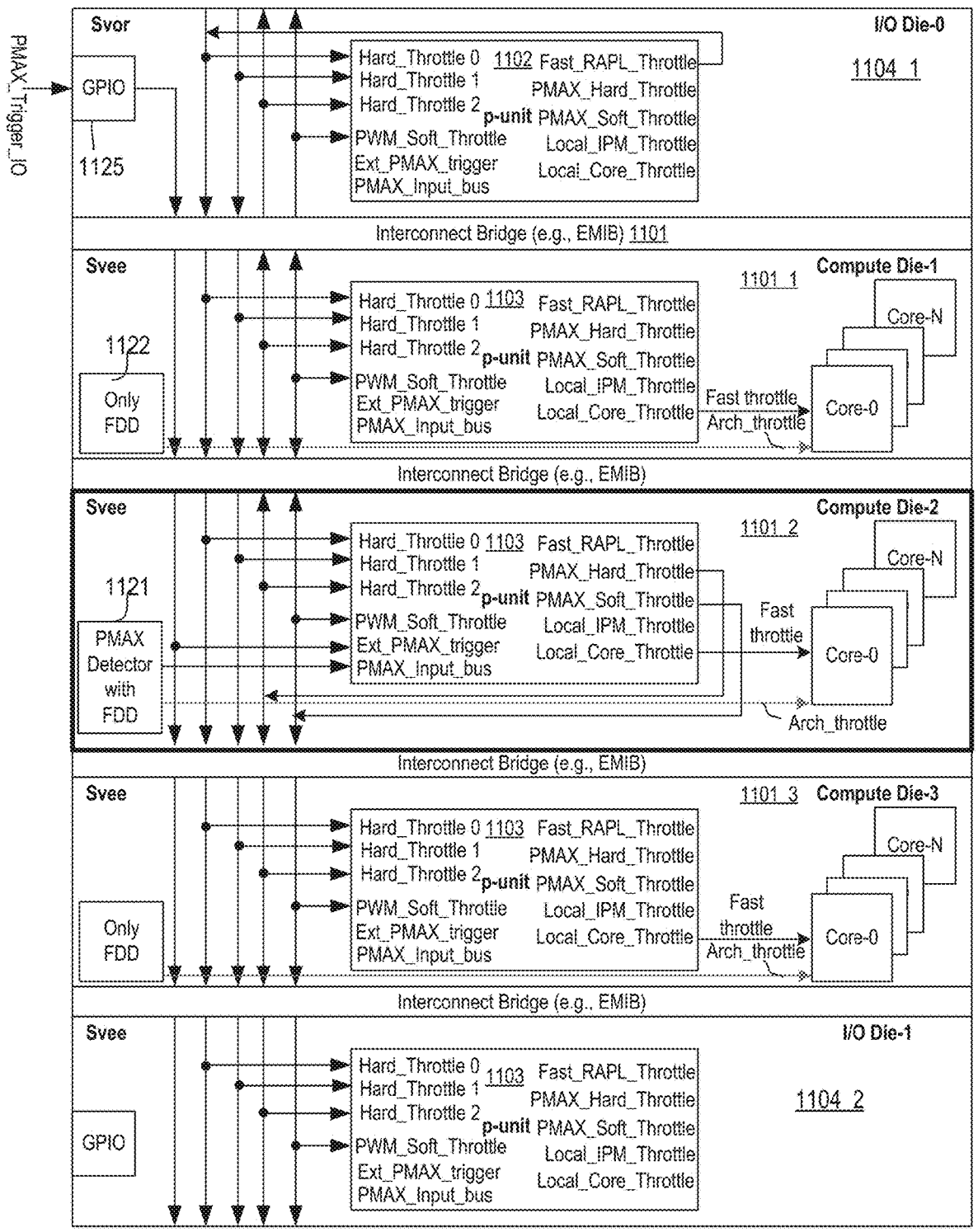
FIG. 11 illustrates a more detailed view of FIG. 10, in accordance with some embodiments.

FIG. 11 illustrates a more detailed view 1100 of FIG. 10, in accordance with some embodiments. This example of an SoC shows five dies which include two IO Dies 1104_1 and 1104_2 with no cores, and three compute dies 1101_1, 1101_2, and 1101_3 with processor cores Core-0 through Core-N, where 'N' is a number greater than zero. The p-unit of IO Die-0 1104_1 is supervisor p-unit 1102 (e.g., 102) in this example because it receives PMAX_TRIGGER_IO signal via GPIO 1125. The p-units of the other dies in this example are supervisee p-units 1103 (e.g., 103). However, some p-units may have dual roles such as supervisor-supervisee p-unit 105.

In some embodiments, each die communicates with the other die via an interconnect bridge. One example of the interconnect bridge is EMIB (embedded multi-die interconnect bridge). In some embodiments, the interconnect bridge is a separate die with multiple routing layers. In some embodiments, fabrics 110 and 111 pass through the interconnect bridge for allowing the p-units (supervisor, supervisee) of various dies to communicate with one another.

Without any loss of generality, IO Die-0 1104_1 (e.g., 104) is assumed to be the supervisor power management Die with supervisor p-unit 1102. The Multi-Threshold PMAX Logic 1121 (or PMAX detector) is implemented in the central compute die 2 1101_2 (e.g. 101). This is done so that the latency to throttle cores across dies is symmetrical and there is no unfairness.

Multi-Threshold PMAX logic 1121 senses VccIN droop (e.g., droop on input power supply to a VR such as VIR or any other VR such as low dropout regulator) and compares it against multiple thresholds. Each threshold is associated with a trigger wire that is routed to the local supervisee p-unit 1103 in Compute Die 2. In FIG. 11, PMAX logic 1121 is assumed to have three thresholds and thus three trigger wires (one corresponding to each threshold) are routed to the p-units. These wires include two throttle wires—HARD_THROTTLE and SOFT_THROTTLE (PWM) that originate at the PMAX Owner Compute Die 1101_2 and broadcast to all dies. Both the wires originate at supervisee p-unit 1103 of PMAX Owner Compute Die 1101_2 and terminate at other supervisee p-units 1103 and supervisor p-unit 1102.

P-units of each die have a number of input and output pins. The pins to the left of p-unit including Hard throttle 0, Hard throttle 1, Hard throttle 2, PWM soft throttle, External (Ext). PMAX trigger, and Maximum (Max) are inputs. The pins to the right of p-unit including Fast RAPL throttle, PMAX Hard throttle, PMAX Soft throttle, Local IPM throttle, and Local core throttle are outputs. Some or all of these various pins and associated wires can be part of first fabric 110, second fabric 111, or fast wire response 112.

PMAX_Input_Bus, is an input bus that corresponds to the multiple threshold triggers from PMAX IP.

Hard_Throttle_2 is an inter-die PMAX input for hard throttle. This is a hard throttle request from another die.

PWM_Soft_Throttle is an inter-die PMAX input for soft throttle. This is a soft throttle or PWM throttle request from another die.

Ext_PMAX_trigger is an input which is an indication from of PMAX from external PMAX_TRIGGER_IO GPIO pin.

Hard_Throttle_0 is an input which indicates a fast RAPL throttle indication from another die.

Hard_Throttle_1 is an input which indicates PROCHOT (processor hot) from another die.

Local_IPM_Throttle is an output pin that indicates a local in-package memory (IPM) throttle request output.

Local_Core_Throttle is an output pin that indicates a local core throttle request output.

PMAX_Hard_Throttle is an inter-die output pin that indicates PMAX Hard Throttle request to another die.

PMAX_Soft_Throttle is an inter-die output pin that indicates PMAX Soft/PWM Throttle request to another die.

Fast_RAPL_Throttle is an inter-die output pin that indicates Fast RAPL Throttle Request to another die.

PMAX_Trigger_Tx_Enb is an output signal that indicates to the BIOS intent to configure PMAX_TRIGGER_IO in output mode.

Not all inputs and/or outputs are used in a particular die. Compute die2 1102_2, which is a supervisee die (because it has supervisee p-unit) in this example, is the central compute die and thus the PMAX owner. Even though compute die-2 1102_2 may not be a supervisor, PMAX detector 1121 detects the PMAX.App limit and sends a signal to p-unit 1103 of the same die via PMAX Input bus if VccIn crosses this limit. In embodiments, p-unit 1103 of Compute die-2 1102_2 is a supervisor/supervisee p-unit (e.g., 105).

In some embodiments, if PMAX detector 1121 (e.g., 1021) detects large droop on VccIn, PMAX Hard throttle is asserted for all cores of each compute die (e.g., Core-0 through Core-N) till the throttle indicates de-asserts. In some embodiments, FDD throttle indication may not go through p-unit 1103, and may directly go from FDD logic to the cores. In some embodiments, FDD throttle indication may go through supervisor p-unit 1102 via the fast response interconnect 112 to the p-units of the dies and/or cores.

During hard throttle, power supply and/or operating frequency of the cores are reduced to lower the power consumption at the package level. In some embodiments, PMAX detector 1121 includes FDD, while other non-PMAX owners (e.g., compute die-1 1101_1 and compute die-3 1101_3) include FDD detector 1122. For example, the PMAX detector in the non-PMAX owner dies is disabled while FDD logic is enabled. FFD detectors 1122 trigger architecture-level throttle (arch_throttle) for all cores of all dies, in accordance with various embodiments. Here, arch_throttle is a hard throttle in which voltage and/or frequency of call cores in all dies is reduced. In some embodiments, supervisor p-unit 1102 determines that one or more of the FDDs 1122 triggered arch_throttle and causes all supervisee p-units to throttle all cores of their respective dies.

In some embodiments, depending on the level of violation using the multi-threshold PMAX detector 1121, PMAX Soft throttle is asserted. For example, when VccIn is about to cross the final or lowest threshold (but has not crossed it), PMAX detector 1121 may initiate a soft throttle. During soft throttle, clock logic in each core (or outside each core) may lower the frequency of the clock. For example, clock frequency can be lowered using clock stretching. In some embodiments, supervisor p-unit 1102 of I/O die 1104_1 includes a counter to count a number of times throttle signal was asserted, and then instructs all supervisee p-units about their operating frequency limits.

Figure 12:
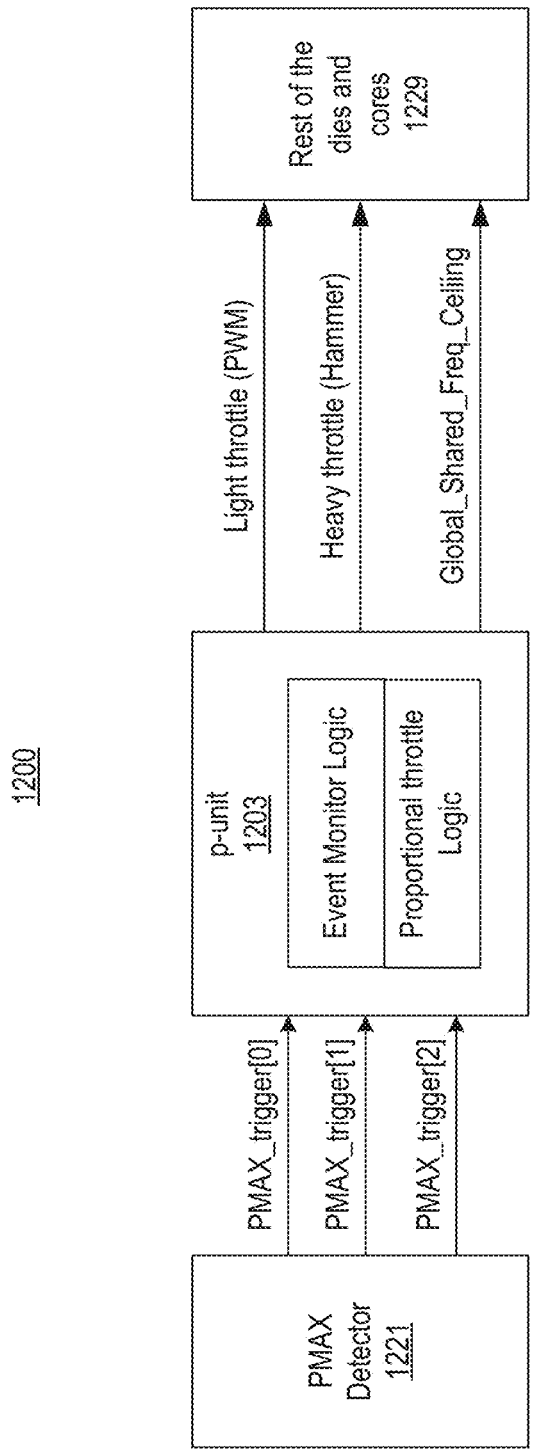
FIG. 12 illustrates a high-level block diagram of a p-unit interface with the PMAX detector, in accordance with some embodiments.

FIG. 12 illustrates a high-level block diagram 1200 of a p-unit interface with PMAX detector 1221 (e.g., 1021), in accordance with some embodiments. In some embodiments, PMAX Owner p-unit 1203 (of compute die 1101_2) comprises an event monitoring and proportional throttle logic that converts the PMAX triggers PMAX_trigger[0], PMAX_trigger[1], and PMAX_trigger[2] to a proportional duty cycle throttle that are broadcast to all the cores across all the dies 1229 (e.g., 1102_1, 1102_3, etc.) over fabric 111. Here, PMAX_trigger[0] asserts when VccIn crosses a first threshold, PMAX_trigger[1] asserts when VccIn crosses a second threshold, and PMAX_trigger[2] asserts when VccIn crosses a third threshold, where the first threshold is higher than the second threshold, and where the second threshold is higher than the third threshold. Here, PMAX Trigger [2] corresponds to final PMAX threshold. PMAX Trigger [1,0] corresponds to early thresholds. When PMAX Trigger [0,1] fires (or asserts), PMAX-Owner Die 1101_2 generates proportional throttling over PWM Soft Throttle Wire. When PMAX Trigger [2] fires (or asserts), the PMAX-Owner Die 1102_2 generates legacy PMAX throttle over Hard Throttle Wire (e.g., fast response wire 112).

Dedicated throttle wires or throttle message may go over fast response wire 112 or over synchronous bus 111 which have a much shorter inter-die and intra-die latency than fabric 110. The latency is also deterministic for fast response wire 112 or over synchronous bus 111. Usage of fast response wire 112 or over synchronous bus 111 for throttle messaging is to ensure that cores are throttled within the $3^{rd}$ droop time constant. Firmware (FW) pCode-to-pCode messages between p-units on fabric 110 are slower and have non-deterministic latency and hence are not ideal for throttle propagation, in accordance with some embodiments.

When the lower PMAX thresholds are triggered (PMAX_trigger[0] and/or PMAX_trigger[1], the event monitoring logic and proportional throttle logic in PMAX owner p-unit 103 (of compute die 1101_2) converts the trigger into a corresponding PWM throttle indication on SOFT_THROTTLE or Light Throttle Wire. When the final PMAX threshold trips (PMAX_trigger[2]), PMAX Owner supervisee p-unit 1103 (of compute die 1102_2) asserts the HARD_THROTTLE or heavy throttle wire.

On Supervisee p-units, the PMAX_Soft_throttle and PMAX_Hard_throttle wires are OR'd and directly connected to the local fast_throttle output port of the p-unit that is routed to the throttle input of all the cores on the die. On assertion of either HARD_THROTTLE or SOFT_THROTTLE signals, each Supervisee die is expected to reduce its power in a time frame (e.g., less than 500 ns). Moreover, the HARD_THROTTLE wire also generates a pCode Fastpath, which is akin to an interrupt to power management firmware (pCode).

In some embodiments, upon receiving a hard throttle, the p-unit in each die asserts a local fast throttle and generates pCode Fastpath. When supervisee p-unit gets HARD_THROTTLE fast path (e.g., an event or interrupt), it reduces the frequency of the local cores to a PSAFE frequency and then de-asserts the throttle. Supervisor p-unit 1102 on the IO die 1104_1 is responsible for adjusting the overall global_shared_frequency_ceiling (or performance level for all dies) of the package based on these IccMax events and percentage throttling.

In some embodiments, upon receiving a soft throttle, p-unit in each die applies the duty cycle to local fast throttle. Here, applying duty cycle refers to varying the on/off time of the signal level. Duty cycle variation is performed for cases when an SoC may not have the luxury of routing more than one throttle wire, so duty cycle is varied for the signal on the fast throttle wire to get lower level of throttling or "softer" throttling. In some embodiments, upon soft throttle, the p-unit stretches its clock or changes the duty cycle of the clock to reduce frequency and this power. In some embodiments, the p-unit simply duty cycles (varies ON/OFF time) the local_fast_throttle wire based on the SOFT_THROTTLE inter-die indication. As a response to the local_fast_throttle, the cores can either stretch its clock, reduce frequency, inject bubbles in the pipeline or anything else that will reduce effective current draw for the cores.

Supervisor p-unit 1102 connects the SOFT_THROTTLE wire to count number of throttle cycles and based on that generate pCode fastpath. pCcode uses this FP (fast path wire 112) to make finer adjustments to package frequency or performance level or global_shared_frequency_ceiling. In some embodiments, the HARD_THROTTLE wire in supervisor p-unit 1102 is used to trigger a legacy PMAX flow and to make coarse-grained adjustments to package frequency or performance level or global_shared_frequency_ceiling. The various wires herein are dedicated wires or part of the synchronized fabric 211.

Figure 13:
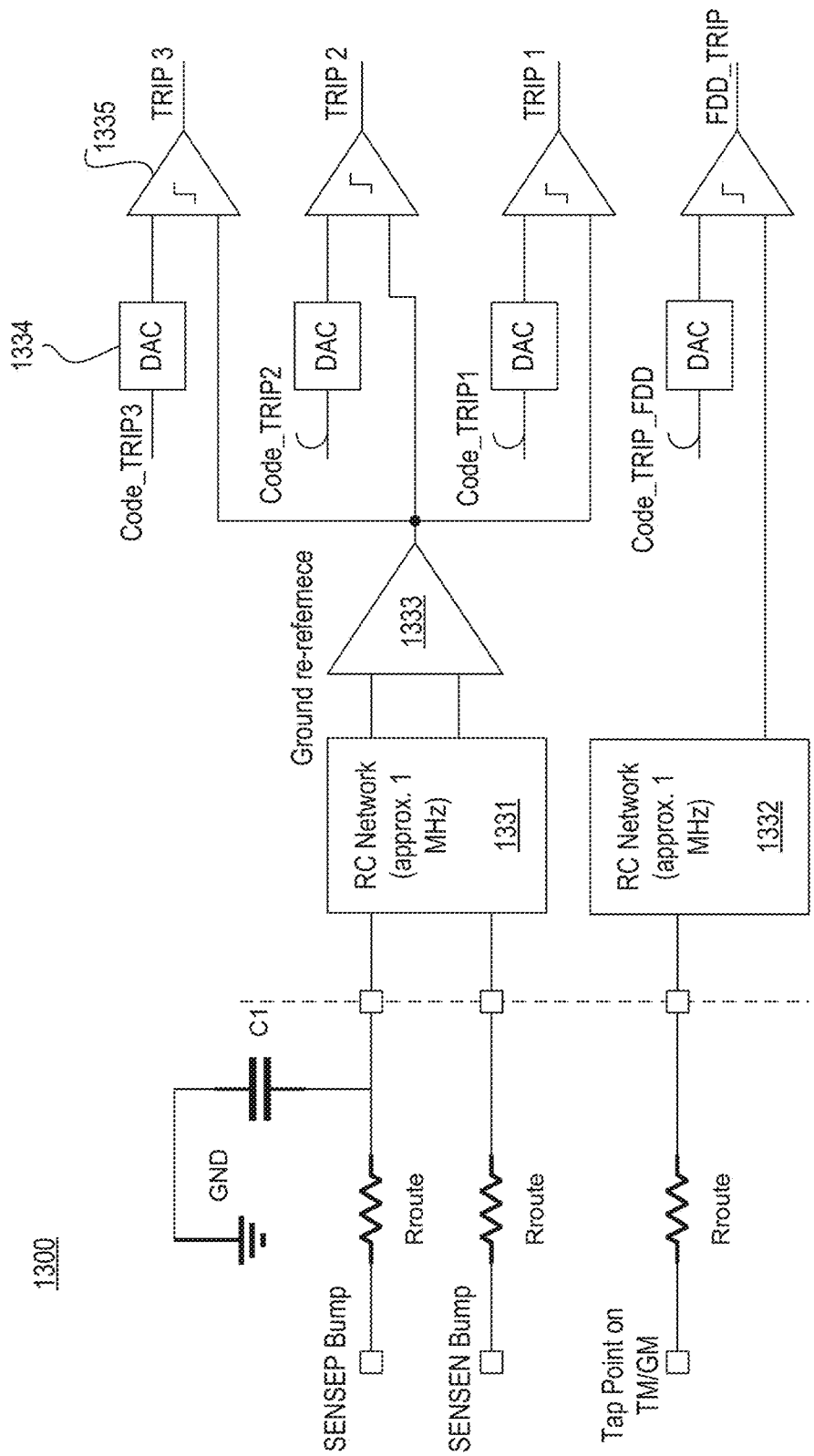
FIG. 13 illustrates a multi-threshold PMAX detector in an HPM architecture of an SoC, in accordance with some embodiments.

FIG. 13 illustrates multi-threshold PMAX detector 1300 (e.g., 1021, 1121, 1221) in an HPM architecture of an SoC, in accordance with some embodiments. In some embodiments, multi-threshold PMAX detector 1300 comprises first filter 1331, second filter 1332, amplifier 1333, digital-to-analog converters (DACs) 1334, and comparators 1335. Nominal VccIN from package bumps (SENSEP and SENSEN bumps) is filtered by filter 1331. Here, SENSEN is connected to the VccIN ground and SENSEP is connected to the VccIN sense point. This differential VccIN is then ground referenced by amplifier 1333. The output of amplifier 1333 is provided to comparators 1335. In various embodiments, a separate path is provided for fast droop detection. In this path VccIN is filtered and provided to comparator 1335 of FDD. Each DAC receives a digital code (e.g., Code_TRIP3, Code_TRIP2, Code_TRIP1, and Code_TRIP_FDD are received by respective comparators).

In some embodiments, DAC 1334 is an apparatus that converts digital data (e.g., binary or thermometer coded) into an analog signal (current, voltage, or electric charge). In some embodiments, DAC 1334 is pulse width modulator DAC. In other embodiments, other types of DACs may be used for implementing DAC 1335. For example, interpolating DAC (also known as oversampling DAC), binary weighted DAC (e.g., switched resistor DAC, switched capacitor DAC, switched current-source DAC), R-2R ladder DAC, thermometer coded DAC, segmented DAC, etc. may be used for implementing DAC 1304. Any suitable DAC may be used for implementing DAC 1334.

Multi-Threshold PMAX detector 1300 takes the VccIn_Sense value and compares it with multiple thresholds, e.g., three thresholds. In some embodiments, Multi-Threshold PMAX detector 1300 provides three Vtrip level signals (TRIP 1, TRIP 2, and TRIP 3) as output from the respective three threshold comparators 1335. In various embodiments, the three trip levels of low-pass filtered VccIn (e.g., 1 MHz low-pass filtered) can be independently programmed through fuses. Typical use model is to take soft-throttling actions for events below IccMax.App with the goal of reducing the number of events where the processor asserts hard electrical throttling.

In various embodiments, when consecutive thresholds are tripped, the 3 level signals are set as follows: 001→011→111 and vice versa; and where 010, 110, 100 are illegal encodings. In some embodiments, PMAX detector 1300 has a programmable digital filter. For example, PMAX detector 1300 comprises programmable digital filter with a range of 10 ns to 2 μs that applies to all Vtrip signals. In some embodiments, PMAX detector 1300 comprises a counter (e.g., a 16-bit counter) that counts for each trip event (TRIP 1, TRIP 2, TRIP 3, FDD_TRIP). In some embodiments, the counters are accessible through TAP (an I/O interface) for debug, validation and characterization purposes. In some embodiments, the counters are designed to continue counting the events even if one or multiple trip indicators are gated off. In some embodiments, the thresholds can be independently adjusted by pCode (firmware of p-unit). For example, the thresholds can be modified without changing fuses programmed in HVM. As such, processor IccMax is effectively reduced without proactively clamping performance.

While various embodiments herein are described with reference to three thresholds, any number of thresholds may be used. Accordingly, any number of DACs and comparators may be used by multi-threshold PMAX detector 1300.

Figure 14B:
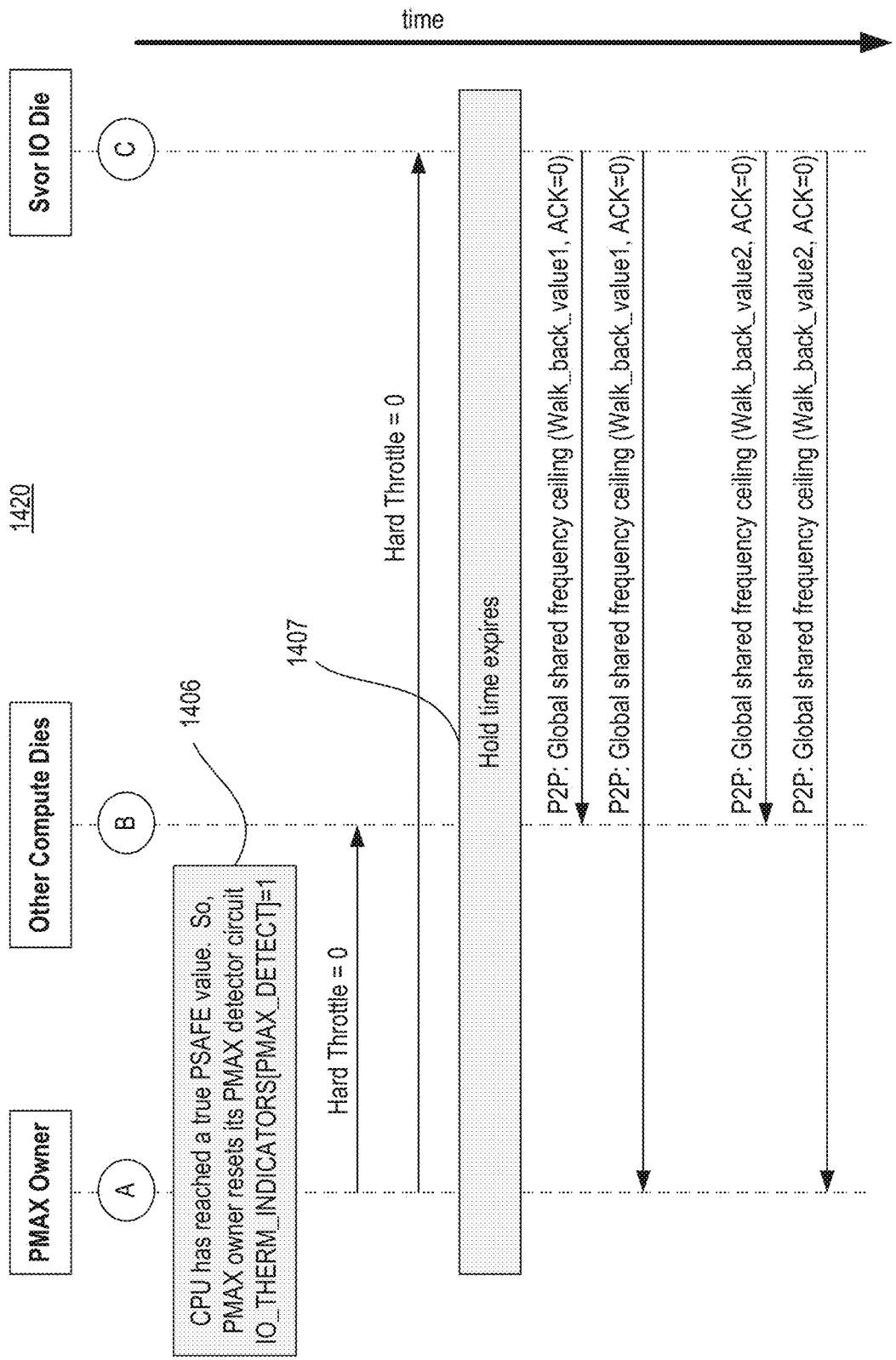

FIGS. 14A-B illustrate PMAX flows 1400 and 1420, respectively, in accordance with some embodiments. Flows 1400 and 1420 illustrate communication between PMAX owner die 1101-2, other compute dies (e.g., dies 1101-1, 1101-3) and supervisor IO die 1104-1. While various communication paths are shown in an order, the order can be modified. For example, some operations can be performed before others while some operations can be performed in parallel. Here, labels 'A', 'B', and 'C' identify the process flow continuation point from FIG. 14A to FIG. 14B, where 'A' indicates the communication to/from PMAX owner 1101-2, 'B' indicates communication to/from other compute dies (other than PMAX owner), and 'C' indicates the communication to/from supervisor IO die 1104-1. The various processes or events occur over time that runs vertically from top to bottom as shown by the time arrow.

In this example, at block 1401 PMAX_trigger[2] event occurs and p-unit 1103 of die 1102-2 asserts a hard throttle wire (Hard Throttle=1). In some embodiments, the hard throttle wire is a dedicated wire that carries the throttle indication. In some embodiments, the hard throttle indication is carried over fabric 111 (second fabric) to p-units of other compute dies (e.g., 1101-1, 1101-3) and supervisor IO die 1014. As discussed herein, fabric 111 has low latency and is designed to carry high priority signals as hard throttle. In some embodiments, PMAX owner die behaves as a supervisor die as well as causing other dies to act upon asserting a hard throttle. Thereafter, supervisor p-unit 1102 of IO die 1104-1 takes its toll as the supervisor of all supervisee p-units under its domain.

At block 1402, each die reduces its power within a predetermined time '1' (e.g., 1 µS) in response to receiving the hard throttle indication. At block 1403, upon assertion of the hard throttle wire or indicator, the p-units (1102 and 1103) of each die asserts a local fast throttle for its respective cores. The firmware, pCode of each p-unit reduces the operating voltage and/or frequency for that die (e.g., for the cores of the die). After some time, pCode of each p-unit de-asserts the fast throttle. At block 1404, the pCode of the supervisee p-units enforces the low power state as long as the request for the low power state is valid (e.g., as long as the throttle wire is asserted or fabric 211 provides a throttle indictor).

Supervisor p-unit 1102 sends a message to the p-units of PMAX Owner die and other compute dies with a safe value (SafeValue) for global frequency limit (ceiling). In some embodiments, the global frequency limit is provided via fabric 110. At block 1405, supervisee p-units including the p-unit of PMAX owner die receive the global frequency limit and send an acknowledgement (ACK=1) message to supervisor p-unit 1102. In some embodiments, p-unit of supervisee compute dies sends a message to p-unit of PMAX owner die that safe level performance (PSAFE) is achieved. In some embodiments, this communication or message can be sent to supervisor p-unit 1102, which in turn sends it to p-unit 1103 of the PMAX owner die 1101-2.

In various embodiments of HPM, power management can be performed by any p-unit, and communication can occur between any p-units. This allows for many p-units to be a supervisor of certain capabilities. For example, p-unit of PMAX owner can act as the supervisor of the PMAX function, and thus all communication can originate from the PMAX supervisor p-unit and go to other p-units and responses would come back to the supervisor PMAX p-unit.

At block 1406, of FIG. 14B, upon determining that compute dies have reached the PSAFE level, p-unit of PMAX owner resets the PMAX detector 1001 (e.g., IO_THERM_INDICATORS[PMAX_DETECT]=1). Thereafter, PMAX detector 1021 de-asserts the Hard throttle indicator or wire and sends that message (or indication) to other compute dies and supervisor I/O die 1104-1. Upon expiration of hold time (or wait time), p-unit 1102 of supervisor die 1104-1 sends walk-back value for frequency limit to compute dies including PMAX owner die 1102-1. The walk-back values are gradually changed (e.g., increased) from value 1 to value 2 to increase performance (e.g., speed) of compute dies.

FIG. 15 illustrates p-code pseudocode 1500 executed by supervisor p-unit 1102 for multi-threshold PMAX detection and management, in accordance with some embodiments. If a number of throttled cycles is greater or equal to a threshold, p-unit 1102 generates pCode Fastpath, and reads a counter value for throttled number of cycles. Upon reading the counter, the counter value is cleared. If supervisor p-unit 1102 determines that the number of throttle cycles divided by an elapsed time is less than or equal to the p-code threshold, then throttling is within accepted limits and there is no need to throttle or lower the operating frequency of the supervisee dies (e.g., dies that have supervisee p-units). Supervisor p-unit 1102 then checks the last time the ceiling increased. If the last time the frequency ceiling increased was a while ago (e.g., greater than up_hysteresis time), the up_hysteresis time is reset and the global shared frequency ceiling is increased (by a programmable amount freq_inc) for all supervisee dies under the domain of supervisor p-unit 1102. This message (PerfGrant) of increase in global shared frequency ceiling is sent via fabric 110 to all supervisee dies in the domain of supervisor p-unit 1102.

If supervisor p-unit 1102 determines that the number of throttle cycles divided by an elapsed time is greater than the p-code threshold, then throttling is more than acceptable and there is no need to lower the frequency of the supervisee dies. If the last time the frequency ceiling decreased was a while ago (e.g., greater than down_hysteresis time), the down_hysteresis time is reset and the global shared frequency ceiling is reduced (by a programmable amount freq_inc) for all supervisee dies under the domain of supervisor p-unit 1102. This message (PerfGrant) of decreasing in global shared frequency ceiling is sent via fabric 110 to all supervisee dies in the domain of supervisor p-unit 1102.

FIG. 16 illustrates p-code pseudocode 1600 executed by a supervisee p-unit for multi-threshold PMAX management, in accordance with some embodiments. When a supervisee p-unit 103 determines that fast throttle is asserted, it applies proportional throttling. PWM is proportional throttling which implies that the throttle severity is a function of the proximity to a critical voltage threshold that the voltage should not drop below. The closer the voltage is to the critical threshold, the more aggressive the throttle actions are. Likewise, gentler throttling is desired and invoked when the voltage is still relatively far away from the trip point (critical threshold). Multiple thresholds allow assessment of the severity of the excursion and thus the throttle response. The throttle response can be controlled by modulating the pulse width of the throttle signal, in accordance with some embodiments. High severity throttling response would keep the throttle signal asserted for longer duration and de-asserted for shorter duration. Gentler throttling asserts the throttle signal for shorter duration and de-assert for longer duration, in accordance with some embodiments. If the p-unit of a supervisee die determines a change in global_shared_freq_ceiling, it clips the operating frequency according to the updated global_shared_freq_ceiling.

The following section describes power management of the uncore using the HPM architecture. Here, the uncore refers to all components of a die that are not part of a processor core or included in a processor core. Examples of the uncore include memory outside of the processor core, fabric outside of the processor cores such as first and second fabrics 110 and 111, respectively, between the p-units, memory fabric, I/O fabric, interconnect fabric components (e.g., mesh nodes) outside of the processor core, IO circuits, etc. The HPM architecture can manage power and performance of all such fabrics. In some embodiments, fabric performance is adjusted by modifying supply voltage, clock frequency, and/or bandwidth of the fabric. For example, by adding (enabling) or removing (disabling) channels in a fabric (which may include multiple channels), the bandwidth of the fabric and hence its power consumption can be modified. Lowering the supply voltage to the fabric slows down the fabric and lowers the power consumption. Increasing frequency of the clock used by the fabric (e.g., by its sequential logic circuits) can increase the speed and hence power of the fabric. All such knobs for adjusting the performance of the fabric are contemplated for managing the performance of the uncore by the HPM architecture.

On processing platforms, active power management may be performed by dynamically scaling at least one of voltage and frequency, a technique known as Dynamic Voltage and Frequency Scaling (DVFS). The DVFS may be performed when processors or other data-handling functional units demand higher (or lower) performance states and may be based on changes in unit utilization. Higher performance states (e.g., higher frequency states) are often granted by a DVFS controller unless there is some other constraint or limit that mitigates against the higher frequency choice, such as detection of thermal violations or peak current violations during processing. A processing platform such as a server may be provided as a SoC which may host a plurality of data-handling functional units such as multiple compute units each comprising a plurality of cores, an IO controller, a memory controller and a Graphic Processing Unit (GPU). Communication between the data-handling functional units on a SoC is performed via a "fabric" of data communication channels. The communication fabric may have a ring, bus, mesh, tree, or any arbitrary topology and operates with a given performance level (Voltage and frequency combination) throughout the fabric. A single fabric may span an entire SoC. Examples of a data-handling functional units include a compute die, a memory die or an Input/Output (JO) die.

The fabric is distributed across the entire SoC connecting different processing elements, such as cores, memory, last level cache (LLC), IOs, and other uncore blocks. The fabric domain is an intellectual property (IP) block in a server SoC that can consume significant amount power. Moreover, the power consumption changes as a function of workload at runtime.

Data processing platforms such as servers may use a single coherent sub-system as a single communication fabric between all data-handling functional units. Since DVFS algorithms for such servers typically set the performance level of the fabric to be the same globally and based on performance counters and constraints from data-handling functional units spanning the whole SoC, the operating frequency of the fabric may be set such that some portions of the fabric are constrained to run at a higher voltage and frequency combination than appropriate. This can result in power wastage. Furthermore, tight coordination of multiple Phase Locked Loops (PLLs) and Integrated Voltage Regulators (IVRs) for respective data-handling functional units on a SoC, can result in complex global architectural flows. Buffering of data across different fabrics operating at different frequencies can give rise to latencies of several clock cycles and also makes loss of data during transmission more likely and is therefore likely to be detrimental to performance. It will be appreciated that power optimization and performance optimization can be difficult to balance in a data processing apparatus. Fabric power consumption is becoming increasingly dominant, and has recently become a performance and design bottleneck in data processing apparatus such as servers.

As the server SoC scales in size and the fabric gets partitioned to support it, there is need for scalable distributed and centralized power management system for the fabric. Existing SoCs typically have a single power management unit to manage the entire fabric domain. This single p-unit is not scalable as the SoC core count and fabric size grows. Suboptimal or inflexible power management mechanisms can lead to inefficiency in design, delay in production schedule or worse performance degradation in the product.

Various embodiments describe mechanisms to manage multiple fabric domains using Hierarchical PM (HPM). Hierarchical fabric management has three main parts: a) computing an optimal V-F (voltage and/or frequency) operating point based on the workload data, b) applying the maximum and minimum bounds for the thermal, IccMax, and SoC architecture limits, and c) Communication between multiple fabric controllers. Described herein are these hierarchical fabric management mechanisms and tradeoffs on how to choose between a fully distributed, centralized and a hybrid approach for fabric power management.

In some embodiments, an apparatus (e.g., an SoC) is provided which includes a plurality of dies including compute dies and I/O dies, wherein each die includes an interconnect fabric having fabric components and interconnect coupling the fabric components. In some embodiments, the SoC further comprises a plurality of power management units, wherein each die of the plurality includes a power management unit such that at least one of the power management units is a supervisor unit and at least two of the power management units are supervisee units. The power management units are arranged in a hierarchical manner such that the supervisor unit controls the at least two supervisee units. In some embodiments, each supervisee unit determines a frequency of its interconnect fabric in consultation with neighboring supervisee units and one or more constraints from the supervisor unit.

In some embodiments, an individual supervisee unit determines workload activity of its die based on telemetry data and heuristics. In some embodiments, the telemetry data includes change in value of one or more hardware performance counters. Other examples of telemetry data include core bandwidth, memory bandwidth, I/O bandwidth, etc. In some embodiments, the individual supervisee unit is part of a die coupled to a memory, wherein the heuristics include traffic on a bus coupled between the die and the memory. Other examples of heuristics include buffer utilization in ingress queues, watermarks in buffers, bandwidth thresholds used to determine either to change frequency by a small step or a large (rocket) step.

In some embodiments, the individual supervisee unit receives a current operation voltage and/or frequency of its neighboring supervisee units via an interconnect between the supervisee units. In some embodiments, the individual supervisee unit resolves a frequency request based on frequency requests of neighboring supervisee units. In some embodiments, when traffic is going from one die to another neighboring die and frequency is about to increase then the receiving die can get early indication to increase frequency to improve latency. Current frequency represents what the uncore is running at this time, and frequency request represents where it might be headed. This separation (between current operating frequencies received from neighboring supervisee units and from the frequency requests of neighboring supervisee units) is probably more relevant when the new frequency is increasing. Because this information can be used to free up some power to allow this die to ramp up its fabric frequency.

In some embodiments, the one or more constraints include one or more of: maximum total power limit of a socket, minimum total power limit of the socket, minimum performance level of the socket, thermal constraints, or user limits. Here, user limits are guidance from a user or customer in the form of a floor frequency or a maximum (ceiling) frequency setting. Other examples of constraints include IccMax, di/dt, voltage droop, etc. In some embodiments, the individual supervisee unit determines the frequency of its interconnect fabric by application of a scale factor that converts a core frequency to a frequency for the interconnect fabric. In some embodiments, the interconnect fabric of a die is coupled to an interconnect fabric of another die.

There are many technical effects of the various embodiments. For example, hierarchical fabric management allows for DVFS to maximize the SoC performance within a power budget. The voltage and frequency settings dynamically change due to the change in workload behavior at runtime. The hierarchical fabric management provides mechanisms to meet the objective at scale. Other technical effects will be evident from the various figures and embodiments.

Figure 17A:
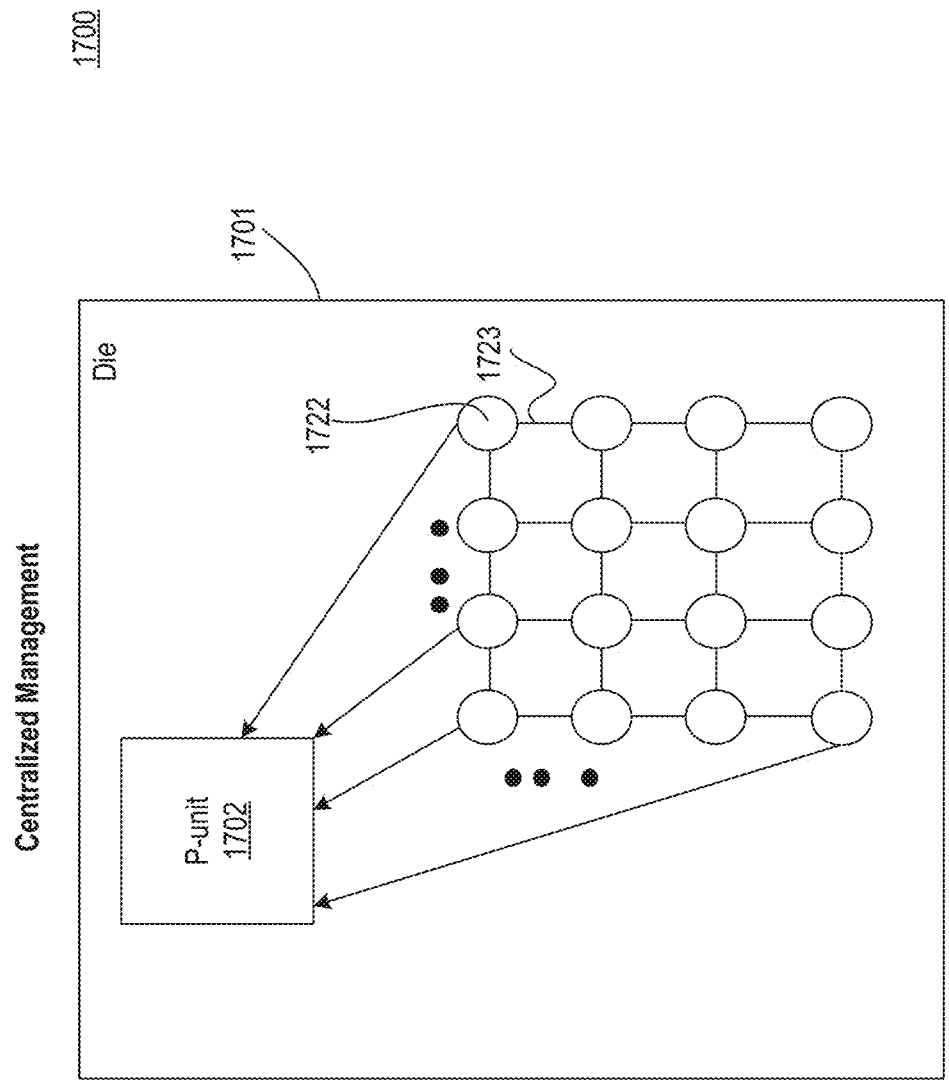
FIG. 17A illustrates a centralized management scheme for managing voltage and/or frequency.

FIG. 17A illustrates a centralized management scheme 1700 for managing voltage and/or frequency. Centralized management scheme 1700 is used for an SoC having fewer processing cores (e.g., between 0 and 64 compute cores) that are connected with one another via a fabric and a fully centralized fabric power management scheme. Centralized management scheme 1700 illustrates a single die 1701 (e.g., an SoC) comprising a power management unit (p-unit) 1702 which controls the operating voltage (e.g., supply voltage) and operating frequency of nodes of am interconnect fabric. The term fabric may be defined to have a known set of sources, destinations, routing rules, topology and other properties. The fabric may be part of a network-on-chip (NoC) with multiple agents. The sources and destinations may be any type of data handling functional unit.

In this example, a plurality of nodes 1722 (or components) are linked together via fabric components 1723. These nodes are akin to mesh stops. Examples of nodes include a core agent, a memory controller and an input output agent. In some embodiments, hardware performance counters (HPCs) from each of the fabric agents (e.g., 1722) and fabric (e.g., 1723) are read and compared against a threshold by p-unit 1702. P-unit 1702 determines the traffic through fabric agents 1722 and decides on the operating voltage and operating frequency of fabric 1723 accordingly. As such, one p-unit 1702 controls the operating voltage and operating frequency of fabric agents and fabric 1722/1723 in a centralized manner, in accordance with some embodiments.

Figure 17B:
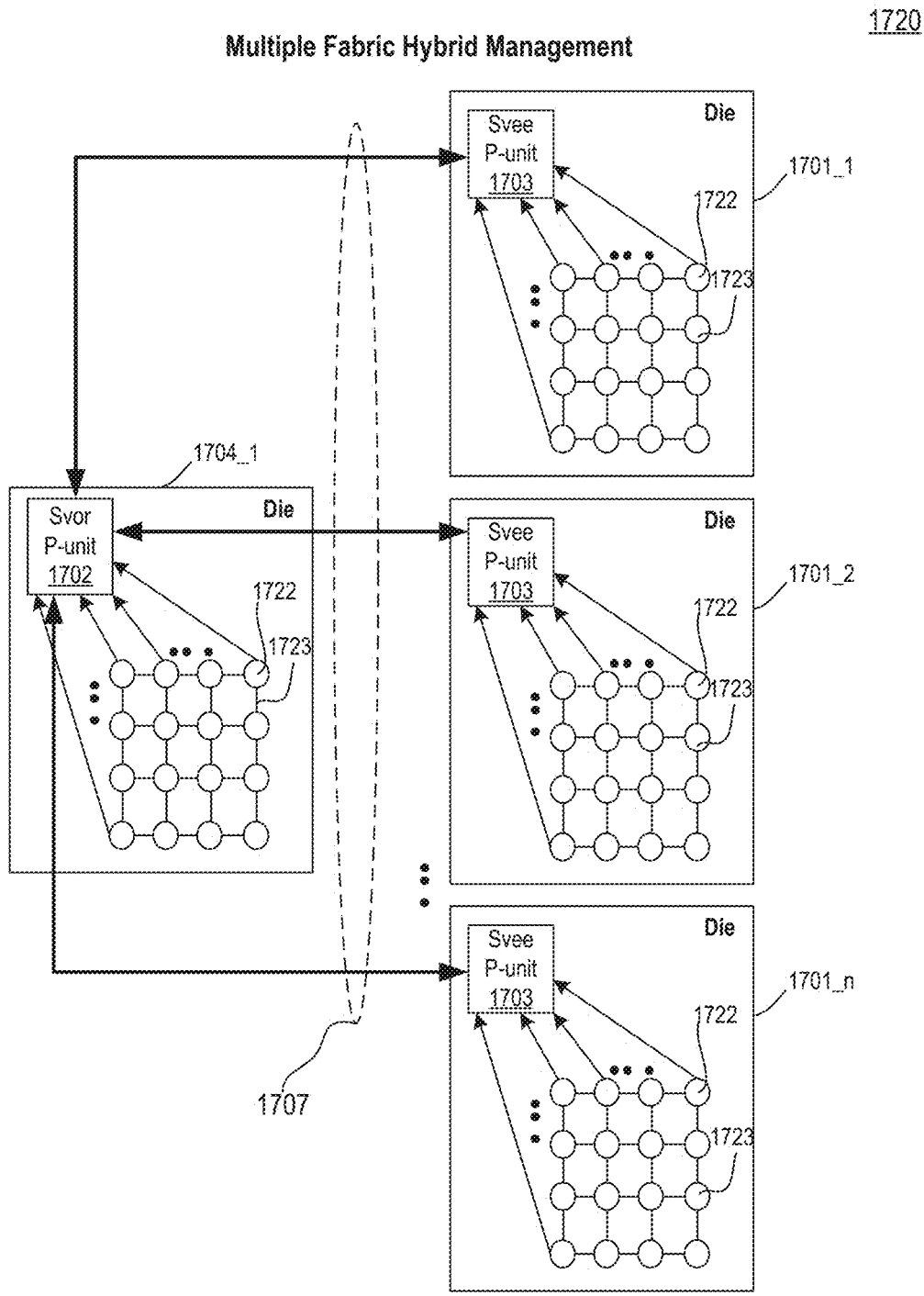
FIG. 17B illustrates a multiple fabric hybrid management scheme for managing voltage and/or frequency in the HPM architecture, in accordance with some embodiments.

FIG. 17B illustrates a multiple fabric hybrid management scheme 1720 for managing voltage and/or frequency in the HPM architecture, in accordance with some embodiments. Scheme 1720 is designed for larger sized SoCs compared to those used in FIG. 17A. For example, SoC with 64 to 300 compute cores with 2 to 10 fabric domains can use the hybrid management scheme 1720. In such an SoC, there are many fabric domains. In some embodiments, an individual fabric domain can be of different size and topology than other fabric domains. For example, a fabric domain for a larger core which have more interconnect and fabric components than a fabric domain used for a smaller core. Scheme 1720 manages the power to the various fabric domains using hybrid approach with the supervisor p-unit (e.g., supervisor) and supervisee p-units (e.g., supervisee) if there is inter-dependence between the fabric domains.

In various embodiments, scheme 1720 is organized into a supervisor die 1704-1 (e.g., a die having p-unit 1702 that behaves as a supervisor p-unit) and 'n' number of supervisee dies 1701_1 through 1701_n (e.g., each die having p-unit 1703 that behaves as a supervisee p-unit). In some embodiments, supervisor p-unit 1702 communicates with supervisee p-unit 1703 using first and/or second interconnect fabrics 110 and 111, respectively. These first and/or second interconnect fabrics 110 and 111 are bi-directional and collectively identified as 1707 (e.g., 107). In various embodiments, fabric domain in each die (e.g., the NoC including nodes 1722 and interconnect 1723) can communicate with fabric domain in other neighboring dies. For example, the fabric domain of die 1101-1 can communicate with the fabric domain of die 1101-2 by sending and/or receiving data.

Figure 17C:
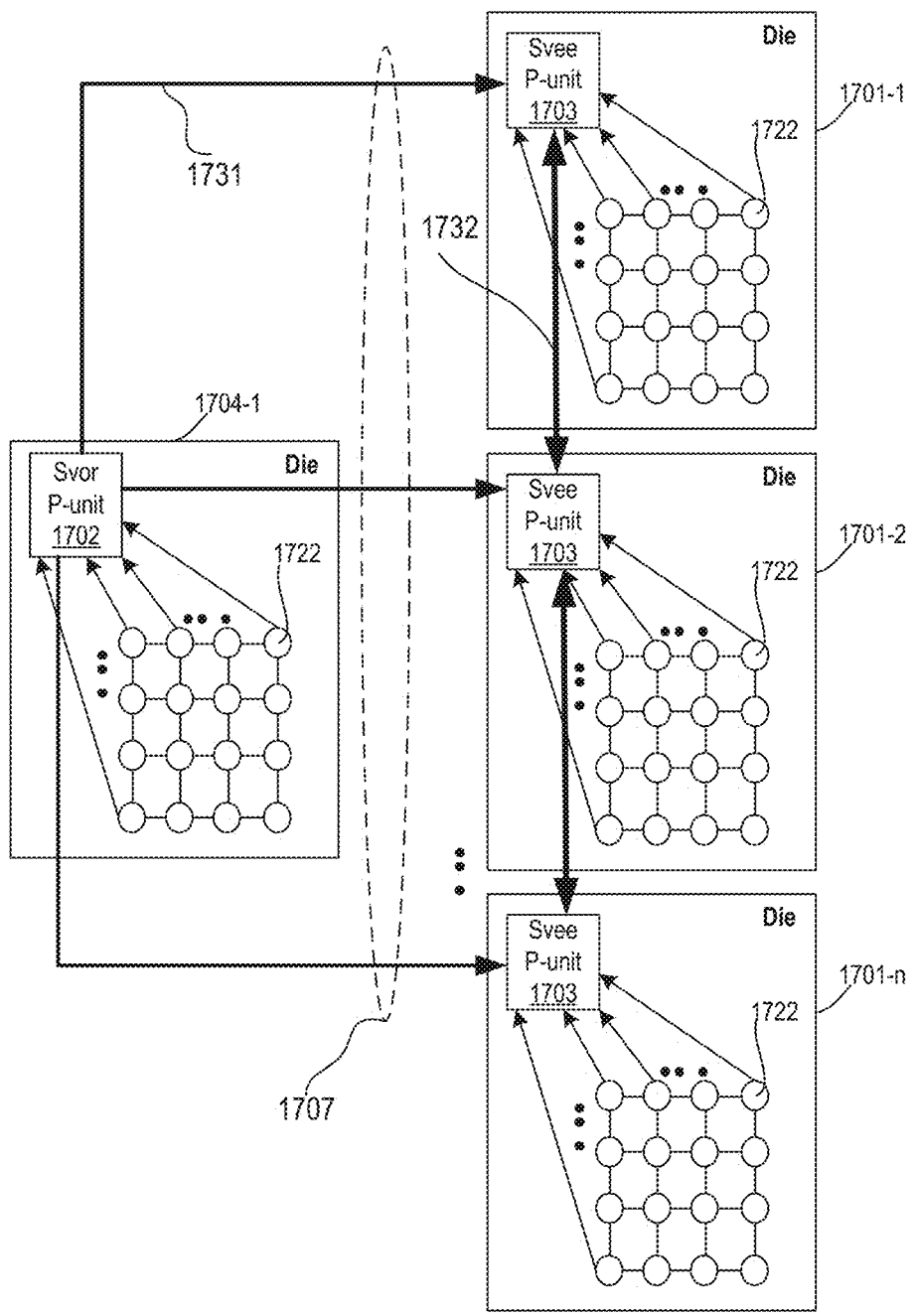
FIG. 17C illustrates a multiple fabric fully distributed management scheme for managing voltage and/or frequency in the HPM architecture, in accordance with some embodiments.

FIG. 17C illustrates a multiple fabric fully distributed management scheme 1730 for managing voltage and/or frequency in the HPM architecture, in accordance with some embodiments. Scheme 1730 is designed for larger sized SoCs compared to those used in FIG. 17B. For example, SoC with more than 300 compute cores with more than 10 fabric domains can use the fully decentralized fabric power management scheme 1730. Scheme 1730 executes an algorithm that reduces the communication overhead between the supervisor p-unit 1702 and supervisee p-units 1703. Compared to multiple fabric hybrid management scheme 1720, here supervisee p-units 1703 of each die also communicate with one another to find the optimal voltage and/or frequency for their fabric domain, in accordance with various embodiments. For example, supervisee p-units 1703 communicate with other supervisee p-units via interconnect fabric 1707. In some embodiments, first and/or second interconnect fabrics 110 and 111, and fast response interconnect 112 are unidirectional and collectively identified as 1731. For example, fabrics 110, 111 and fast response interconnect 112 are used to send information (e.g., instructions) from supervisor p-unit 1702 to supervisee p-units 1703. Unidirectional interconnect fabric 1731 reduces the network connection between supervisor p-unit 1702 and supervisee p-units. In various embodiments, voltage and/or frequency for the fabric domains for the supervisee dies are shared among the peer fabric that are sharing data interface. In some embodiments, fabrics 110 and 111 are bi-directional as discussed with reference to FIG. 17B.

In some embodiments, each supervisee p-unit 1703 performs local computations to determine power level (voltage and/or frequency) for its fabric domain (e.g., mesh of nodes 1722 and interconnects 1723). In some embodiments, supervisee unit 103 determines an optimal voltage and/or frequency for its fabric using at least two factors—telemetry data and frequency selection algorithms Telemetry data corresponds to a workload being performed by one or more cores of the supervisee die while frequency selection algorithms that maximize performance under power budget, while meeting latency constrains of various injectors (e.g., traffic sources such as I/O devices) to the fabric. In some embodiments, supervisee p-unit 1703 performs voltage computation for the fabric domain from frequency. For example, supervisee p-unit 1703 uses VF (voltage-frequency) curve stored locally in the supervisee p-unit to determine an operating voltage for a particular frequency.

In some embodiments, external SoC power level limits and resolution of frequency for the fabrics of supervisee dies are determined by supervisor p-unit 1702. In some embodiments, distribution of shared resource like power budget is divided differently in each fabric as:

$$f_{fabric_i} = f_{base,i} + \beta_i f_{rc}$$

Where the $f_{fabric_i}$ is the fabric frequency limit for the supervisee p-unit 1703$i$, the $f_{base,i}$ is the base frequency of the fabric managed by the supervisee p-unit 103 i, $\beta_i$ is a scale factor which is the contribution of global limit $f_{rc}$ supplied from supervisor p-unit 1702. $\beta_i$ is a scale factor to convert core frequency to fabric frequency or mesh frequency. In some embodiments, supervisor p-unit 1702 applies user level or other socket level power limits to each supervisee p-unit.

In some embodiments, communication between supervisor p-unit 1702 and supervisee p-unit 1703 is unidirectional. In that case, supervisor p-unit 102 sends power limits to supervisee p-units 1703. In some embodiments, communication between supervisor p-unit 1702 and supervisee p-unit 1703 is bi-directional. For example, supervisor p-unit 1702 sends power limits to supervisee p-units 1703 and receives current operating frequency from each supervisee p-unit 1703. In some embodiments, supervisor p-unit uses information from supervisee p-units to coordinate relationship between different fabric domains. While various dies of a category (e.g., compute and I/O) are illustrated with having a same size, the sizes can be different. For example, some compute dies are asymmetric in size with larger dies adapted for high performance operations and smaller dies optimized for low power and lower performance operations.

Figure 18:
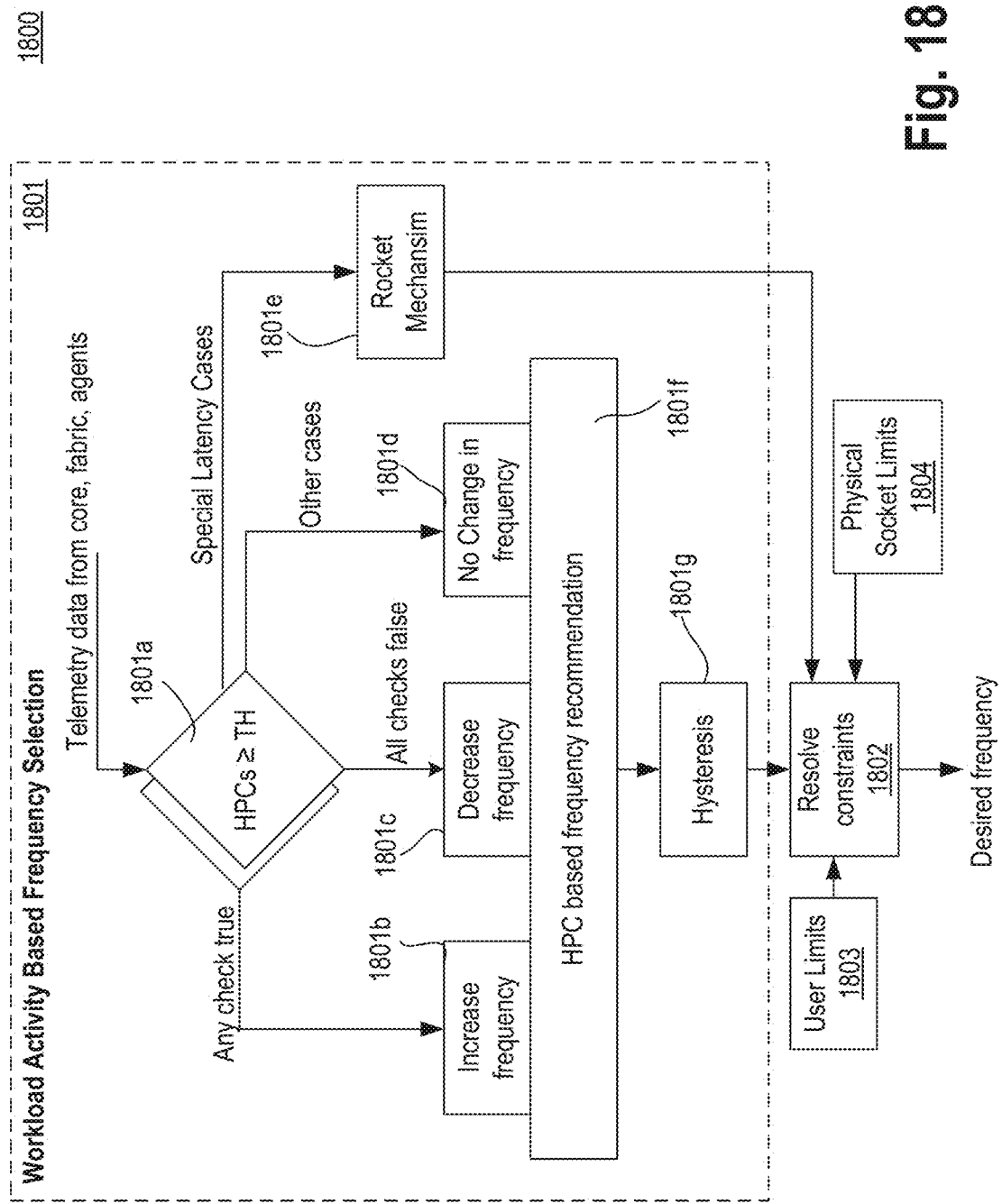
FIG. 18 illustrates a flowchart of a baseline fabric frequency selection flow for the centralized management scheme of FIG. 17A, in accordance with some embodiments.

FIG. 18 illustrates flowchart 1800 of a baseline fabric frequency selection flow for the centralized management scheme of FIG. 17A, in accordance with some embodiments. In some embodiments, all the mechanisms are local to controller 102. In some embodiments, p-unit 102 performs workload activity-based frequency selection in block 1801 and then resolves various constraints at block 1802 to determined desired frequency in view of user limits 1803 and/or physical socket limits 1804. Examples of user limits 1803 include minimum and maximum frequency for each mesh domain. Example of physical socket limit 1804 include power limit for the socket.

Supervisor p-unit 1702 reads hardware performance counters (HPCs) from each of the fabric agents and receives telemetry data from one or more processor cores, fabric components (e.g., agents and/or nodes) 1722 and/or fabric interconnect 1723. At block 1801, supervisor p-unit 1702 compares the HPCs with a threshold limit (TH). If HPCs is greater or equal to TH, then one of the blocks 1801b, 1801c, 1801d, and 1801e are executed. If any HPC violates the threshold TH then this indicates that there is large traffic, leading to recommend in the frequency increase by a pre-determined step size at block 1801b.

If all the HPCs are below the threshold then this indicates a low traffic scenario and a frequency decrease of a fixed step size is recommended at block 1801c. In some special cases, certain counters are indicative of latency, when such counters are violated, the frequency is recommended to be increased to the maximum possible value at block 1801e. This is also called a rocket mechanism. In all other cases, no change in the frequency is recommended at indicated by block 1801d. The basic checks for frequency recommendation pass through a hysteresis mechanism at block 1801g to avoid oscillations and any performance penalty of performing dynamic voltage and frequency scaling (DVFS). In various embodiments, the socket wide and user limits are also considered while resolving to a final frequency recommendation for the fabric.

Figure 19:
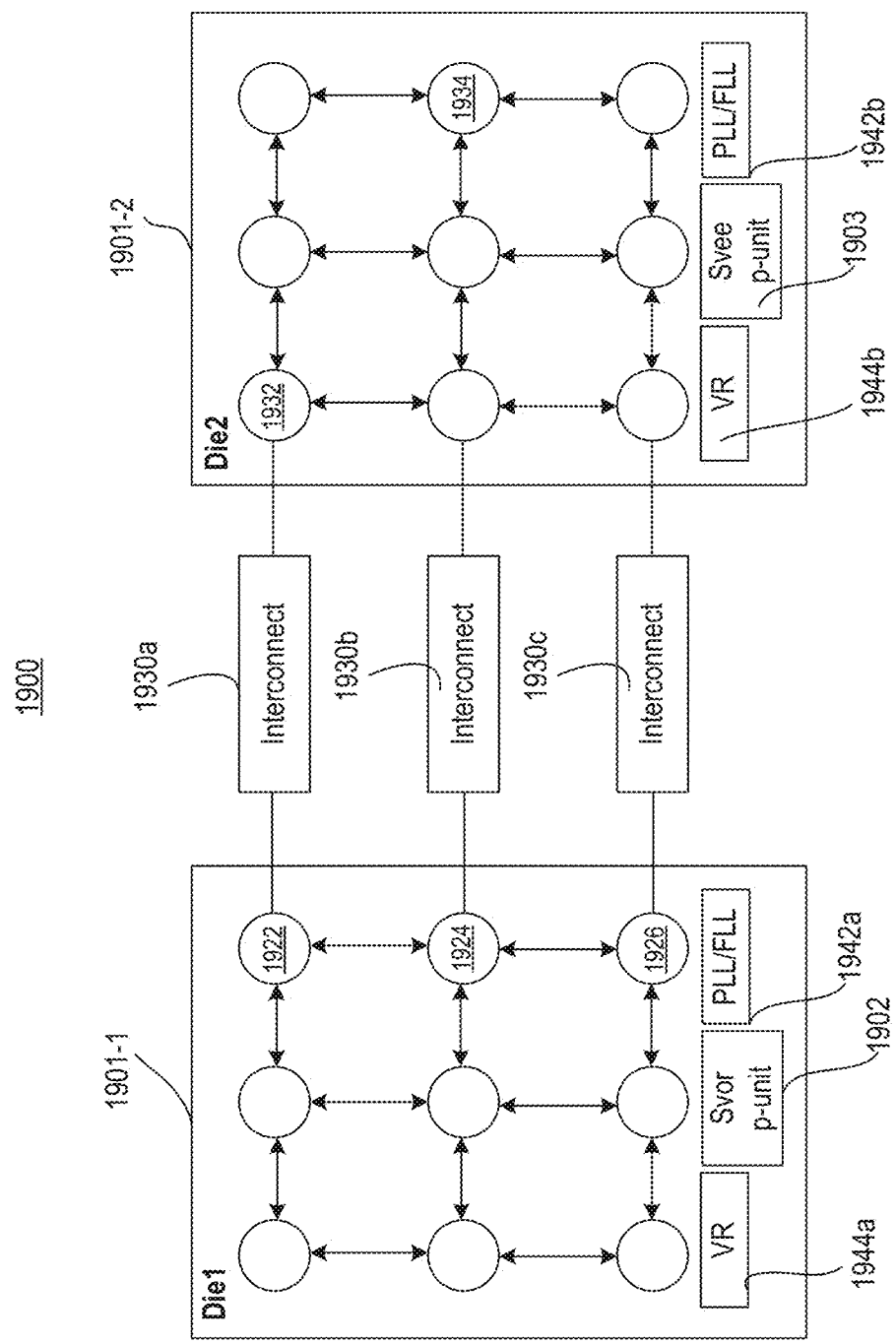
FIG. 19 illustrates a communication fabric for a data processing apparatus, wherein the communication fabric includes an interconnection region, in accordance with some embodiments.

FIG. 19 illustrates communication fabric 1900 for a data processing apparatus, wherein the communication fabric includes an interconnection region, in accordance with some embodiments. As discussed herein, a fabric may be defined to have a known set of sources, destinations, routing rules, topology and other properties. The sources and destinations may be any type of data handling functional unit. The communication fabric in this example comprises a first die 1901-1 (e.g., Die1 101-01) and a physically separate second die 1901-2 (e.g., Die2 101-02). In this example, first die 1901-1 has a component node 1922 (e.g., 1722) and eight further components nodes. Examples of component nodes include a core agent, a memory controller and an input output agent. Three of the nine component nodes 1922, 1924, 1926 are at a periphery of first die 1901-1 where it forms an interface with second die 1901-2. Component node 1922 on first die 1901-1 communicates with a corresponding component node 1932 on second die 1901-2 via a first interconnect 1930a provided at the die boundary. Two further interconnects 1930b and 1930c are provided at the die boundary. In this example, first die 1901-1 and second die 1901-2 are the same size and each die boundary component node 1922, 1924, 1926 has a corresponding interconnect, but in alternative examples just one or two (i.e., a subset) of the peripheral component nodes at a die boundary may be provided with interconnects.

First die 1901-1 and second die 1901-2 may have a corresponding Phase Locked Loop (PLL) or Frequency Locked Loop (FLL) 1942a, 1942b, and Voltage Regulator (VR) 1944a, 1944b. In various embodiments, VRs 1944a, 1944b include one or more of integrated VR (IVR), low dropout regulator (LDO), and switching DC-DC regulators, etc. In some embodiments, there may be a single clock source for an entire fabric 1900 so that the operating frequency may be the same for all component nodes and data communication channels (e.g. wires) of fabric 1900. However, the individual PLLs and/or FFLs may be used to create different interconnection domains within fabric 1900 in which operating frequency and voltage of the fabric is controllable domain-by-domain basis. Note that the operating frequency and voltage of nodes and a mesh of the fabric may not be related to the operating frequencies and voltages of the core and memory connected via the mesh.

In some embodiments, interconnects 1930a, 1930b, 1930c provide electrical connection between the two physically distinct dies 1901-1, 1901-2 at their boundary and may provide at least data lanes and clock lanes and optionally control lanes. A transmitter circuit (not shown) of one die may be connected to a receiver circuit (not shown) of the adjacent die via one or more of interconnects 1930a, 1930b, 1930c. Communication between the two dies via the fabric may be unidirectional, bi-directional or both. The transmitter(s) and receiver(s) may be provided in one or more of the dies 1901-1, 1901-2 and/or in the interconnects 1930a, 1930b, 1930c.

Examples of agents that may be connected to any component node of communication fabric 1900 to form a hardware processor are a memory controller, a processor, a Last Level Cache (LLC), a cache circuit, a decode unit and such like. While the embodiments illustrate first and second dies 1901-1, 1901-2 are of the same size, these dies can be interconnected dies of different sizes, power, and/or function. Furthermore, more than two dies may be interconnected to form a processing package as described with reference to FIG. 1.

A single SoC may comprise a single die comprising multiple components such as multiple cores and associated memory or alternatively a SoC may use two or more different dies to host the numerous components. A data processing apparatus according to the present technique may comprise two or more compute sockets. Data may be communicated across fabric 1900 via packets according to a routing algorithm such that, for example, packets may be first routed vertically from a source component to a destination component at a different location on the fabric and then may be routed horizontally. In some embodiments, each component 1922 of the fabric may correspond to a converged/common mesh stop (CMS) that facilitates an interface between an agent such as a core or memory controller or input output agent and the fabric 1900.

Dies 1901-1, 1901-2 may comprise execution circuitry for executing program instructions and may further comprise a Last level Cache (LLC) component. LLC is a shared highest-level cache that may be called before accessing memory and it may be sliced into multiple independently accessible components. The LLC may be shared between multiple cores on a compute socket formed from a plurality of dies.

Dies 1901-1, 1901-2 of communication fabric 1900 each have a two-dimensional (2D) mesh interconnect topology of data communication channels in this example. The fabric may have an alternative topology such as a ring topology or a bus topology. In some embodiments, the mesh of FIG. 19 is a fabric comprising a two-dimensional (2D) array of half rings forming a system wide (e.g. SoC wide) interconnect grid of data communication channels. In some embodiments, every vertical column of components forms a bi-directional half ring and similarly, every horizontal row forms a bi-directional half ring. This allows for components such as the component 1922 to have connections to any other component of the fabric 1900 going through any of the rows and columns of the mesh and allowing for a shortest path between any two components. This can reduce latency and improve bandwidth relative to alternative fabric topologies such as ring topologies.

For example, if component node 1924 has a CMS connected to a core agent (single core) and component node 1934 has a CMS attached to a memory controller agent then data packets from the core agent may be routed to the memory controller agent vertically to component 1926 and then horizontally to component node 1934 via the interconnect 1930b. A return path may differ from the outward path since vertical routing is performed before horizontal routing in this example. Note that a single die 1901-1 may comprise a plurality of agents related to computation, I/O and/or memory control.

A processor core is an independent execution unit that can run a program thread, e.g., in parallel with other cores. A die is a single continuous piece of semiconductor material (e.g. silicon) where transistors or other components making up a processor core may reside. Multi-core processors may have two or more processors on a single die, but alternatively, the two or more processors may be provided on two or more respective dies. A single fabric may span multiple dies, but in this case the die boundaries are provided with an interconnect mechanism arranged to provide a latency for data communication between component nodes 1922, 1932 across the die boundary that is at least close to a latency achievable between different components on the same die via the mesh.

In this description the term "dielet" may be a physically distinct semiconductor die, but a die that is connected to an adjacent die in a way that allows the fabric across the die boundary to function like a single fabric rather than as two distinct fabrics. Thus at least some dies may be dielets. This may be contrasted with, for example, a dual processor system in which two different fabrics are connected via a bridge in a single package, where the bridge is a point-to-point interconnect bridge whose latency is lower than the intra-mesh latency of either of the two different fabrics. The intra-fabric latency is very low relative to a latency achievable via a bridge (or similar) connecting two physically distinct fabrics. An expectation where there is a "single fabric" spanning die boundaries is that a latency of the interconnect is at or close to the intra-fabric latency. The intra-fabric bandwidth is also likely to be higher than an inter-fabric bandwidth via a bridge, but the bandwidth also depends on a number of connecting wires whereas latency does not.

While interconnects 1930a, 1930b, and 1830c are shown for two-dimensional (2D) architectures, the interconnects can be between vertical and/or horizontal stacks forming a three-dimensional (2D) fabric topology.

Figure 20:
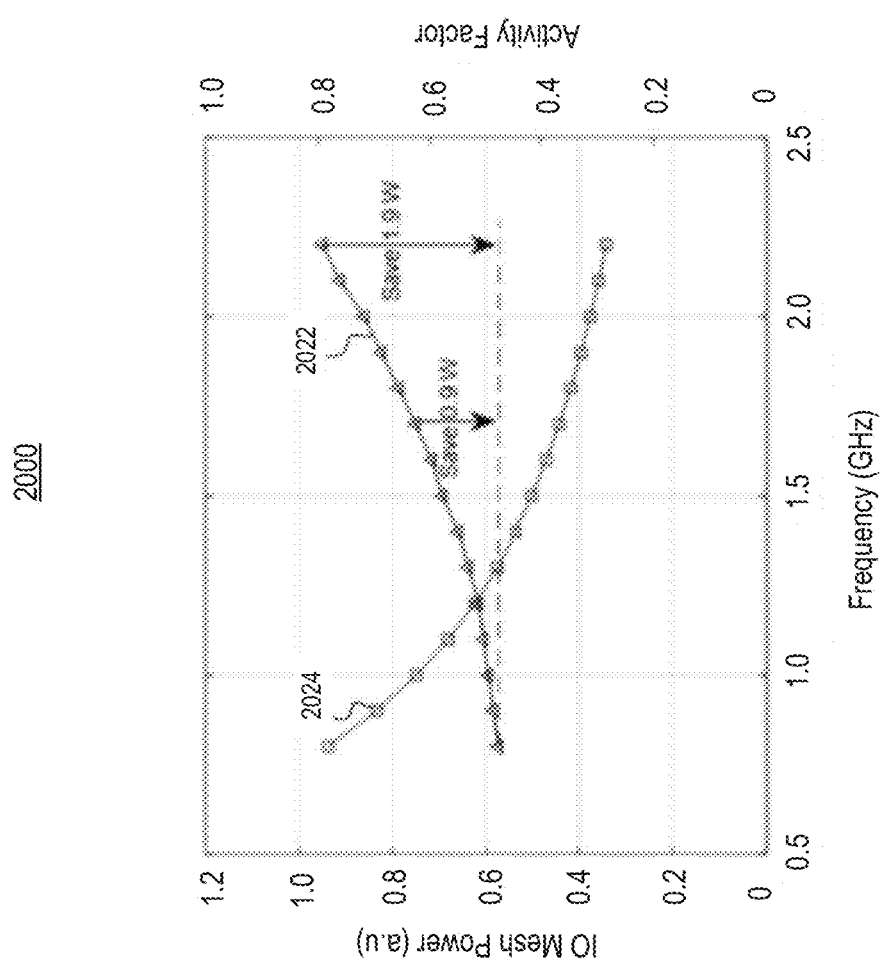
FIG. 20 illustrates a graph showing a variation of each of a mesh power in Watts (W) and an activity factor (AF) with fabric operating frequency in Giga Hertz (GHz), in accordance with some embodiments.

FIG. 20 illustrates graph 2000 showing a variation of each of a mesh power in arbitrary units (a.u.) and an activity factor (AF) with fabric operating frequency in Giga Hertz (GHz), in accordance with some embodiments. The AF indicates an average number of switching events undergone by transistors in a SoC and is a dimensionless quantity. Curve 2022 with triangle data points shows a variation of IO mesh power in a.u. with frequency in GHz and a trend can be seen for power to increase non-linearly from about 0.6 a.u. for a fabric operating frequency of 1 GHz to around 0.84 a.u. for a fabric operating frequency of 2 GHz. Curve 2024 going through square data points shows a variation of the AF with the fabric operating frequency such that the activity factor is approximately six at an operating frequency of 1 GHz and three at 2 GHz. The AF here decreases non-linearly as frequency increases. The AF is an indication of fabric utilization.

The power consumption of the fabric in an IO die (e.g., one type of data-handling functional unit) for Standard Performance Evaluation Corporation (SPEC) workloads at frequency of 2.2 GHz is about 0.96 a.u. SPEC workloads are widely used to evaluate performance of computer systems. At the same frequency, the AF for the fabric in JO die is less than 0.3. This means that reducing an operating frequency of the fabric from 2.2 GHz to 800 MHz can reduce power consumption by about 0.4 a.u. This same frequency decrease will increase the AF. However, even at a low frequency of 800 MHz, the activity factor is below 0.8. Therefore, according to these simulation results it is possible to save 0.4 a.u. of power with little or no adverse performance impact. For workloads with even lower activity factor, one can reduce the frequency below the 800 MHz limit of FIG. 20 and get more than 0.4 a.u. of power savings. Power consumption and AF are workload dependent as well as frequency dependent.

Figure 21:
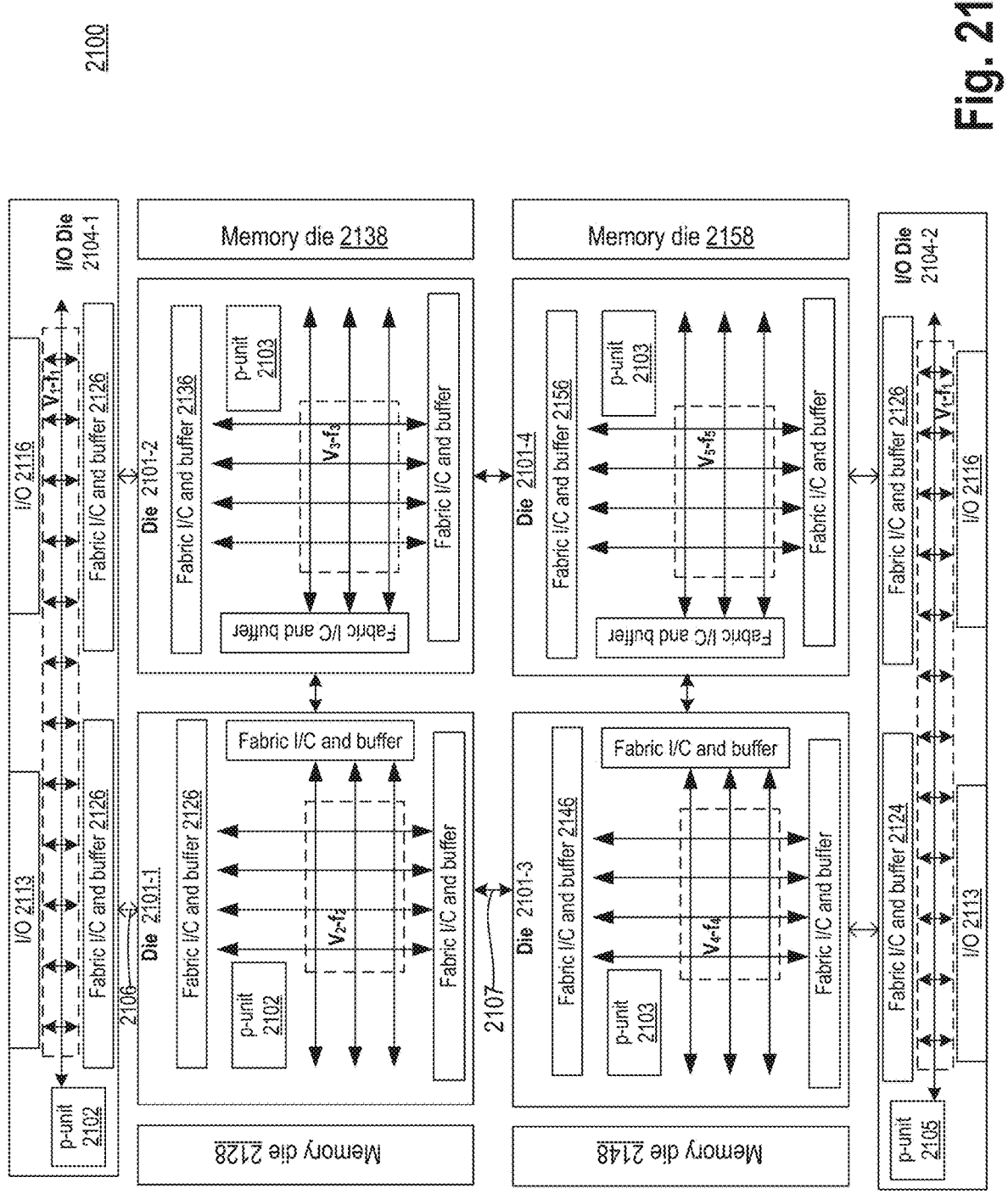
FIG. 21 illustrates a system of chip (SoC) having 6 dielets connected by interconnect boundaries, wherein the SoC includes a fabric that is partitioned into domains along the dielet boundaries, in accordance with some embodiments.

FIG. 21 illustrates a system of chip (SoC) 2100 having 6 dielets connected by interconnect boundaries, wherein the SoC includes a single fabric that is partitioned into domains along the dielet boundaries, in accordance with some embodiments. In this example, SoC 2100 includes six "dielets" (e.g., 2104-1, 2104-2, 2101-1, 2101-2, 2101-3, 2101-4) are connected by interconnect boundaries that allow inter-dielet communication at a similar latency to intra-dielet communication. A single dielet may comprise one core or multiple cores provided on multiple respective fabric nodes and may further comprise other components of a "CPU system" such as memory, fabric and the like.

A first dielet 2104-1 comprises multiple JO cores 2114, 2116 and a first power management unit (p-unit) 2102 (e.g., 102). A second dielet 2101-1 comprises multiple processor cores (not shown) at respective nodes of the mesh fabric within the dielet and at least one memory controller agent at a different node to provide access to a memory 2128 shown adjacent to the dielet and further comprises a second power management unit 2102. Any number of cores may be provided on a processor (or compute) dielet such as the first dielet or the second dielet, together with further agents at nodes of the fabric. Similarly, to second dielet 2101-1, a third dielet 2101-2, a fourth dielet 2101-3 and a fifth dielet 2101-4 each comprise multiple processor cores and memory controller agents in this example and each dielet has a respective local power management unit 2103 (e.g., 103). In some embodiments, one or more of the dielets (e.g., JO Die 2104-1 and Die-1 2101-1) are supervisor dielets with supervisor p-units while the other dielets are supervisee dielets with supervisee p-units.

Each of the four processor dielets 2101-1, 2101-2, 2101-3, 2101-4 has a respective memory dielet 2128, 2138, 2148, 2158 on the one of its four boundaries where it does not interconnect with an adjacent processor dielet or IO dielet 2104-1, 2104-2. In this example, sixth dielet 2104-2 at the bottom of the plan is a mirror image of first dielet 2104-1 and also comprises multiple IO cores 2124 and 2126 and a sixth power management unit 2102. Each of the six dielets has an associated local power management unit 105 provided on the respective dielet.

Each of the six dielets may have a dedicated VR and PLL (similarly to the dies shown in FIG. 19) that may be controlled by one or more power control units to dynamically alter a frequency of operation of the fabric of the corresponding dielet via DVFS. In this example, each of the processor dielets is provided with a fabric interconnect and buffer on the three of the four edges of the dielet that do not interface with the memory dielet 2128, 2138, 2148, 2158.

In previously known server SoCs, a single communication fabric is operated at a given operating frequency (f) and voltage (V) spread across multiple physical dielets despite the availability of PLLs and VRs on individual dielets. The single voltage and frequency (V-f) domain spanning multiple physical dielets was chosen due to hardware architectural dependencies. The global V-f would be selected based on a power management unit monitoring multiple inputs from across the entire SoC. Example inputs used to determine the global performance level may include one or more performance counters, perf-p limit, model specific register (MSR) customer overrides, socket thermal limit, and Running Average Power Limit (RAPL). The target frequency might be selected based upon a maximum requested frequency across all processor cores on the SoC, although other constraints like temperature and power might mean that a requested target frequency is not granted by the power management unit.

However, operating at a single V-F across the entire SoC fabric means implementing a tightly coupled architectural flow to change V-f across all of the dielets of the SoC in a coordinated way. Tight coordination of all the PLLs and VRs across the fabric partitions leads to complex global architectural flows. Furthermore, a single V-F domain may constrain large portions of fabric to run at higher V-F than needed based on the prevailing workload of the respective fabric portion, which causes wastage of power and diminished performance. It is possible to obtain improved power and performance optimizations for a SoC by using multiple different V-F domains under non-homogeneous fabric traffic-distribution.

However, one disincentive to allowing for different performance level (V-f) domains on a single communication fabric is due to the challenge of managing latency that can potentially be incurred when communicating data from a higher operating frequency dielet to a lower operating frequency dielet (i.e. where there is a frequency mismatch). There is a further challenge of preventing inadvertent data loss due to discrepancies in operating frequencies between different dielets. One option to compensate for the frequency mismatch between different fabric domains might be to implement an asynchronous FIFO (first in first out) buffer at dielet interfaces. However, such an asynchronous FIFO may lead to a latency of two to three cycles, which, in some, but not all, implementations, could be unacceptably high due to consequences of diminished performance of the single shared fabric. An asynchronous FIFO refers to a FIFO design where data values are written to a FIFO buffer from one clock domain and the data values are read from the same FIFO buffer from another clock domain, where the two clock domains are asynchronous to each other.

Figure 23:
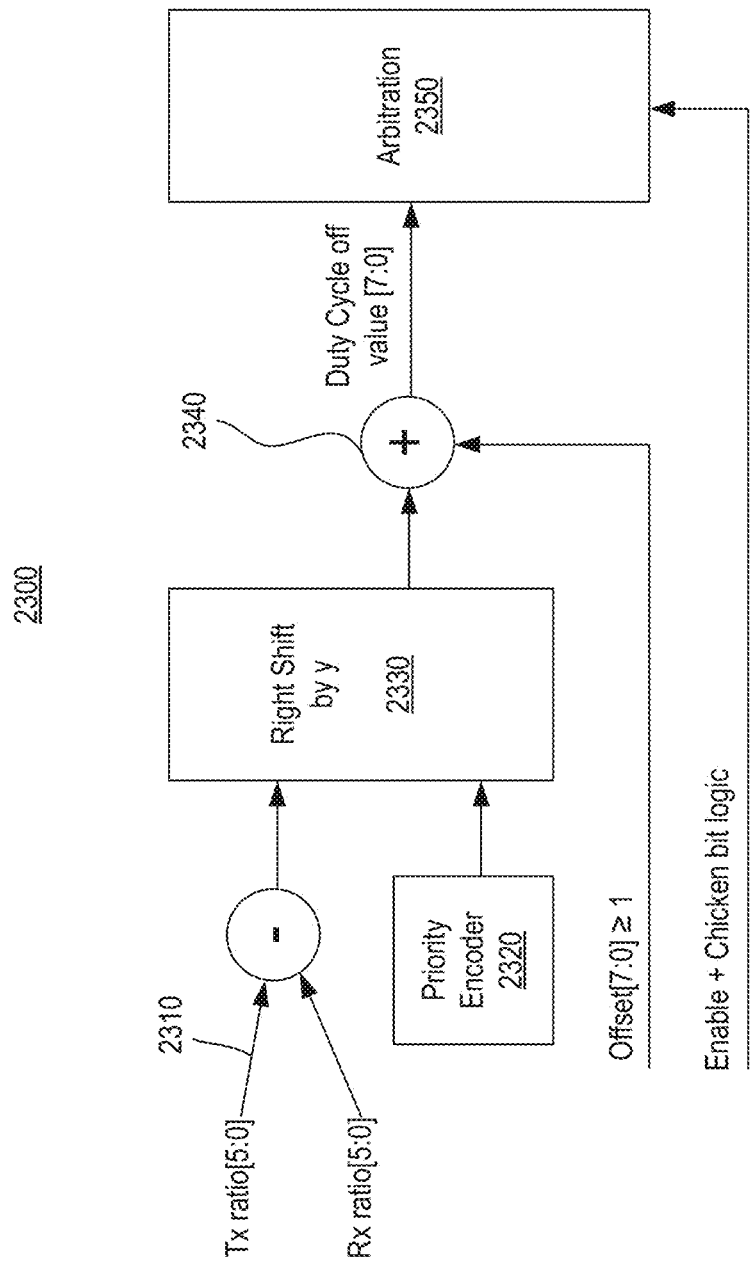
FIG. 23 illustrates an example implementation of back-flow control circuitry providing an interface between two different fabric domains operating at different frequencies, in accordance with some embodiments.

In some embodiments, a technique is provided to allow a single fabric to be divided into two or more fabric domains whose performance levels (e.g. operating frequency) can be independently set and set to mismatching values. For example, a first fabric domain may provide data communication channels between a first subset of data-handling functional units and a second, different, fabric domain may provide a second different set of data-handling functional units of the data processing apparatus. One fabric domain may comprise all of the data-handling functional units on a compute die and another fabric domain may comprise all of the data-handling functional units on an IO die. Alternatively, data-handling functionals units from different physical dielets may be grouped as part of the same fabric domain. This multi-domain fabric may be implemented in a way that reduces latency and yet avoids inadvertent loss of data that could otherwise result from frequency mismatches across fabric domain boundaries. In some embodiments, at each of the dielet boundaries in SoC 2100, backflow control circuitry (not shown) is provided in the fabric interconnect and buffer unit 2126 that allows buffering of data for transmission to a dielet operating at a lower frequency from a dielet operating at a higher frequency. One example implementation of the backflow control circuitry is schematically illustrated in FIG. 23.

Referring back to FIG. 21, in SoC 2100, each of the six dielets 2101-1, 2101-2, 2101-3, 2101-4, 2104-1, 2104-1 may be independently set to operate at an appropriate operating frequency (or other performance level) for the corresponding fabric domain. Thus, for example, if a current workload level of fifth dielet 2101-4 is lower than a workload of third dielet 2101-2, then fifth power control unit 2103 (of 2101-4) may set an operating frequency of fifth dielet 2101-4 to be higher than an operating frequency of third dielet 2101-2. Thus, if data is to be transmitted across the fabric from fifth (higher frequency) dielet 2101-4 to third (lower frequency) dielet 2101-2 then backflow control circuitry in the fabric I/C and buffer unit 2156 will control a data flow rate of the transmission and will buffer data pending transmission by recirculating the data in the fabric of fifth dielet 2101-4 preventing data loss.

FIG. 21 shows six different interconnection domains of the fabric having distinct performance levels ($V_i$-$f_i$) to coincide with six respective different dielet boundaries. However, in alternative arrangements, the interconnection domains of the fabric may be formed within a single dielet or partitions demarcating the different domains may span two or more dielets in a way that does not coincide with dielet boundaries. Different interconnection domains may be formed in a variety of different ways provided that circuitry is available to independently set a frequency and voltage of each interconnection domain. Different fabric domains may provide data communication channels for respective different subsets of data-handling functional units connected by a single fabric. A subset may comprise one or more data-handling functional unit installed at a component node of a fabric such as a fabric having a mesh topology.

SoC 2100 having plural cores, memory, fabric and I/O provided on a plurality of different dielets may be denoted a "compute socket". Two or more compute sockets may be connected together by electrical connectors such as copper wires to form a data processing apparatus. Connections between the compute sockets are likely to be high latency relative to communication channels within the single fabric of a given compute socket.

Any data traffic flowing through the single communication fabric of SoC 2100 may not be aware of the six different fabric domains. When two adjacent fabric domains operate at different frequencies, it is possible to inadvertently cause a traffic bottleneck in a slow fabric domain by transmitting too much traffic into it too rapidly from a faster fabric domain. This can result in loss of data that is transmitted but cannot be processed rapidly enough upon reception. To ameliorate such a data loss, a dynamic back-pressuring throttling mechanism is implemented according to some embodiments to control traffic going from a faster fabric domain into a slower fabric domain. Control parameters of the throttling mechanism determined depending on a magnitude of a frequency difference between the two fabric domains.

Consider two different fabric domains, one denoted a "local die", which is a transmitter (Tx), and another different fabric domain denoted a "remote die", which is a receiver (Rx). An interesting case with potential for traffic loss can occur when the Tx fabric is operating faster than Rx fabric. Using backflow control circuitry according to the present technique to perform throttling of data being transmitted, an ON/OFF bidding of transactions is implemented and a counter is set up based on a "duty cycle" waveform. This allows data transactions to bid in the ON phase, but not in the OFF phase. In other words, data packets may be communicated from the local die to the remote die in the ON phase but no communication of data packets is permitted in the OFF phase. Thus:

Duty Cycle (DC) ON: Send data packets on these clock cycles; and

Duty Cycle (DC) OFF: Do not send data packets on these clock cycles.

If a packet is sent from Tx to Rx on one cycle (DC ON=1), then a DC OFF may be determined, i.e., how many cycles for which the sending the traffic is suppressed after sending the traffic for one cycle. The clock cycles of DC ON and DC OFF are clock cycles of the local (higher frequency) die. As an example, when DC ON is one and DC OFF is two, the fraction of time packets is sent is equal to ⅓ and the fraction of time the packets are not sent is equal to ⅔. Note that for each new combination of the Tx and Rx frequencies, it is appropriate to calculate a new duty cycle value. This makes the duty cycle determination non-trivial. According to some embodiments, an example implementation duty cycle value determination is provided and a low overhead hardware approximation of the same of the duty cycle determination is also provided. The hardware approximation is implemented by the backflow control circuitry illustrated in FIG. 23.

To determine the duty cycle value, consider denoting a frequency of the fabric in terms of "$x_{ratio}$". In one example, the unit of the ratio implies a frequency of 100 MHz. Therefore, a ratio of 20 implies a frequency of 2000 MHz, or 2 equivalently, GHz.

Figure 22:
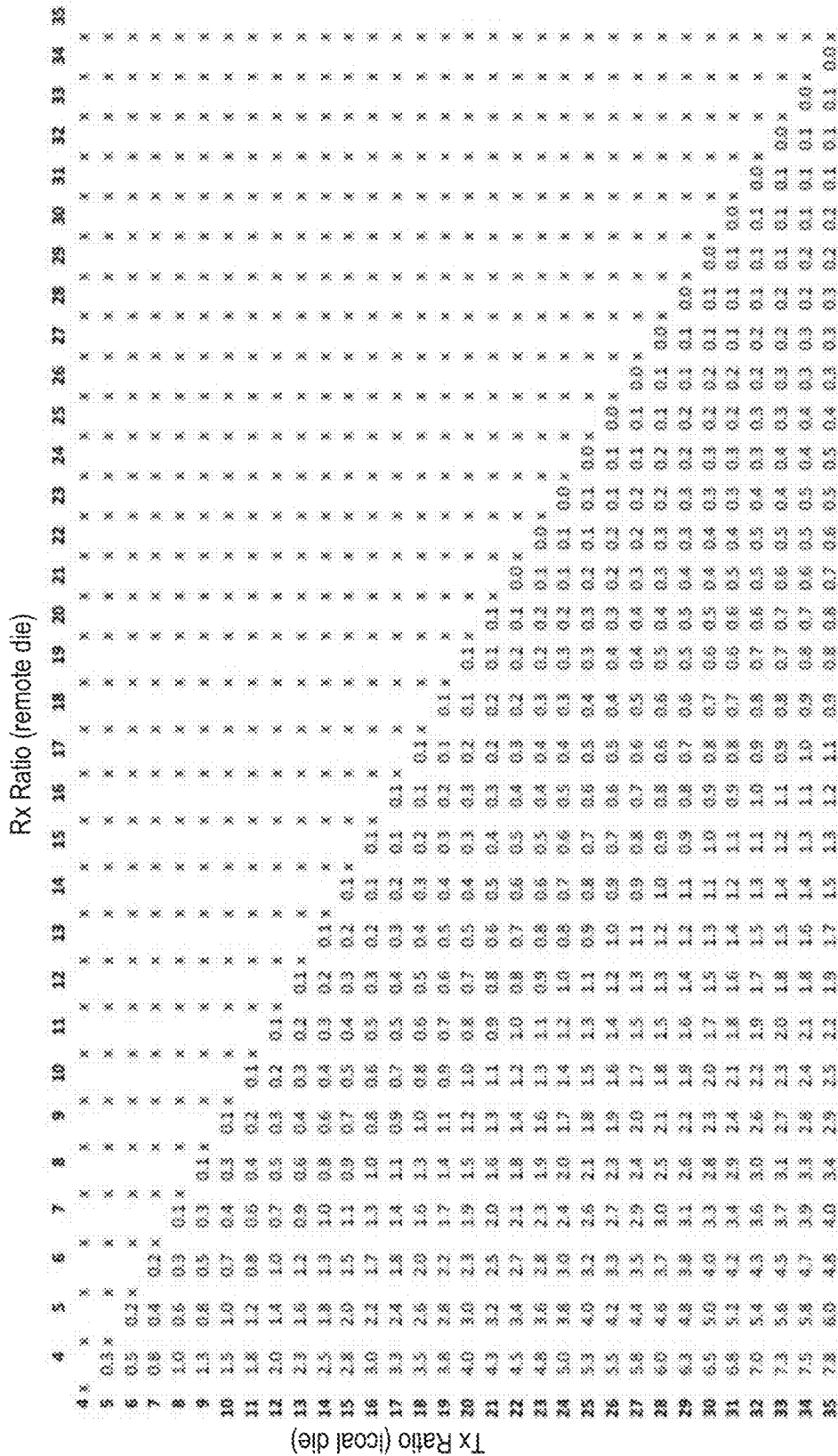
FIG. 22 illustrates a table showing calculated values of DC OFF to perform data throttling for a range of local die transmitter frequencies and a range of remove die receiver frequencies in a fabric having at least two performance level domains, in accordance with some embodiments.

FIG. 22 illustrates table 2200 showing calculated values of DC OFF to perform data throttling for a range of local die transmitter frequencies and a range of remove die receiver frequencies in a single fabric having at least two performance level domains, in accordance with some embodiments. Table 2200 shows decimal number of DC OFF cycles for an "ideal" throttling mechanism. When $x_{ratio_{Rx}} \geq x_{ratio_{Tx}}$, the packets should not be inadvertently dropped (shown in the table 2200 as a data cross point). This indicates that DC OFF should be zero. However, when $x_{ratio_{Rx}} < x_{ratio_{Tx}}$, the Tx die transmits packets on every DC ON=1 cycle and then it is appropriate to stop transmission for a number of DC OFF cycles, which can be computed as follows:

$$DC\ OFF = \frac{x_{ratio_{Tx}} - x_{ratio_{Rx}}}{x_{ratio_{Rx}}} \qquad (1)$$

However, since throttling of data for transmission can is implemented at a granularity of a full number of clock cycles, any fractional numbers for DC OFF are rounded to full integers. Table 2200 schematically illustrates calculated values of DC OFF based on equation (1) above for a range of local die Tx frequencies from $x_{ratio_{Tx}}$ of 4 through to 35 (corresponding to 400 MHz through to 3.5 GHz) and a range of remote die Rx frequencies from $x_{ratio_{Rx}}$ of 4 through to 35. The entries of table 2200 in the lower diagonal region all correspond to the Tx frequency exceeding the Rx frequency and the numerical entries in the lower left diagonal correspond to a number of DC OFF cycles as calculated from equation (1) prior to rounding to the nearest integer. The larger the discrepancy between the Tx frequency and the Rx frequency, the greater the number of DC OFF cycles that is appropriate.

Although equation (1) could be implemented in hardware to perform the appropriate throttling of data, implementing division in hardware is computationally expensive. Furthermore, decoder logic that would be implemented to map Tx to Rx die frequency ratios according to equation (1) could be complex. Furthermore, implementing equation (1) in hardware may exhibit poor scalability as Rx and Tx increase. A more efficient and less complex computation can be performed in hardware by approximating the DC OFF calculation of equation (1) using a right shift instead of a division. This makes sense because the shift operation provides a good approximation and yet is less computationally expensive that a division. According to one implementation, equation (1) is approximated according to the following equation:

$$DC\ OFF = (x_{ratio_{Tx}} - x_{ratio_{Rx}}) \gg y + \textit{offset} \qquad (2)$$

where, $$y = \text{floor}(\log_2 x_{ratio_{Rx}})$$

While I/O dies 2104-1 and 2104-2 are illustrated as having same V/F points, in some embodiments, I/O dies 2104-1 and 2104-2 can have different frequency points that allow for optimized communication between compute dies and I/O dies.

FIG. 23 illustrates an example implementation of backflow control circuitry 2300 providing an interface between two different fabric domains operating at different frequencies, in accordance with some embodiments. Here, backflow control circuitry 2300 represents a hardware implementation of Equation (2). In some embodiments, backflow control circuitry 2300 comprises subtractor 2310, priority encoder 2320, shifter circuitry unit 2330, adder 2340 and arbitration circuitry 2350. In some embodiments, priority encoder 2320 is a digital circuit that selects an index of the most significant bit that is '1' in a binary number. For example, in a binary number 01001, priority encoder 2330 will give an output of 3. So, for y=3 a division by $2^3$ is performed right shifting the difference in the of Tx ratio and Rx ratio in Equation (2). In some embodiments, subtractor 2310 receives a six-bit Tx ratio ($x_{ratio_{Tx}}$) as a first input and subtracts from that value a six-bit Rx ratio ($x_{ratio_{Rx}}$) and outputs a result of this subtraction as input to shifter circuitry unit 2330.

In some embodiments, shifter circuitry unit 2330 performs a right shift of the subtraction result by an integer number, y, of bit positions and supplies the shifted difference value to adder 2340. The integer y corresponding to the magnitude of the right shift is calculated by priority encoder 2320 depending on the six-bit Rx ratio ($x_{ratio_{Rx}}$) which is supplied as input to the priority encoder. In some embodiments, adder 2340 receives a first input corresponding to the right shifted difference value output by the shifter circuitry 2330 and a second input to the adder is an eight-bit offset having a value greater than or equal to one.

In some embodiments, the offset value is provided to allow compensation for clock skew, which is a phenomenon whereby a clock signal from a given source may arrive at different circuit components at different times. Clock skew can add a fraction of a cycle to a DC OFF value, which can potentially increase the calculated DC OFF time by up to one clock cycle. In a tuning phase, a value of offset=2 can be set initially to account for worst case clock skew in different functional units (e.g. Stock Keeping Units, SKUs) of SoC 2100. After tuning to compensate for clock skew, the offset can subsequently be set to one so that the approximation is functionally correct.

In some embodiments, an enable bit that is supplied as one of two inputs to the arbitration circuitry serves to disable throttling, which may be appropriate in the case where $x_{ratio_{Rx}} \geq x_{ratio_{Tx}}$. The other input to arbitration circuitry 2350 is an output of adder 2340 corresponding to a calculated DUTY CYCLE OFF value. Similar to the enable bit, a set of "chicken bit logic" circuitry may be used to provide an input to the arbitration circuitry and can be used to disable throttling in case the given implementation of throttling is not used in the integrated circuit for any other reason.

In some embodiments, backflow control circuitry 2300 may be implemented as part of an interconnect at boundaries between different fabric domains. In examples where the fabric domains coincide with dielet boundaries, such as SoC 2100 example, then backflow control circuitry 2300 may be provided in one or more of the fabric interconnect and buffer units 2136, 2156. Alternatively, in some embodiments, backflow control circuitry 2300 may be provided in an intra-mesh region of the fabric proximal to an intra-mesh domain boundary.

In some embodiments, the fabric backpressure mechanism provided by the backflow control circuitry 2300 together with equations (1) and (2) enhances performance of an interconnect fabric having two or more different domains with respective different performance levels by preventing data loss without any extra latency being incurred in the data path. In addition, the backpressure mechanism of various embodiments works across a wide range of frequency mismatch between adjacent domains using minimal hardware logic.

Figure 24:
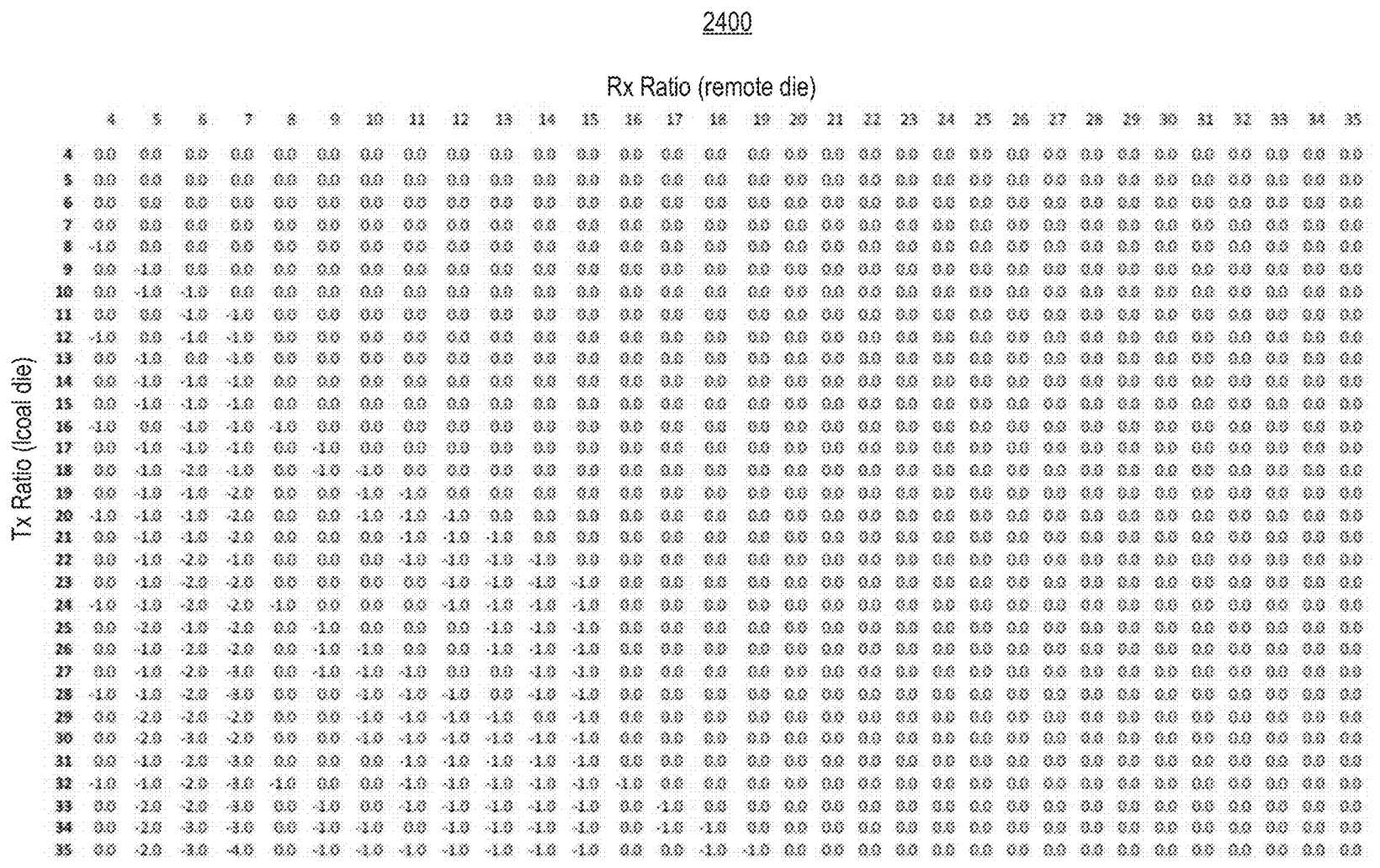

FIG. 24 illustrates table 2400 illustrating a difference between accurately calculated values and approximated values for DC OFF of a throttling duty cycle for the same predetermined range of range of local die and remote die frequency values shown in Table of FIG. 22, as derived from Equation (2) and the approximated DC OFF value derived from Equation 3 in accordance with some embodiments.

In Table 2400, a table entry of zero indicates perfect approximation (in which case table 2200 DC OFF value and the approximation of Equation 2 match) and is an ideal case. A positive value does not occur in the table 2400, which is good, since that could lead to an underestimation of the DC OFF value and have the potential consequence of dropping of packets. A negative value entry in table 2400 indicates that the approximating logic backflow control circuitry 2300 predicts higher throttling than is strictly required by the more precise calculation of table 2200. This could potentially lead to some minor performance loss; however, this is acceptable due to at least the reasons enumerated below:

1) The remote die is running too slow in most cases where a negative value entry appears in Table 2400. This is an unlikely scenario at runtime (e.g., $x_{ratio_{Tx}}$ at 35 and $x_{ratio_{Rx}}$ at 9). The more likely cases are when the difference in frequencies is not too large.
2) Even if the difference is large, the traffic required to flow from the Tx die (faster) to Rx die (slower) should be small since the remote die is slower.
3) The estimation error is in terms of faster frequency cycles (based on the transmitting die operating frequency), which is a small absolute time value. For example, 4-cycle penalty at 3.5 GHz is smaller in time than a 1 cycle latency at 0.8 GHz.

4) Having some estimation error is still better than choosing a fixed worst case value of DC OFF=8 across all the Tx and Rx ratios, which has a relatively high-performance penalty.

The data path prior to the fabric I/C and buffer units 2136, 2156 at the dielet boundary is guaranteed to be an intra-mesh path within the dielet. This should be true even if a boundary between two fabric domains does not coincide with dielet boundaries. Therefore, data should never be lost even in DC_OFF periods. The data on fabric in the transmitting fabric domain is simply bounced and recirculated into the local fabric domain when the buffer in the interconnect region cannot accept more data. This bounced traffic increases the fabric utilization of the local fabric domain, indicating to a corresponding local power control unit through hardware counters that frequency in the local fabric domain should be increased to accommodate recirculation of the bounced data traffic. In summary, the traffic bounces back when the buffer at the fabric domain interface cannot accept more data, but the data awaiting transmission should never be dropped according to the present technique. By way of contrast, implementation of an asynchronous FIFO at fabric domain boundaries instead of using backflow control circuitry 2300 to determine a duty cycle for transmission would be highly likely to lead to unacceptable latency and potential loss of data when the local fabric domain operating frequency exceed the remote fabric domain operating frequency.

Figure 25:
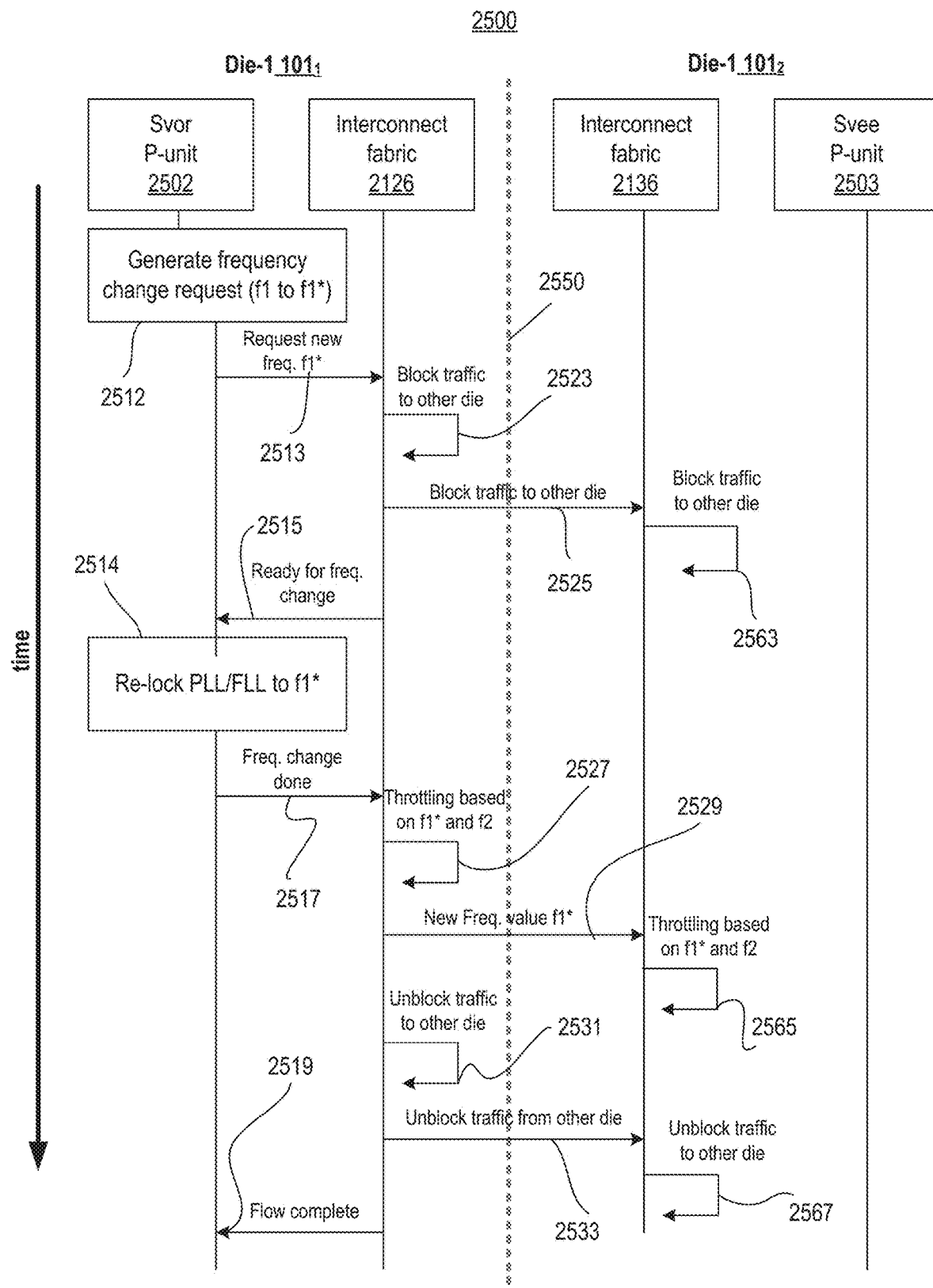
FIG. 25 illustrates a flowchart or signal diagram illustrating signaling performed at a fabric boundary, such as a die boundary, to implement a frequency change of a fabric operational frequency on one side of the domain boundary, in accordance with some embodiments.

FIG. 25 illustrates flowchart 2500 or signal diagram illustrating signaling performed at a fabric boundary, such as a die boundary, to implement a frequency change of a fabric operational frequency on one side of the domain boundary, in accordance with some embodiments. For simplicity, in FIG. 25 the low-level implementation details have been abstracted in two main components (power management unit and interconnect interface). The frequency change may be an increase or a decrease in frequency. Here, various events and processes occur over time as shown by the time running from the top to the bottom.

In flowchart 2500 example, a signal flow is shown for time lines of a first power management unit 2502 (e.g., supervisor p-unit of I/O Die 2104-1) and a first interconnect 2136 corresponding to a first fabric domain, and a second power management unit 2103 (e.g., supervisee p-unit of Die 2101-2) and a second interconnect 2126 corresponding to a second fabric domain. In this example a fabric domain boundary 2550 coincides with a die boundary between two adjacent dies on the same SoC. However, domain boundary 2550 of the fabric may not coincide with die boundaries in other examples.

At box 2512, first power management unit 105 generates a frequency change request to change the operating frequency of the fabric domain of IO Die 2104-1 from f1 to f1* and sends a signal 2513 to first interconnect 2126 (of IO Die 2104-1) requesting a frequency change to f1*. Responsive to the frequency change request signal 2512, first interconnect 2126 both: (i) temporarily blocks traffic to die 2 2101-2 via an internal signal 2523; and (ii) sends a signal 2525 to the second interconnect 2126 (of die 2101-2) to temporarily block incoming traffic from die 2101-2. Responsive to the signal 2525 from the first interconnect 2520, second interconnect 2126 (of die 101₂) implements blocking of outgoing traffic to I/O die 1041 via an internal signal 2563. After traffic in each direction has been blocked, the second interconnect 2126 of die 2101-2 sends a signal 2515 to first power management unit 105 indicating that the respective interconnects are ready for the requested frequency change to be implemented on I/O die 2104-1.

Next at box 2514, first power management unit 105 re-locks its local PLL or FLL to the newly requested frequency f1* and then sends a signal 2517 to first interconnect 2126 of die 2104-1. After the frequency change f1→f1* has been implemented on I/O die 2104-1 then first interconnect 2126 of I/O die 2104-1 implements throttling using the circuitry of FIG. 23 to determine an appropriate duty cycle via an internal signal 2527. Once throttling set-up has been implemented locally on first interconnect 2520, which is on die 2101-2, the first interconnect 2126 of I/O die 2104-1 sends a signal 2529 to the second interconnect 2126 of die 2101-2 to inform die 2101-2 of the changed frequency value f1*.

Then the second interconnect 2126 of die 2101-2 uses internal signaling 2565 to implement the throttling based on the frequency difference between f1* and f2. One might assume that throttling need only be set up on the transmitting die of I/O die 2104-1 and die 2101-2, but the relationship between f1* and f2 may not be known and thus no assumptions are made. When setting up throttling traffic flow in either of the two directions is a possibility so both dies across the die boundary maybe configured for throttling. After both sides of the interconnect (i.e. fabric domain boundary) have been configured an appropriate throttling duty cycle for the frequency mismatch (f1*-f2) then first interconnect 2126 of I/O die 2104-1 sends a signal 2533 to second interconnect 2126 of die 2101-2 triggering it to unblock traffic to die 2101-1. Finally, at signal 2519, the flow is complete and the frequency change in the fabric domain of I/O die 2104-1 has been implemented on the fabric domain boundary.

In some embodiments, the implementation of changes to a throttling duty cycle may be performed on more than one fabric domain boundary, depending on how many different fabric domain boundaries the change in the fabric frequency on I/O die 2104-1 impacts upon. In the FIG. 21 example, a change to $V_1$-$f_1$ may trigger a similar signal exchange sequence with each of the dielet 2101-1 and the dielet 2104-1. As a further example, a change to $V_3$-$f_3$ may trigger signal sequences with each of the dielets 2104-1, 2101-1 and 2101-4 but not the 2101-3 dielet. According to the signal flow 2500, simplified non-coordinated flows for DVFS between two interfacing fabric domains is achieved. That is, the fabric on one die may change frequency without the fabric on the other die being also triggered to change frequency.

Figure 26:
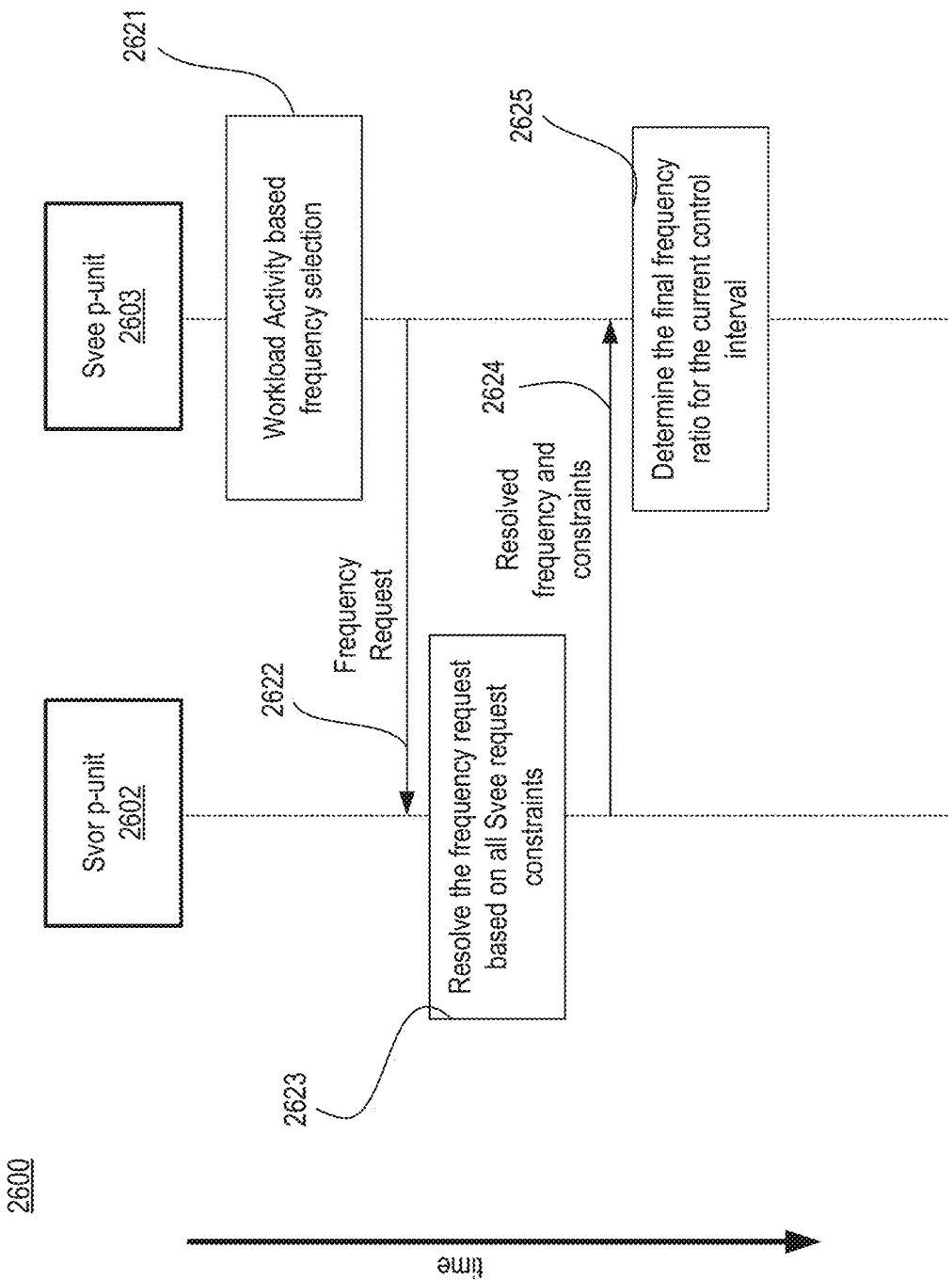
FIG. 26 illustrates a flowchart showing bidirectional communication between supervisor and supervisee p-units for one control interval of a supervisee p-unit, in accordance with some embodiments.

FIG. 26 illustrates flowchart 2600 showing bidirectional communication between supervisor p-unit 2602 and supervisee p-unit 2603 for one control interval of a supervisee p-unit, in accordance with some embodiments. In some embodiments, supervisee p-unit 2603 (e.g., of die 2101-2) decides to set an appropriate voltage and/or frequency of its uncore including interconnect fabric and its mesh stops. In that regards, at block 2621, supervisee p-unit 2603 begins the workload activity-based frequency selection process. In some embodiments, supervisee p-unit 2603 considers telemetry data for the workload (e.g., change in value of performance counters), traffic on the fibers, current voltage and frequency, etc. in determining whether the fabric needs a higher or lower voltage and/or frequency. Supervisee p-unit 2603 then formally requests supervisor p-unit 2602 for change in frequency via signal 2602. This signal can be sent over fabrics 110, 111, or fast response interconnect 112.

At block 2623, supervisor p-unit 2602 processes the frequency change request from supervisee p-unit 2603. For example, at block 2623 supervisor p-unit 2602 resolves the frequency request based on supervisee request constraints and/or voltage and/or frequency of operation of fabrics of other supervisee dies. Supervisor p-unit 2605 uses comprehensive data to determine whether the frequency change request from supervisee p-unit 2603 is to be granted and if so, the voltage and/or frequency that should be assigned to the uncore of supervisee die. In some embodiments, external SoC power level limits and resolution of frequency for the fabrics of supervisee dies are reviewed by supervisor p-unit 105. In some embodiments, distribution of shared resource like power budget is divided differently in each fabric as:

$$f_{fabric_i} = f_{base,i} + \beta_i f_{rc}$$

Where the $f_{fabric_i}$ is the fabric frequency limit for supervisee p-unit 2603$i$, the $f_{base,i}$ is the base frequency of the fabric managed by the supervisee p-unit is the contribution of global limit $f_{rc}$ supplied from supervisor p-unit 2602. Supervisor p-unit then sends the signal to supervisee p-unit 2603 regarding the constraints and frequency and/or voltage for the uncore of the supervisee die. At block 2625, supervisee p-unit then determines the final frequency ratio (e.g., PLL or FLL divider ratio) for a duration of operation of the uncore (which includes the fabric and its mesh stops). In some embodiments, supervisor p-unit 2602 applies user level or other socket level power limits to each supervisee p-unit.

Figure 27:
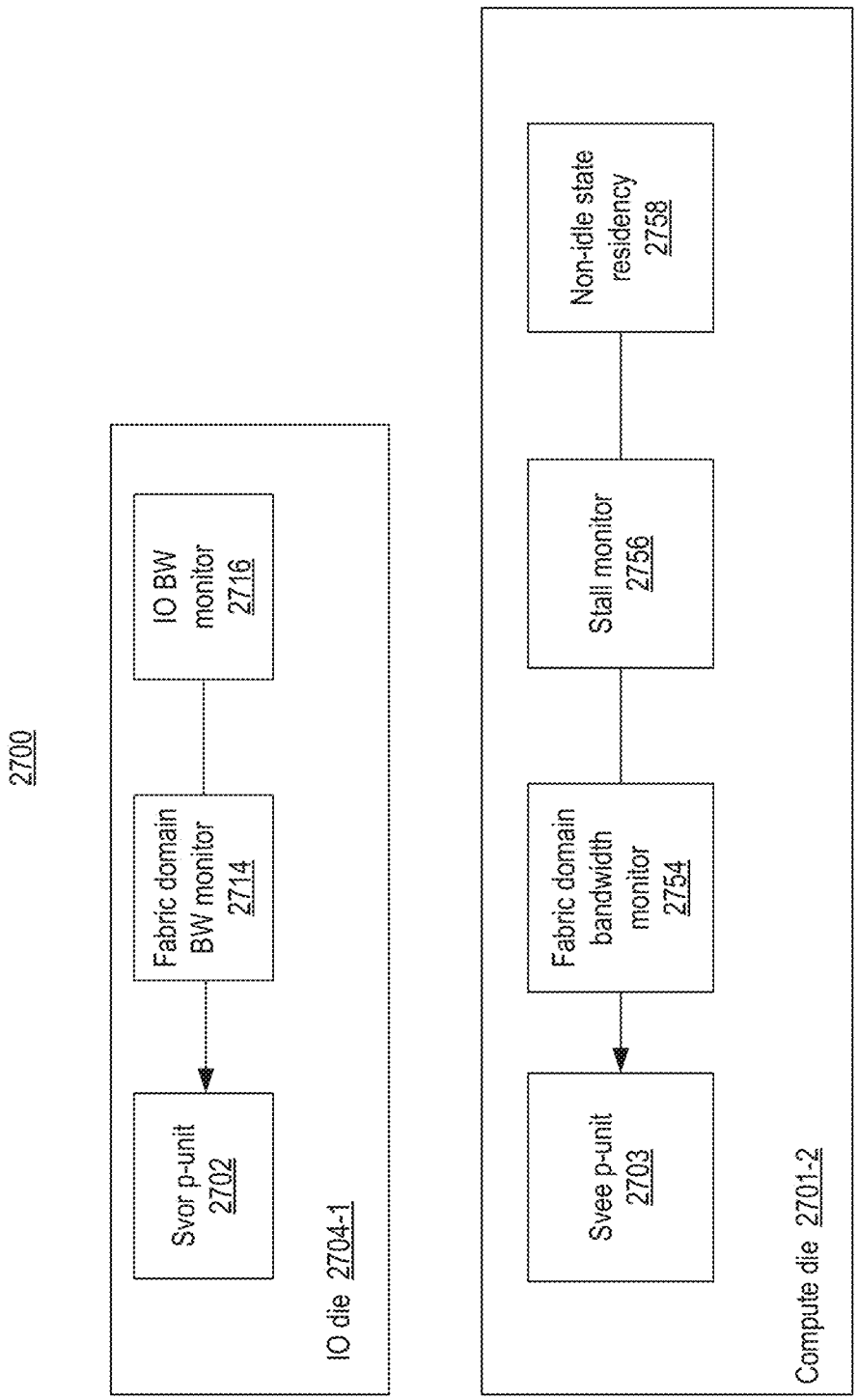
FIG. 27 illustrates components of an JO die and Compute Die showing how telemetry of data associated with performance level setting is performed on a domain basis of the fabric, in accordance with some embodiments.

FIG. 27 illustrates components telemetry system 2700 of an IO die 2704-1 (e.g., 104-01) and Compute Die 2701-2 (e.g., 101-02) showing how telemetry of data associated with performance level setting is performed on a domain basis of the fabric, in accordance with some embodiments. In this example, supervisor p-unit 2702 (e.g., 102) of IO die 2704-1 is the supervisor p-unit while supervisee p-unit 2703 of compute die 2101-2 is a supervisee p-unit for that supervisor p-unit domain.

In this example, a telemetry system 2700 that is subdivided into an IO die (or domain) 2704-1 and a compute die (or domain) 2101-2. In some embodiments, IO die 2704-1 has an IO power control unit 105, an IO fabric domain bandwidth monitor 2714 and an IO bandwidth monitor 2716. In some embodiments, compute die $101_2$ has a compute power control unit 2703 (or 102 is it's a supervisor p-unit), having a compute power control unit 2752, a compute fabric domain bandwidth monitor 2754, a stall monitor 2756 and a non-idle state residency monitor 2758.

In systems which implement a performance level throughout a fabric, a single power control unit might receive workload information from at least a plurality of dielets of the SoC and use that collated workload information to determine an appropriate performance level. In this case only one fabric domain bandwidth monitor is likely to be provided. By way of contrast, according to some embodiments, distinct fabric domain bandwidth monitors may be provided for each different fabric domain. The dedicated IO power control unit 105 requests a performance level for IO die 2704-1 based on information from IO bandwidth monitor 2716.

The compute p-unit 2703 monitors the prevailing workload using the stall monitor 2756 and the non-idle state-residency monitor 2758 and requests a compute fabric performance level based on that input without considering the JO workload. The non-idle state-residency monitor 2758 may monitor a duration for which a core is executing and not idle. Each core of a processor may have a number of core idle states (C-states) and a number of voltage-frequency pairs (P-states) that set the speed and power consumption of the core or processor. When the operating voltage of a processor is lower, so is the power consumption. Different C-states may correspond to clock gating of progressively more components of the SoC.

Since the frequency is lowered in tandem with the voltage, a lower frequency results in slower computation. In some embodiments, power control unit 2702 periodically monitors the processor utilization. If that utilization is less than a certain threshold, it may increase the P-state, that is, the data functional unit may the next higher power efficiency state. Ideally, utilization should be as close to 100% as possible.

Figure 28:
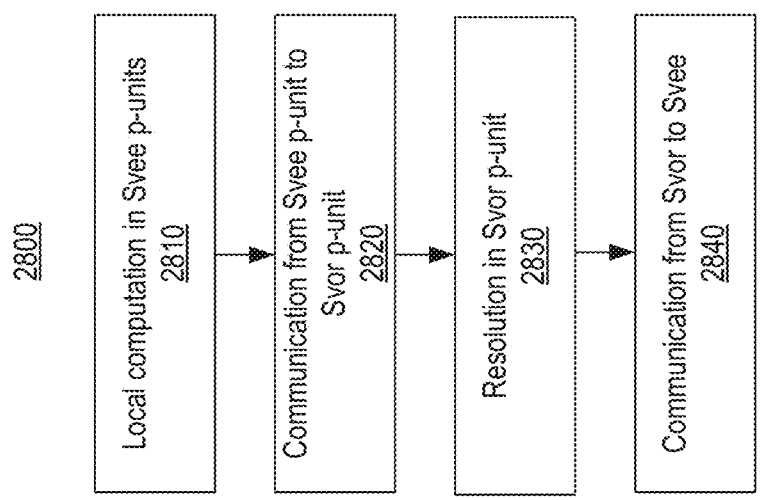
FIG. 28 illustrates a flowchart showing hierarchical power management for power management of uncore or fabric interconnect, in accordance with some embodiments.

FIG. 28 illustrates flowchart 2800 showing hierarchical power management for power management of uncore or fabric interconnect, in accordance with some embodiments. In some embodiments, a requested performance level may be determined individually for each distinct fabric domain to take specific account of each of processing workload and mesh bandwidth in the respective domain. In some embodiments, the requested performance levels may be collated by a power control supervisor unit that determines whether or not to grant the requested performance levels of the fabric domains depending on at least one constraint. Examples of constraints include maximum total power limit, minimum total power limit, minimum performance level and thermal constraints. In alternative examples a single supervisor power control unit may receive telemetry from two or more dies connected by a single fabric and may control different domains of the fabric to have different performance levels based on that telemetry. In some such examples the supervisor power control unit performs the power control and supervisee power units need not be provided.

According to some embodiments, a hierarchical power management algorithm may be implemented for fabric DVFS involving two or more different fabric domains in a single fabric, the different domains operable concurrently at different fabric operating frequencies.

At process element 2810 a p-unit (power management unit) controller applies a set of heuristic algorithms to find the frequency required for the local dielet fabric portion (domain) after processing a set of telemetry data for the dielet. The frequency may be increased when fabric domain traffic is large and vice versa. Next, at process element 2820 each supervisee p-unit controller 2703 then sends the requested frequency calculated based on the local telemetry to a supervisor p-unit 2702. In some embodiments, supervisor p-unit 2702 resolves the frequency based on user applied limits such as, for example, a perf-p limit, an RAPL limit and an architecture of the system as indicated by process element 2830. At process element 2840 the resolved frequency determined by the p-unit supervisor 2702 is communicated back to the supervisee p-units 2703, which enforces the decision and re-sets the PLLs of the local dies according to the resolved performance level received from the p-unit supervisor 2702.

Figure 29:
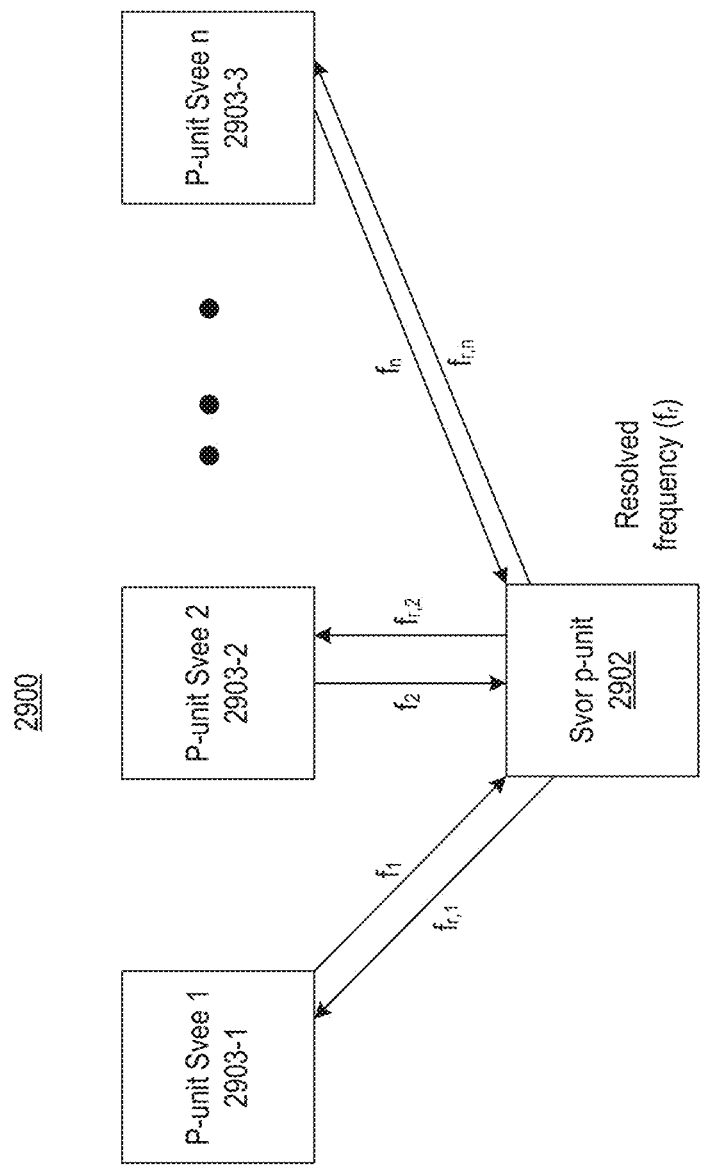
FIG. 29 illustrates a flowchart showing power management unit communication sequence between supervisor and supervisee p-units, in accordance with some embodiments.

FIG. 29 illustrates flowchart 2900 showing power management unit communication sequence between supervisor and supervisee p-units, in accordance with some embodiments. As discussed with reference to FIG. 28, supervisor p-unit 2702 resolves the various constraints to determine the frequency for each supervisee unocre (e.g., fabric components and interconnect). Here, 'n' supervisee dies are shown with n respective p-units 2903-1 through 2903-$n$. Each supervisee p-unit collects telemetry data (e.g., hardware counters), for workload being processed by the corresponding supervisee die, and heuristics to determine what frequency to request for the uncore. Each supervisee p-unit then sends the requested frequencies $f_1$ through $f_n$ to supervisor p-unit 2902 (e.g., 102). Supervisor p-unit 2902 resolves the frequencies from each supervisee p-unit based on user applied limits such as, for example, a perf-p limit, an RAPL limit. Supervisor p-unit then send the resolved frequency for each supervisee p-unit as discussed with reference to various embodiments.

FIG. 30 illustrates user interface 3000 for setting power constraints for a communication fabric having two or more performance level domains, in accordance with some embodiments. In one example implementation, two modes are available for independent fabric control of the data processing apparatus. These modes can be selected from a customer visible interface.

Mode 1: Legacy mode (entire server fabric is treated as a single domain and will have same frequency)

$$f_{r,i} = \max(f_i) \forall i \in [1,N]$$

Where $f_{r,i}$ is the resolved frequency by the supervisor power control unit for each of the N different fabric domains. In this example a global frequency may be selected as the maximum frequency value of the performance level requests coming from each of the fabric domains.

Mode 2: Independent Fabric DVFS mode in which each fabric domain is treated as a separate entity for the purpose of performance level setting. Also note, that in examples where the LLC is distributed in the data processing apparatus, it could be undesirable to have different frequencies for fabric domains that are on the same compute die. However, if a unless SNC mode is enabled).

$$f_{r,compute} = \max(f_i) \text{ where } i \in \text{Compute dielet}$$

$$f_{r,HSIO} = f_j \text{ where } j \in \text{HSIO dielet(both IO can have different frequency)}$$

FIG. 30 schematically illustrates an example user interface for the multi-domain single fabric data processing apparatus according to the present technique. A user interface may be provided to enable user selection of the frequency (and in turn voltage) for each of the different fabric domains on the SoC.

There are four types of variables in the example user interface illustrated in FIG. 30: 1) Fabric Domain Ratio Status N—shows current frequency of the fabric domain N; 2) Fabric Domain Ratio MAX LIMIT N—Apply this limit to the frequency of fabric domain N; 3) Fabric Domain Ratio MIN LIMIT N—Apply this limit to the frequency of fabric domain N; and 4) Fabric DVFS mode select.

Via this user interface, users can, for example, set the MAX LIMIT and MIN LIMIT for a given fabric domain to be the same and force the frequency of a fabric domain as per their specific requirements. According to the present technique it is possible to obtain better power and performance optimizations with multiple V-F domains under non-homogeneous fabric traffic distribution. Some example implementation scenarios include: DVFS on High Speed IO (HSIO) disaggregated tile fabric; Multiple socket level cluster configuration; Companion die fabric that cannot run at same frequency as main core die fabric; Sub-NUMA (Non-Uniform Memory Access) clustering mode; Peer-peer companion fabric optimization.

Although there are some dual (or multi) processor systems where two (or multiple) different fabrics are connected through a bridge (path interconnect) in a single package. For example, two compute sockets of the type illustrated in FIG. 21 may be connected to form a data processing apparatus. Topologically, such dual processor systems system could appear superficially to be like a single fabric partitioned into two fabric domains. However, two separate fabrics connected by a bridge are very poor in performance compared to a single large fabric. This is because, the bridge latency cannot match the native fabric latency. The performance demands of a single fabric call for mechanisms that enable the fabric PnP (Power and Performance) optimizations without affecting the baseline performance of the fabric. Examples of the present technique involve partitioning a single large fabric into multiple V/F domains without incurring any appreciable latency being attributable to the mechanisms that enable this partitioning. Example implementations can achieve zero or at least very low added latency for multiple V/F domains in a single fabric.

A simple backpressure mechanism, such as an asynchronous FIFO could in principle be used in between the fabric domains to provide loss-less data transmission when two fabric domains are operating at asymmetric frequencies. However, this will likely incur a two to three cycle latency in the data path, which is not often acceptable for a single shared fabric performance. By way of contrast a fabric backpressure mechanism according to the present technique that implements a duty cycle based on a frequency mismatch amount, does not incur impractical extra latency and thus facilitates viable implementation of fabric partitioning. Moreover, an approximation to this backpressure mechanism is provided, such that it uses minimal hardware logic while still working across a wide range of frequency mismatch between the two different fabric domains of the single fabric.

Figure 31:
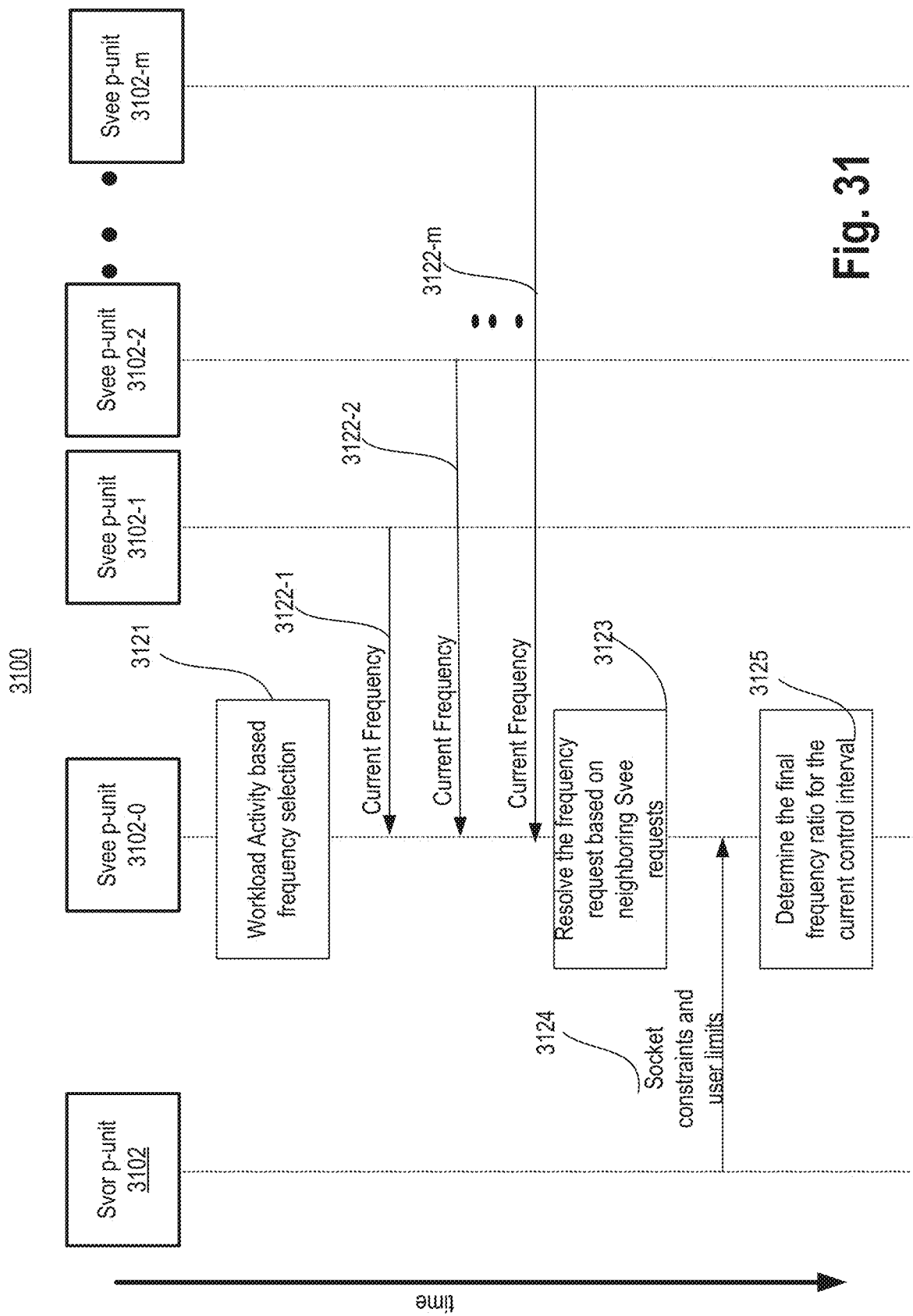
FIG. 31 illustrates a flowchart for distributed power management associated with FIG. 17C of the frequency in one control interval of a supervisee p-unit, in accordance with some embodiments.

FIG. 31 illustrates flowchart 3100 for distributed power management associated with FIG. 17C of the frequency in one control interval of a supervisee p-unit, in accordance with some embodiments. In this approach, each fabric determines the optimal voltage and frequency as part of the local computation. In some embodiments, supervisor p-unit 3102 send unidirectional limits to supervisee p-units 3103-0 though 3103-$m$, which reduces the network contention between supervisor p-unit 3102 and supervisee p-units 3103-0 through 3103-$m$. This voltage and frequency are shared among the peer fabrics that are sharing the data interface.

Consider a system in which the fabric i with supervisee diei is connected to m neighboring fabrics $\{n_1, n_2, n_3, \ldots n_m\}$ of m neighboring supervisee dies. In some embodiments, each supervisee p-unit performs the local computation for frequency for its uncore which includes the fabric components connecting interconnects. For example, each supervisee p-unit gathers telemetry information for the workload to determine workload activity as indicated by block 3121. One way to determine workload activity is to read hardware performance counters. A higher value of the counters indicates higher use of the fabric and possible bottlenecks in the fabric. In some embodiments, each supervisee p-unit also receives current uncore frequency (which includes the operating frequency of the fabric) of other supervisee dies. For example, supervisee p-units use interconnect 1732 to receive current frequencies 3122-1 thought 3122-$m$ from supervisee p-units 3103-0 through 3103-$m$, respectively. In some embodiments, the supervisee dies 2-$m$ are dies to the north, source, east, and west of supervisee die 1.

Supervisee p-unit 3103-1 then resolves its fabric frequency based on current frequencies of other supervisee p-units, and workload activity of its own supervisee die as indicated by block 3123. In various embodiments, supervisee p-unit 3103-1 receives socket constraints and user limits from supervisor p-unit 3102. These socket constraints and user limits are global limits applicable to all supervisee dies, in accordance with some embodiments. At block 3125, supervisee unit determines the final frequency for its uncore components (e.g., fabric components and interconnect) as follows:

Final frequency resolution=>$f_{res}$=max $\{f_i, f_{n_1}, f_{n_2}, f_{n_3}, \ldots, f_{n_m}\}$
  a. If ($f_i$==$f_{res}$) then $f_i$=$f_{res}$
  b. Else: $f_i$=$f_{res}$−1 bin of frequency (To avoid getting stuck at equilibrium)

Supervisee p-unit 3102-0 then shares its uncore frequency $f_1$ with other neighboring supervisee p-units 3102-1 through 3102-$m$. As each supervisee p-unit shares it frequency with other neighboring supervisee p-units. For example, supervisee p-units send operating voltage and/or frequency of its local VRs (e.g., LDOs) and PLL/FLL for its fabric to other neighboring supervisee p-units. As such, each supervisee die operates its fabric with a frequency for optical die-to-die and intra-die communication at optimal power levels.

Resource Director Technology (RDT) is one example of commercially available technologies which provide a framework for cache and memory monitoring and allocation capabilities in a processor, including cache monitoring technology (CMT), cache allocation technology (CAT), code and data prioritization (CDP), memory bandwidth monitoring (MBM), and memory bandwidth allocation (MBA). These technologies enable tracking and control of shared resources, such as last-level cache (LLC) and main memory bandwidth in use by applications, virtual machines, etc. running on system 3200 concurrently. RDT may aid noisy neighbor detection and help to reduce performance interference, ensuring the performance of key workloads in complex computing environments meets QoS requirements.

Cache Allocation Technology (CAT) provides software programmable control over the amount of cache space that can be consumed by a given thread, application, virtual machine (VM), or container. This allows, for example, OSs to protect important processes, or hypervisors to prioritize important virtual machines (VMs) even in a noisy datacenter environment. The basic mechanisms of CAT include the ability to enumerate the CAT capability and the associated last-level cache (LLC) allocation support via CPUID, and the interfaces for the OS/hypervisor to group applications into classes of service (CLOS) and indicate the amount of last-level cache available to each CLOS. These interfaces are based on Model-Specific Registers (MSRs). As software enabling support is provided, most users can leverage existing software patches and tools to use CAT.

The CMT feature provides visibility into shared platform resource utilization (via L3 cache occupancy), which enables improve application profiling, better scheduling, improved determinism, and improved platform visibility to track down applications which may be over-utilizing shared resources and thus reducing the performance of other co-running applications. CMT exposes cache consumption details, which allows resource orchestration software to ensure better Service Level Agreement (SLA) attainment.

MBA technology enables approximate and indirect control over the memory bandwidth available to workloads, enabling interference mitigation and bandwidth shaping for noisy neighbors present in system 3200. MBA provides per-core controls over bandwidth allocation. MBA is included between each core and a shared high-speed interconnect which connects the cores in some multi-core processors. This enables bandwidth downstream of shared resources, such as memory bandwidth, to be controlled.

MBA is complementary to existing RDT features such as CAT. For instance, CAT may be used to control the last-level cache, while MBA may be used to control memory bandwidth. The MBA feature extends the shared resource control infrastructure introduced with CAT. The CAT architecture defines a per-software-thread tag called a Class of Service (CLOS), which enables running threads, applications or VMs to be mapped to a particular bandwidth. Through central processing unit (CPU) identifier (CPUID)-based enumeration, the presence of the MBA feature can be confirmed on a specific processor. Once enumerated as present, details such as the number of supported classes of service and MBA feature specifics such as throttling modes supported may be enumerated.

In typical usages an enabled operating system and/or virtual machine monitor will maintain an association of processing threads to a CLOS. Typically, when a software thread is swapped onto a given logical processor, a model specific register (MSR) such as IA32_PQR_ASSOC MSR (for an Intel Corporation Xeon® processor, for example) is updated to reflect the CLOS of the thread. MBA bandwidth limits per-CLOS are specified as a value in the range of zero to a maximum supported level of throttling for the platform (available via CPUID), typically up to 90% throttling, and typically in 10% steps. These steps are approximate, and represent a calibrated value mapped to a known bandwidth-intense series of applications to provide bandwidth control. The resulting bandwidth for these calibration points provided may vary across system configurations, generations and memory configurations, so the MBA throttling delay values should be regarded as a hint from software to hardware about how much throttling should be applied.

There are many technical effects of the various embodiments. For example, various embodiments exploit recent extension to the priority definition of a CLOS in RDT—the extension providing a new class of service called a memory class of service (called "memCLOS" or "MCLOS" herein)—to enable the incorporation of MCLOS functionality across multiple IC dies of an HPM architecture. In one such embodiment, IC dies of such an architecture comprise respective P-units, where—at least with respect to the provisioning of MCLOS functionality—one such P-unit is to function as a "supervisor" to one or more other "supervisee" P-units. Other technical effects will be evident from the various figures and embodiments.

Figure 32:
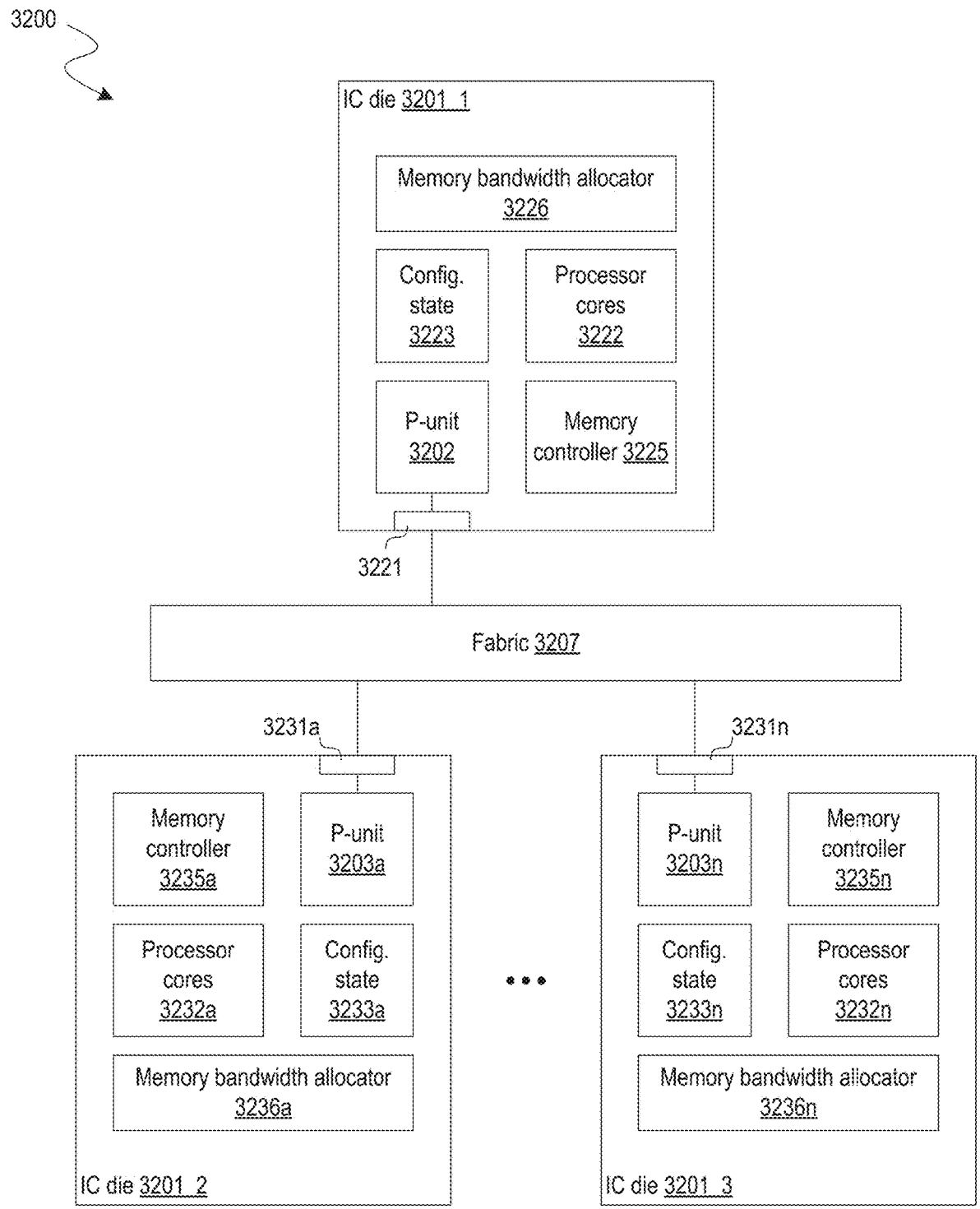
FIG. 32 illustrates a functional block diagram showing features of a system to manage memory accesses by processor cores according to an embodiment.

FIG. 32 is a block diagram illustrating a system 3200 to support MCLOS in a HPM architecture according to an embodiment. System 3200 is one example of an embodiment wherein multiple IC dies (of a packaged device, for example) each comprise respective P-units that are to variously support MCLOS functionality, where—at least with respect to management of such functionality—one P-unit is to be a "supervisor" P-unit for one or more other "supervisee" P-units.

In the illustrative embodiment shown, IC dies 3201_1, and 3201_2, . . . , 3201_3 of system 3200 are variously coupled to one another via interconnect circuitry such as the illustrative fabric 3207 shown. By way of illustration and not limitation, a P-unit 3202 of IC die 3201_1 is coupled to fabric 3207 (e.g., a P2P fabric) via a hardware interface 3221. Similarly, a P-unit 3203$a$ of IC die 3201_2 is coupled to fabric 3207 via a hardware interface 3231$a$—e.g., where another P-unit 3203$n$ of IC die 3201_3 is coupled to fabric 3207 via a hardware interface 3231$n$.

One of the IC dies is to operate as a supervisor chip at least with respect to the provisioning of MCLOS features with one or more others of the IC dies. By way of illustration and not limitation, P-unit 3202 is to be a supervisor P-unit and some or all of IC dies 3201_2, . . . , 3201_3 are each to be a supervisee P-unit, the MCLOS features of which are to be managed by P-unit 3202.

In the illustrative embodiment shown, IC die 3201_1 comprises cores 3222 and a memory controller 3225 which provides cores 3222 with access to one or more memory resources (not shown) including, for example, a shared cache, main memory, or the like. In various embodiments, system 3200 includes—or alternatively, is to couple to— some or all such memory resources, which (for example) include one or more memory devices or dies including any of various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, a main memory may include one or more hard disk drives within and/or accessible by system 3200.

Cores 3222 (as with the other cores discussed throughout this disclosure) include, for example, any of various commercially available processor cores, including without limitation those of Intel® Atom®, Celeron®, Core (2) Duo®, Core i3, Core i5, Core i7, Itanium®, Pentium®, Xeon® or Xeon Phi® processors, ARM processors, processors from Applied Micro Devices, Inc., and similar processors—e.g., wherein cores 3222 include, but are not limited to, one or more vector processing cores, matrix processing cores, scalar processing cores, GPU cores, AI engines, DSP cores, or the like. During operation of system 3200, cores 3222 variously access the memory resources, via memory controller 3225, to process one or more workloads. To promote efficient power utilization with cores 3222, while accommodating one or more MCLOS requirements, IC die 3201_1 further comprises a P-unit 3202 and a memory bandwidth allocator 3226 which are variously coupled to each other, to memory controller 3225 and to cores 3222. P-unit 3202 comprises logic (e.g., including hardware and, in some embodiments, firmware) to determine MCLOS parameters that, for example, are received from a host OS executed with cores 3222 (or, in another embodiment, from an agent that is external to IC die 3201_1).

Based on the MCLOS parameters, P-unit 3202 dynamically updates, or otherwise provides, memory bandwidth settings for memory bandwidth allocator 3226. These memory bandwidth settings are variously applied by memory bandwidth allocator 3226 to processor cores 3222—e.g., wherein memory bandwidth allocator 3226 dynamically adjusts memory bandwidths that are variously allocated to the one or more workloads that cores 3222 process. In various embodiments, adjusting memory bandwidth comprises memory bandwidth allocator 3226 dynamically changing one or more of: a number of memory channels that are to be available for use by a given one or more cores, an amount of memory resources for which the one or more cores have been allowed access, an amount of time to be allocated for the one or more cores to use memory resources (and/or to use fabric resources to access said memory resources), a frequency of a clock which facilitates communication between the one or more cores and a given memory resource, a priority of memory accesses by the one or more cores, and/or the like.

In some embodiments, one or more memory bandwidth settings—which P-unit 3202 updates or otherwise provides for memory bandwidth allocator 3226—are additionally or alternatively based on performance monitoring statistics which are generated at memory controller 3225. For example, in one such embodiment, memory controller 3225 comprises logic to monitor the performance of one or more workloads by cores 3222. Based on such monitoring, memory controller 3225 generates performance statistics that are made available to determine whether, according to current MCLOS parameters, one or more changes need to be made to allocate more or less memory bandwidth to a given workload (e.g., to a given one or more of cores 3222).

In an embodiment, IC die 3201_1 comprises one or more registers, memory arrays and/or any of various other suitable repositories of MCLOS parameters, performance monitoring statistics, memory bandwidth settings and/or other information (represented as the illustrative configuration state 3223 shown) which, at a given time, is to determine operation of one or more of P-unit 3202, memory controller 3225, memory bandwidth allocator 3226 and cores 3222. Some or all of configuration state 3223 is distributed among various components of IC die 3201_1, in different embodiments.

One or more other chips of system 3200—e.g., including some or all of IC dies 3201_2, . . . , 3201_3—further provide respective MCLOS functionality locally. For example, IC die 3201_2 comprises processor cores 3232a, configuration state 3233a, a P-unit 3203a, a memory controller 3235a, and a memory bandwidth allocator 3236a which, for example, correspond functionality to cores 3222, configuration state 3223, P-unit 3202, memory controller 3225, and memory bandwidth allocator 3226 (respectively). Similarly, IC die 3201_3 comprises processor cores 3232n, a configuration state 3233n, a P-unit 3203n, a memory controller 3235n, and a memory bandwidth allocator 3236n which, for example, correspond functionality to cores 3222, configuration state 3223, P-unit 3202, memory controller 3225, memory bandwidth allocator 3226 (respectively).

Some or all of P-units 3202, 3203a, . . . , 3203n each include logic to support a protocol for communications which enable a hierarchical management of MCLOS operations across multiple IC dies of system 3200. For example, P-unit 3203a is coupled to receive respective MCLOS parameters that P-unit 3202 communicates via fabric 3207—e.g., were such other MCLOS parameters are received, derived, or otherwise determined by P-unit 3202 based (for example) on communications with a host OS executed by cores 3222. For example, in one embodiment, fabric 3207 comprises interconnects which provide some or all of the functionality of communication network 107. Alternatively, or in addition, P-unit 3203n is coupled to receive the same or other MCLOS parameters that P-unit 3202 communicates via fabric 3207. Based on such MCLOS parameters, one or more of P-units 3203a, . . . , 3203n provide settings for memory bandwidth allocation such as that which is to be provided by one of memory bandwidth allocators 3236a, 3236n.

Figure 33A:
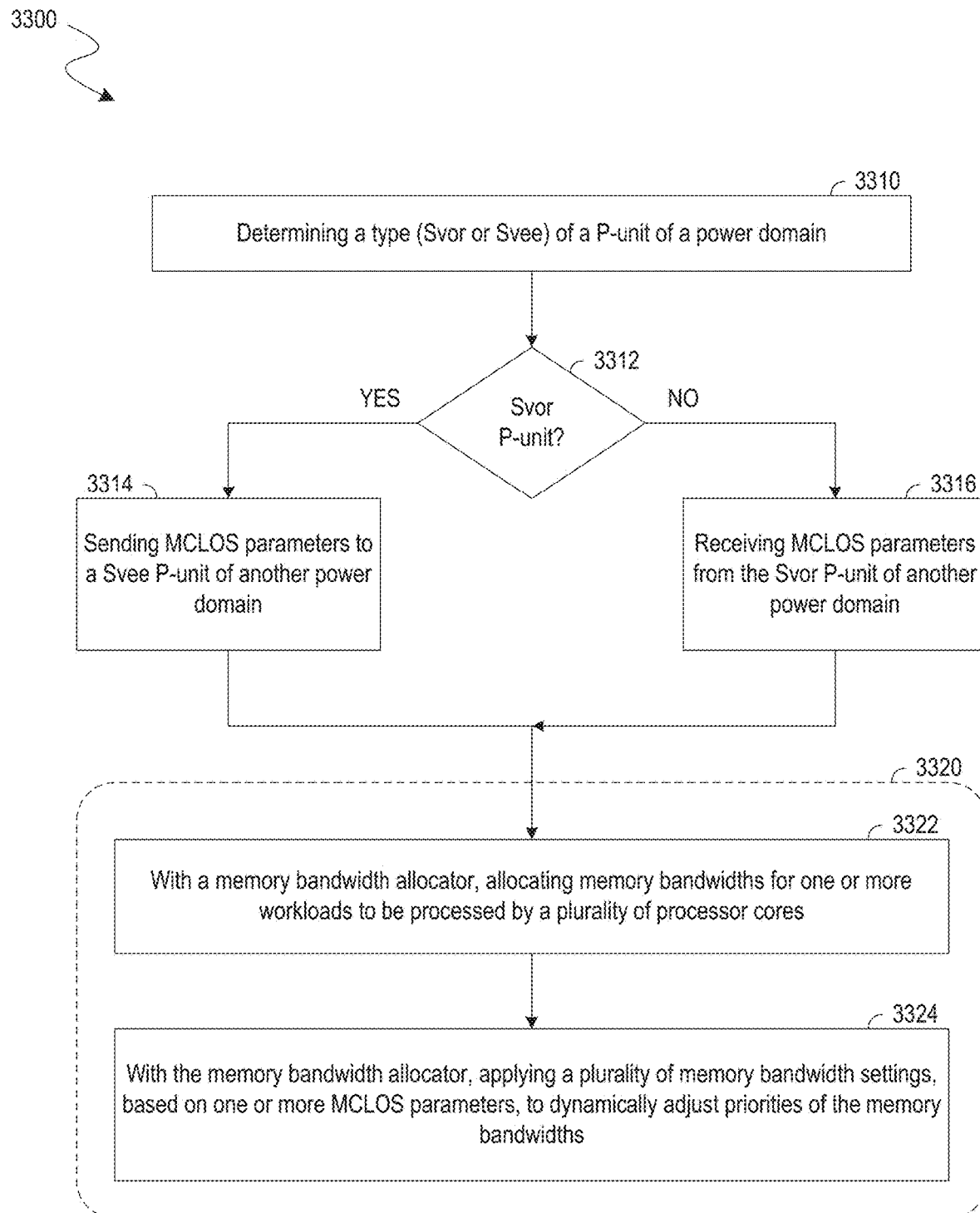

FIG. 33A shows operations of a method 3300 to communicate MCLOS information in a HPM architecture according to an embodiment. Method 3300 is performed with one or more IC dies which, for example provide functionality of system 3200.

As shown in FIG. 33A, method 3300 comprises (at 3310) determining a type to which a P-unit of a given power domain (e.g., a given IC die) belongs—e.g., including identifying a particular one of a supervisor P-unit type or a supervisee P-unit type. The type is determined, for example, based on handshake communications between P-units of different IC dies, or (for example) by accessing a mode set register, one or more fuse bits and/or any of various other suitable mechanisms to identify a function of the IC die in the power management hierarchy. An evaluation is then made (at 3312) as to whether a supervisor P-unit type—or alternatively, the supervisee P-unit type—is identified by the determining at 3310

Where the P-unit is determined at 3312 to be the supervisor P-unit, the P-unit (at 3314) sends MCLOS parameters from the P-unit to another P-unit of a different power domain (e.g., a different IC die). By contrast, the P-unit instead receives MCLOS parameters from another P-unit (at 3316) of a different power domain, where the P-unit is determined at 3312 to be the supervisee P-unit. In various alternative embodiments, method 3300 omits the determining at 3310, and the evaluating at 3312—e.g., wherein method 3300 instead automatically performs one of the sending at 3314 or the receiving at 3316.

In some embodiments, method 3300 further comprises—or alternatively, is a basis for—operations 3320 which are performed (for example) at that one of the power domains which includes a supervisee P-unit. Alternatively, or in addition, method comprises MCLOS operations that are performed at that one of the power domains which includes the supervisor P-unit. In the illustrative embodiment shown, operations 3320 comprise (at 3322) allocating memory bandwidths, with a memory bandwidth allocator of the power domain in question, for one or more workloads to be processed by a plurality of processor cores of that power domain. Operations 3320 further comprise (at 3324) the memory bandwidth allocator applying a plurality of memory bandwidth settings, based on one or more MCLOS parameters (such as those communicated at 3314 or at 3316), to dynamically adjust priorities of the memory bandwidths.

In various embodiments, MCLOS parameters (communicated at 3314 or at 3316) comprise an identifier of a type of event to be monitored, wherein, operations 3320 further comprise a performance monitor of a memory controller generating performance monitoring statistics, based on the identifier of the type of event, by monitoring performance of the one or more workloads by the plurality of processor cores based at least in part on performance monitoring configuration parameters. Alternatively, or in addition, such MCLOS parameters comprise information which identifies a correspondence of different levels of a MCLOS classification scheme each with a respective level of another class of service classification scheme. Alternatively, or in addition, such MCLOS parameters comprise an identifier of a time window which determines how a given event type is to be monitored.

FIGS. 33B, 33C show operations of methods 3330, 3340 which are performed—respectively—at a supervisee P-unit and a supervisor P-unit of a HPM architecture. In various embodiments, one or both of methods 3330, 3340 are part of, or otherwise based on, method 3300. As shown in FIG. 33B, method 3330 comprises (at 3332) a supervisee P-unit of a first IC die determining local performance monitoring statistics—e.g., based on a monitoring of memory accesses at the first IC die. In one example embodiment, the determining at 3332 comprises P-unit 3203a receiving said statistics from performance monitoring circuitry of memory controller 3235a. Method 3330 further comprises (at 3334) the supervisee P-unit sending the statistics which were determined at 3332 to a supervisor P-unit of another IC die (such as P-unit 3202).

Referring now to FIG. 33C method 3340 comprises (at 3342) a supervisor P-unit of a second IC die receiving, from a supervisee P-unit, performance monitoring statistics such as those which are sent at 3334 of method 3330. Method 3340 further comprises (at 3344) the supervisor P-unit determining local performance monitoring statistics at supervisor P-unit—e.g., based on a monitoring of memory accesses at the second IC die. In one example embodiment, the determining at 3332 comprises P-unit 3202 receiving said statistics from performance monitoring circuitry of memory controller 3225.

Method 3340 further comprises (at 3346) the supervisor P-unit determining one or more MCLOS configuration parameters (including, for example, a MCLOS time window parameter). In one such embodiment, the one or more MCLOS configuration parameters are provided to the supervisor P-unit by a workload monitor module of an operating system (or other suitable software process) which—for example—generates said one or more parameters based on aggregated performance monitoring statistics provided by the supervisor P-unit. In an alternative embodiment, the supervisor P-unit provides functionality to locally generate MCLOS configuration parameters based on the statistics which are variously determined at 3342 and 3344. Method 3340 further comprises (at 3348) sending the one or more MCLOS configuration parameters to the supervisee P-unit.

Referring again to FIG. 33B, method 3330 further comprises (at 3336) the supervisee P-unit receiving one or more MCLOS configuration parameters such as those which a supervisor P-unit sends at 3348. In one such embodiment, MCLOS functionality at the supervisee P-unit is modified based on the one or more MCLOS configuration parameters—e.g., wherein event monitoring at the first IC die as performed according to a time window (or other) MCLOS parameter which is received at 3336.

Figure 34:
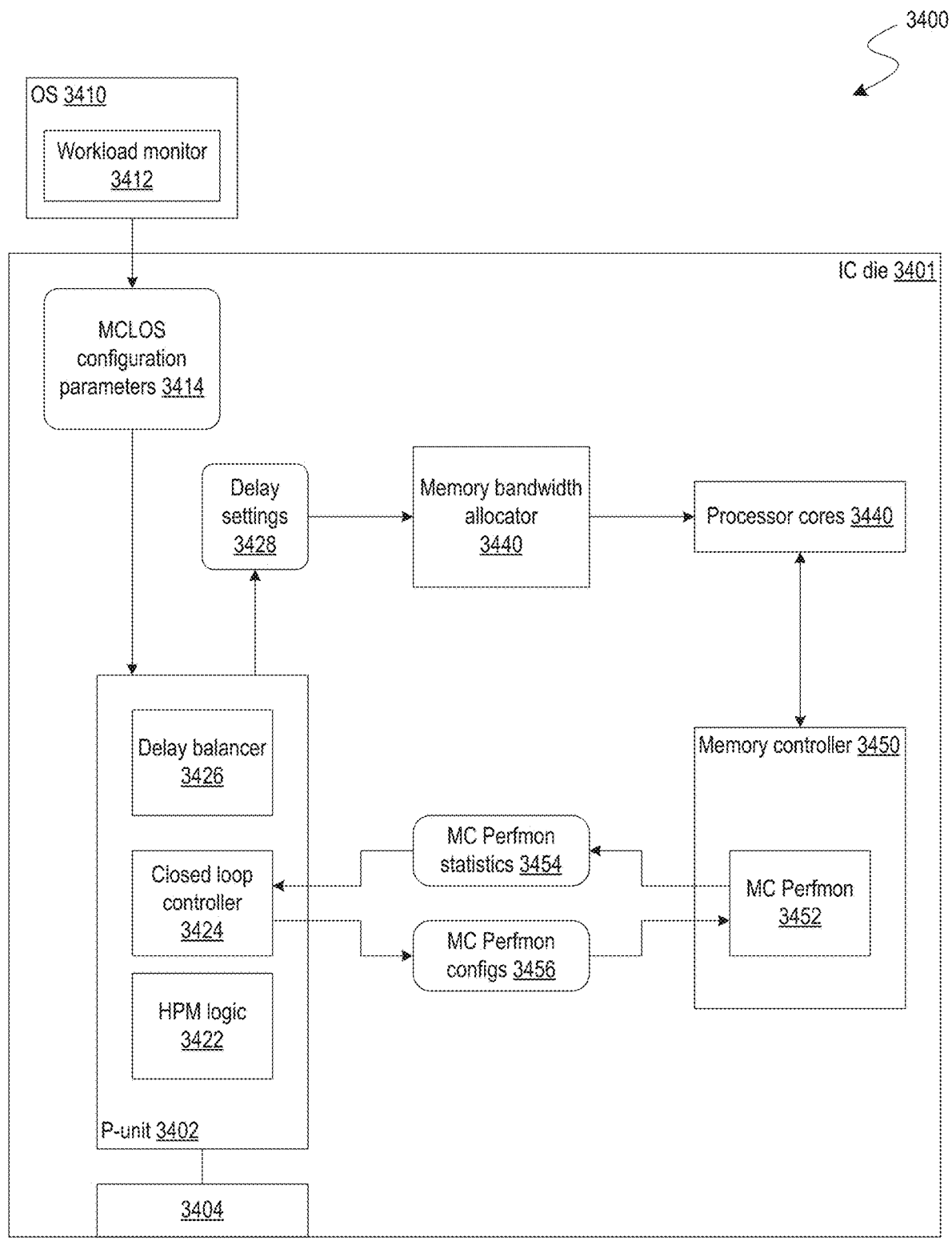
FIG. 34 illustrates a functional block diagram showing features of an integrated circuit chip to operate in a hierarchical power management architecture according to an embodiment.

FIG. 34 illustrates an example of dynamic control of memory bandwidth allocation according to some embodiments. System 3400 of components includes workload monitor 3412 implemented in software. In one embodiment, workload monitor 3412 is a component within OS 3410 to monitor workloads (e.g., applications or parts of applications) running on processor cores 3440. System 3400 includes processor cores 3440, memory controller (MC) 3450, P-unit 3402, and memory bandwidth allocator (MBA) 3430, all part of an IC die 3401 such as one of IC dies 3201_1, 3201_2, . . . , 3201_3. P-unit 3402 uses MCLOS configuration parameters 3414 set by workload monitor 3412 to determine delay settings 3428 (also called memory bandwidth settings), which are passed to MBA 3430. MBA 3430 communicates with processor cores 3440, which are coupled to MC 3450. As processor cores process instructions of workloads, MC performance monitor (perfmon) 3452 within MC 3450 gathers MC Perfmon statistics 3454 based at least in part on parameters set in MC perfmon configurations (configs) 3456. MC Perfmon statistics 3454 are passed to closed loop controller (e.g., proportional-integral-derivative, PID) controller 3424, within P-unit 3402, which may then cause delay balancer 3426 to change delay settings 3428 as needed. Thus, closed loop controller 3424 (e.g., a PID controller) and delay balancer 3426 implement a control loop mechanism employing feedback that is widely used in applications requiring continuously modulated control. Closed loop controller 3424 continuously calculates an error value as the difference between a desired set point (SP) and a measured (e.g., monitored) process variable (PV) (such as RPQ occupancy for example) and applies a correction based on proportional, integral, and derivative terms (denoted P, I, and D respectively). Closed loop controller 3424 automatically applies accurate and responsive corrections to a control function (e.g., memory bandwidth allocation in one embodiment).

In embodiments of the present invention, delay balancer 3426, based at least in part from inputs from closed loop controller 3424, determines delay settings 3428 (e.g., memory bandwidth settings) to be applied by MBA 3430 for processor cores 3440 to adjust the priorities of memory bandwidth for workloads being processed by the cores.

In one embodiment, MCLOS configuration parameters 3414 are communicated from workload monitor 3412 to P-unit 3402 using a mailbox implementation provided by OS 3410. A mailbox may be used for SW/BIOS to communicate with the processor for feature discovery and control. There are two registers which form the mailbox interface: one is the interface register which is used to control and specify the command, and the other is the data register. The busy bit is set and the operation to modify or control is specified. If the operation is a write, the data register carries the write data; and if the operation is a read, the content read back is stored in the data register.

In another embodiment, new MSRs (not shown in FIG. 34) for storing MCLOS configuration parameters 3414 are defined and implemented in IC die 3401 to extend existing CLOS configurations as defined in RDT.

In some embodiments, memory bandwidth and latency are mapped to one or more configurable metrics. In one embodiment, a specific metric called RPQ_occupancy can be used. A control loop is implemented in P-unit 3402 firmware maintaining favorable memory latency characteristics for high priority tasks and detecting unfavorable scenarios where high priority tasks can suffer performance loss due to memory bandwidth/latency degradation by monitoring, for example, system RPQ_occupancy. Delay balancer 3426 in P-unit 3402 automatically throttles (delays) access to memory bandwidth of low priority CLOS cores when, for example, a system RPQ_occupancy value crosses above a set point and restores high priority memory bandwidth/latency. Delay balancer 3426 uses the RDT/MBA interface provided by MBA 3430 to achieve throttling of low priority processor cores 3440.

In one embodiment, the plurality of delay settings (e.g., memory bandwidth settings) comprises a delay value for memory bandwidth allocation for a low priority processor core based on a memory class of service ("memCLOS," or "MCLOS") of (e.g., assigned to) the low priority processor core. In an embodiment, the one or more of the plurality of delay settings comprises a delay value of zero (e.g., no delay) for memory bandwidth allocation for a high priority processor core based on a MCLOS of (e.g., assigned to) the high priority processor core.

In one embodiment, a closed loop controller 3424 loop in P-unit 3402 firmware monitors, for example, RPQ_occupancy of IC die 3401 and when RPQ_occupancy crosses a set point, delay balancer 3426 throttles (delays) the low priority processor cores based on their MCLOS definition. In an embodiment, MCLOS configuration parameters 3414 can be programmed by workload monitor 3412 as shown below in tables 3 and 4, and MC Perfmon configs 3456 (such as an RPQ_occupancy setpoint) for the system can be programmed as shown below in table 5. In other embodiments, other MC Perfmon statistics 3454 can be monitored as determining metrics for dynamically adjusting memory bandwidth allocation (or other shared resources).

Thus, a practical design interface to add additional QoS levels for different priority workloads is accomplished in embodiments with the extension to CLOS called MCLOS.

In an embodiment, MCLOS configuration parameters 3414 includes a control bit used to enable the MCLOS feature. When set (e.g., set to 1), the MCLOS feature is enabled for IC die 3401. In one embodiment, the enable MCLOS control bit is implemented as a fuse in IC die 3401 that can be blown when the MCLOS capability is authorized.

In the example embodiment shown, P-unit 3402 receives MCLOS configuration parameters 3414 from a workload monitor 3412 (or other software process) that, for example, is executed with processor cores 3440. Such MCLOS configuration parameters 3414 are used, for example, at P-unit 3402 to perform operations which contribute to MCLOS functionality at IC die 3401. In various embodiments, P-unit 3402 additionally or alternatively communicates some or all such MCLOS configuration parameters 3414 to one or more other P-units each at a different IC die which system 3400 includes (or, alternatively, is to couple to). For example, P-unit 3402 includes or otherwise has access to HPM logic 3422 which supports communication—via a hardware interface 3404 of circuitry 3401—with respective P-units or one or more other IC dies. In one such embodiment, the one or more other P-units operate each as a supervisee to P-unit 3402—e.g., by using parameters provided by P-unit 3402 to implement MCLOS functionality at the one or more other IC dies.

In still other embodiments, P-unit 3402 instead receives MCLOS configuration parameters 3414 from another P-unit of a different IC die via a hardware interface 3404—e.g., wherein P-unit 3402 is a supervisee to the other P-unit at least with respect to management of MCLOS functionality. In one such embodiment, OS 3410 and workload monitor 3412 are instead software processes executed with one or more processor cores of the different IC die.

Figure 35:
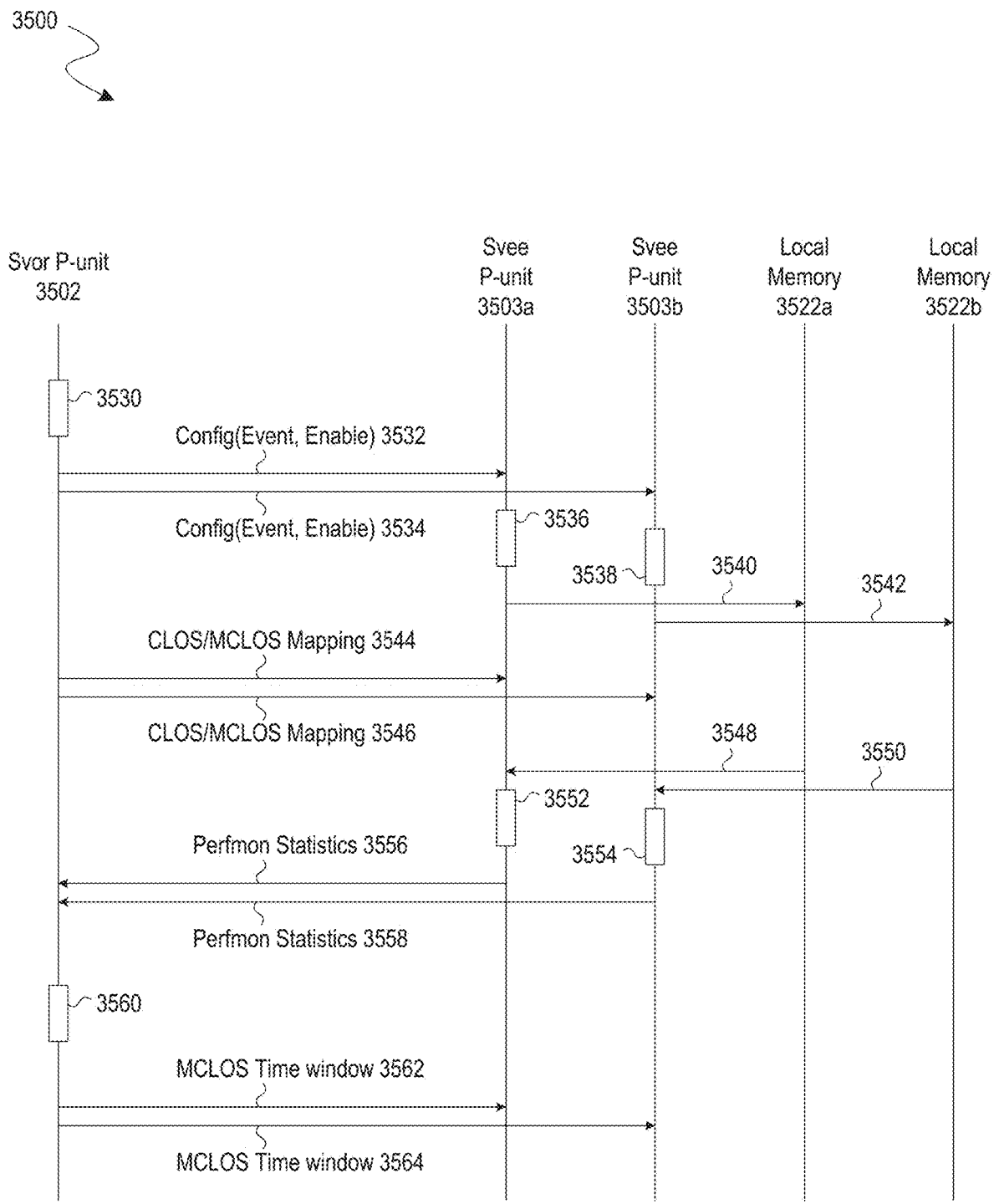
FIG. 35 illustrates a swim lane diagram showing features of communications between integrated circuit chips of a hierarchical power management architecture according to an embodiment.

FIG. 35 shows a timing diagram 3500 illustrating signals that are variously communicated to facilitate MCLOS functionality in an HPM architecture according to an embodiment. Signals such as those shown in timing diagram 3500 are communicated, for example, with one or more of IC dies 3201_1, 3201_2, . . . , 3201_3, or with circuitry 3401—e.g., wherein one of methods 3300, 3330, or 3340 includes or is otherwise based on such communications.

Timing diagram 3500 shows various communications between respective ones of a supervisor P-unit 3502, and supervisee P-units 3503a, 3503b which are each at a different respective IC die other than one which includes supervisor P-unit 3502. As shown in timing diagram 3500, supervisor P-unit 3502 performs operations 3530 to receive and process MCLOS information which (for example) supervisor P-unit 3502 receives from a workload monitor, operating system or other such source. Based on operations 3530, supervisor P-unit 3502 sends a message 3532 comprising one or more MCLOS configuration parameters which, in this example embodiment, enable supervisee P-unit 3503a to monitor a respective event at the IC die which includes supervisee P-unit 3503a. Furthermore, supervisor P-unit 3502 sends another message 3534 comprising other (or the same) one or more MCLOS configuration parameters to enable event monitoring at the IC die which includes supervisee P-unit 3503b.

In one illustrative embodiment, one or both of messages 3532, 3534 have a format such as the one shown in Table 3 below.

mine how respective memory bandwidth allocators, memory controllers and/or other resources of the supervisee IC dies are to provide MCLOS functionality.

In the example embodiment shown, supervisor P-unit 3502 provides additional MCLOS configuration parameters to supervisee P-unit 3503a and/or supervisee P-unit 3503b.

TABLE 3

MEMCLOS Configuration Message Format

| L15 | L14 | L13 | L12 | L11 | L10 | L9 | L8 | L7 | L6 | L5 | L4 | L3 | L2 | L1 | L0 |
|---|---|---|---|---|---|---|---|---|---|---|---|---|---|---|---|
| EH = 1 | | SrcID Reserved EH_ID | | | | | | | | | | | DstID Opcode Reserved | | |
| RR | | PM agent ID Reserved | | | | SAI_PM_DIE-2-DIE Reserved | | | | | | | MEMCLOS_MSG SUB_CMD_TYPE = 0(MEMCLOS_CONFIG) | | |
| DDR_MEM_CLOS_EVENT[7:0] DDRT_MEM_CLOS_EVENT[7:0] | | | | | | Reserved Reserved Payload[47:32] Payload[63:48] Payload[79:64] Payload[95:80] | | | | | | | DDR_MEMCLOS_EN[0] DDRT_MEMCLOS_EN[0] | | |

In Table 3, the command sub-type indicated by MEMCLOS_CONFIG facilitates the identification of one or more events for which MCLOS monitoring is to be enabled (or alternatively, disabled). The DDR_MEM_CLOS_EVENT and DDRT_MEM_CLOS_EVENT fields in Table 3 facilitate the identification of respective event types, and the corresponding DDR_MEMCLOS_EN and DDRT_MEMCLOS_EN fields enable identification of whether said events are to be monitored.

For example, messages 3544, 3546 communicate to supervisee P-units 3503a, 3503b (respectively) a correspondence of different levels of a MCLOS classification scheme each to a respective level of an alternative class of service (CLOS) classification scheme. In an example embodiment, one or both of messages 3544, 3546 have a format such as the one shown in Table 4 below.

TABLE 4

CLOS/MCLOS Mapping Message Format

| L15 | L14 | L13 | L12 | L11 | L10 | L9 | L8 | L7 | L6 | L5 | L4 | L3 | L2 | L1 | L0 |
|---|---|---|---|---|---|---|---|---|---|---|---|---|---|---|---|
| EH = 1 | | SrcID Reserved EH_ID | | | | | | | | | | | DstID Opcode Reserved | | |
| RR | | PM agent ID Reserved | | | | SAI_PM_DIE-2-DIE Reserved | | | | | | | MEMCLOS_MSG SUB_CMD_TYPE = 2(CLOS_MEMCLOS_MAPPING) | | |
| CLOS7MCLOS[1:0] | CLOS6MCLOS[1:0] | CLOS5MCLOS[1:0] | CLOS4MCLOS[1:0] | CLOS3MCLOS[1:0] | CLOS2MCLOS[1:0] | | | | | | | CLOS1MCLOS[1:0] | | CLOS0MCLOS[1:0] | |
| CLOS15MCLOS[1:0] | CLOS14MCLOS[1:0] | CLOS13MCLOS[1:0] | CLOS12MCLOS[1:0] | CLOS11MCLOS[1:0] | CLOS10MCLOS[1:0] | | | | | | | CLOS9MCLOS[1:0] | | CLOS8MCLOS[1:0] | |
| | | | | | | Payload[47:32] Payload[63:48] Payload[79:64] Payload[95:80] | | | | | | | | | |

Based on message 3532, supervisee P-unit 3503a performs operations 3536 to identify MCLOS configuration parameters 3540 that are then stored to a memory 3522a which is local to the IC die comprising supervisee P-unit 3503a. Similarly, operations 3538 by supervisee P-unit 3503b identify MCLOS configuration parameters 3542 that are then stored to a memory 3522a which is local to the IC die comprising supervisee P-unit 3503a. Parameters 3540 and parameters 3542 are variously made available to deter- In one such embodiment, fields in the above format provide mapping as indicated in Table 5 below.

TABLE 5

CLOS to MemCLOS Mapping Fields

| Field Name | Description | Bits | Width |
|---|---|---|---|
| CLOS0MemCLOS | Mapping of CLOS0 to MemCLOS | 1:0 | 2 |
| CLOS1MemCLOS | Mapping of CLOS1 to MemCLOS | 3:2 | 2 |

TABLE 5-continued

CLOS to MemCLOS Mapping Fields

| Field Name | Description | Bits | Width |
|---|---|---|---|
| CLOS2MemCLOS | Mapping of CLOS2 to MemCLOS | 5:4 | 2 |
| CLOS3MemCLOS | Mapping of CLOS3 to MemCLOS | 7:6 | 2 |
| CLOS4MemCLOS | Mapping of CLOS4 to MemCLOS | 9:8 | 2 |
| CLOS5MemCLOS | Mapping of CLOS5 to MemCLOS | 11:10 | 2 |
| CLOS6MemCLOS | Mapping of CLOS6 to MemCLOS | 13:12 | 2 |
| CLOS7MemCLOS | Mapping of CLOS7 to MemCLOS | 15:14 | 2 |
| CLOS8MemCLOS | Mapping of CLOS8 to MemCLOS | 17:16 | 2 |
| CLOS9MemCLOS | Mapping of CLOS9 to MemCLOS | 19:18 | 2 |
| CLOS10MemCLOS | Mapping of CLOS10 to MemCLOS | 21:20 | 2 |
| CLOS11MemCLOS | Mapping of CLOS11 to MemCLOS | 23:22 | 2 |
| CLOS12MemCLOS | Mapping of CLOS12 to MemCLOS | 25:24 | 2 |
| CLOS13MemCLOS | Mapping of CLOS13 to MemCLOS | 27:26 | 2 |
| CLOS14MemCLOS | Mapping of CLOS14 to MemCLOS | 29:28 | 2 |
| CLOS15MemCLOS | Mapping of CLOS15 to MemCLOS | 31:30 | 2 |

In various embodiments, some or all supervisee P-units each report performance statistics which are generated based on the monitoring of workload processing—e.g., where supervisor P-unit 3502 receives performance statistics 3556 from 3503a, and performance statistics 3558 from supervisee P-unit 3503b. Table 6 below shows an example format for communicating one type of performance statistics—i.e., bandwidth utilization—according to an embodiment.

TABLE 6

* Supervisee-Supervisor Msg providing Memory BW Utilization Statistics

| L15 | L14 | L13 | L12 | L11 | L10 | L9 | L8 | L7 | L6 | L5 | L4 | L3 | L2 | L1 | L0 |
|---|---|---|---|---|---|---|---|---|---|---|---|---|---|---|---|
| | | | | SrcID | | | | | | | | | DstID | | |
| EH = 1 | | | | Reserved | | | | | | | | | Opcode | | |
| | | | | EH_ID | | | | | | | | | Reserved | | |
| | | | | | | | SAI_PM_DIE-2-DIE | | | | | | | | |
| RR | | | | PM agent ID | | | | | | | | | MEMCLOS_MSG | | |
| | | | | Reserved | | | | | | Reserved | | | SUB_CMD_TYPE = 3(BW_PERFMON_STATISTICS) | | |
| | | | | mem_statistics[15:7] | | | | | | | | | mem_statistics[7:0] | | |
| | | | | mem_statistics[31:24] | | | | | | | | | mem_statistics[23:16] | | |
| | | | | | | | Payload[47:32] | | | | | | | | |
| | | | | | | | Payload[63:48] | | | | | | | | |
| | | | | | | | Payload[79:64] | | | | | | | | |
| | | | | | | | Payload[95:80] | | | | | | | | |

Referring again to timing diagram 3500, supervisor P-unit 3502 evaluates or otherwise processes statistics 3556, 3558 to update various MCLOS parameters for one or more supervisee P-units. By way of illustration and not limitation, supervisor P-unit 3502 performs operations 3560 to calculate new time window parameters for monitoring respective events at the other IC dies. Such time window parameters are communicated, for example, in messages 3562, 3564 to supervisee P-units 3503a, 3503b (respectively). In one illustrative embodiment, one or both of messages 3562, 3564 have a format such as the one shown in Table 7 below.

TABLE 7

MEMCLOS Time Window Message Format

| L15 | L14 | L13 | L12 | L11 | L10 | L9 | L8 | L7 | L6 | L5 | L4 | L3 | L2 | L1 | L0 |
|---|---|---|---|---|---|---|---|---|---|---|---|---|---|---|---|
| | | | | SrcID | | | | | | | | | DstID | | |
| EH = 1 | | | | Reserved | | | | | | | | | Opcode | | |
| | | | | EH_ID | | | | | | | | | Reserved | | |
| | | | | | | | SAI_PM_DIE-2-DIE | | | | | | | | |
| RR | | | | PM agent ID | | | | | | | | | MEMCLO_SMSG | | |
| | | | | Reserved | | | | | | Reserved | | | SUB_CMD_TYPE = 1(MEMCLOS_TIMEWINDOW) | | |
| | | | | time_window1[15:8] | | | | | | | | | time_window0[7:0] | | |
| | | | | time_window3[31:24] | | | | | | | | | time_window2[23:16] | | |
| | | | | | | | Payload[47:32] | | | | | | | | |
| | | | | | | | Payload[63:48] | | | | | | | | |
| | | | | | | | Payload[79:64] | | | | | | | | |
| | | | | | | | Payload[95:80] | | | | | | | | |

In Table 7, the command sub-type indicated by MEM-CLOS_TIMEWINDOW indicates that one or more time windows are to be configured. The various time_window fields in Table 7 facilitate the identification of particular time windows to be updated or otherwise determined.

Figure 36:
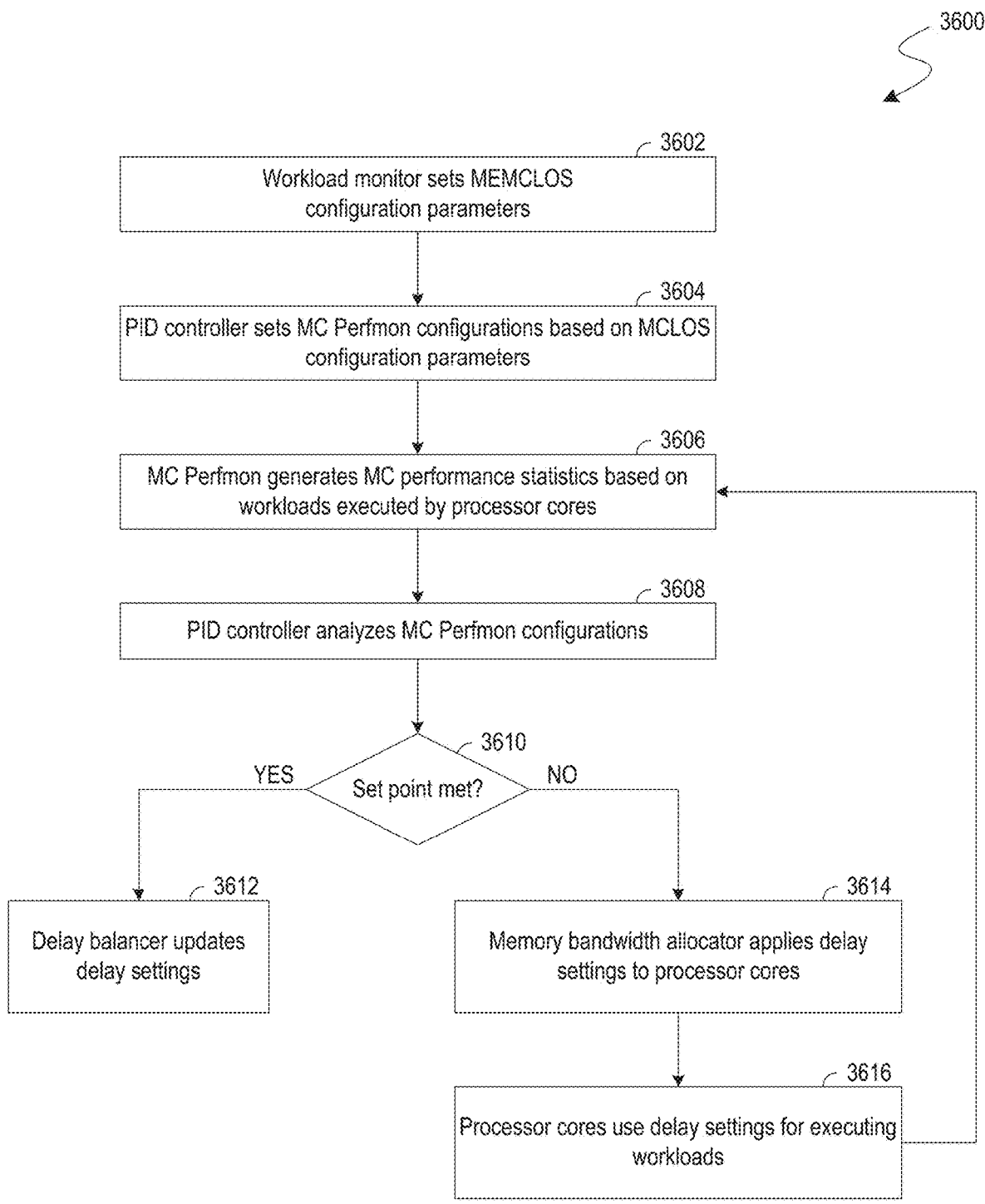
FIG. 36 illustrates a flow diagram showing features a method for dynamically controlling memory bandwidth allocation according to an embodiment.

FIG. 36 shows operations of a method 3600 illustrating example dynamic control of memory bandwidth allocation processing according to some embodiments. In some embodiments, method 3600 includes, or is based on, operations of one of methods 3300, 3330, 3340 (for example). For example, in some embodiments, method 3600 is performed with an IC die comprising a supervisee P-unit. To illustrate certain features of various embodiments, method 3600 is described herein with respect to operations by system 3400. However, in other embodiments, system 3400 performs additional or alternative operations and/or method 3600 is performed with other circuit resources which support MCLOS and HMP functionality described herein.

At block 3602, workload monitor 3412 sets memCLOS configuration parameters 3414 (e.g., enables the memCLOS functionality and sets CLOS to memCLOS mappings). In some embodiments, workload monitor 3412 is executed with a processor of an IC die which performs 3600 (or, alternatively, at a different IC die which is coupled thereto). Closed loop controller 3424 (implemented in one embodiment as firmware in P-unit 3402) is activated when Mem-CLOS EN is set. At block 3604, closed loop controller 3424 sets MC perfmon configurations 3456 based at least in part on memCLOS configuration parameters 3414. In an embodiment, MC perfmon configurations 3456 are set to enable memory statistics of a desired event, which gives insight into memory bandwidth utilization. At block 3606, MC perfmon 3452 generates MC perfmon statistics 3454 based on workloads executed by processor cores 3440. At block 3608, closed loop controller 3424 periodically reads MC perfmon statistics 3456 generated by MC perfmon 3452 and analyzes the MC perfmon statistics. If closed loop controller 3424 determines, based on analysis of the MC perfmon statistics, that a memCLOS set point has been met, then closed loop controller 3424 causes delay balancer 3426 to update delay settings 3428 at block 3612. Delay settings 3428 are used to dynamically throttle memory bandwidth of any low priority processing cores when bandwidth contention issues arise. In an embodiment, delay balancer 3426 distributes a delay budget amongst the various memCLOS classes based on a priority value for each memCLOS. For example, high priority processing cores can be given less delay (perhaps even a delay value of zero) and low priority processing cores can be given more delay. Otherwise, if the set point has not been met, no update of the delay settings is made. In either case, processing continues with block 3614 where memory bandwidth allocator 3440 applies delay settings 3428 to processor cores. At block 3616, processor cores 3440 use the delay settings for executing workloads. Processing continues in a closed loop back at block 3606 with the gathering of new MC perfmon statistics. In an embodiment, the closed loop is repeated periodically to continuously dynamically adjust memory bandwidth.

Figure 37:
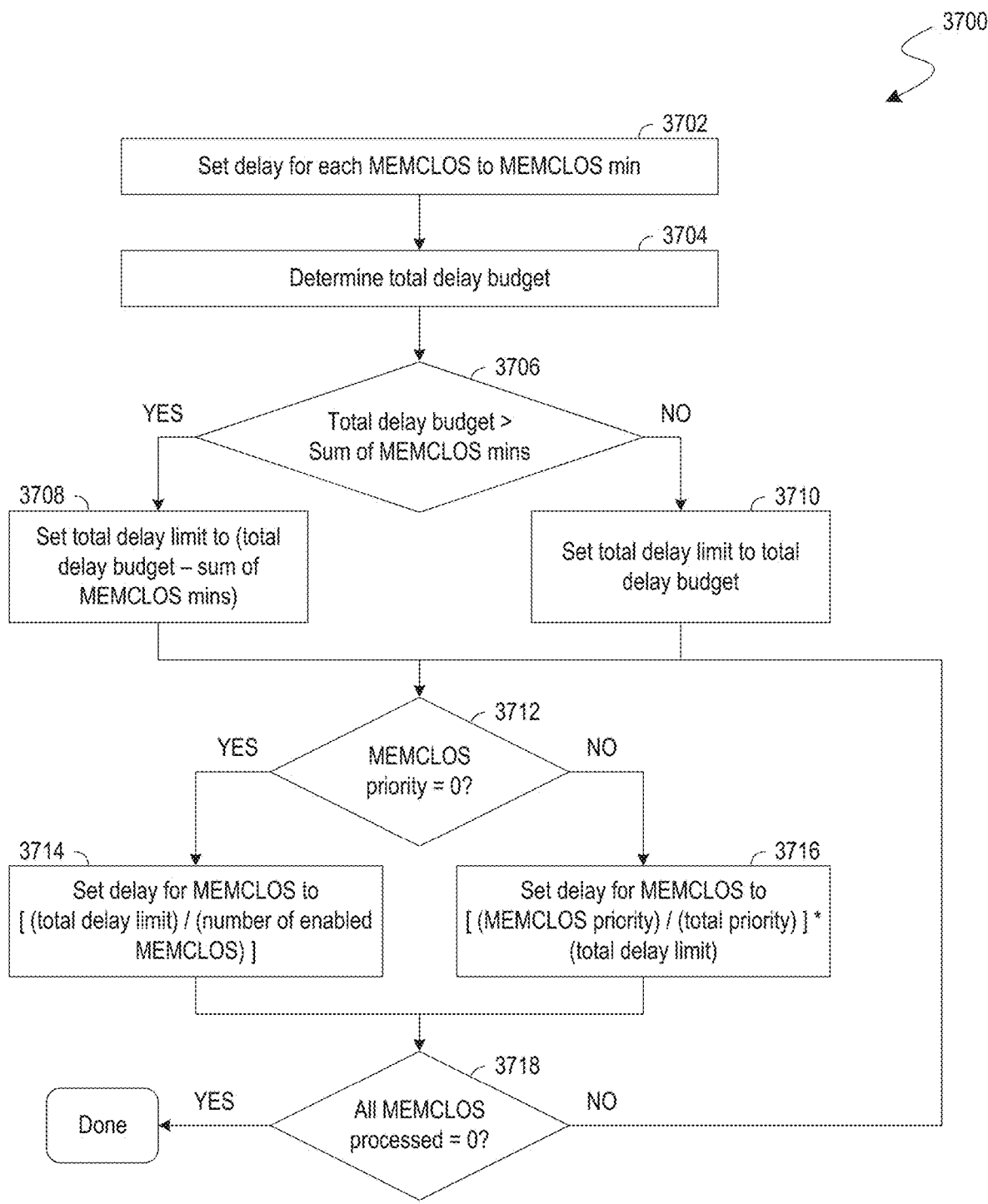
FIG. 37 illustrates a flow diagram showing features a method for providing a delay balancer according to an embodiment.

FIG. 37 shows operations of method 3700 performed with a delay balancer of a P-unit according to some embodiments. To illustrate certain features of various embodiments, method 3700 is described herein with respect to operations by system 3400. However, in other embodiments, system 3400 performs additional or alternative operations and/or method 3700 is performed with other circuit resources which support MCLOS and HMP functionality described herein.

At block 3702, delay balancer 3426 sets a delay value for each memCLOS to a minimum memCLOS value. At block 3704, delay balancer 3426 determines a total delay budget for IC die 3401. In an embodiment, the total delay budget is set to the output of closed loop controller 3424 multiplied by the number of enabled memCLOS. At block 3706, if the total delay budget is greater than a sum of the memCLOS minimum values, then at block 3708, delay balancer 3426 sets a total delay limit to the total delay budget minus the sum of the memCLOS minimum values. Otherwise, delay balancer 3426 sets the total delay limit to the total delay budget at block 3710. Processing continues with a first memCLOS at block 3712. If the priority of this memCLOS is 0 (indicating high priority in one embodiment), then at block 3714 delay balancer 3426 sets a delay for this memCLOS to the total delay limit divided by the number of enabled memCLOS. If the priority of this memCLOS is not 0 (indicating a lower priority than the highest setting), then at block 3716 delay balancer 3426 sets the delay for this memCLOS to the priority of this memCLOS divided by the total of all priority values multiplied by the total delay limit. Thus, in one embodiment, setting each of the plurality of delay settings to a delay value is based at least in part on the total delay budget and the priority of the selected memC-LOS.

Next, at block 3718 if not all memCLOS have been processed, then block 3712, 3714 or 3716 are performed for the next memCLOS. If all memCLOS have been processed, delay balancer processing ends at block 3720. The updated delay settings 3428 are then input to memory bandwidth allocator 3440. With features of some embodiments enabled, a firmware-based dynamic resource controller (DRC) for memory bandwidth allocation as described herein maintains approximately 90% to 97% of the performance of high priority workloads of search, redis, and specCPU2006 launched along with low priority noisy workloads like stream and specCPU2006. Noisy aggressors such as stream and specCPU workloads can degrade high priority workload performance by approximately 18% to 40% if DRC is not present. With a noisy memory aggressor, and DRC enabled, some embodiments can maintain approximately 90% to 97% of high priority core baseline performance With some embodiments, overall processor utilization is improved from approximately 65% to 90% compared with approximately 25% to 45% with high priority cores alone.

Also, comparing to software implemented similar control logic, the firmware-based dynamic resource controller as described herein implemented using existing processor hardware will save up to 90% of a processor core depending on the sampling interval and improve monitor/control and response action convergence in 10s of milliseconds (ms) granularity. In contrast, a SW controller can only respond within 100s of ms because of kernel/user space SW overheads.

There are at least several advantages of various embodiments. The dynamic resource controller as described herein which uses RDT features such as memory bandwidth allocation (MBA) can be easily adopted in different CSP SW frameworks without requiring any changes to their SW frameworks. Embodiments provide a fast response (target 1 millisecond (ms)) through a control mechanism (e.g., P-unit 3402) in processor firmware. When bad behavior is detected, processor firmware logic in P-unit 3402 throttles bandwidth to lower priority memCLOS through MBA in a closed loop action which will help remove potential performance jitter within a fast interval. The end user will not notice the noisy workload impact because of the fast action. Various embodiments are autonomous, dynamic, and do not involve any additional hardware overhead. Current RDT solutions are static and can be overly restrictive for cases where throttling is not needed. Some embodiments provide a dynamic controller that throttles memory bandwidth access only when needed. Measurements show that if the control loop is implemented in SW, the control loop can consume almost a single processor core. Embodiments can save a single virtual central processing unit (vcpu) compute resource by running the control mechanism in the package control unit (PCU) controller.

Figure 38:
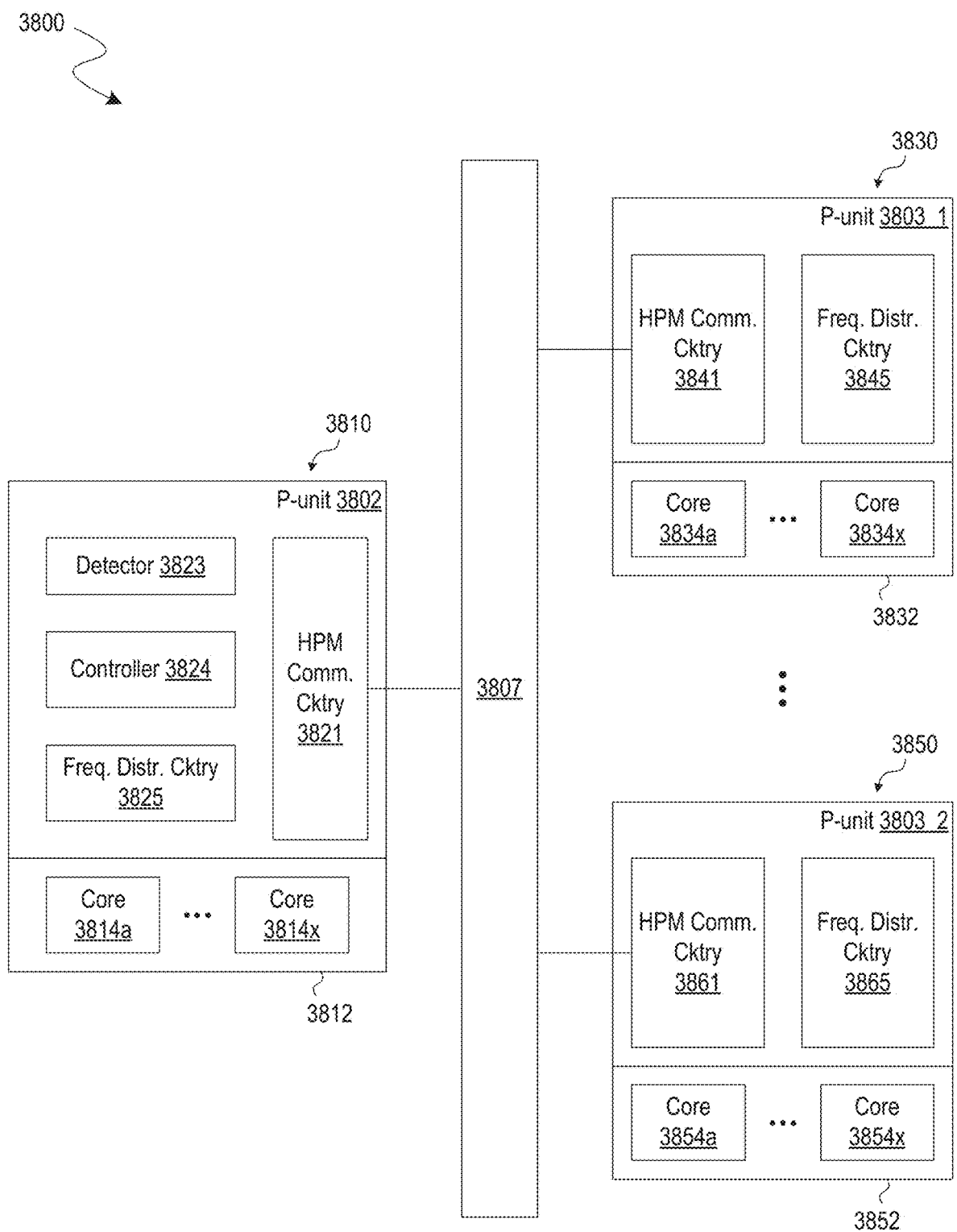
FIG. 38 illustrates a functional block diagram showing features of a system to determine power consumption by processor cores in a multi-chip packaged according to an embodiment.

FIG. 38 illustrates features of system 3800 to determine processor frequencies in a multi-chip packaged device according to an embodiment. System 3800 is one example of an embodiment wherein multiple IC dies of a packaged device comprise respective P-units that are to operate with each other in a hierarchical power management architecture. The P-units variously support communications and/or other operations to facilitate the determining of operational frequencies each for a respective IC die. In one such embodiment, the multiple IC dies further comprise respective processors, wherein one P-unit evaluates power consumption by the package device and, based on a power consumption threshold and class of service information, communicates with one or more other P-units to adjust operational frequencies of one or more processor cores—e.g., including one or both of a compute core and a graphics core—and, in some embodiments, operational frequencies of one or more accelerators, uncore circuits, or the like. In some embodiments, system 3800 is implemented entirely with the packaged device or, alternatively, with any of various types of computers, smart phones or similar devices which include such a packaged device.

As shown in FIG. 38, system 3800 comprises IC dies 3810, 3830, 3850 which are variously coupled to one another via one or more interconnect structures, such as the illustrative fabric 3807 (e.g., a P2P fabric) shown. For example, in one embodiment, fabric 3807 comprises interconnects which provide some or all of the functionality of communication network 107. Respective processors of IC dies 3810, 3830, 3850 each comprise a respective one or more cores—e.g., wherein a processor 3812 of IC die 3810 comprises cores 3814a, . . . , 3814x, a processor 3832 of IC die 3830 comprises cores 3834a, . . . , 3834x, and a processor 3852 of IC die 3850 comprises cores 3854a, . . . , 3854x. Such cores include, for example, any of various commercially available processor cores, including without limitation those of Intel® Atom®, Celeron®, Core (2) Duo®, Core i3, Core i5, Core i7, Itanium®, Pentium®, Xeon® or Xeon Phi® processors, ARM processors, processors from Applied Micro Devices, Inc., and similar processors. Some embodiments are not limited to a particular number of the multiple IC dies of system 3800, or to a particular type and/or number of one or more processor cores (and, in some embodiments, a particular type and/or number of accelerators, uncore circuitry, or the like) of a given IC die.

In various embodiments, IC dies 3810, 3830, 3850 variously comprise additional circuit resources (not shown) to facilitate the execution of software processes with various cores of processors 3812, 3832, 3852. By way of illustration and not limitation, such circuit resources include, but are not limited to, one or more accelerators, memory controllers, shared caches, and one or more memory devices including any of various types of volatile and/or non-volatile memory.

At a given time during operation of system 3800, some or all processor cores are subject to being variously transitioned each between respective frequencies of operation. Such transitions are performed, for example, to compensate for (or alternatively, to avail of) one or more conditions of power delivery to system 3800. To facilitate such transitions, IC dies 3810, 3830, 3850 further comprise respective P-units 3802, 3803_1, 3803_2 which operate in combination with each other to provide a hierarchical power management architecture. For example, P-unit 3802 comprises HPM communication circuitry 3821 which supports communications, via fabric 3807, with both HPM communication circuitry 3841 of P-unit 3803_1 and with HPM communication circuitry 3861 of P-unit 3803_2. In one such embodiment, P-unit 3802 is to function as a supervisor P-unit type, wherein P-units 3803_1, 3803_2 are each to function as a respective supervisee P-unit type which, in one or more respects, is controlled by P-unit 3802.

Operation of P-unit 3802 as a supervisor P-unit—at least with respect to the management of core frequencies—is enabled with power budget allocation circuitry which comprises one or more state machines, programmable gate arrays, microcontrollers, application specific integrated circuits and/or various other suitable circuitry. Such power budget allocation circuitry determines respective power budgets for various IC dies based on a measure of power consumption by the packaged device. In the example embodiment shown, the power budget allocation circuitry comprises a detector 3823, a controller 3824, and a frequency distribution circuitry 3825.

Detector 3823 comprises circuitry to receive, calculate or otherwise identify a metric of power consumption by the packaged device. In one such embodiment, detector 3823 is coupled to receive power consumption information from any of the variety of circuit resources (not shown) that, for example, are coupled to the packaged device. Such information is received, for example, from a voltage regulator which is coupled to the package device via a printed circuit board (e.g., a motherboard). Detector 3823 provides functionality to determine whether a current value of the power consumption metric exceeds a given power consumption threshold—e.g., wherein detector 3823 identifies a difference between the current metric value and the power consumption threshold.

Detector 3823 communicates this difference to controller 3824, which provides circuitry to determine power budget information based on the difference. By way of illustration and not limitation, controller 3824 provides proportional-integral-derivative (PID) control functionality such as that adapted from any of a various known processor power management techniques. In one such embodiment, the power budget information specifies or otherwise indicates an average power budget to be made available (e.g., on a per-core basis or, alternatively, across all cores of the packaged device).

Based on the power budget information determined by controller 3824, frequency distribution circuitry 3825 generates signaling to specify or otherwise indicate respective frequency thresholds each for a respective core of processors 3812, 3832, 3852. Such signaling is generated, for example, based on the total number of cores 3834a, . . . , 3834x and the total number of cores 3854a, . . . , 3854x (as identified by P-units 3803_1, 3850, for example), and the total number of cores 3814a, . . . , 3814x. Alternatively, or in addition, such signaling is generated based on information identifying a correspondence of multiple class of service (CLOS) groups each with a respective one or more cores of processors 3812, 3832, 3852.

In an illustrative scenario according to one embodiment, HPM communication circuitry 3821 communicates with processor 3812—responsive to frequency distribution circuitry 3825—to set, for some or all of cores 3814a, . . . , 3814x, respective maximum frequencies and/or a respective minimum frequencies. Alternatively or in addition, HPM communication circuitry 3821 communicates with HPM communication circuitry 3841—responsive to frequency distribution circuitry 3825—to determine operations of frequency distribution circuitry 3845 which are to set respective maximum frequencies and/or respective minimum frequencies for some or all of cores 3834a, . . . , 3834x. Alternatively or in addition, HPM communication circuitry 3821 communicates with HPM communication circuitry 3861—responsive to frequency distribution circuitry 3825—to determine operations of frequency distribution circuitry 3865 which are to set respective maximum frequencies and/or respective minimum frequencies for some or all of cores 3854a, . . . , 3854x.

In some embodiments, power budget allocation circuitry of P-unit 3802 provides functionality to perform first evaluations to regulate processor power consumption based on a power threshold PL1 (and, for example, based on a first metric of average power consumption over a time window TW1). In some embodiments, the power budget allocation circuitry is further to perform second evaluations to further regulate processor power consumption based on another power threshold PL2 (and, for example, based on a second metric of average power consumption over a time window TW2). The power thresholds PL1, PL2 are each less than a maximum power (Pmax) limit specification for the packaged device—e.g., where PL2 is greater than PL1 (and TW2 is less than TW1, for example), and where PL1 is equal or otherwise based on a thermal design power (TDP) for the packaged device.

Performance of the first evaluations, in some embodiments, is concurrent, in parallel, or otherwise temporally overlapping with, the performance of the second evaluations. Alternatively, or in addition, the first evaluations are successively performed with power budget allocation circuitry of P-unit 3802 at a first frequency, where the second evaluations are successively performed with such power budget allocation circuitry at a second frequency which (for example) is greater than the first frequency. In one such embodiment, the power budget allocation circuitry—in response to detecting an exceeding of the power threshold PL2 (e.g., for longer than one-time threshold)—successively throttles cores to cycle power consumption of processors 3812, 3832, 3852. This successive throttling results in cyclical variation of a metric of power consumption by the packaged device—e.g., where such variation is between PL2 and another power threshold PL3 which, for example, is between PL2 and the Pmax limit specification. By contrast, the power budget allocation circuitry—in response to detecting an exceeding of the power threshold PL1 (e.g., for longer than another time threshold)—simply adjusts core frequencies to bring a power consumption level back down to PL1. In some embodiments, where more than one of the evaluations determine that power limiting is indicated, core frequencies are throttle to a level satisfying all power limiter instances of system 3800.

Figure 39:
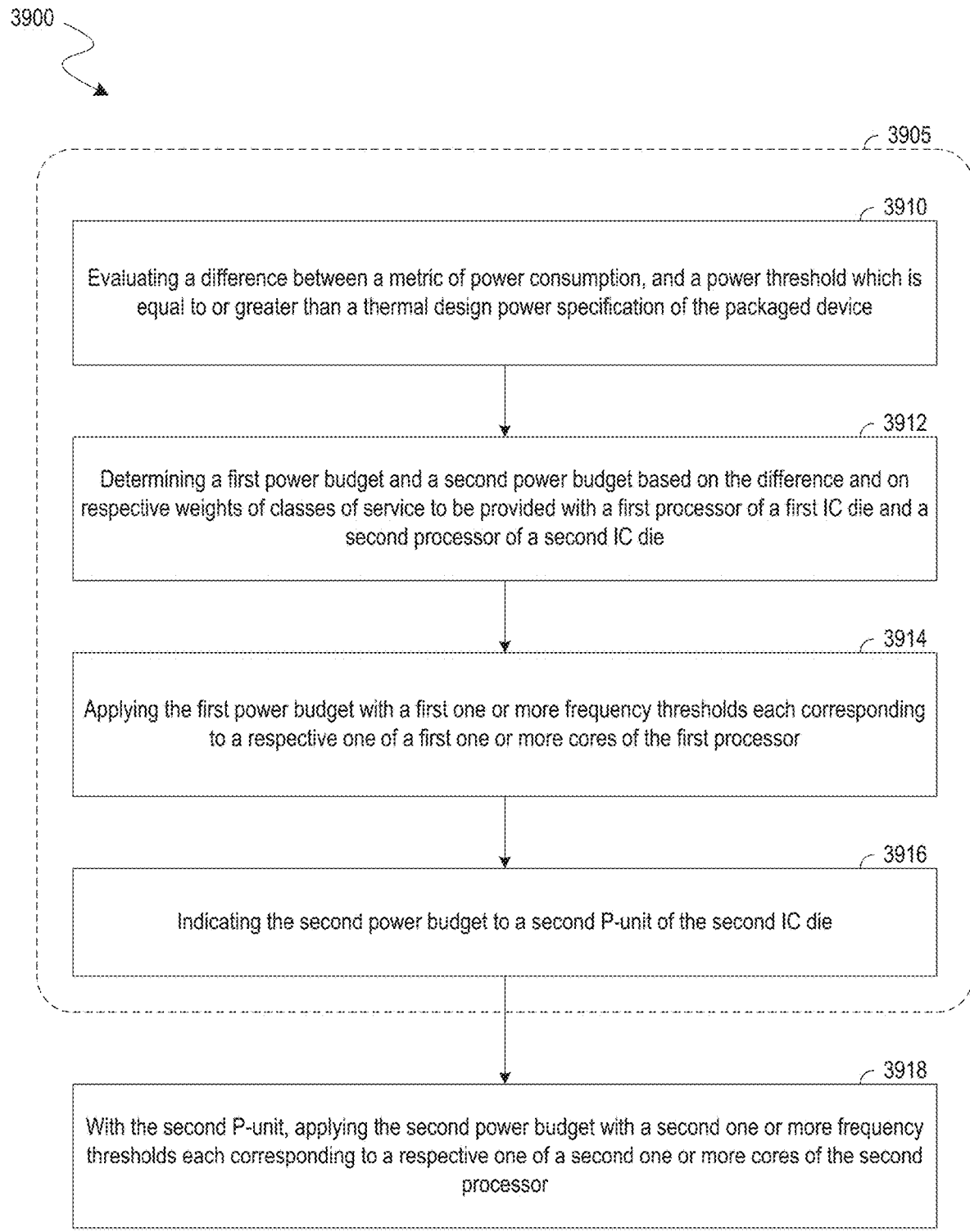
FIG. 39 illustrates a flow diagram showing features of a method to operate a hierarchical power management architecture according to an embodiment.

FIG. 39 shows features of a method 3900 to determine frequency thresholds each to apply at a respective core of a multi-chip package according to an embodiment. Method 3900 is performed, for example, with one or more P-units of a packaged device, wherein the one or more P-units operate in a HPM architecture such as that of system 3800.

As shown in FIG. 39, method 3900 comprises (at 3910) operations 3905 which are performed at a first P-unit of a multi-chip package. A first IC die and a second IC die of the multi-chip package comprise (respectively) the first P-unit and a second P-unit that operate, respectively, as a supervisor P-unit and a supervisee P-unit of a power management hierarchy.

Operations 3905 comprise (at 3910) the first P-unit evaluating a difference between a metric of power consumption, and a power threshold which is equal to or greater than a thermal design power specification of the packaged device. The power threshold is less than a maximum power limit (Pmax) specification of the packaged device. The metric is received at the packaged device, for example, from a voltage regulator and/or other suitable circuitry resource—e.g., external to the packaged device—which monitors power consumption by the packaged device. In some embodiments, the metric represents an average of power consumption by the packaged device for a particular period of time.

Operations 3905 further comprise (at 3912) determining a first power budget and a second power budget based on the difference, and further based on respective weights of classes of service (CLOSs) to be provided with a first processor the first IC die and a second processor of a second IC die. The determining at 3912—e.g., performed with frequency distribution circuitry 3825—includes or is otherwise based on the supervisor P-unit determining, for example, a first total number of a first one or more processor cores (such as a total number of currently active cores) of the first processor, and further determining a second total number of a second one or more processor cores (e.g., active cores) of the second processor. The determining at 3912 is additionally or alternatively based on the supervisor P-unit communicating with one or more supervisee P-units to determine a correspondence of multiple class of service (CLOS) groups each with a respective one or more cores of the first processor and the second processor. In various embodiments, the determining at 3912 is performed based on a detected change to a number of active cores (for example, while the configured CLOS groups have not changed).

In an illustrative scenario according to one embodiment, the supervisor P-unit determined that a first CLOS group and a second CLOS group include (respectively) a first core of the first processor, and a second core of the second processor. Based on such associations of cores with respective CLOS groups, the supervisor P-unit calculates or otherwise determines that the first power budget is to be applied at the first processor, and that the second power budget to be applied at the second processor. In one embodiment, one or each of the first power budget and the power budget is represented as a respective frequency budget—i.e., an amount of available frequency to be given to one core or (alternatively) to be apportioned across multiple cores.

Operations 3905 further comprises (at 3914) the supervisor P-unit applying the first power budget to the first processor with a first one or more frequency thresholds which each correspond to a respective one of a first one or more cores of the first processor. For example, applying the first power budget at 3914 comprises regulating one or more core frequencies at the first processor based on the first one or more frequency thresholds. In various embodiments, some or all of the first one or more cores execute instructions of a first instruction set, wherein the first one or more frequency thresholds are determined based on the first instruction set (e.g., wherein instruction sets corresponding to different respective instruction set licenses are associated with different respective power performance characteristics). Alternatively, or in addition, applying the first power budget at 3914 further comprises, in some embodiments, regulating one or more frequencies (e.g., each with a respective frequency threshold) each at a respective accelerator of the first IC die.

Operations 3905 further comprises (at 3916) indicating the second power budget to the second (supervisee) P-unit. In one illustrative embodiment, the indicating at 3916 comprises P-unit 3802 communicating to P-unit 3803_1 (or alternatively, to P-unit 3803_2) an identifier of a frequency budget which corresponds to the second power budget.

In some embodiments, method 3900 additionally or alternatively comprises one or more operations, performed by at least one supervisee P-unit of the packaged device, to implement power management on one or more other IC dies based on operations 3905. For example, method 3900 further comprises (at 3918) the second P-unit applying the second power budget to the second processor with a second one or more frequency thresholds which each correspond to a respective one of a second one or more cores of the second processor. Applying the second power budget at 3914 comprises regulating one or more core frequencies at the second processor based on the second one or more frequency thresholds. In various embodiments, some or all of the second one or more cores execute instructions of a second instruction set, wherein the second one or more frequency thresholds are determined based on the second instruction set. For example, in one such embodiment, the first instruction set and the second instruction set correspond to a first instruction set license and a second instruction set license (respectively), and correspond to different respective power performance characteristics. Alternatively or in addition, applying the second power budget at 3918 further comprises, in some embodiments, regulating one or more frequencies (e.g., each with a respective frequency threshold) each at a respective accelerator of the second IC die.

Figure 40A:
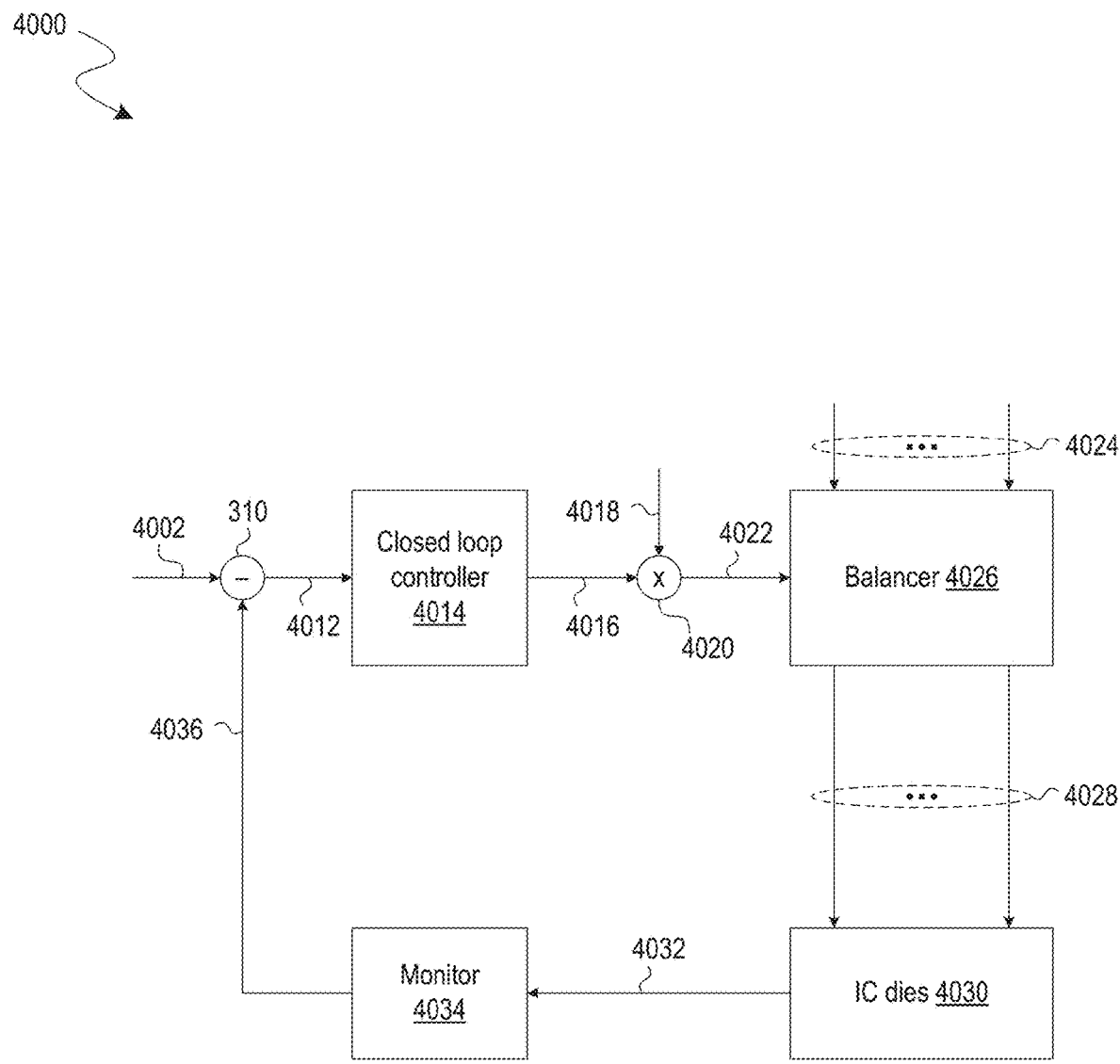
FIGS. 40A-40C illustrate functional block diagrams each showing features of a respective system to regulate power consumption by a multi-chip package according to a corresponding embodiment.

FIG. 40A shows a system 4000 to limit power consumption by processor cores of a multi-chip package according to an embodiment. System 4000 provides some or all of the functionality of system 3800, for example—e.g., wherein one or more operations of method 3900 are performed with system 4000.

As shown in FIG. 40A, system 4000 comprises power limiter circuitry of a supervisor P-unit (for example, P-unit 3802), the circuitry including an evaluation circuit 4010, a closed-loop (e.g., PID) controller 4014, and a balancer 4026 which, in some embodiments, correspond functionally to detector 3823, controller 3824, and frequency distribution circuitry 3825 (respectively).

System 4000 comprises IC dies 4030 of a packaged device, some or all of which each include a respective supervisee P-unit that is controlled at least in part by the supervisor P-unit. In some embodiments, the packaged device is coupled to—or alternatively, includes—one or more current monitors, voltage regulators and/or other suitable circuitry (such as the illustrative monitor 4034 shown) which are coupled to monitor one or more currents, voltages and/or other indicia of power consumption by the packaged device. Information about such power consumption is provided to the supervisor P-unit as feedback to facilitate dynamic management of power consumption by cores of IC dies 4030.

Certain features of system 4000 according to various embodiments are described herein with reference to various labels which are identified in the table below:

TABLE 8

Labels in description of system 4000

| Label | Description |
|---|---|
| $n_c$ | Total number of cores in the packaged device |
| $n_d$ | Total number of dies in the packaged device |
| $n_g$ | Number of class of service (CLOS) groups |
| $n_l$ | Number of license levels |
| k | Index to refer to a given CLOS group |
| $n_{c,k} \forall k \in [1, n_g]$ | Number of cores within CLOS group k |
| $R_T$ | Total power budget for the packaged device |
| i | Index to refer to a given core |
| $f_i^* \forall i \in [1, n_c]$ | Optimum frequency of each core i |
| $f_{min,i} \forall i \in [1, n_c]$ | Minimum frequency for each core i |
| $f_{min,k}$ | minimum frequency for each core in CLOS group k |
| $f_{max,k}$ | maximum frequency for each core in CLOS group k |
| $f_{clos,k}$ | frequency ceiling for each core in CLOS group k (for a given software domain) |
| $W_k \forall k \in [1, n_g]$ | CLOS priority weight for each core in a CLOS group k |
| $R_+$ | Remaining Budget (positive) |
| $R_-$ | Remaining Budget (negative) |
| u | Decision variable for priority (e.g., u = 1 for Ordered Throttling, u = 0 for Proportional Throttling) |
| $n_k \forall k \in [1, n_g]$ | CLOS Priority of each core in a CLOS group k |
| $n_{max}$ | Maximum CLOS Priority value |

In some embodiments, a metric of overall power consumption by the packaged device is determined—e.g., using one or more current monitors (such as the illustrative monitor 4034 shown)—and averaged over some predetermined time period. The metric is communicated via a signal 4036 to evaluation circuit 4010, which is also coupled to receive a signal 4002 comprising an identifier of a power consumption threshold PL1. The threshold PL1 represents (for example) a target power consumption for the packaged device—e.g., wherein PL1 is equal to or otherwise based on a TDP of the packaged device.

Based on signal 4036 and signal 4002, evaluation circuit 4010 generates a signal 4012 indicating a difference between PL1 and the power consumption metric. Based on signal 4012 (and, for example, a predetermined maximum length of time that the metric can be above PL1), closed loop controller 4014—such as a PID controller—outputs another signal 4016 which (for example) indicates a per-core average frequency budget—e.g., wherein signal 4016 identifies a p-state which corresponds to said frequency budget. In various embodiments, closed loop controller 4014 is implemented as firmware (e.g., pCode) at the supervisor P-unit.

In some embodiments, this average per-core frequency budget is scaled—e.g., by the illustrative multiplier/divider circuit 4020 shown—based on the number of active cores in the packaged device. Such a total number of cores is indicated at least in part by one or more signals—such as the illustrative signal 4018 shown—which are provided by one or more supervisee P-units (not shown) of IC dies 4030.

The scaled frequency budget is communicated via a signal 4022 from multiplier/divider circuit 4020 to balancer 4026. Based on signal 4022, balancer 4026 generates signals 4028 which are variously communicated each to a respective one or more of IC dies 4030. For a given one such IC die, signals 4028 specify or otherwise indicate, for one or more cores of that IC die, a respective one or more threshold frequencies (e.g., including one or more of a threshold minimum frequency, a threshold maximum frequency, or a threshold target frequency) according to which that core is to operate. In the example embodiment shown, balancer 4026 is implemented centrally at a supervisor P-unit of one IC die—e.g., where signals 4028 includes signals communicated to one or more supervisee P-units each at a respective other IC die. In some alternative embodiments, functionality such as that of balancer 4026 is distributed among two or more P-units at various levels of a hierarchical power management architecture.

In various embodiments, generation of signals 4028 by balancer 4026 is further based on signals 4024 which identify one or or more criteria for setting operational parameters of a given core. For example, in one such embodiment, signals 4024 identify, for each core of IC dies 4030, a respective Class of Service (CLOS) group to which that core belongs. By way of illustration and not limitation, n, cores are variously assigned—e.g., by a user, performance management software and/or any of various other suitable external agents each to a respective one of $n_g$ CLOS groups. In one such embodiment, a given CLOS group k corresponds to one or more performance parameters according to which any given core i of that CLOS group k is to operate. By way of illustration and not limitation, such one or more one or more performance parameters include a minimum frequency $f_{min,k}$, and a maximum frequency $f_{max,k}$. Such a CLOS group k is also assigned a value—e.g., such as a weight $w_k$—indicating how that CLOS group k is to be prioritized, ordered or otherwise ranked relative to one or more others of the CLOS groups. In a given software domain, the cores within a single CLOS group are expected to have the same frequency ceiling $f_{clos,k}$, in some embodiments. Such a frequency ceiling need not hold between different CLOS groups or between different software domains (e.g., different sockets), in some embodiments.

Balancer 4026 provides any of a variety of techniques to facilitate an allocating of frequencies each to a respective core. By way of illustration and not limitation, balancer 4026 supports an Equal Priority (EP) frequency allocation scheme wherein the same frequency limit is always applied to all the cores of a packaged device. Alternatively or in addition, balancer 4026 support a Proportional With Priority (PP) frequency allocation scheme wherein one baseline minimum frequency is assigned to all cores of the packaged device, and wherein a remaining frequency budget (if any) is variously apportioned to different ones of the cores based on the CLOS groups' respective weight values.

Alternatively, or in addition, balancer 4026 supports an Ordered With Priority (OP) frequency allocation scheme wherein, for each core of a highest priority CLOS group, each core of that CLOS group is assigned a highest possible frequency (up to the respective maximum frequencies which that core can support). Further allocation of frequency budget is similarly repeated sequentially by the OP scheme for successively lower priority CLOS groups—where each core of that CLOS group is assigned a next highest possible frequency (up to a respective maximum supported frequency for that core)—until all frequency budget is apportioned.

Alternatively, or in addition, balancer 4026 supports a License-aware With Equal Priority (LEP) frequency allocation scheme. In one such embodiment, implementation of an LEP scheme comprises pCode, or other suitable power management logic, computing or otherwise determining respective frequencies for each of multiple instruction set types (also referred to as "licenses"), where balancer 4026 selects one such frequency for a given core based on the instruction type which that core is using.

Alternatively, or in addition, balancer 4026 supports a license-aware With Unequal Priority (LUP) allocation scheme wherein normalized values—representing various frequencies—are determined according to an unequal scheme, such as PP allocation, or OP allocation. In one such embodiment, these normalized frequency values—e.g., which are taken as corresponding to some baseline instruction set (such as SSE)—are variously translated each into a respective frequency, for a given core, based on a corresponding instruction type being used by that core.

In various embodiments, EP frequency allocation is performed by allocating the same ceiling frequency $f_{ceil,k}$ each core i of the packaged device's $n_c$ cores—e.g., where $f_{ceil,k}$ is determined according to the following:

$$f_{ceil,k} = \frac{R_T}{n_c}, \quad (3)$$

$$\forall i \in [1, n_c]$$

By contrast, unequal frequency allocation in various other embodiments (e.g., according to one of a PP frequency allocation algorithm or an OP frequency allocation algorithm) comprises determining, for each CLOS group k, an respective frequency budget $\Delta f_{clos,k}$, $\forall k \in [1, n_g]$ to be further apportioned to the one or more cores of that CLOS group k—e.g., in addition to a minimum frequency which is allocated to each core i of the packaged device's $n_c$ cores.

By way of illustration and not limitation, identifying the additional frequency budget $\Delta f_{clos,k}$, for a respective CLOS group k, comprises evaluating a relationship of the total power budget $R_T$ to the CLOS groups' respective frequency limits $f_{min}$ and $f_{max}$. For example, such unequal frequency allocation comprises a conditional evaluation of $\Delta f_{clos,k}$ per the following equations (4)-(5):

$$\text{if } R_T \geq \sum_{i=1}^{n_c} f_{max,i}, \quad (4)$$

$$\text{then } \Delta f_{clos,k} = n_{c,k}(f_{max,k} - f_{min,k}), \forall k \in [1, n_g]. \quad (5)$$

Where the evaluation of $\Delta f_{clos,k}$ per equation (5) is not performed, the unequal frequency allocation instead conditionally performs an alternative evaluation per the following equations (6)-(10):

$$\text{else if } \sum_{i=1}^{n_c} f_{min,i} <= R_T < \sum_{i=1}^{n_c} f_{max,i}, \quad (6)$$

$$\text{then } R_+ = \left(R_T - \sum_{k=1}^{n_g} n_{c,k} f_{min,k}\right), \quad (7)$$

wherein, based on the evaluation of a remaining (positive) power budget $R_+$ according to equation (7)—a provisional value of $\Delta f_{clos,k}$ is determined according to the following:

$$\Delta f_{clos,k} = R_+ \left(u + (1-u)\left\{\frac{n_{c,k} w_k}{\sum_{j=k}^{n_g}(n_{c,j} w_j)}\right\}\right), \quad (8)$$

$$\forall j \in [1, n_g],$$

This provisional value of $\Delta f_{clos,k}$ is then clipped, as necessary (so that each core of the CLOS group k will be below the corresponding maximum frequency $f_{max,k}$), according to the following:

$$\Delta f_{clos,k} = \min(\Delta f_{clos,k}, n_{c,k}(f_{max,k} - f_{min,k})) \quad (9)$$

The remaining positive energy budget $R_+$ is then recalculated according to the following:

$$R_+ = R_+ - \Delta f_{clos,k} \quad (10)$$

In one example embodiment, the weight $w_k$ in equation (8) is determined according to the following:

$$w_k = 1 + \eta_{max} - \eta_k \qquad (11)$$

Where the conditional evaluation of $\Delta f_{clos,k}$ per equations (6)-(10) is not performed, the unequal frequency allocation algorithm conditionally performs an alternative evaluation per the following equations (12)-(16):

$$\text{else if } R_T < \sum_{i=1}^{n_c} f_{min,i}: \qquad (12)$$

$$\text{then } R_- = \left( R_T - \sum_{k=1}^{n_g} n_{c,k} f_{min,k} \right) \qquad (13)$$

wherein, based on the evaluation of the (negative) power budget $R_-$ according to equation (13)—the unequal frequency balancing determines a provisional value of $\Delta f_{clos,k}$ according to the following:

$$\Delta f_{clos,k} = R_- \left( u + (1-u) \left\{ \frac{n_{c,k} \eta_k}{\sum_{j=k}^{n_g} (n_{c,j} \eta_j)} \right\} \right), \qquad (14)$$

$$\forall j \in [1, n_g],$$

In one such embodiment, the parameter u in equation (14) takes the value zero (0) in the case of PP frequency allocation, or the value (1) in the case of OP frequency allocation. Subsequently, the frequency allocation algorithm selectively supplements this provisional value of $\Delta f_{clos,k}$, as necessary (so that each core of the CLOS group k will be above the corresponding minimum frequency), according to the following:

$$\Delta f_{clos,k} = \max(\Delta f_{clos,k}, n_{c,k}(f_{P_m} - f_{min,k})) \qquad (15)$$

An updated value of the (negative) power budget $R_-$ is then calculated, according to the following:

$$R_- = R_- \Delta f_{clos,k} \qquad (16)$$

For OP-type frequency allocation according to some embodiments, the evaluations according to equations (6)-(10) are successively performed first for a highest priority one of the CLOS groups, and then sequentially repeated each for a successively lower priority one of the CLOS groups. In one such embodiment, the OP-type frequency allocation further performs the evaluations according to equations (12)-(15) first for a lowest priority one of the CLOS groups, and then sequentially performs similar evaluations each for a successively higher priority one of the CLOS groups.

After the determining of respective frequency budgets $\Delta f_{clos,k}$, each for a respective CLOS group k, some embodiments variously compute, for each such CLOS group, a respective ceiling frequency $f_{clos,k}$ according to the following:

$$f_{ceil,k} = f_{min,k} + \Delta f_{clos,k}/n_{c,k}, \forall i \in [1, n_c] \qquad (17)$$

Some embodiments variously provide one or more normalized frequency values to identify respective frequency thresholds (e.g., including one or more of a threshold minimum frequency, a threshold maximum frequency, or a threshold target frequency) which are each to be applied to a corresponding core. Such normalized values facilitate frequency allocation which accommodates differences between various GPU core types and/or various CPU core types, differences between instruction set types, and/or other variations across different IPs. For example, use of normalized frequency information frees firmware (and/or other logic of a supervisor P-unit) from needing to know one or more implementation-specific details of another IC die which includes a supervisee P-unit.

In one such embodiment, a range of normalized frequency values for a given one or more cores is represented by a 3-tuple ($f'_{min}$, $f'_{P1}$, $f'_{max}$). A supervisee P-unit converts this normalized 3-tuple into a corresponding denormalized 3-tuple ($f_{min}$, $d_{P1}$, $f_{max}$) which identifies specific frequencies for said one or more cores. By way of illustration and not limitation, a normalized ceiling $f'_{ceil}$ value, sent from a supervisor P-unit, is converted by a supervisee P-unit into a corresponding provisional denormalized ceiling $f_{ceil}$ according to the following:

$$f_{ceil} = f_{P1} + (f'_{ceil} - f'_{P1}) * \text{scalefactor.} \qquad (18)$$

This provisional value of $f_{ceil}$ is then clipped, as necessary, according to the following:

$$f_{ceil} = \max(f_{min}, \min(f_{max}, f_{ceil})) \qquad (19)$$

In equation (18), scalefactor is a parameter that, in some embodiments, the supervisor P-unit does not require (and, for example, does not know). In one such embodiment, scalefactor is determined according to the following:

$$\text{scalefactor} = \frac{f_{max} - f_{P1}}{f'_{max} - f'_{P1}} \qquad (20)$$

In some embodiments, denormalization calculations such as those according to equations (18)-(20) are based on the following two conditions:

$$f'_{min} \le \frac{f_{min} - f_{P1}}{\text{scalefactor}} + f'_{P1} \qquad (21)$$

$$f'_{max} \ge \frac{f_{max} - f_{P1}}{\text{scalefactor}} + f'_{P1} \qquad (22)$$

In some embodiments, determination of $f'_{ceil}$ is further based on a type of IP. For example, various shared resources (e.g., including graphics cores, a mesh and/or the like) only need the average frequency across all cores, whereas, individual cores running in different priority groups have different normalized frequency ceilings.

In some embodiments, use of normalized performance parameters is extended to cores running under different instruction types (or different "licenses," as also referred to herein). In one such embodiment, two or more cores execute instructions of different respective instruction types, where (for example) a given core is subject to reconfigured to variously execute instructions of different instruction types at different times. By way of illustration and not limitation, such instruction type includes a SSE (Streaming Single Instruction, Multiple Data Extensions) instruction type, an Advanced Vector Extensions (AVX) instruction type—e.g., including, for example, one or more of AVX256, or AVX512—and/or any of various other instruction types.

In an illustrative scenario according to one embodiment, cores running different ones of SSE128, AVX256 and AVX512 (for example) are to operate according to different respective frequency limits—e.g., according to the respective 3-tuples ($f_{minSSE}$, $f_{P1SSE}$, $f_{maxSSE}$), ($f_{minAVX2}$, $f_{P1AVX2}$, $f_{maxAVX2}$) and ($f_{minAVX512}$, $f_{P1AVX512}$, $f_{maxAVX512}$). A supervisor P-unit communicates a normalized frequency value $f'_{ceil}$ to a supervisee P-unit of an IC die, wherein a core i of the IC die is a running a LIC license In one such embodiment, the supervisee P-unit converts $f'_{ceil}$ into provisional (e.g., denormalized, and core-specific) ceiling frequency $f_{iLIC}$—e.g., according to the following:

$$f_{i\,LIC} = f_{P1\,LIC} + (f'_{ceil} - f'_{P1}) * scalefactor_{LIC}, \quad (23)$$

where the scalefactor$_{LIC}$ term is given by the following:

$$scalefactor_{LIC} = \frac{f_{max\,LIC} - f_{P1\,LIC}}{f'_{max} - f'_{P1}} \quad (24)$$

This provisional value of $f_{iLIC}$ is then clipped, as necessary, according to the following:

$$f_{i\,LIC} 32\,\max(f_{min\,LIC}, \min(f_{max\,LIC}, f_{i\,LIC})) \quad (25)$$

In various embodiments, allocating core frequencies according to a given scheme (such as one of those described herein) results in a change to power consumption by the packaged device. Power consumption is monitored, for example, by a voltage regulator which is coupled to the packaged device via a printed circuit board (e.g., a motherboard), and/or as telemetry from the die consuming the power, and/or as a hybrid (i.e., partially by a MBVR and partially by one or more dies). Monitor 4034 is coupled to determine—based on an output such as the illustrative signal 4032 from IC dies 4030—an updated value of a metric of said power consumption. This updated metric value is provided as a feedback via signal 4036 to facilitate dynamically adaptive power budget allocation to cores of IC dies 4030.

Figure 40B:
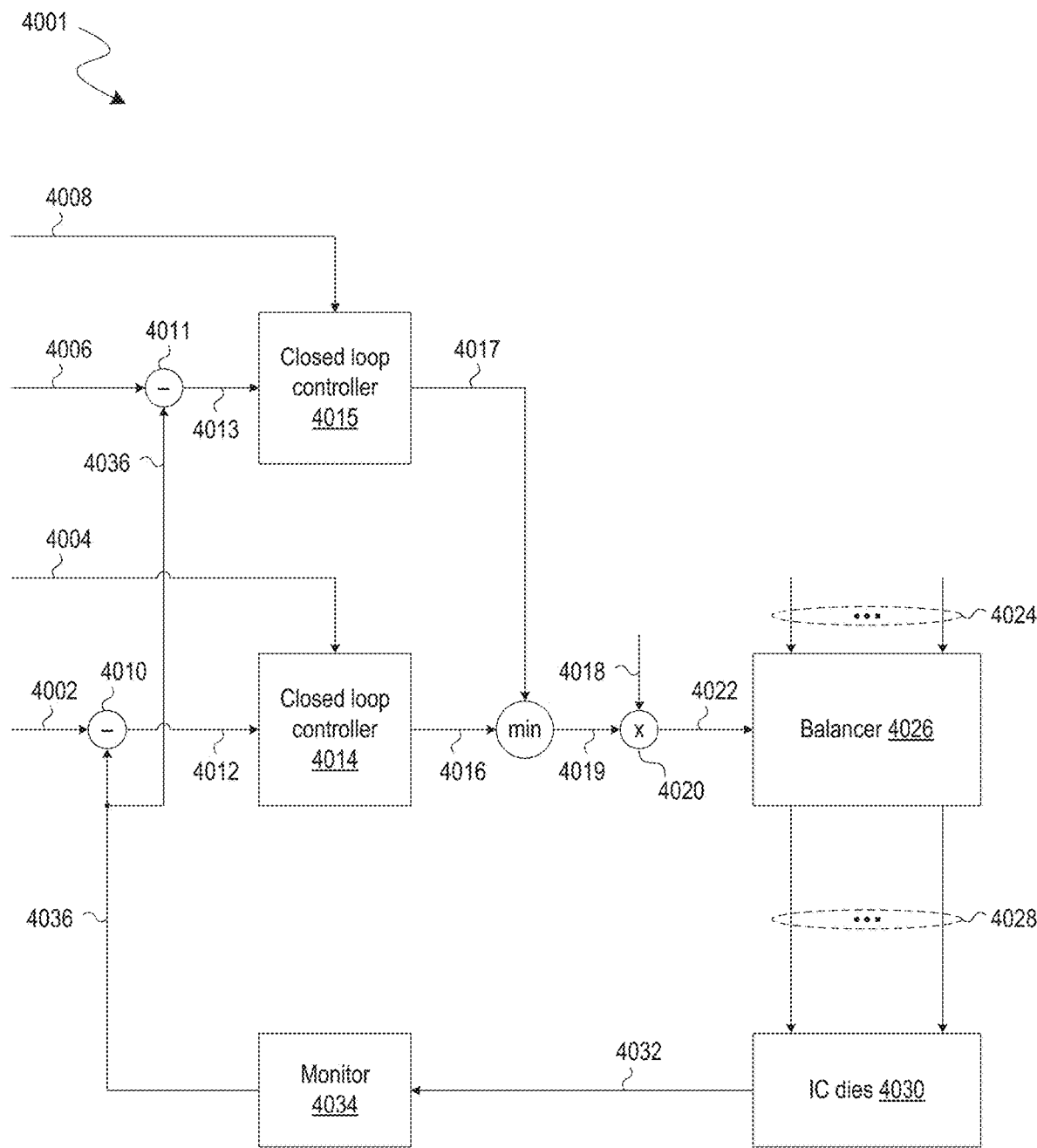

FIG. 40B shows system 4001 to limit power consumption by processor cores of a multi-chip package according to another embodiment. System 4001 provides some or all of the functionality of one of systems 3800, 4000, for example—e.g., wherein one or more operations of method 3900 are performed with system 4001.

As shown in FIG. 40B, system 4001 similarly comprises the evaluation circuit 4010, closed loop controller 4014, multiplier/divider circuit 4020, balancer 4026, IC dies 4030, and monitor 4034 in system 4000. Furthermore, signals 4002, 4012, 4016, 4018, 4022, 4024, 4028, 4032, 4036 are variously communicated in system 4001 (similar to such communication in system 4000)—e.g., wherein a signal 4004 identifies to closed loop controller 4014 a time window TW1 representing a maximum length of time that the metric of average power consumption can be above PL1.

In various embodiments, another evaluation circuit 4011 of system 4001 receives—e.g., via a signal 4036—the same (or another) metric of package power consumption determined with monitor 4034. Evaluation circuit 4011 further receives a signal 4006 comprising an identifier of a second power consumption threshold PL2 (which, for example, is greater than PL1).

In one such embodiment, another closed loop controller 4015 (e.g., a PID controller) of system 4001 is coupled to receive a signal 4013 indicating a difference between PL2 and the power consumption metric communicated to evaluation circuit 4011. Another signal 4008 identifies to closed loop controller 4015 a time window TW2 representing a maximum length of time that the metric of average power consumption can be above PL2. Based on signal 4013 and a time window TW2, closed loop controller 4015 outputs another signal 4017 which (for example) indicates a second per-core average frequency budget. A lower one of the budgets indicated by signals 4016, 4017 is determined, and communicated—via a signal 4019—to multiplier/divider circuit 4020 for use in determining signal 4022—e.g., as described with reference to system 4000.

Figure 40C:
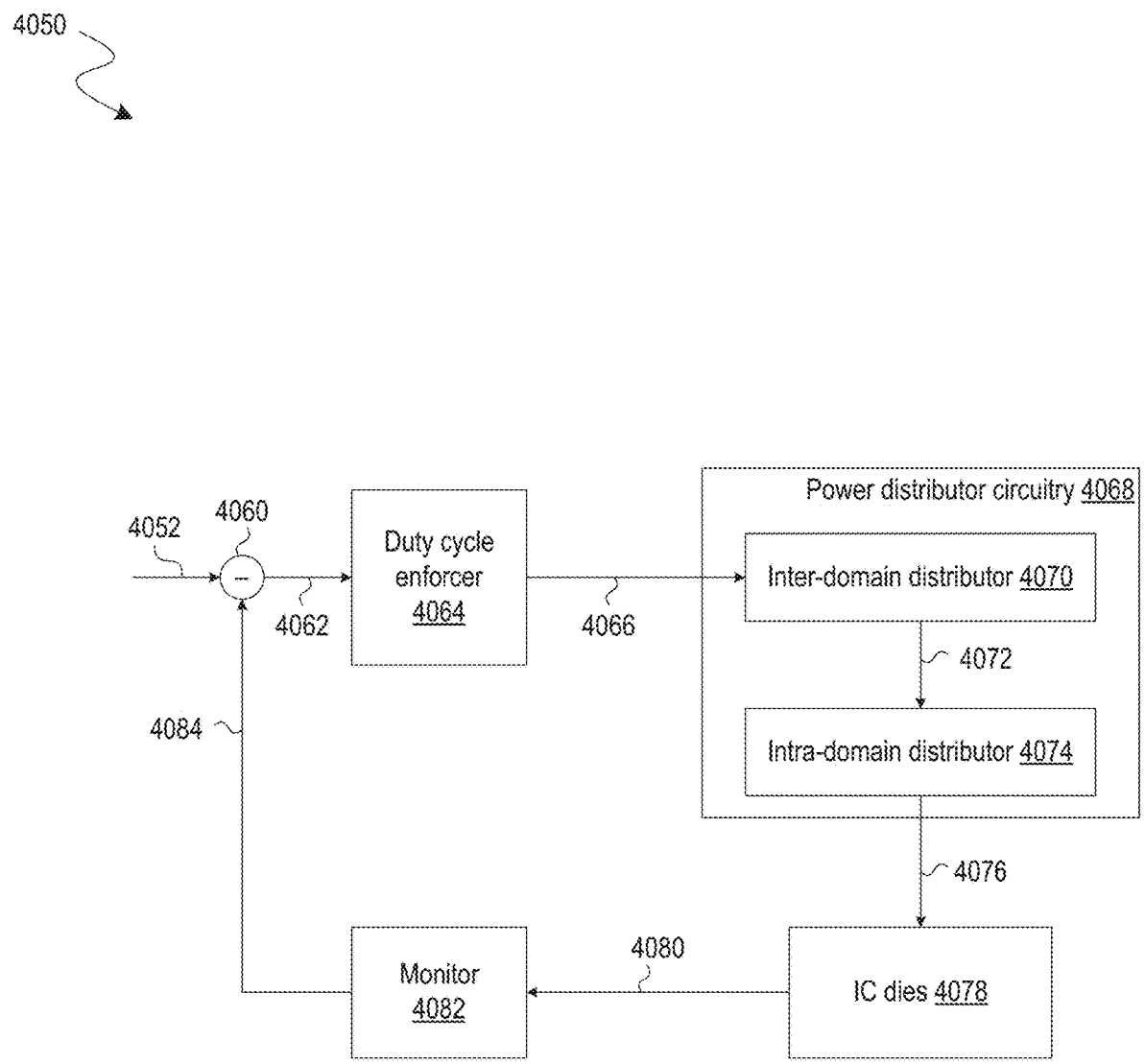

FIG. 40C shows system 4050 to limit power consumption by a multi-chip package according to another embodiment. System 4050 provides some or all of the functionality of system 3800, for example—e.g., wherein one or more operations of method 3900 are performed with system 4050. In some embodiments, system 4050 further comprises features of one of systems 4000, 4001—e.g., wherein system 4050 is to detect concurrently for, and variously respond to, the exceeding of any of multiple different power thresholds by the multi-chip package.

As shown in FIG. 40C, system 4050 comprises power limiter circuitry of a supervisor P-unit (for example, P-unit 3802), the circuitry including an evaluation circuit 4060, a duty cycle enforcer 4064, and power distributor circuitry 4068 which, in some embodiments, correspond functionally to evaluation circuit 4010, controller 3824, and frequency distribution circuitry 3825 (respectively). For example, the signals 4052, 4062, 4076, and 4084—which are shown as being variously communicated in system 4000—correspond functionally to signals 4002, 4012, 4028, and 4036 (respectively), in some embodiments.

System 4050 comprises IC dies 4078 of a packaged device, some or all of which each include a respective supervisee P-unit that is controlled at least in part by the supervisor P-unit. In some embodiments, the packaged device is coupled to—or alternatively, includes—circuitry (such as the illustrative monitor 4082 shown) which monitors indicia of power consumption by the packaged device. Information about such power consumption is provided to the supervisor P-unit as feedback signal 4084 to facilitate dynamic management of power consumption by cores of IC dies 4078.

In some embodiments, signal 4084 indicates a metric of overall power consumption which is averaged over some predetermined time period. In one such embodiment, this time period is less than a corresponding period of time used for the averaging of a differently-calculated metric which (for example) is indicated by signal 4036. Signal 4084 is received by an evaluation circuit 4060, which also receives a signal 4052 comprising an identifier of a power consumption threshold PL2. In some embodiments, PL2 is greater than the threshold PL1 which is identified by signal 4002—e.g., where PL2 is less than a Pmax specification for the packaged device.

Based on signal 4084 and signal 4052, evaluation circuit 4060 generates a signal 4062 indicating a difference between PL2 and the power consumption metric. Based on signal 4062, duty cycle enforcer 4064 determines one or more parameters of a cycling of power consumption by one or more cores—e.g., the one or more parameters indicating a cycle duration, a duty cycle or the like. Such cycling is to be performed, for example, by successively throttling one or more core frequencies for a predetermined number of times, or until some other test condition has been met.

The one or more parameters are communicated via a signal 4066 to an inter-domain distributor 4070 of power distributor circuitry 4068, which provides functionality (similar to that of balancer 4026) to determine, based on the one or more parameters, a corresponding first one or more frequency budgets to implement the power cycling. In one such embodiment, the first one or more frequency budgets each correspond to (and are to be apportioned at) a different respective IC die of the multi-chip package. The first one or more frequency budgets are then indicated, via signal 4072, to an intra-domain distributor 4074 of power distributor circuitry 4068.

Based on signal 4072, power distributor circuitry 4068 determines, for each of one or more of the IC dies 4078, a respective one or more frequency thresholds (e.g., including one or more of a threshold minimum frequency, a threshold maximum frequency, or a threshold target frequency) which are each to correspond to a respective processor core of that IC die. With one or more signals (such as the illustrative signal 4076 shown) intra-domain distributor 4074 indicates the various frequency thresholds each to a respective one of IC dies 4078. For example, P-units of IC dies 4078 variously identify a respective one or more frequency thresholds, which are then variously applied to determine frequencies at which respective processor cores are to operate.

Figure 41:
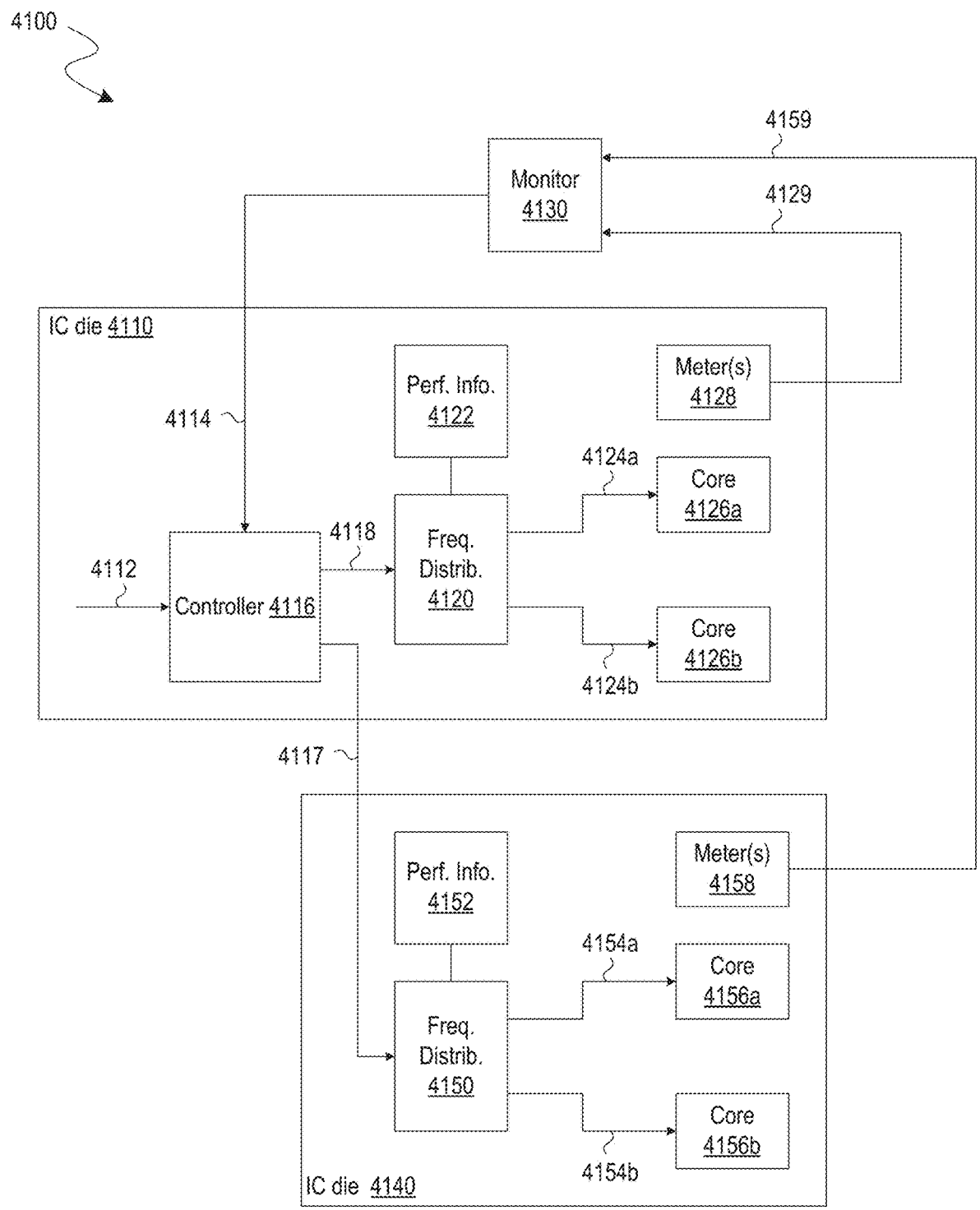
FIG. 41 illustrates a functional block diagram showing features of a hierarchical power management architecture to determine core frequencies of a multi-chip packaged device according to an embodiment.

FIG. 41 shows features of a HPM architecture 4100 to determine respective frequencies of processor cores in a multi-chip packaged according to an embodiment. HPM architecture 4100 is one example of an embodiment wherein functionality to determine an apportioning of frequency budget among processor cores is distributed across multiple P-units each at a different respective IC die. In some embodiments, HPM architecture 4100 is provided with a packaged device of one of systems 3800, 4000, 4001, 4050—e.g., wherein one or more P-units of HPM architecture 4100 are to perform some or all of method 3900.

As shown in FIG. 41, HPM architecture 4100 comprises a multi-chip packaged device including an IC die 4110 and an IC die 4140 couple thereto. IC die 4110 comprises a first P-unit and a first processor coupled to the first P-unit, wherein the first processor comprises a first one or more cores (such as the illustrative cores 4126a, 4126b shown). IC die 4140 comprises a second P-unit and a second processor coupled thereto, wherein the second processor comprises a second one or more cores (such as the illustrative cores 4156a, 4156b shown). In an embodiment, the first P-unit and the second P-unit operate, respectively, as a supervisor P-unit and a supervisee P-unit of HPM architecture 4100. In one such embodiment, IC die 4110 corresponds functionally to IC die 3810—e.g., wherein IC die 4140 corresponds functionally to one of IC dies 3830, 3850.

The first (supervisor) P-unit of IC die 4110 comprises a controller 4116 and a frequency distributor 4120 which, for example, provide some or all functionality of closed loop controller 4014 and balancer 4026 (respectively). Alternatively, or in addition, controller 4116 and frequency distributor 4120 provide some or all functionality of duty cycle enforcer 4064 and power distributor circuitry 4068 (respectively). For example, the first P-unit of IC die 4110 supports concurrent operations to regulate power consumption based on two power thresholds (such as the thresholds PL1, PL2 described herein with reference to systems 4000, 4001, 4050).

In an embodiment, the signals 4112, 4114, and 4118 variously communicated with the first P-unit correspond functionally to signals 4002, 4036, and 4016 (respectively), and/or to signals 4052, 4084, and 4062 (respectively). Based on signal 4118, frequency distributor 4120 calculates or otherwise determines various frequency thresholds each for a respective one of cores 4126a, 4126b. Such thresholds are applied with control signals 4124a, 4124b which frequency distributor 4120 communicates to core 4126a, 4126b (respectively). In one such embodiment, generation of signals 4124a, 4124b is further based on performance information 4122 which (for example) identifies a number of active cores of IC die 4110, a correspondence of core 4126a, 4126b each to a respective CLOS group, a relative ranking of CLOS groups, and/or the like. Such performance information 4122 is collected, for example, with communications between P-units of HPM architecture 4100. In an embodiment, a change to a number of active cores is communicated, for example, conditional upon the configured CLOS groups having not changed.

The second (supervisee) P-unit of IC die 4140 comprises a frequency distributor 4150 which, for example, provides at least some functionality of balancer 4026 and/or at least some functionality of intra-domain distributor 4074. Frequency distributor 4150 is coupled to receive a signal 4117, which specifies or otherwise indicates a power budget that is to be made available to IC die 4140. The power budget indicated by signal 4117 is represented, for example, as a frequency budget to be variously apportioned among cores 4156a, 4156b. Although signal 4117 is shown as being sent from controller 4116, in an alternative embodiment, signal 4117 is instead generated by frequency distributor 4120—e.g., based on a processing of signal 4118 to determine an apportioning of power budget between IC dies 4110, 4140.

Based on signal 4117, frequency distributor 4150 calculates or otherwise determines various frequency thresholds each for a respective one of cores 4156a, 4156b. Such thresholds are applied with control signals 4154a, 4154b which frequency distributor 4150 communicates to core 4156a, 4156b (respectively). In one such embodiment, generation of signals 4154a, 4154b is further based on performance information 4152 which (for example) identifies a number of cores of IC die 4140, a correspondence of core 4156a, 4156b each to a respective CLOS group, a relative ranking of CLOS groups, and/or the like.

In some embodiments, HPM architecture 4100 further comprises (or alternatively, is to couple to) a monitor 4130 which, for example, provides functionality of one or both of monitors 4034, 4082. Monitor 4130 is coupled to receive from one or more meters 4128 of IC die 4110 an output (e.g., including the illustrative signal 4129 shown) which specifies or otherwise indicates current and/or voltage use by cores 4126a, 4126b. Monitor 4130 further receives from one or more meters 4158 of IC die 4140 a signal 4159 which specifies or otherwise indicates current and/or voltage use by cores 4156a, 4156b. Based on signals 4129, 4159, monitor 4130 regularly calculates one or more metrics of average power consumption by the packaged device—e.g., where such metrics are provided as a feedback signal 4114 to controller 4116.

Figure 42:
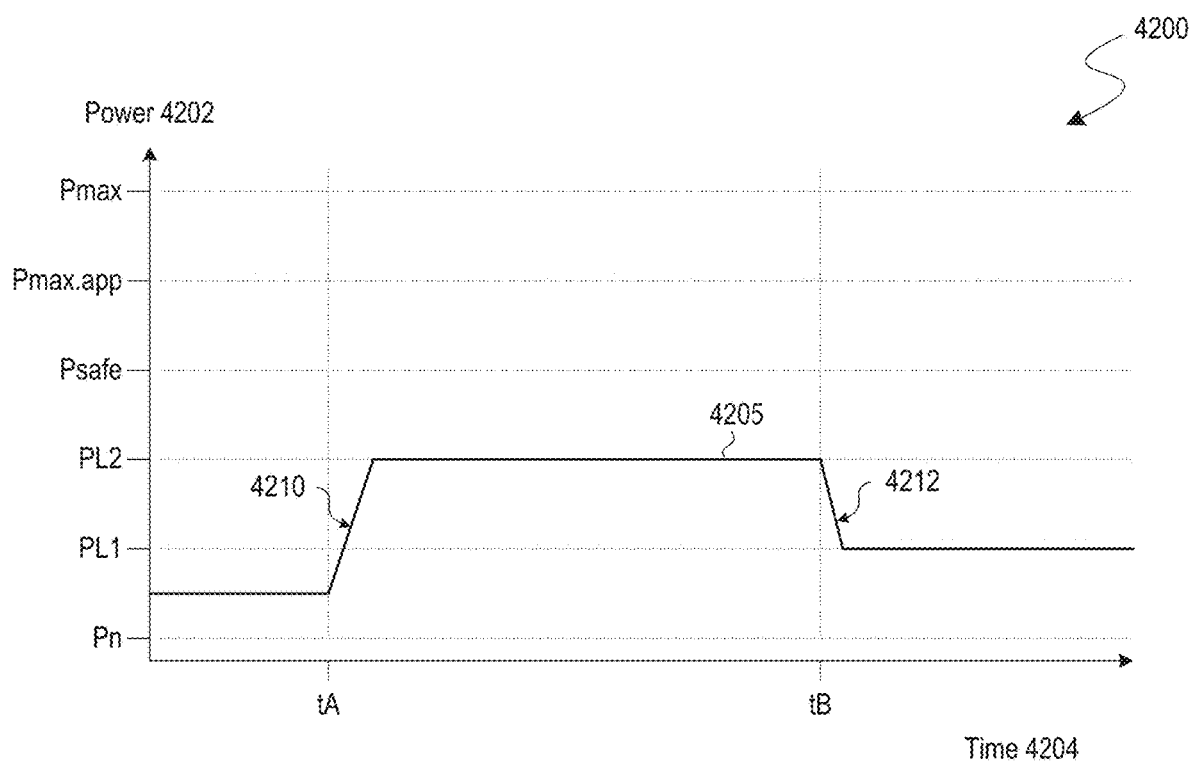
FIGS. 42, 43 illustrate timing diagrams each showing features of respective managed power consumption by a multi-chip package according to a corresponding embodiment.

FIG. 42 is a timing diagram 4200 which illustrates hierarchical power management with a multi-chip packaged device according to an embodiment. Timing diagram 4200 shows an average consumption 4205 of power 4202 by the packaged device over a period of time 4204. Power management such as that illustrated by average power consumption 4205 is provided, for example, with one of systems 3800, 4000, 4001 or HPM architecture 4100—e.g., wherein such power management is according to method 3900.

In the illustrative embodiment shown, the average power consumption 4205 is initially below a first power threshold PL1, which is less than a maximum power (Pmax) specification of the packaged device. For example, PL1 is equal to, or otherwise based on, a TDP of the packaged device. At a given time tA, the average power consumption 4205 undergoes a transition 4210 above PL1. Based on transition 4210 (e.g., based on the average power consumption 4205 remaining above PL1 for a period of time longer than a duration TW1, a hierarchical power management architecture of the packaged device operates to bring average power consumption 4205 to a target level equal to PL1.

For example, HPM mechanisms such as those described herein modify one or more core frequencies to limit average power consumption 4205 to a higher level (such as the illustrative power threshold P2 shown) until one or more workloads of the cores are completed or otherwise decrease. Such a decrease in the workloads results in a transition 4212 of average power consumption 4205, at a time tB, back to (or, for example, below) PL1.

Figure 43:
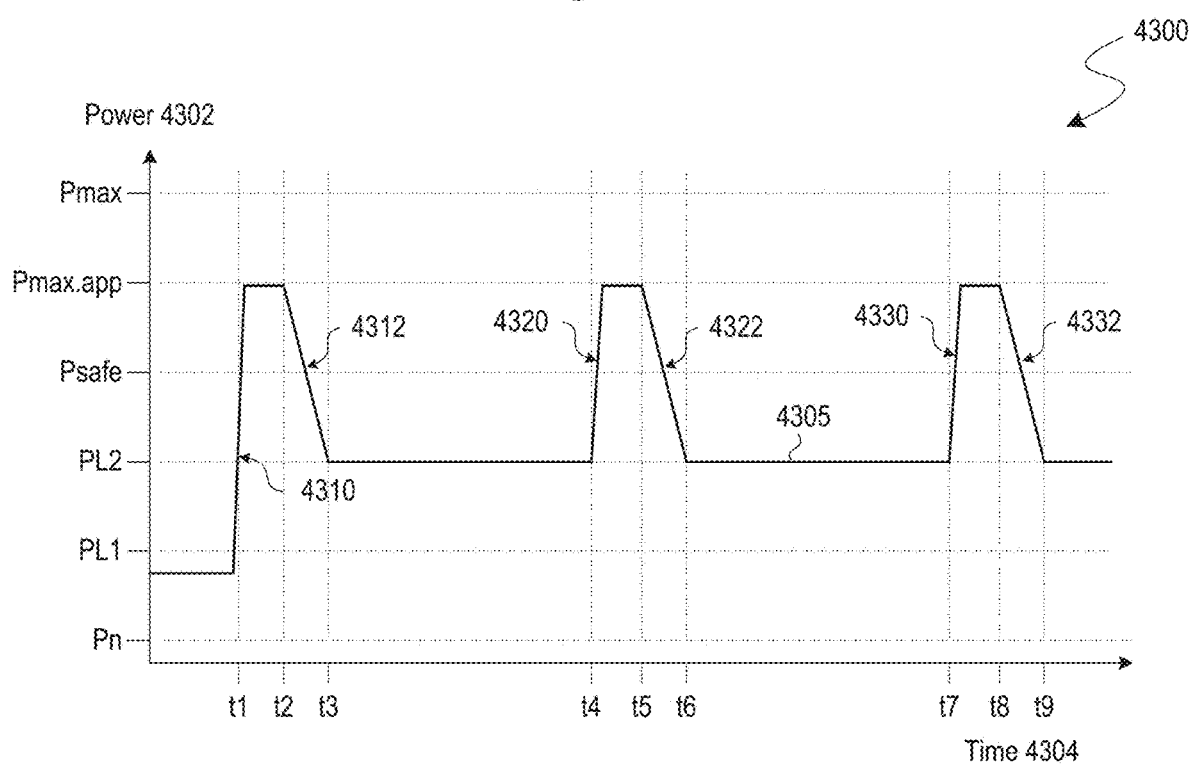

FIG. 43 is another timing diagram 4300 which illustrates additional hierarchical power management with a multi-chip packaged device according to some embodiments. Timing diagram 4300 shows an average consumption 4305 of power 4302 by the packaged device over a period of time 4304. Power management such as that illustrated by average power consumption 4305 is provided, for example, with one of systems 3800, 4050 or HPM architecture 4100—e.g., wherein such power management is according to method 3900.

In the illustrative embodiment shown, the average power consumption 4305 is initially below a power threshold PL1, which (for example) is equal to, or otherwise based on, a TDP of the packaged device. At a given time t1, the average power consumption 4305 undergoes a transition 4310 above PL1, and also above a higher threshold PL2. In response to transition 4310, a hierarchical power management architecture of the packaged device operates to repeatedly cycle the average power consumption 4305 in a range above PL1 (and, for example, above PL2), by successively throttling the respective frequencies of one or more cores.

For example, HPM mechanisms such as those described herein modify one or more core frequencies to limit average power consumption 4305 to a third threshold Pmax.app for some predetermined time duration—e.g., a duration equal to the difference (t3–t1) between times t1, t3. Subsequently, the one or more core frequencies are variously throttled to cause a transition 4312 of average power consumption 4305 down to PL2. The one or more core frequencies remain throttled until a time t4, whereupon another cycling of average power consumption 4305 is performed.

For example, an increase of one or more core frequencies results in a transition 4320 of average power consumption 4305 back to Pmax.app until a t5 when core throttling again causes a transition 4322 of average power consumption 4305 back to PL2. The one or more core frequencies again remain throttled until a time t7, whereupon still another cycling of average power consumption 4305 is performed. For example, one more core frequencies are again increased to cause a transition 4330 of average power consumption 4305 back to Pmax.app until a t8 when yet another core throttling causes a transition 4332 of average power consumption 4305 back to PL2. In some embodiments, such repeated cycling of average power consumption 4305 facilitates a meeting of power delivery constraints, and efficient thermal dissipation from the packaged device, during relatively high frequency operation of the cores. In one such embodiment, this high frequency operation more quickly brings the multi-chip package into a processing state which allows for lower levels of power consumption. In one example embodiment, the cycling of average power consumption 4305 is based on one TDP of multiple "localized" TDPs which (for example) each correspond to a different respective power domain of the processor.

In various embodiments, the HPM architecture regularly performs first evaluations to provide power regulation such at that illustrated by timing diagram 4200, while also regularly performing second evaluations to provide power regulation such at that illustrated by timing diagram 4300. For example, the first evaluations are repeated at a first frequency—e.g., where the power consumption 4205 is calculated as an average over a first time duration. By contrast, the second evaluations are repeated at a second frequency which is greater than the first frequency—e.g., where the power consumption 4305 is calculated as an average over a second time duration which is less than the first duration. In one such embodiment, the first time duration is on the order of 0.5 to 1.5 seconds—e.g., wherein the second time duration (t4–t1) is on the order of 5-15 microseconds.

In some embodiments, cycling of the average power consumption 4305 is based on any of a variety of other monitored conditions (e.g., including a real-time thermal state, an average current, or the like) of one or more cores. For example, for a given one or more P-units, each such P-unit supports, or otherwise operates based on, a real-time monitoring of one or more conditions of a corresponding power domain. The one or more P-units variously perform power throttling, such as that shown in timing diagram 4300, to apply a predetermined threshold for the one or more conditions.

Figure 44A:
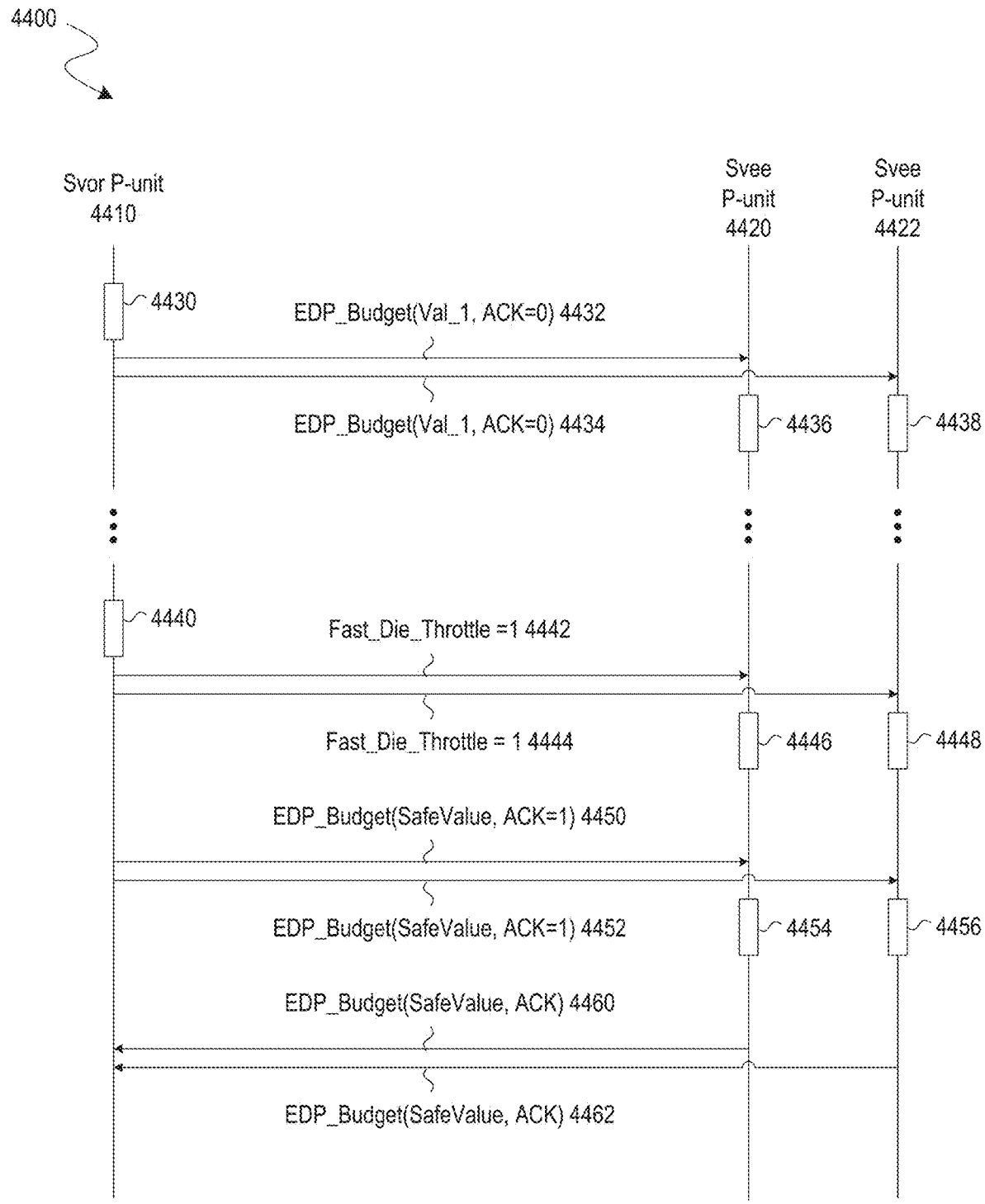
FIGS. 44A, 44B illustrate sequence diagrams each showing respective communications to determine processor core operations according to a corresponding embodiment.
Figure 44B:
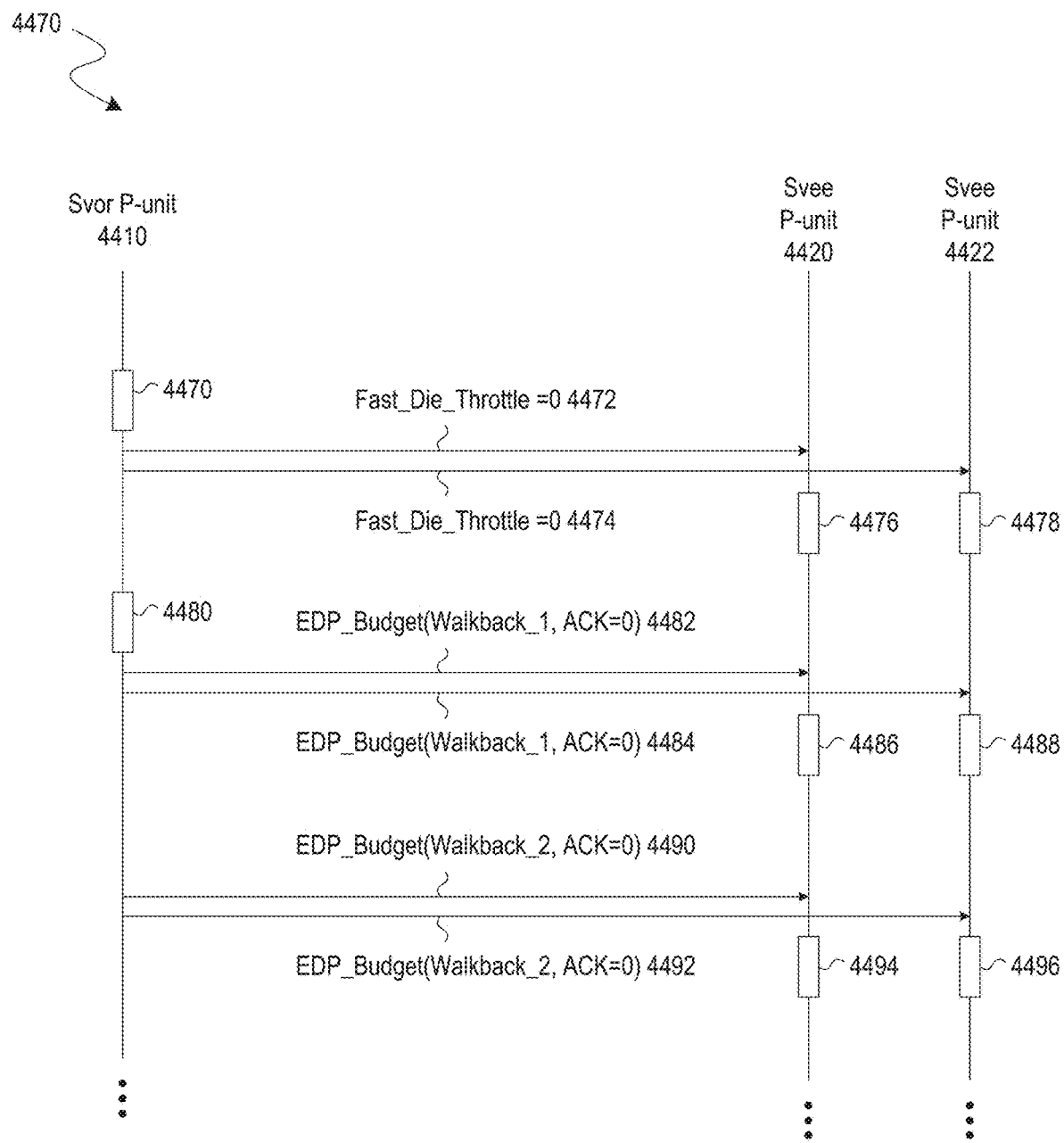

FIGS. 44A, 44B show respective sequence diagrams 4400, 4470 illustrating various communications, in a HPM architecture, to determine a cycling of power consumption by a multi-chip packaged device according to an embodiment. Communications such as those shown in sequence diagrams 4400, 4470 are performed, for example, with HPM architecture 4100 or with P-units of one of systems 3800, 4050. Alternatively or in addition, method 3900 includes or is otherwise based on some or all such communications.

As shown in FIGS. 44A, 44B, a HPM architecture comprises a supervisor P-unit 4410 and two supervisee P-units 4420, 4422 which are variously controlled by supervisor P-unit 4410. In one such embodiment, P-units 4410, 4420, 4422 are P-units of a multi-level power management hierarchy—e.g., where one of supervisee P-units 4420, 4422 is further to function as a local supervisor P-unit for another one or more P-units (not shown) of the power management hierarchy. In an illustrative scenario according to one embodiment, supervisor P-unit 4410 performs operation 4430 which, at a given time, detects that an average power consumption by the packaged device is more than a power threshold which is at or above PL2. Based on such detection, supervisor P-unit 4410 performs operations to decrease a current draw by one or more cores (and, in some embodiments, by one or more accelerators, uncore circuits, or the like) while the average package power consumption is allowed to be as much as some higher threshold (e.g., Pmax.app).

For example, based on operation 4430, supervisor P-unit 4410 communicates electrical design point (EDP) messages 4432, 4434 which identify respective maximum current (Iccmax) parameters to supervisee P-units 4420, 4422. Based on messages 4432, 4434, supervisee P-units 4420, 4422 perform respective operations 4436, 4438 to variously reduce (according to the indicated Iccmax parameters) the currents drawn by different cores.

In one such embodiment, supervisor P-unit 4410 incrementally decreases such current draw repeatedly—e.g., up to some maximum number of times before implementing core throttling which is to at least temporarily reduce the average power consumption to PL2. By way of illustration and not limitation, supervisor P-unit 4410 performs another operation 4440—e.g., a last one in a round of such operations—to detect whether the average power consumption by the packaged device has decreased to (or below) PL2. Where operation 4440 indicates that the power consumption is still above PL2, supervisor P-unit 4410 generates signals 4442, 4444 to cause supervisee P-units 4420, 4422 perform respective operations 4446, 4448 each to apply a respective predefined throttle mode to all its cores. In some embodiments, signals 4442, 4444 (and/or other fast throttle signals) are communicated via direct wires to supervisee P-units 4420, 4422—e.g., rather than via a P2P fabric which is used for other communications between various P-units. In this particular context, "direct wire" refers to a signal line which is directly coupled to the respective hardware interfaces of a corresponding two P-units. In some embodiments, direct wires are arranged in a daisy chain configuration to facilitate communicate of fast throttle signals between P-units. In other embodiments, direct wires are variously coupled each between a global supervisor P-unit and a different respective supervisee P-unit which is directly under that global supervisor P-unit in the hierarchy. In one such embodiment, for each local supervisor P-unit (if any) in the hierarchy, a respective one or more other direct wires are variously coupled each between that local supervisor P-unit and a corresponding supervisee P-unit which is directly under that local supervisor P-unit in the hierarchy.

Subsequent messages 4450, 4452 from supervisor P-unit 4410 variously communicate EDP budgets according to which supervisee P-units 4420, 4422 throttle their cores (in respective operations 4454, 4456). After operations 4454, 4456, supervisee P-units 4420, 4422 provide messages 4460, 4462 to acknowledge initiation of the throttling to supervisor P-unit 4410. Afterwards, supervisor P-unit 4410 performs operation 4470 which to determine when it is possible to send respective signals 4472, 4474 for supervisee P-units 4420, 4422 to discontinue fast die throttling (e.g., with the respective operations 4476, 4478 shown).

In one such embodiment, a subsequent operation 4480 by supervisor P-unit 4410 detects that the power consumption of the throttled cores has been at or below PL2 for at least some predetermined hold time. In response to such detecting, supervisor P-unit 4410 prepares for another cycling of the power consumption—e.g., wherein messages 4482, 4484, 4490, 4492 are successively communicated to incrementally raise an upper limit to the power consumption. Various operations 4486, 4488, 4494, 4496 based on messages 4482, 4484, 4490, 4492 allow core frequencies to increase—e.g., to enable one of transitions 4320, 4330, in various embodiments.

Figure 45:
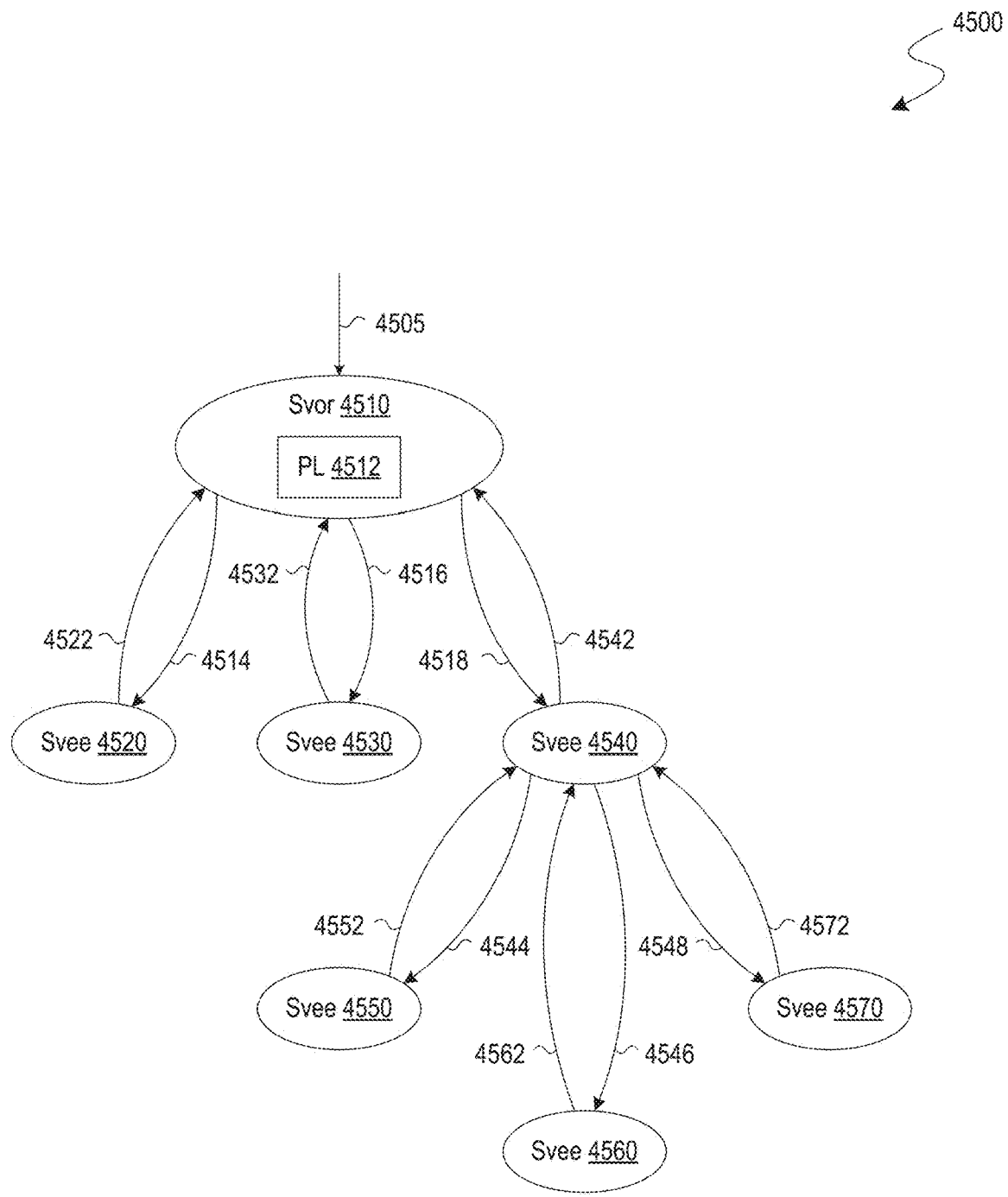
FIG. 45 illustrates a functional block diagram showing features of a hierarchical power management architecture according to an embodiment.

FIG. 45 shows features of a HPM architecture 4500 to manage power consumption by cores of different respective IC dies according to an embodiment. In FIG. 45, P-units of HPM architecture 4500 are represented as interconnected nodes which participate in communications such as those shown in sequence diagrams 4400, 4470 (for example). In some embodiments, HPM architecture 4500 provides functionality of one of systems 3800, 4000, 4001, 4050, or of HPM architecture 4100—e.g., wherein HPM architecture 4500 is operable to perform some or all of method 3900.

HPM architecture 4500 illustrates one embodiment comprising multiple levels of a hierarchy of P-units, the multiple levels under one "global" supervisor P-unit. For example, P-units of HPM architecture 4500 are each at a different respective IC die of a multi-chip package, where a P-unit 4510 operates as a global supervisor P-unit, and one or more other P-units (e.g., including the illustrative P-units 4520, 4530, 4540 shown) are each a respective supervisee P-unit which is controlled directly by supervisor P-unit 4510. In one such embodiment, supervisee P-unit 4540 (for example) is coupled to operate both as a supervisee P-unit under supervisor P-unit 4510, and also—in one or more respects—as a "local" supervisor of one or more other P-units (such as the illustrative supervisee P-units 4550, 4560, 4570 shown).

Supervisee P-unit 4540 is coupled to receive respective messages 4552, 4562, 4572 which describe, for each of supervisee P-units 4550, 4560, 4570 (respectively), configuration state of the respective die which includes that P-unit. By way of illustration and not limitation, such state information includes one or more of a total number of active cores of a given IC die, and instruction types being used by a given core, a CLOS to be provided with a given core, and/or the like. In an embodiment, a change to a number of active cores is communicated in the power management hierarchy, for example, conditional upon the configured CLOS groups having not changed, and/or upon dies being configured to apply frequency adjustments dies on local cores based on instruction sets. Similarly, supervisor P-unit 4510 is coupled to receive respective messages 4522, 4532, 4542 which describe, for each of supervisee P-units 4520, 4530, 4540 (respectively), configuration state of the respective die which includes that P-unit. In one such embodiment, supervisee P-unit 4540 aggregates state information received via messages 4552, 4562, 4572, where such aggregated state information is then provided to supervisor P-unit 4510 via message 4542. Based on such state information, P-units 4510, 4540 perform operations to determine how a frequency budget is to be variously allocated to respective cores of HPM architecture 4500.

For example, HPM architecture 4500 distributes across P-units 4510, 4540 a functionality (such as that of balancer 4026) to determine an allocation of core frequency bandwidths based on an available power budget. In one such embodiment, based on one or both of power thresholds PL1, PL2, power limiter logic PL 4512 of supervisor P-unit 4510 specifies or otherwise indicates to each of P-units 4520, 4530 (e.g., via messages 4514, 4516) a respective one or more frequency thresholds to be applied each to a corresponding core. Furthermore, PL 4512 of supervisor P-unit 4510 specifies or otherwise indicates to P-unit 4540 a power budget to be applied over a combination of the respective IC dies which include P-units 4540, 4550, 4560, 4570. P-unit 4540 provides balancer functionality to determine, based on such a power budget, multiple core frequency thresholds which are to be variously applied each by a respective one of P-units 4540, 4550, 4560, 4570.

In one such embodiment, supervisee P-unit 4540 determines power budgets that are to be variously applied by the respective P-units 4540, 4550, 4560, 4570. For example, P-unit 4540 then specifies or otherwise indicates to each of P-units 4550, 4560, 4570 (e.g., via messages 4544, 4546, 4548) a respective one or more frequency thresholds to be applied each to a corresponding core. Furthermore, supervisee P-unit 4540 itself applies one or more other frequency thresholds each to a respective core of the IC die which includes supervisee P-unit 4540.

In an illustrative scenario according to one embodiment, some or all of P-units 4520, 4530, 4540 each receive from P-unit 4510 a respective communication which specifies or otherwise indicates a power budget for a corresponding power domain (e.g., wherein a communication identifies a frequency budget to implement a corresponding power budget). For example, message 4514 indicates to P-unit 4520 a first frequency budget for a first power domain—e.g., wherein message 4516 indicates to P-unit 4530 a second frequency budget for a second power domain. Furthermore, message 4518 indicates to P-unit 4540 a third frequency budget for a third power domain.

In its capacity as a supervisee, P-units 4520 distributes the first frequency budget among a first one or more processor cores of the first power domain—e.g., wherein P-units 4530 similarly distributes the second frequency budget among a second one or more processor cores of the second power domain.

In its capacity as a supervisee, P-unit 4540 identifies a first portion of the third frequency budget, and distributes said first portion among a third one or more cores of a first sub-domain of the third power domain. Furthermore, in its capacity as a "local" supervisor, P-unit 4540 further identifies remaining second, third, and fourth portions of the third frequency budget—e.g., where said second, third, and fourth portions are to be variously distributed by P-units 4550, 4560, 4570 (respectively) among respective second, third, and fourth sub-domains of the third power domain.

In one such embodiment, message 4544 identifies the second sub-portion of the third power budget to P-unit 4550—e.g., wherein message 4546 identifies the third sub-portion of the third power budget to P-unit 4560, and wherein message 4548 identifies the fourth sub-portion of the third power budget to P-unit 4570. Based on messages 4544, 4546, and 4548, P-units 4550, 4560, 4570 variously distribute the second, third, and fourth sub-portions of the third power budget each among a respective one or more cores.

There are many technical effects of various embodiments. For example, in some embodiments, a supervisor P-unit provides an interface whereby a software process is able to access any of various P-units of a HPM architecture. In one such embodiment, the interface enables the software process to avail of functionality such as that of the Intel® Speed Select Technology. Other technical effects will be evident from the various figures and embodiments.

Figure 46:
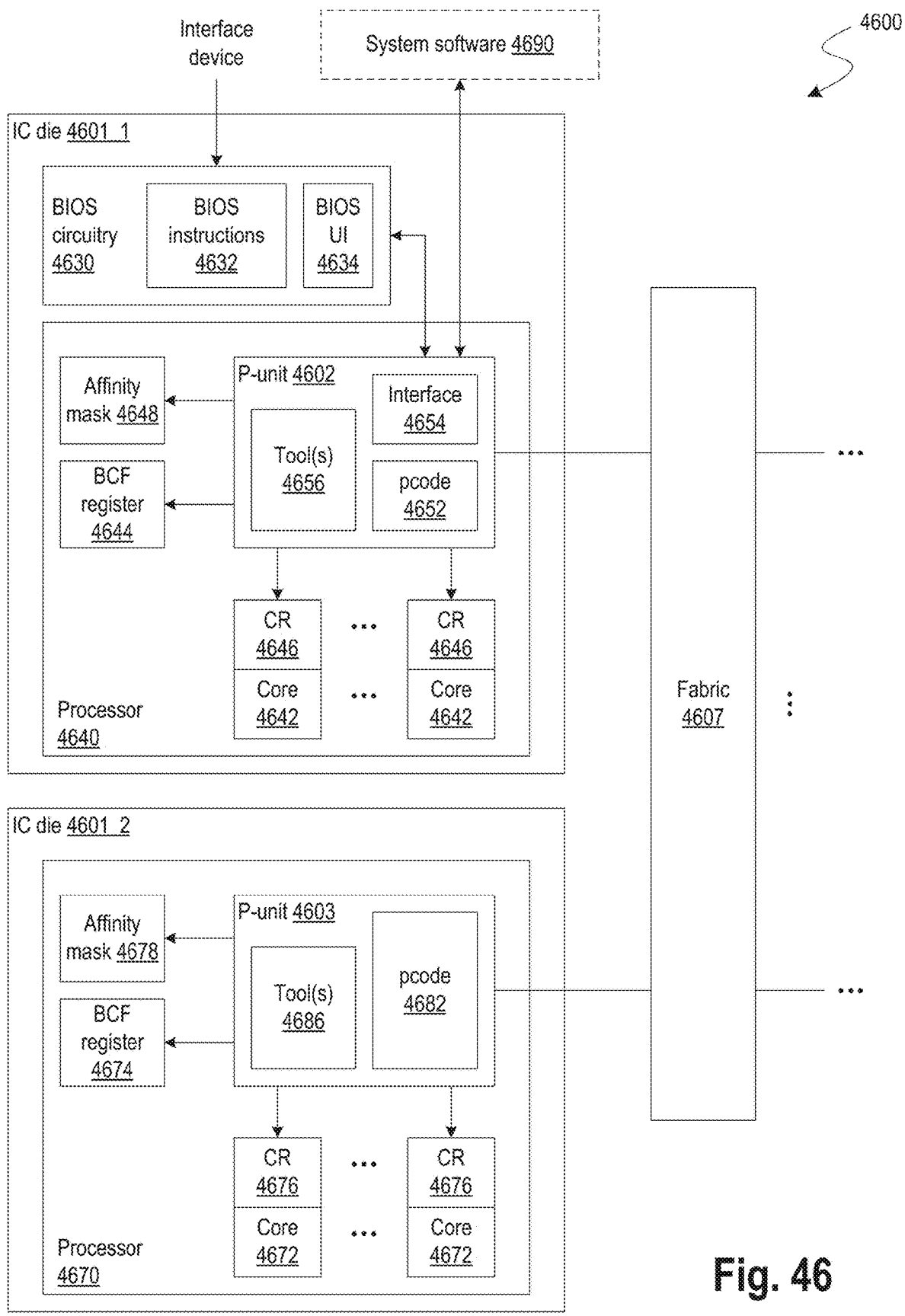
FIG. 46 illustrates a functional block diagram showing features of a packaged device to provide access to hierarchical power management features m according to an embodiment.

FIG. 46 is a block diagram illustrating a packaged device packaged device 4600 to provide an interface, according to an embodiment, by which a software process or other agent is to access a HPM architecture. Packaged device packaged device 4600 is one example of an embodiment wherein multiple IC dies of a package comprise respective P-units, where one P-unit is to be a "supervisor" P-unit for one or more other "supervisee" P-units (at least with respect to the providing of a functionality which is accessed via the interface).

In the illustrative embodiment shown, IC dies 4601_1, 4601_2 of packaged device 4600 are coupled to one another via interconnect circuitry such as the illustrative fabric 4607 shown. For example, in one embodiment, fabric 4607 comprises interconnects which provide some or all of the functionality of communication network 107. IC dies 4601_1, 4601_2 comprise respective processors 4640, 4670—e.g., each comprising, for example, a CPU, or GPU including one or more processing cores—wherein a P-unit 4602 of processor 4640 is coupled via fabric 4607 (e.g., a P2P fabric) to a P-unit 4603 of processor 4670. In an embodiment, P-unit 4602 is a microcontroller programmed with pCode 4652 (firmware, for example)—e.g., wherein P-unit 4603 is a microcontroller programmed with pCode 4682. The pCodes 4652, 4682 variously include code encoding functionalities associated with managing operational parameters of processors 4640, 4670 (respectively). In one embodiment, execution of pCode 4652 facilitates an interface by which an executing software process is able to read, set or otherwise determine one or more operational parameters of a given processor. Additionally or alternatively, P-unit 4602 executing pCode 4652, during a boot-up, reads Basic Input Output System (BIOS) instructions 4632 stored in BIOS circuitry 4630 to perform an initialization of packaged device 4600.

For example, P-unit 4602 provides an interface 4654—e.g., comprising an application programming interface (API)—by which one or more agents (e.g., including a software processes such as that of system software 4690, or of executed BIOS instructions 4632) have access to determine the operation of one or more processor cores and/or to access information describing such operation. In various embodiments, system software 4690 comprises a scheduling agent (e.g., of an OS or, alternatively, executing on the OS). Such a scheduling agent provides functionality to selectively migrate a given thread from being executed on one core to being executed on an alternative core. In one such embodiment, a thread is migrated between heterogeneous cores—e.g., wherein a "big" core exhibits relatively large power consumption characteristics, as compared to those of another, comparatively "small" core.

Based at least in part on communications via interface 4654, P-unit 4602 operates as a supervisor P-unit to control P-unit 4603 (as a corresponding supervisee P-unit), to determine operations by a processor 4670. Alternatively or in addition, interface 4654 provides access to information which P-unit 4602 has determined, as the supervisor P-unit, based on communication with P-unit 4603. In various embodiments, interface 4654 is a firmware interface which, for example, is compatible with the Unified Extensible Firmware Interface (UEFI) specification, Version 2.0, Jan. 31, 2006, the UEFI specification, Version 2.1, Jan. 7, 2007, or other such UEFI specification. Such a firmware interface supports system boot services and/or runtime services.

By way of illustration and not limitation, processor 4640 comprises one or more processing cores (e.g., including the illustrative cores 4642 shown), and control registers 4644, 4646, 4648 by which P-unit 4602 variously determines one or more operations of cores 4642. Similarly, processor 4670 further comprises one or more processing cores (e.g., including the illustrative cores 4672 shown), and control registers 4674, 4676, 4678 by which P-unit 4603 variously determines one or more operations of cores 4672. Processing cores 4642, 4672 in various implementations are provided by in-order cores or out-or-order cores. Alternatively, or in addition, some or all of processing cores 4642, 4672 each have a micro-architecture including processor logic and circuits used to implement a respective instruction set architecture (ISA).

With interface 4654, P-unit 4602 provides an interface between an OS process (and/or a BIOS process) and the hierarchical power management architecture. For example, interface 4654 facilitates access to P-unit 4602—and, for example, indirect access via P-unit 4602 to one or more supervisee P-units—by system software 4690 and/or a BIOS user interface (UI) 4634 and/or other such agent. BIOS UI 4634 is provided, for example, by an execution of BIOS instructions 4632 which are stored at BIOS circuitry 4630 (of IC die 4601_1, for example)—e.g., wherein BIOS user interface 4634 is presented with a display device, a keyboard, a mouse and/or one or more input/output devices (not shown). In an example embodiment, BIOS circuitry 4630 stores system initiation instructions for use during system boot (e.g., at power on)—e.g., wherein BIOS circuitry 4630 includes a read-only memory (ROM) or a flash memory to store said instructions.

In an embodiment, interface 4654 exposes to system software 4690 (and/or to a BIOS process) one or more HPM functionalities—e.g., including the illustrative tools 4656 shown—which are available via P-unit 4602. For example, hierarchical power management based on communications via interface 4654 include some or all of tools 4656 each controlling one or more corresponding tools each of a respective supervisee P-unit—e.g., e.g., wherein tools 4686 of P-unit 4603 are each controlled by a different respective one of tools 4656.

Based on communications via interface 4654, P-unit 4602 accesses, modifies or otherwise determines configuration state of processor 4670. For example, on behalf of system software 4690 (or other such agent), P-unit 4602 signals P-unit 4603 to perform operations to get, set, or otherwise access the configuration state of one or more registers, fuses, and/or other suitable circuitry of processor 4670 (e.g., including one or more the illustrative registers 4672, 4674, 4678 shown). Alternatively, or in addition, such communications via interface 4654 cause P-unit 4602 to access, modify or otherwise determine configuration state of processor 4640—e.g., wherein P-unit 4602 accesses one or more registers, fuses, and/or other suitable circuitry such as one or more the illustrative registers 4642, 4644, 4648 shown). In various embodiments, access by one or more types of software processes to a supervisee P-unit such as P-unit 4603—where such access is for the purpose of configuring and/or determining power management of a given one or more processor cores—is provided indirectly (for example, only indirectly) via P-unit 4602 and the interface 4654 thereof.

In some embodiments, communications via interface 4654 result in P-unit 4602 setting one or more operational parameters which are each to apply to various resources of a respective processor. In an illustrative scenario according to one embodiment, a manufacturer, during the fabrication and testing of packaged device 4600, determines respective base clock frequency values for one or more processors (e.g., including processors 4640, 4670). A base clock frequency value is the highest certified clock speed at which a processor can run with a pre-determined workload (e.g., a worst workload). A workload of a task running on such a processor is measured, for example, with respect to the number of clock cycles used to perform the task. An upper limit of instructions that can be executed per clock cycle is determined based on many factors including, for example, the heat generated by the execution of these instructions. In some embodiments, respective control registers 4644, 4674 of processors 4640, 4670—referred to as processor base clock frequency (BCF) registers—each store a respective base clock frequency value to be applied to the corresponding processor. In one such embodiment, P-unit 4602 modifies or otherwise determines a frequency value of BCF register 4674 (and, for example, a frequency value of BCF register 4644) based on an input received via interface 4654.

In some embodiments, communications via interface 4654 result in P-unit 4602 signaling P-unit 4603 to set one or more operational parameters which are each specific to a respective one of cores 4672. Alternatively or in addition, such communications result in P-unit 4602 setting one or more configuration settings which are each specific to a respective one of cores 4642). For example, processing cores 4642 each correspond to a different respective one of control register 4646, which store respective base clock frequency values each specific to the corresponding one of cores 4642. Furthermore, processing cores 4672 each correspond to a different respective one of control register 4676, which store respective base clock frequency values each specific to the corresponding one of cores 4672. In one such embodiment, communications via interface 4654 result in P-unit 4602 accessing one or more of control registers 4646, and/or accessing (via P-unit 4603) one or more of control registers 4676. In various embodiments, one or more cores each support some autonomous core functionality whereby a given core is able to autonomously suspend, mitigate or otherwise modify—at least temporarily—the application of one or more operational parameters (for example, one or more frequency thresholds) which a P-unit has configured—e.g., based on a CLOS or core group to which the core belongs—to otherwise determine operation of that core.

Alternatively, or in addition, processor 4640 provides an affinity mask 4648 (e.g., each at control register thereof) to indicate which or processing cores 4642 are active—e.g., wherein another affinity mask 4648 of processor 4640 similarly indicates which or processing cores 4672 are active. In an example embodiment, one or each of affinity masks 4648, 4678 is a bit map, where each bit stores an activity status for a corresponding processing core. For example, when a bit is set to an active status (e.g., "1"), the corresponding processing core is to run according the base clock frequency value associated with the processing core. When the bit is set to an inactive status (e.g., "0"), the corresponding processing core is not available to software applications or is idle. In one such embodiment, communications via interface 4654 result in P-unit 4602 determining which of processor cores 4642, 4672 are to be active (or inactive). Based on such determining, P-unit 4602 sets one or more bits in affinity mask 4648, and/or signals P-unit 4603 to set one or more bits in affinity mask 4678. It will be appreciated that other methods could be used by the P-unit to facilitate core selection, e.g., depending on a specifically implemented OS.

In enabling access to one or more supervisee P-units via interface 4654 of supervisor P-unit 4602, some embodiments extend functionality—such as that of the Performance Profile (SST-PP) feature in the Intel® Speed Select Technology—whereby various performance profiles are each identified as corresponding with a different respective one or more cores of a given processor. For example, some embodiments enable a software user (or other agent) to provide input, via interface 4654, to determine—for an IC die other than IC die 4601_1—one or more operational parameters of a given performance profile and/or a correspondence a respective one or more cores of that IC die with that performance profile. A performance profile identifies, for example, a thermal design power (TDP), a base frequency, a turbo frequency, and/or any of various other operational parameters to determine operation of each or the corresponding one or more cores.

Alternatively or in addition, said embodiments extend functionality—such as that of the Core Power (SST-CP) feature in the Intel® Speed Select Technology—whereby cores of a given processor are variously prioritized, relative to each other, for the purpose of determining an allocation of power budget between said cores. For example, some embodiments enable an agent to provide input, via interface 4654, to determine a relative prioritization of cores 4672 (or other such cores of an IC die other than IC die 4601_1).

Alternatively or in addition, said embodiments extend functionality—such as that of the Base Frequency (SST-BF) feature in the Intel® Speed Select Technology—whereby the base frequency of one or more cores of a processor is to be increased in exchange for a lower base frequency of other cores of that processor. For example, some embodiments enable P-unit 4602 to control P-unit 4603—based on communications via interface 4654—to facilitate an increased base frequency for some of cores 4676 (or cores of another IC die other than IC die 4601_1) in exchange for a decreased base frequency for others of cores 4676.

Alternatively or in addition, said embodiments extend functionality—such as that of the Turbo Frequency (SST-TF) feature in the Intel® Speed Select Technology—whereby respective turbo frequencies of one or more cores of a processor are increased in exchange for lower respective turbo frequencies of other cores of that processor. For example, some embodiments enable P-unit 4602 to control P-unit 4603—based on communications via interface 4654—to facilitate an increased turbo frequency for some of cores 4676 (or cores of another IC die other than IC die 4601_1) in exchange for a decreased turbo frequency for others of cores 4676.

Figure 47:
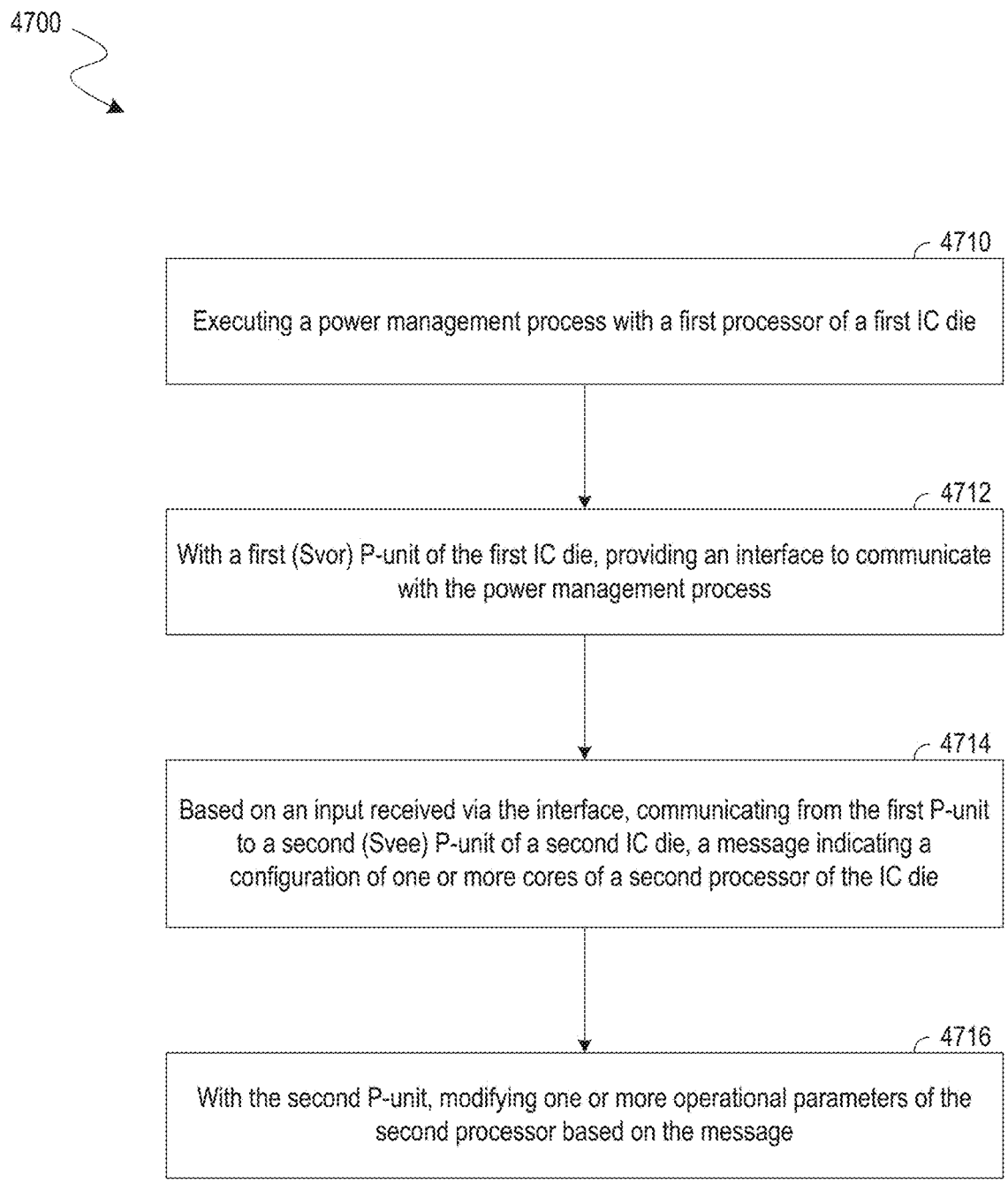
FIG. 47 illustrates a flow diagram showing features of a method to manage power consumption with a multi-die package according to an embodiment.

FIG. 47 shows operations of method 4700 to facilitate power management of a multi-chip package which provides a HPM architecture according to an embodiment. Method 4700 is one example of an embodiment wherein operations by a supervisor P-unit of an HPM architecture implement an interface whereby a software process is provided access to a supervisee P-unit of the HPM architecture. The interface enables power management features, such as those of the Intel® Speed Select Technology, to be extended for use by software in a HPM context. In one example embodiment, method 4700 is performed with system 4600.

As shown in FIG. 47, method 4700 comprises (at 4710) executing a power management process with a first processor of a first IC die—e.g., wherein processor 4640 of IC die 4601_1 performs the executing at 4710. In an embodiment, a multi-die package includes the first IC die (which comprises the first processor and a first P-unit), as well as a second IC die which comprises a second processor and a second P-unit. The first P-unit and the second P-unit—which are coupled to communicate with each other—are configured to operate, for example, as a supervisor P-unit and a supervisee P-unit (respectively) of a hierarchical power management architecture. In various other embodiments, method 4700 omits (but, for example, is performed in combination with) the executing at 4710.

Method 4700 further comprises (at 4712) a first P-unit of the first IC die providing an interface—e.g., interface 4654—to communicate with the power management process. For example, in various embodiments, any access to the second P-unit by the power management process is to be via the first P-unit (and the interface which it provides). Method 4700 further comprises (at 4714) communicating, from the first P-unit to the second P-unit, a message which is based on an input received from the power management process via the interface. In an embodiment, the message indicates a configuration of one or more cores of the second processor.

Method 4700 further comprises (at 4716) the second P-unit modifying one or more operational parameters of the second processor based on the message. By way of illustration and not limitation, the one or more operational parameters comprise a base frequency parameter, a turbo frequency parameter, and/or other such configuration state. In various embodiments, the message communicated at 4714 identifies an association of the one or more cores with a core group of multiple core groups, and wherein the second P-unit modifies the one or more operational parameters at 4716 based on the association. Additionally or alternatively, the message communicated at 4714 identifies a weight of a core group relative to one or more other core groups—e.g., wherein the second P-unit modifies the one or more operational parameters at 4716 based on the weight. In various embodiments, the message indicates to the second P-unit a power budget to be distributed among multiple cores of the second processor, where the modifying at 4716 facilitates such distribution.

Figure 48:
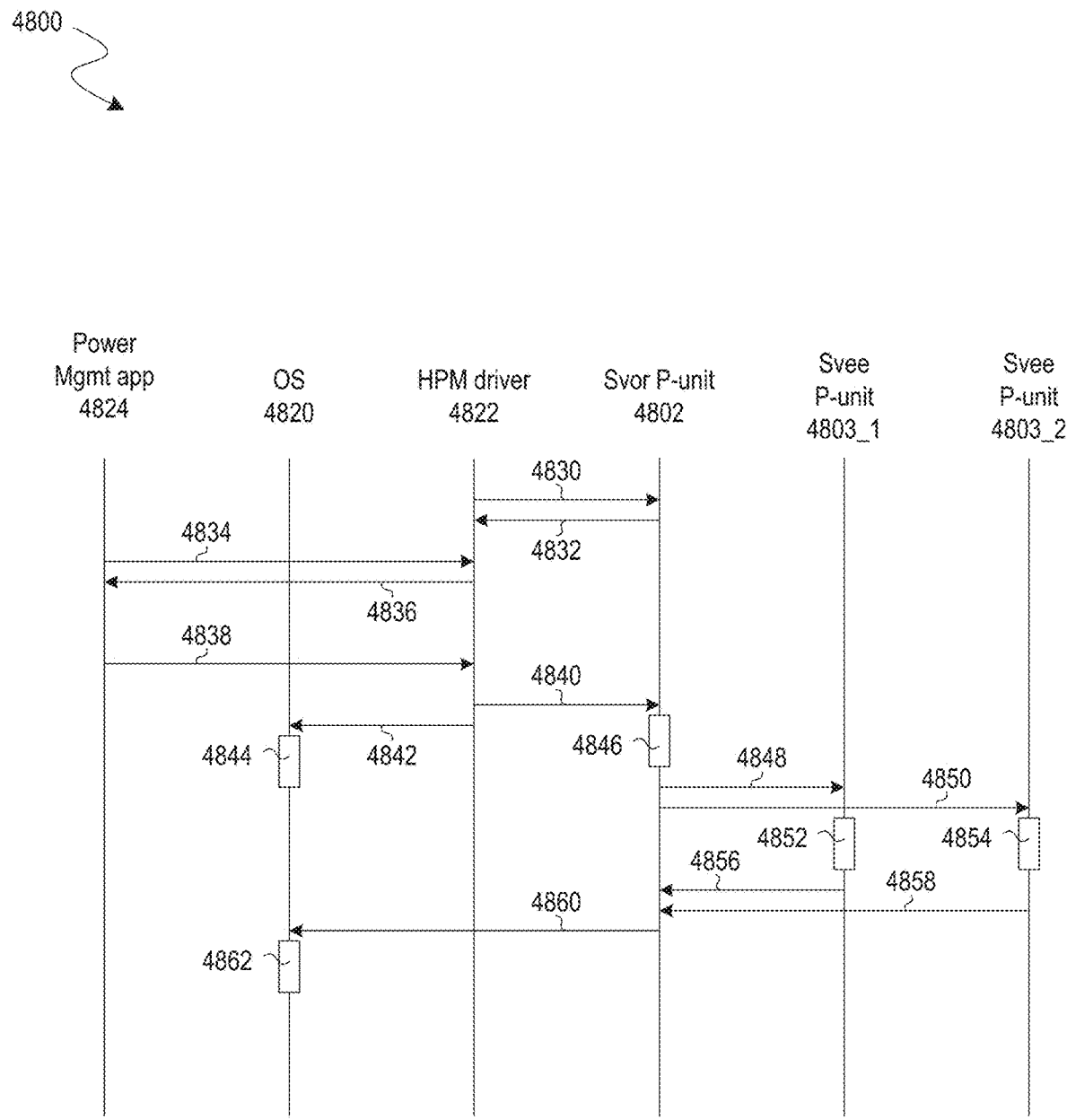
FIG. 48 illustrates a sequence diagram showing features of communications to determine power management of a multi-die package according to an embodiment.

FIG. 48 shows a sequence diagram 4800 illustrating various communications, with a HPM architecture and system software, to determine operational parameters of a multi-die packaged device according to an embodiment. Communications such as those shown in sequence diagram 4800 are performed, for example, with system 4600. Alternatively or in addition, method 4700 includes or is otherwise based on some or all such communications.

As shown in FIG. 48, a HPM architecture of a multi-die package comprises a supervisor P-unit 4802 and two supervisee P-units 4803_1, 4803_2 (which are variously controlled by supervisor P-unit 4802) each at a different respective IC die. An operating system OS 4820—e.g., executed by a processor which includes supervisor P-unit 4802—supports execution of a power management application 4824 with which a user is to select or otherwise request a power management configuration for the multi-die package. A HPM driver 4822 (which for example, is loaded as part of a boot process of OS 4820) facilitates access to an interface—e.g., interface 4654—that, in some embodiments, is provided with firmware of supervisor P-unit 4802.

In an illustrative scenario according to one embodiment, HPM driver 4822 and supervisor P-unit 4802 exchange messages 4830, 4832 whereby HPM driver 4822 discovers a HPM functionality which is supported by supervisor P-unit 4802. For example, HPM driver 4822 communicates with an interface of supervisor P-unit 4802 which, in some embodiments, has features of interface 4654.

Subsequently, power management application 4824 and HPM driver 4822 exchange messages 4834, 4846 whereby power management application 4824 discovers the HPM functionality identified to HPM driver 4822 by supervisor P-unit 4802. In some embodiments, message 4832 (or other such communications from supervisor P-unit 4802) identify a current configuration state of one or more processors which are managed by the HPM architecture—e.g., wherein power management application 4824 further determines said current configuration state based on message 4836 and/or other communications with HPM driver 4822. By way of illustration and not limitation the configuration state comprises, for a given one or more processor cores, a respective one or more of a base frequency, a turbo frequency, an association of the one or more cores with a given core group, a relative weight (e.g., priority) of such a core group with respect to one or more other core groups, a thermal design power (TDP), any of various threshold frequency levels, any of various threshold power consumption levels, and/or the like. In various embodiments, the current configuration state is that of one or more processors are each at a different respective IC die of the multi-die package—e.g., wherein one such processor includes a supervisee P-unit of the HPM architecture.

At some later time during execution of OS 4820, power management application 4824 sends to HPM driver 4822 a message 4838 which requests a change to the current configuration state of the one or more processors. In response, HPM driver 4822 sends to supervisor P-unit 4802 a message 4840 which relays the change request in supervisor P-unit 4802. Based on message 4840, supervisor P-unit 4802 performs operations 4846 to facilitate the change in configuration state. By way of illustration and not limitation, operations 4846 comprises supervisor P-unit 4802 configuring one or more cores of the processor which includes supervisor P-unit 4802. Alternatively or in addition, operations 4846 comprises supervisor P-unit 4802 performing any of various calculations and/or other processes to determine a configuration of another processor at a different IC die.

In some embodiments, HPM driver 4822 further sends a message 4842, based on message 4838, to indicate to OS 4820 that one or more processor cores are expected to be offline (e.g., including a core of a processor which also comprises one of supervisee P-units 4803_1, 4803_2). In one such embodiment, OS 4820 perform operations 4844, in response to message 4842, to suspend or otherwise prepare an executing process for the one or more cores being offline.

In one example embodiment, operations 4846 results in supervisor P-unit 4802 identifying, for one or each of supervisee P-unit 4803_1 and supervisee P-unit 4803_2, a respective configuration to be performed by said supervisee P-unit. By way of illustration and not limitation, supervisor P-unit 4802 sends to supervisee P-unit 4803_1 a message 4848 which specifies or otherwise indicates a first configuration to be provided for one or more cores of the processor which includes supervisee P-unit 4803_1. Alternatively or in addition, supervisor P-unit 4802 sends to supervisee P-unit 4803_2 a message 4850 which specifies or otherwise indicates a second configuration to be provided for one or more cores of the processor which includes supervisee P-unit 4803_2. Based on message 4848, supervisee P-unit 4803_1 performs operations 4852 to provide the first configuration—e.g., wherein supervisee P-unit 4803_2 performs other operations 4854 based on message 4850 to provide the second configuration.

Subsequently, supervisee P-units 4803_1, 4803_2 send respective messages 4856, 4858 which indicate to supervisor P-unit 4802 that the first and second configurations have been completed. In one such embodiment, supervisor P-unit 4802 sends a message 4860—e.g., based on one or both of messages 4856, 4858—to notify OS 4820 that one or more previously-offline cores have been (or are expected to be) available again. In response to message 4860, OS 4820 performs operations 4862 which prepare to resume execution of one or more software operations with the one or more previously-offline cores.

Figure 49A:
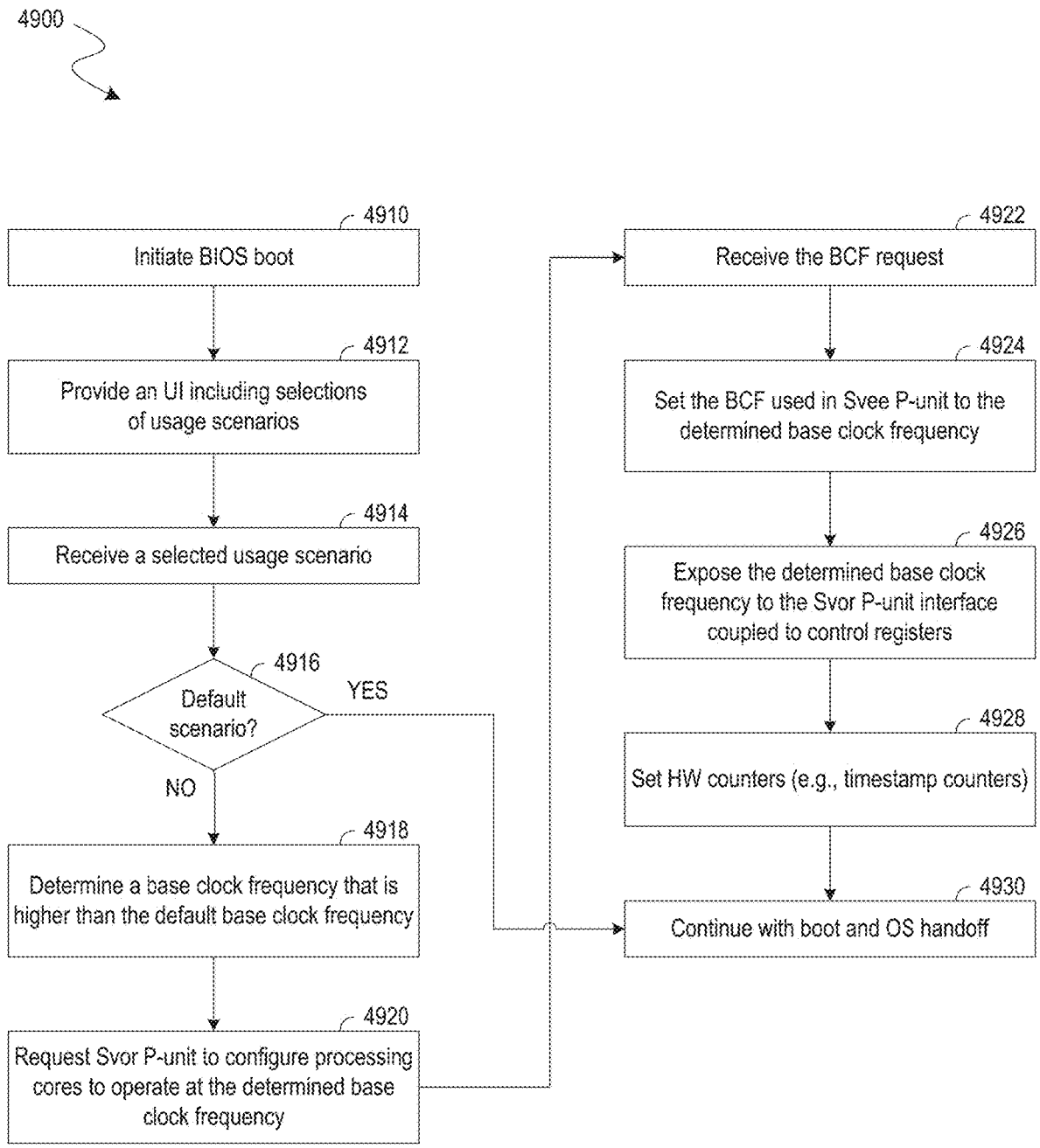
FIGS. 49A, 49B illustrate flow diagrams each showing respective features of a method to determine a base clock frequency of a multi-die package according to a corresponding embodiment.

FIG. 49A illustrates method 4900 to determine base clock frequency via a HPM architecture according to an embodiment of the present disclosure. To illustrate certain features of various embodiments, method 4900 is described with reference to operations performed with functionality of packaged device 4600. However, method 4900 is performed with any of a variety of additional or alternative HPM resources, in different embodiments.

In the illustrative embodiment shown in FIG. 49A, method 4900 comprises—or alternatively, is based on—a boot process of packaged device 4600 (at 4910). A controller (e.g., P-unit 4602) of processor 4640 reads the sequence of instructions stored in the BIOS chipset to set up different devices associated with packaged device 4600. In some embodiments, the boot process also presents status of the boot process on a display device. Responsive to executing instructions to set up processors of packaged device 4600 (e.g., including processors 4640, 4670), method 4900 comprises the boot process displaying, on the display device, a list of usage scenarios for the user to choose (at 4912). In some embodiments, presenting of the list of usage scenarios is based on communications between the boot process and P-unit 4602 via interface 4654—e.g., wherein such communications are to provide information which P-unit 4602 receives from P-unit 4603 and/or one or more other supervisee P-units of packaged device 4600. Each usage scenario specifies a set of parameters for a corresponding one or more processor cores. By way of illustration and not limitation, such a set of parameters includes a target number of processing cores to be used, a target thermal design power (TDP), a target workload (e.g., as a percentage of the TDP), a target reliability measurement, and/or the like. In various embodiments, the list of usage scenarios includes scenarios for processors which are at different respective IC dies of packaged device 4600. Alternatively or in addition, the list of usage scenarios includes a usage scenario for a set of processing cores including cores of different respective processors (at different respective IC dies).

The user selects, from the list of usage scenarios, a usage scenario that matches his or her need. At 4914, the system boot instructions receive the selection and, at 4916, further determine whether the selected usage scenario is a default usage scenario—e.g., where the default usage scenario is the one of those scenarios tested by a manufacturer and assigned with the base clock frequency value labeled on the processor. Responsive to determining that the selected usage scenario is the default usage scenario, at 4930, the boot process continues with other instructions to set up devices other than the processors of packaged device 4600 (e.g., including processors 4640, 4670), while said one or more processors are to run each at a respective default base clock frequency. Subsequently, control is transferred to system software 4690 after the boot process completes.

Responsive to determining that the selected usage scenario is not the default usage scenario, at 4918, the boot process continues with executing instructions to determine for each of one or more cores—e.g., including one of cores 4672 (and, for example, one of cores 4642)—a respective target base clock frequency based on the selected usage scenario. The list of usage scenarios is constructed, for example, during the manufacturing of the processor as additional usage scenarios and corresponding base clock frequency determined. The controller (e.g. P-unit 4602 executing pCode 4652) determines the one or more target base clock frequency values for the selected usage scenario. In one embodiment, this is implemented as a conversion table including mappings from usages scenarios to target base clock frequency values. For example, the table contains a list of active core counts and a corresponding base frequency value. Depending on the selected number of active core count, the corresponding base frequency value will be used. A determined target base clock frequency value is associated with a given one or more processors—e.g., including processor 4670 (thus, for all processing cores 4672 of processor 4670). In one such embodiment, the determined target base clock frequency value is also associated with fewer than all of the processing cores of a given processor. At 4920, the boot process continues with executing instructions to transmit a base clock frequency request to supervisor P-unit 4602. The base clock frequency request includes the target base clock frequency value and optionally, the number of processing cores associated with the target base clock frequency value.

At 4922, P-unit 4602 receives via interface 4654 the base clock frequency request from the execution of instructions stored in BIOS circuitry 4630. At 4924, P-unit 4602 updates to the target base clock frequency value a base clock frequency value used in a supervisee P-unit (by one or more other algorithms in pCode 4682, for example)—e.g., where P-unit 4602 communicates a corresponding base clock frequency message to P-unit 4603. In some embodiments, P-unit 4602 additionally or alternatively updates a base clock frequency value used in one or more algorithms in pCode 4652 to the same, or another, target base clock frequency value in the received request.

For example, one or more such pCode algorithms adjust a processor workload to prevent violation of a corresponding TDP and/or other performance limitation. Such a workload is adjusted, for example, by offloading the task to another processing device, or by reducing the base clock frequency values of one or more processing cores. In various embodiments, P-unit 4602 signals P-unit 4603 to set up base clock frequency values for processor 4670 and/or one or more of processing cores 4672—e.g., wherein P-unit 4602 further sets up base clock frequency values for processor 4640 and/or one or more processing cores 4642.

In one embodiment, at 4926, supervisor P-unit 4602 exposes one or more such target base frequency values on interface 4654—e.g., wherein a CPUID (or similar) instruction exposes one or more base clock frequency values each for a respective processor, and/or exposes one or more model specific registers (MSRs) each of a respective core. The exposure of the target base clock frequency can be achieved by making some or all of registers 4644, 4646, 4648, 4674, 4676, 4678 visible to system software 4690. This allows system software 4690 to inquire the target base frequency values. If P-unit 4602 receives a base clock frequency request including a target base clock frequency value for processor 4670 (i.e., all processing cores 4672), P-unit 4602 signals P-unit 4603 to store the target base clock frequency value in control register 4674. Processor 4670 (and all processing cores 4672) runs according to the target base clock frequency value, where the target base clock frequency value can be higher than the labeled value. If P-unit 4602 receives the base clock frequency request including a set (e.g., fewer than all) of processing cores 4672 and their corresponding target base clock frequency values, P-unit 4602 signals P-unit 4603 to store these target base clock frequency values in corresponding control registers 4676. P-unit 4602 also sets activity status (e.g., corresponding bits in the affinity mask) associated with the set of processing cores 4672 to the active status, allowing them to run at the target base clock frequency values. These target base clock frequency values can be different from (e.g., higher than) the labeled value. Alternatively, or in addition, if P-unit 4602 similarly accesses some or all of registers 4644, 4646, 4648 to determine operations of cores 4642 and/or other circuitry of processor 4640.

At 4928, P-unit 4602 optionally sets other hardware components that run based on a selected base clock frequency. For example, P-unit 4602 sets up a timestamp counter (TSC) to run at the target base clock frequency value. Responsive to setting all hardware components to run at the target base clock frequency, at 4930, the boot process continues with other instructions to set up devices other than processors 4640, 4670. In another embodiment, system software 4690 also facilitates a presentation of usage scenarios for the user to choose. Based on the user selection, system software 4690 transmits, via interface 4654, a base clock frequency request to P-unit 4602 to request a change of a respective one or more base clock frequency values for one or more processors—e.g., including one or both of processors 4640, 4670—and/or for one or more processing cores (such as some or all of cores 4642, 4672). P-unit 4602 similarly sets up processor 4640, and/or signals P-unit 4603 to set up processor 4670, to run at a respective target-based clock frequency.

Figure 49B:
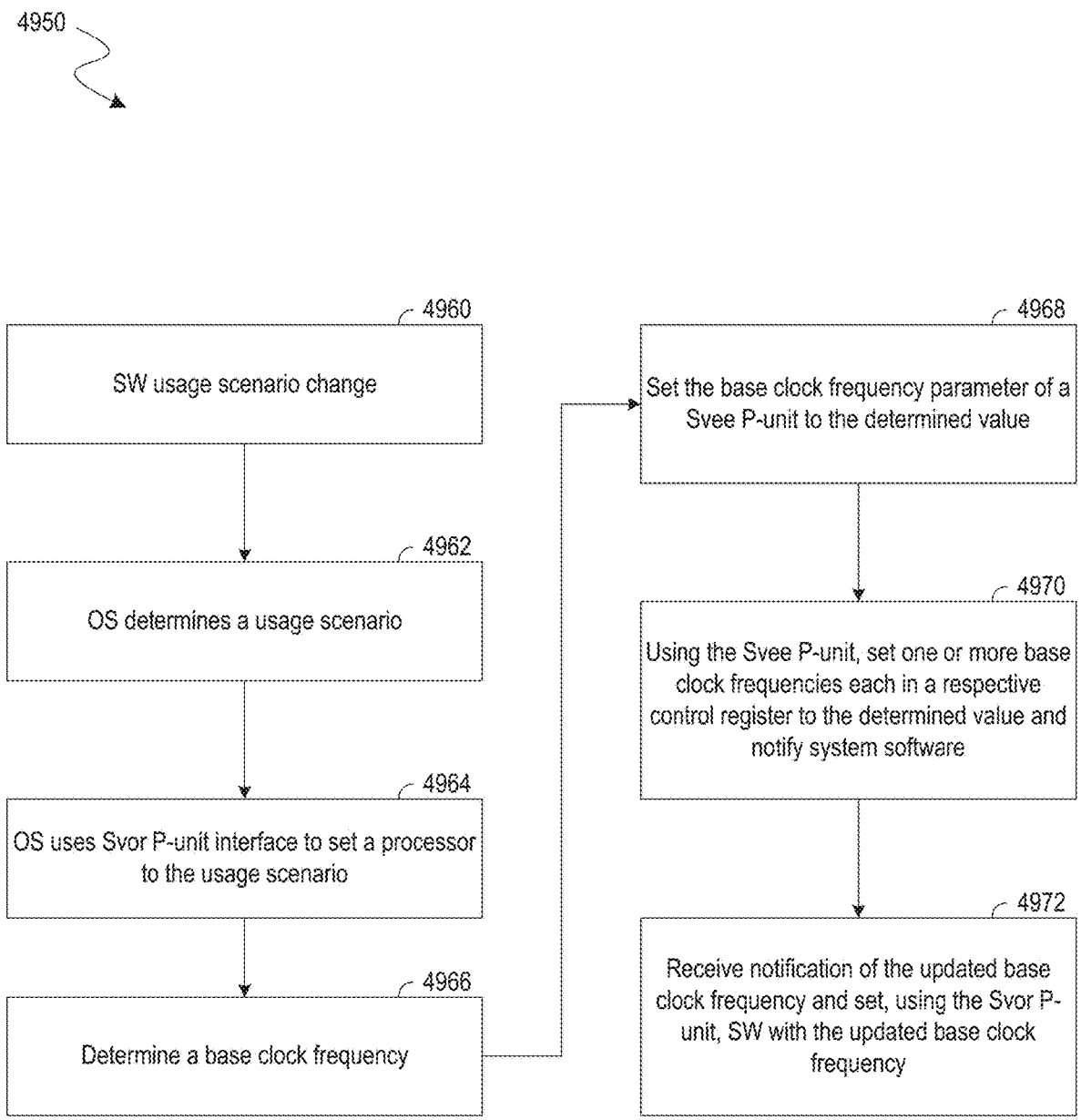

FIG. 49B illustrates a method 4950 to change base clock frequency based on usage scenarios according to another embodiment of the present disclosure. To illustrate certain features of various embodiments, method 4950 is described with reference to operations performed with functionality of packaged device 4600. However, method 4950 is performed with any of a variety of additional or alternative HPM resources, in different embodiments.

As shown in FIG. 49B, at 4960, an actual or expected/required change to a usage scenario detected—e.g., due to a change in the software environment. At 4962, responsive to detecting the usage scenario change (e.g., change from a first usage scenario to a second usage scenario), system software 4690 determines a new usage scenario for one or more processors including (for example) processor 4670 or some other processor which comprises a supervisee P-unit of the HPM architecture. In one such embodiment, the new usage scenario specifies a target number of processing cores in a given one or more processors to be used, a target thermal design power, a target workload (e.g., as a percentage of the TDP), a target reliability measurement, and/or the like. At 4964, system software 4690 running on processor 4640 provides the new usage scenario to P-unit 4602 via interface 4654—e.g., to request an update of a base clock frequency value for processor 4670 and/or one or more processing cores 4672 (and, in some embodiments, to request an update of a base clock frequency value for processor 4640 and/or one or more processing cores 4642).

At 4966, supervisor P-unit 4602 receives the new usage scenario and, in some embodiments, calculates a target base clock frequency value and optionally, a number of processing cores to operate at the target base clock frequency value. In an alternative embodiment, supervisor P-unit 4602 signals P-unit 4603 to calculate the target base clock frequency value and/or the number of cores to operate at the target base clock frequency value. Similar to the booting process, at 4968, P-unit 4602 signals P-unit 4603 to update parameters associated with pCode 4682 to reflect a target base clock frequency value. Thus, pCode 4682 monitors processor 4670 based on the target base clock frequency value. In some embodiments, P-unit 4602 further updates parameters associated with pcode 4652 to reflect the same, or another, target base clock frequency value.

At 4970, P-unit 4603 stores one or more clock frequency values in BCF register 4674 and/or control registers 4676 associated with those of target processing cores 4672 which (per affinity mask 4678) are to be active. Such storing enables processor 4670 and/or one or more processing cores 4672 each to run at a respective target base clock frequency value under the new usage scenario. Responsive to making processor 4670 ready to run at the target base clock frequency value, P-unit 4603 signals P-unit 4602 to notify system software 4690, via interface 4654, of the base clock frequency value update. In one embodiment, P-unit 4602 sends the notification by triggering an interrupt event that can be trapped by system software 4690.

At 4972, system software 4690 running on processor 4640 receives (e.g., by detecting the interrupt event) the notification of base clock frequency value update. The notification includes, for example, the target base clock frequency value at which processor 4670 (or a set of processing cores 4672) is to run. In this way, packaged device 4600 dynamically changes its base clock frequency value based on the usage scenario.

Figure 50:
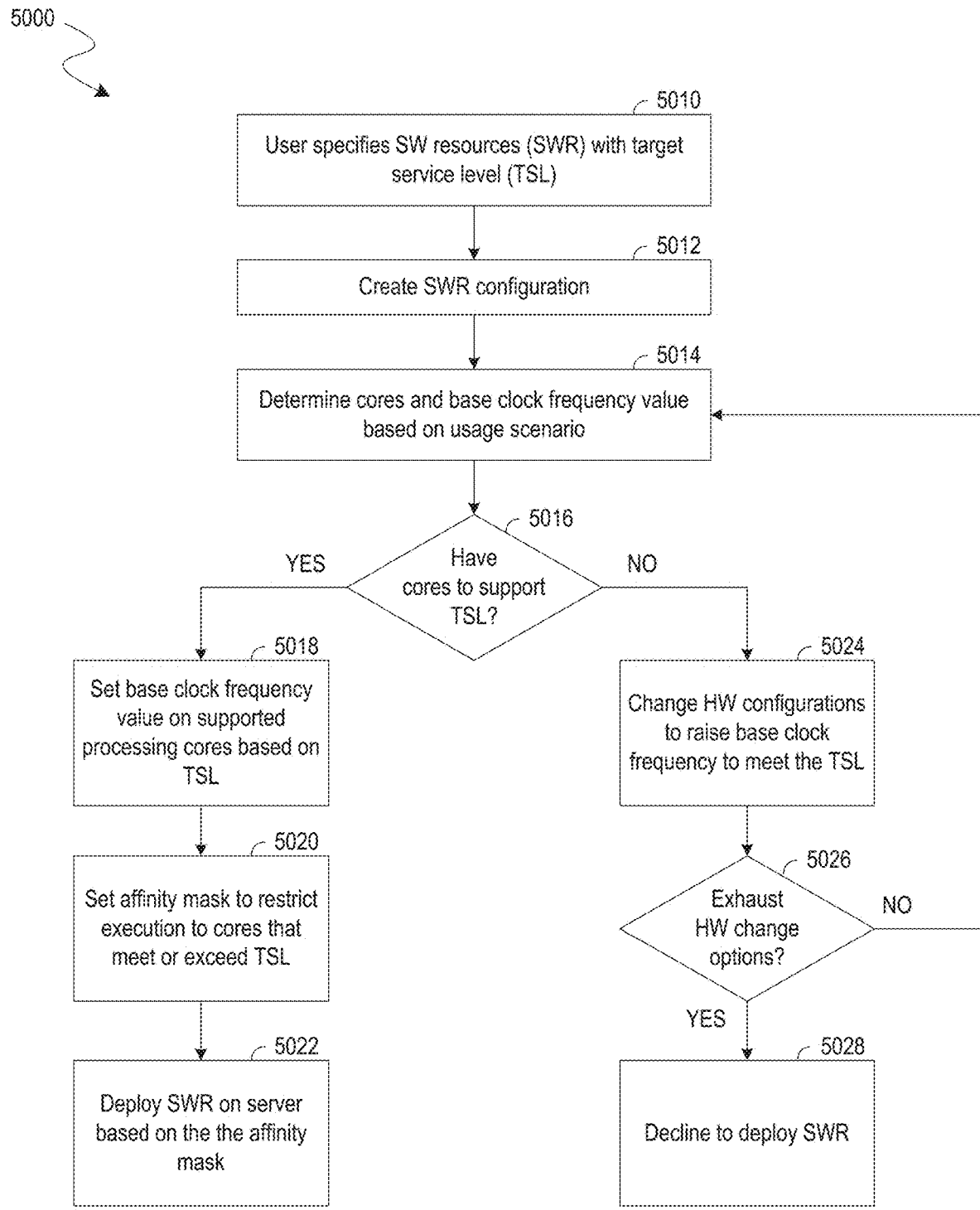
FIG. 50 illustrates a flow diagram showing features of a method to adjust clock frequencies of a multi-die package values according to an embodiment.

FIG. 50 illustrates a method 5000 to adjust the base clock frequency values to meet a target service level according to an embodiment of the present disclosure. To illustrate certain features of various embodiments, method 5000 is described with reference to operations performed with functionality of packaged device 4600. However, method 5000 is performed with any of a variety of additional or alternative HPM resources, in different embodiments.

As shown in FIG. 50, at 5010, system software 4690 executing on processor 4640 receives, from a user thereof, a request which specifies a target service level under which a set of one or more software objects are to run. The target service level includes, for example, the time required to accomplish a specific task. Thus, in one illustrative scenario, the target service level is satisfied by utilizing different combinations of processing cores running at different base clock frequency values. At 5012, system software 4690 generates the set of software objects (e.g., VMs or containers) and stores the target service level in a service level data structure. At 5014, system software 4690 determines, via interface 4654, which available processing cores (at their current base clock frequency values) can support the target service level stored in the service level data structure.

For example, responsive to communications with system software 4690 via interface 4654, P-unit 4602 communicates with P-unit 4603 (and, in some embodiments, one or more other supervisee P-units of packaged device 4600) to determine the availability of respective processing resources at one or more IC dies other than IC die 4640. Based on said communications with one or more supervisee P-units, P-unit 4602 provides an output via interface 4654 to identify to system software 4690 an availability of cores and, for example, available power budget of said cores (e.g., wherein available power budget is represented to system software 4690 as an available frequency budget).

At 5016, system software 4690 further determines, based on such communication with P-unit 4602, whether there are enough available processing cores to support the target service level. Responsive to determining that there are enough processing cores to support the target service level requested by the user, at 5018, system software 4690 signals P-unit 4602, via the API, to cause P-unit 4602 to set up these supported processing cores to run at their current base clock frequency values. At 5020, system software 4690 further executes instructions to set up the affinity mask to restrict services, which are to be provided to the user, to those provided with one or more of the available and capable processing cores identified at 5014 and 5016. At 5022, system software 4690 deploys software objects on processor 4640 that run on the identified processing cores according to the affinity mask.

Responsive to determining that there are not enough processing cores to support the target service level requested by the user, at 5024, system software 4690 instructs P-unit 4602 to increase one or more base clock frequencies for the available processing cores each to a respective target base clock frequency value, thus meeting the target service level requested by the user. In one such embodiment, P-unit 4602 signals P-unit 4603 (and/or one or more other supervisee P-units) to variously increase some or all of the one or more base clock frequencies. At 5026, P-unit 4602 determines—e.g., based on communications with one or more supervisee P-units such as P-unit 4603—whether hardware change options, to satisfy the target service level, have been exhausted. In one embodiment, the determination is based on an exceeding of a threshold number of times that a base clock frequency value has been increased. Alternatively or in addition, the determination is based on an exceeding of an upper limit of a base clock frequency value. If P-unit 4602 determines that hardware change options are not exhausted, P-unit 4602 signals system software 4690 (e.g., by sending an interrupt event via interface 4654) to which of the the available processing cores (at their proposed base clock frequency values) are sufficient for the one or more software objects to perform tasks at the target service level. If P-unit 4602 determines that hardware change options are exhausted, at 5028, P-unit 4602 notifies system software 4690 (e.g., by sending an interrupt event via interface 4654) to decline the deployment of software objects requested by the user, or alternatively to offline the software objects to other systems.

Figure 51:
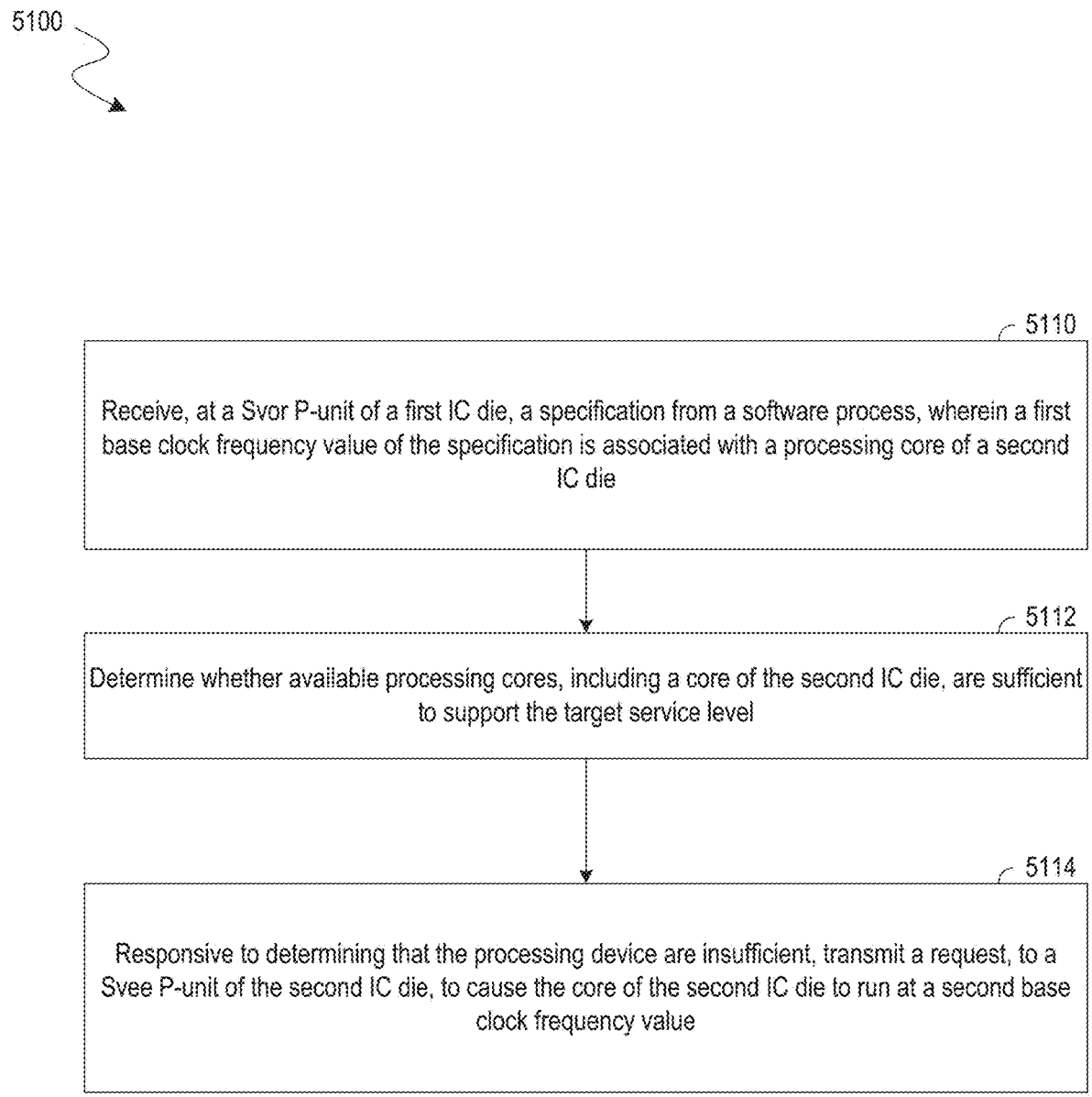
FIG. 51 illustrates a flow diagram showing features of a method to set a base clock frequency value with a hierarchical power management architecture according to an embodiment.

FIG. 51 is a block diagram of a method 5100 to set the base clock frequency value based on a target service level according to an embodiment of the present disclosure. Method 5100 is performed by processing logic that includes hardware (e.g., circuitry, dedicated logic, programmable logic, microcode, etc.), software (such as instructions run on a processing device, a general purpose computer system, or a dedicated machine), firmware, or a combination thereof. For simplicity of explanation, the method 5100 is depicted and described as a series of acts. However, acts in accordance with this disclosure can occur in various orders and/or concurrently and with other acts not presented and described herein. Furthermore, not all illustrated acts are performed to implement the method 5100 in accordance with the disclosed subject matter. In addition, those skilled in the art will understand and appreciate that the method 5100 could alternatively be represented as a series of interrelated states via a state diagram or events.

To illustrate certain features of various embodiments, method 5100 is described with reference to operations performed with functionality of packaged device 4600. For example, at 5110, the supervisor P-unit 4602 of processor 4640 receives, via interface 4654, a specification from system software 4690, the specification comprising a target service level associated with a software object. The target service level comprises a first base clock frequency value associated with one or more of the cores 4672 of processor 4670.

At 5112, P-unit 4602 determines—e.g., based on communications with P-unit 4603—whether an availability of processing cores of packaged device 4600 (including one or more of cores 4672) is sufficient to support the target service level.

At 5114, responsive to determining that the processing device are insufficient, P-unit 4602 transmits a request, to P-unit 4603, to cause one or more of cores 4672 to run at a second base clock frequency value that is higher than the first base clock frequency value.

Figure 52A:
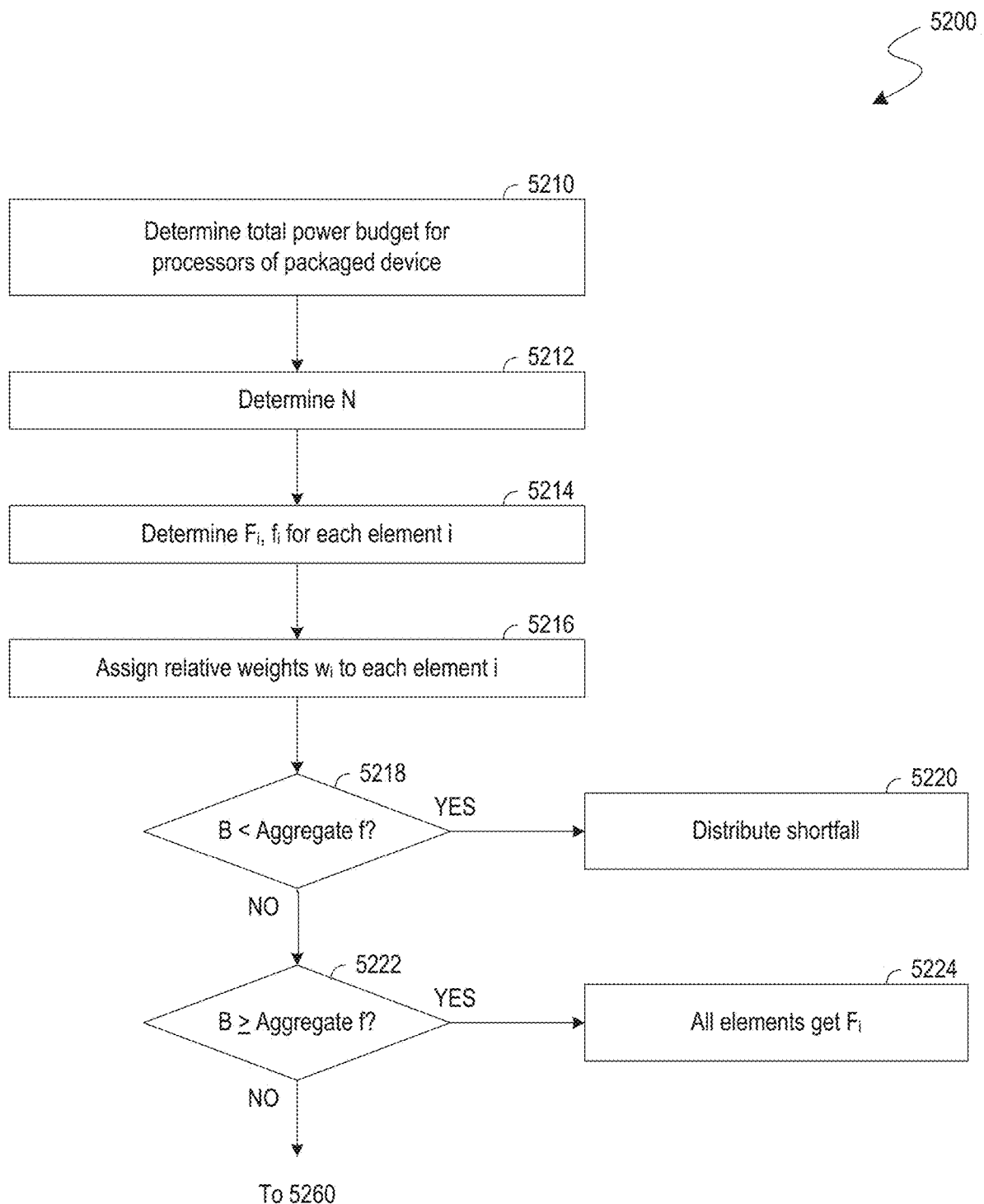
FIGS. 52A-52B illustrate flow diagrams each showing respective features of a method to distribute a frequency budget among various compute elements of a multi-die package according to a corresponding embodiment.
Figure 52B:
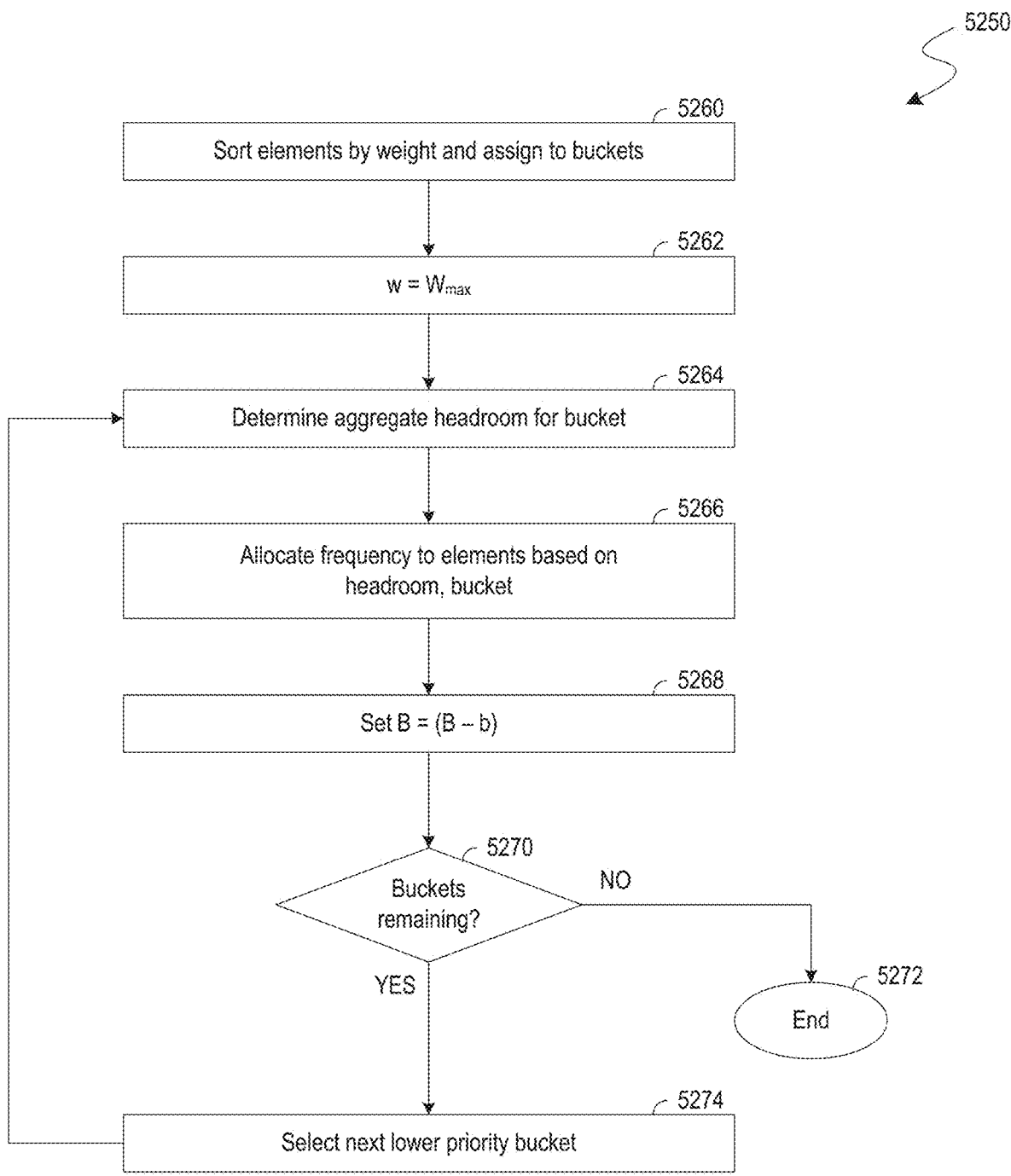

FIGS. 52A, 52B show flow diagrams 5200, 5250 illustrating a method distributing frequency to multiple compute elements, according to an embodiment of the invention. The method shown in diagrams 5200, 5250 is one example of an embodiment which is provided, for example, with functionality of packaged device 4600—e.g., wherein the method includes or is otherwise based on method 4700.

In the following description of flow diagrams 5200, 5250, these terms are defined:

N—the total number of elements across which power is being distributed.
i—one of elements 1 through N
$f_i$—The minimum frequency that is used for element i when a minimum performance level must be met.
$F_i$—The maximum desired frequency for element i. That is, any higher frequency that achieves performance for element i beyond the performance level desired. Cutting off at this frequency allows other, higher priority elements to use the additional available performance.

$w_i$—Weight. A unitless measure of the relative priority of the compute element i. In general, higher weights indicate higher priority.

$W_{max}$—The maximum weight that any compute element is assigned.

$N_w$—The number of compute elements with a particular weight w.

bucket—a conceptual term indicating a group of all the elements that have been assigned the same weight w.

$b_w$—The combined frequency budget granted to all compute elements with weight w. Since power consumption and heat generation are the ultimate resources of concern, and both are proportional to frequency, the term 'frequency budget' is used in the same manner as 'power budget' or 'energy budget' in other descriptions.

B—the aggregate frequency budget granted to all compute elements combined in all buckets.

$A_w$—The 'aggregate frequency headroom' of weight w. That is, the collective frequency that all elements in a bucket can possibly utilize beyond the minimum requested frequency of every element in that bucket, before being clipped due to the maximum frequency Fw of each element. In other words, $A_w$ is equal to the sum of $(F_i-f_i)$ for all the elements in that bucket. All this headroom might not be useable. It is limited by the budget $b_w$ available to that bucket.

Pi—The performance (frequency) of compute element i that is output according to the algorithm.

In flow diagram 5200, at 5210 a supervisor P-unit of a packaged device determines the total power budget for processors of said packaged device. In some embodiments this is expressed as a frequency budget—e.g., wherein power-saving operations are based on controlling core frequencies. At 5212, at least some processing resources of the packaged device are divided into N elements, where each element will have an independently-assignable operating frequency. In some embodiments, each element is a processing core, but other embodiments may differ. By way of illustration and not limitation, N is the number of cores of a given processor of one IC die—e.g., where said processor includes a supervisee P-unit. In an alternative embodiment, N is a number of processors of different respective IC dies. For the purposes of this discussion, each element, and the other parameters associated with that element, is indicated with the identifier i, with the values for i ranging from 1 to N. In one such embodiment, at least one of the N elements includes one or more cores of a processor which further comprises a supervisee P-unit, wherein a distribution of frequencies among the N elements is based communications by a supervisor P-unit via an interface with a software process.

For example, at 5214, $F_i$ and $f_i$ are determined for each element i. At 5216, a relative weight $w_i$ is assigned to each element i. For example, referring again to the example embodiment of packaged device 4600, P-unit 4602 determines one or more of the relative weights $w_i$ based on communications via interface 4654 with system software 4690 (or alternatively, with a BIOS process). Weight is a measure of priority, or importance, and multiple elements, for example, have the same weight. In some embodiments, weights of a higher value indicate a higher priority for the corresponding elements, while weights of a lower value indicate a lower priority for the corresponding elements. In some embodiments, the values assigned to the various weights are proportional to their relative priorities (not just rank ordered). In other embodiments, proportionality does not matter. Although shown at a particular place in the flow, the assignment of weights to elements occurs earlier than shown, in other embodiments. In FIGS. 52A, 52B, the values of weights $w_i$, and frequencies $f_i$ and $F_i$ are all shown at certain points in the flow. But in some embodiments, these values are redefined at other times.

At 5218, it is determined if the total frequency budget B is sufficient to provide the minimum requested budget $f_i$ to every element i of the N processing elements of the packaged device. If there is insufficient power for this, the shortfall of available frequency is distributed in various ways at 5220. For example, in some embodiments the frequency shortage is distributed in proportion to the minimum frequency request of each element. In other embodiments, some elements are shut off completely and their intended frequency made available to the remaining elements. Other techniques are also used. In any case, operation 5220 indicates that some or all of the elements will not receive their requested minimum frequency $f_i$. For example, in an illustrative scenario according to one embodiment, P-unit 4602 locally identifies a distribution of one or more frequencies each to a respective one of cores 4672. In an alternative embodiment, P-unit 4602 communicates via fabric 4607 to indicate to P-unit 4603 a frequency budget for multiple cores of processor 4670—e.g., wherein, based on the indicated frequency budget, P-unit 4603 calculates one or more frequency parameters each to be applied to a respective one of cores 4672.

If B is sufficient to meet the minimum requested $f_i$ for all N elements of the packaged device, the supervisor P-unit (or a supervisee P-unit under control of the supervisor P-unit) determines at 5222 if B is sufficient to meet the maximum requested $F_i$ for all elements in the packaged device. If B meets or exceeds this amount, each of the N elements is allocated its $F_i$ at 5224, and any remaining frequency for all elements combined goes unused. But if B is sufficient to supply the aggregate of all while insufficient to supply the aggregate of all $F_i$, then the flow proceeds to 5260 to determine how to distribute the available frequency budget among the various elements.

Continuing with flow diagram 5250 at 5260 in FIG. 52B, the supervisor P-unit (or a supervisee P-unit under control of the supervisor P-unit) sorts the various elements by the weights they were assigned at 5216, and placed into groups (virtual 'buckets'), where every element in a bucket has the same weight. For discussion purposes, each bucket is referred to as 'bucket w', indicating a bucket with elements which all have weight w. After bucketizing the elements at 5260, the flow continues at 5262 by setting $w=W_{max}$, which effectively selects the bucket containing the highest priority elements.

Within this bucket, the aggregate headroom for all the elements in the bucket is determined at 5264. In some embodiments, this is determined by subtracting $f_i$ from $F_i$ for each element in the bucket, and summing the results for all the elements in that bucket. This sum represents aggregate headroom for this bucket, that is, the maximum amount of frequency that is allocated among all the elements in this bucket based solely on $F_i$ and $f_i$. However, the budget $b_w$ is smaller than that maximum amount, and therefore limits that allocation of frequency. Therefore at 5266, the frequency allocated to the elements of this bucket is the lesser of 1) the budget $b_w$ assigned to this bucket, and 2) the aggregate headroom for this bucket. The budget $b_w$ assigned to this bucket is determined is various ways, such as but not limited to scaling the total available budget B by the relative weight of bucket w to the weight of all buckets i≤w (for example, $b_w=[B*n_w*w]/(sum(n_i*i))$. In some embodiments, the distribution of frequency among the elements in this bucket is prorated based on the various parameters, such as but not limited to: 1) the relative values off, 2) the relative values of $F_i$, or 3) the relative headroom for each element.

Once the allocated budget has been distributed to the elements in this bucket at 5266, the remaining overall budget B for the N elements is determined at 5268. In some embodiments, this is determined by subtracting the budget just allocated from the previous budget. At 5270, if all buckets have been processed as described in operations 5264-5268, then the process ends at 5272. But if not, the next lower priority bucket is selected at 5274, and the flow returns to 5264 to distribute the frequency budget within that bucket. This continues until all buckets have been processed, or until all frequency budget has been allocated.

Figure 53:
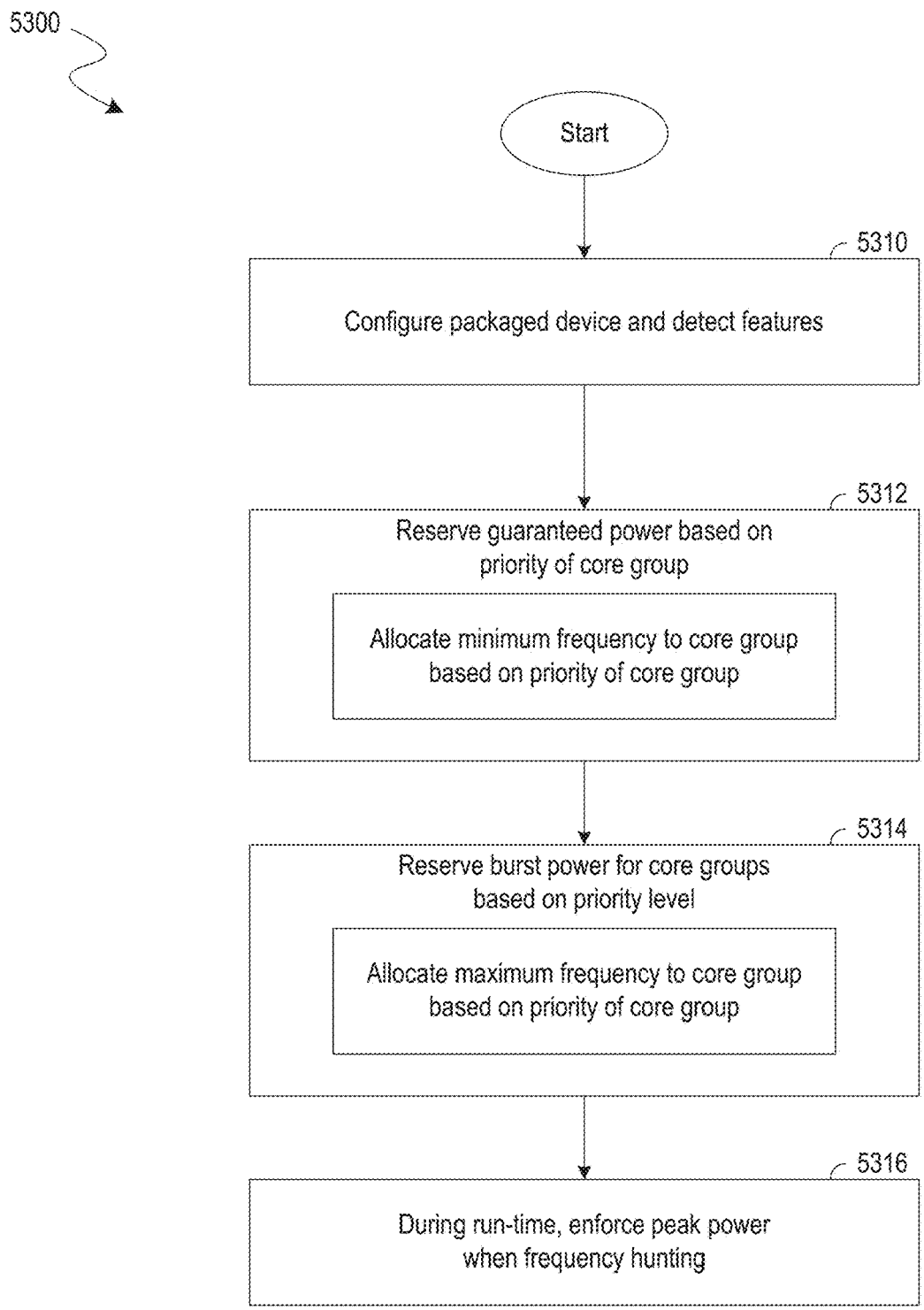
FIGS. 53A-53C illustrate flow diagrams each showing respective features of a method to reserve power for respective groups of processor cores according to a corresponding embodiment.

FIG. 53 illustrates operations of a method 5300 to variously reserve power for respective groups of processor cores according to an embodiment. Method 5300 illustrates an embodiment, wherein power is reserved to a group core based on communication between a software process and a supervisor P-unit of a HPM architecture. Method 5300 is performed, for example, with functionality of packaged device 4600—e.g., wherein method 5300 includes or is otherwise based on method 4700.

As shown in FIG. 53, at 5310, packaged device feature configuration occurs. Configuring the packaged device includes variously allocating cores each to a respective core group for the purpose of power budget allocation (e.g., by frequency tuning). In one such embodiment, at least one core group includes one or more cores of a processor (such as processor 4670) which further comprises a supervisee P-unit of the HPM architecture. Allocation of the one or more cores to said core group is based (for example) on communication, via an interface such as interface 4654, between a supervisor P-unit of the HPM architecture and an OS or other software process executing (for example) at a processor which includes the supervisor P-unit. Alternatively or in addition, allocation power budget (e.g., including allocation of one or more frequencies) to said core group is based on the same or other communications with said interface of the supervisor P-unit.

In an embodiment, the packaged device includes multiple IC dies which each include a respective processor, and (for example) a respective one or more other resources—such as I/O circuitry, accelerator circuitry (e.g., decryption, encryption, TCP segmentation offload, etc.) and so forth—that can be power or frequency controlled. The packaged device is prepared, for example, to receive tags each identifying priority of a respective process (e.g., that of a function as a service or a 5G network slice) so that the packaged device can allocate the process to the appropriate priority core group. In one such embodiment, the tags are received via interface 4654 (or other such interface of a supervisor P-unit).

At 5312, an amount of guaranteed power is reserved for cores in a core group based on priority—e.g., where the reserving at 5312 is performed with the supervisor P-unit (and/or a supervisee P-unit under control of the supervisor P-unit). In an example embodiment, cores of a core group are allocated an operating frequency band from minimum frequency depending on a priority level of the core group. The guaranteed power is, for example, a minimum power level or minimum frequency level. In one example embodiment, a core group identified as highest priority, to run critical or highest priority processes, is assigned a highest base (minimum) frequency. A core group identified as next highest priority is then assigned a same or lower base frequency (minimum), and so forth. Accordingly, a highest priority core group is allocated to perform critical components, for example, whereas a lower priority core group can be allocated to perform less critical, lower priority processes.

At 5314, a burst power level is reserved for a core group based on priority level—e.g., where the reserving at 5314 is performed with the supervisor P-unit (and/or a supervisee P-unit under control of the supervisor P-unit). For example, the burst power level for a given core group is configured by configuring a peak clock frequency applied by that core group. In some embodiments, the burst power level is allocated based on the priority level of the core group. For example, a core group identified as highest priority is granted the highest burst power level (e.g., frequency level). Similarly, a core group identified as next highest priority is granted the next highest burst power level (e.g., frequency).

At 5316, during runtime of processes on the core group, a check is made that a frequency selected does not result in a TDP of a given processor being met or exceeded. If a selected frequency for a core group causes the TDP to be met or exceeded, the frequency for the core group is reduced—e.g., by the supervisor P-unit (and/or a supervisee P-unit under control of the supervisor P-unit)—based on group priority, until the TDP is not met or exceeded. For example, Running Average Power Limit (RAPL) counter values can be used to estimate whether TDP is being met or not met.

Figure 54A:
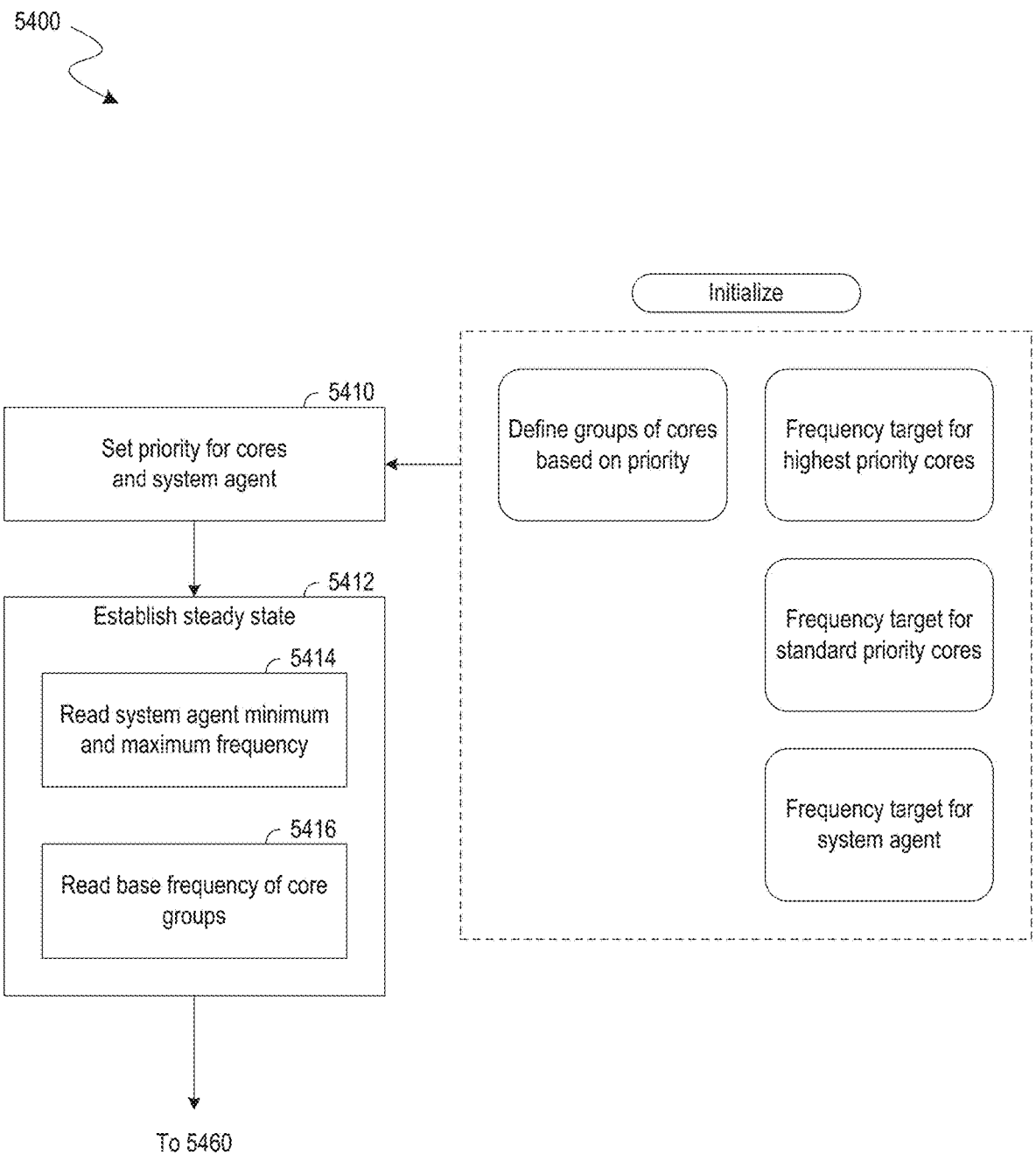
FIGS. 54A, 54B illustrate flow diagrams each showing respective features of a method to configure operational frequencies of a multi-chip package according to a corresponding embodiment.
Figure 54B:
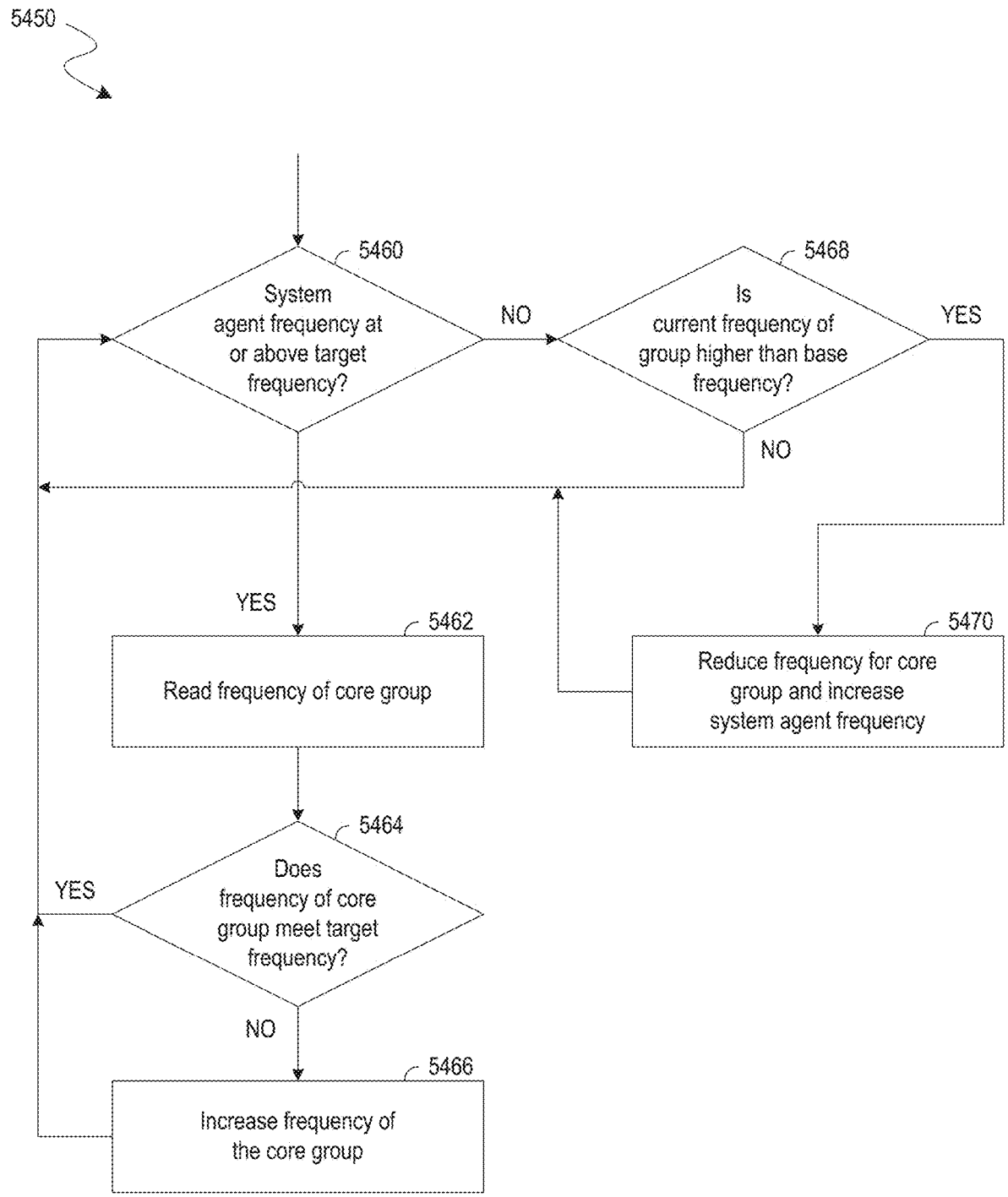

FIGS. 54A, 54B show flow diagrams 5400, 5450 of a illustrates operations of a method for configuring operational frequencies of a multi-die package, based on communication between a software process and a supervisor P-unit of a HPM architecture, according to an embodiment. The method illustrated by flow diagrams 5400, 5450 is performed, for example, with functionality of packaged device 4600—e.g., wherein said method includes (or is otherwise based) on method 4700. Alternatively or in addition the method is performed with a supervisor P-unit (or a supervisee P-unit under control of the supervisor P-unit) of the multi-die packaged, in some embodiments.

In an embodiment, the method illustrated by FIGS. 54A, 54B facilitates frequency tuning, frequency hunting and/or power assignment to resources at runtime—e.g., where some or all such operations are based on relative priorities of resources and, for example, subject to a minimum required system agent (uncore) performance. Frequency hunting attempts to step up an operational frequency to the maximum level for a group or one or more cores—e.g., while making sure TDP (or some other constraint) is not met or exceeded, while avoiding oversubscription of one or more processors, while avoiding a system agent having to throttle frequency, and/or the like.

In some embodiments, the method is based on, or alternatively includes, an initialization comprising (for example) defining a group of cores in a priority group, setting a target frequency for a highest priority group, setting a frequency target for a standard priority group, setting a frequency target (e.g., lower limit) for a system agent, and/or the like. In one such embodiment, the initialization includes or is otherwise based on communication, via an interface such as interface 4654, between a supervisor P-unit of the HPM architecture and an OS or other software process executing (for example) at a processor which includes the supervisor P-unit. For example, based on such communication, a given core group is defined as including one or more cores of a processor which further comprises a supervisee P-unit of the HPM architecture. Alternatively or in addition, such communications determine a priority of the given core group relative to one or more other core groups.

At 5410, one or more priority levels for cores and system agent are variously set—e.g., wherein the supervisor P-unit (or a supervisee P-unit under control of the supervisor P-unit) sets a priority for cores of a processor which includes a supervisee P-unit of the HPM architecture. In an illustrative scenario according to one embodiment, a Priority 1 (for example, a top priority) is given to a system agent of an IC die—e.g., wherein a Priority 2 is given to a first group of one or more cores of the IC die, and a Priority 3 is given to second group of one or more other cores of the IC die. At 5412, a steady state for the packaged device is set—e.g., wherein 5412 includes 5414 and/or 5416. At 5414, a system agent minimum and maximum frequency is read from a configuration file. For example, the initialization operation specifies parameters in the configuration file. At 5416, respective base frequencies of core groups of various priority levels are read.

Continuing to 5460 (FIG. 54B), a determination is made—e.g., by the supervisor P-unit or, alternatively, by a supervisee P-unit under control of the supervisor P-unit—as to whether a system agent frequency of a given IC die (e.g., one which includes the supervisee P-unit) is at or above a target frequency for the system agent. In an embodiment, the target frequency is a lower limit frequency for the system agent and (for example) specified to the supervisor P-unit at initialization. If the system agent frequency is at or above a target frequency for the system agent, then 5462 follows. If system agent frequency is below a target frequency for the system agent, 5468 follows.

At 5462, a frequency for a core group (e.g., including one or more of cores 4672) is read. At 5464, a determination is made as to whether the frequency of the core group meets a target maximum frequency. If the frequency of the core group meets a target maximum frequency, then 5460 follows. If the frequency of the core group does not meet a target frequency, then 5466 follows.

At 5466, a frequency of the core group is increased in frequency—e.g., subject to the frequency not exceeding a target maximum frequency. For example, the frequency is increased by a step interval of some predetermined value (e.g., 100 MHz). Action 5460 follows action 5466. In some examples, frequency is increased into a "turbo" frequency range or span available to a core group. For example, a turbo frequency range is available using Intel® Turbo Boost Technology.

Where a frequency of operation of a system agent is below a target frequency, at 5468, a determination is made as to whether the current frequency for the core group is higher than a base frequency. The base frequency is a minimum frequency of the core group. If the current frequency for the core group is higher than a base frequency, then 5470 follows. If the current frequency for the group of one or more cores is at or below a base frequency, then 5460 follows.

At 5470, the core group frequency is decreased and system agent frequency is increased. The amount of increase or decrease is, for example, 100 MHz or any other suitable step frequency amount. In some examples, the system agent frequency is set to a maximum (target) level. In some examples, 5468 and 5470 attempts to reduce frequency of lower priority core groups in order to increase the frequency of the system agent before attempting to reduce a frequency of a higher priority core group.

Figure 55:
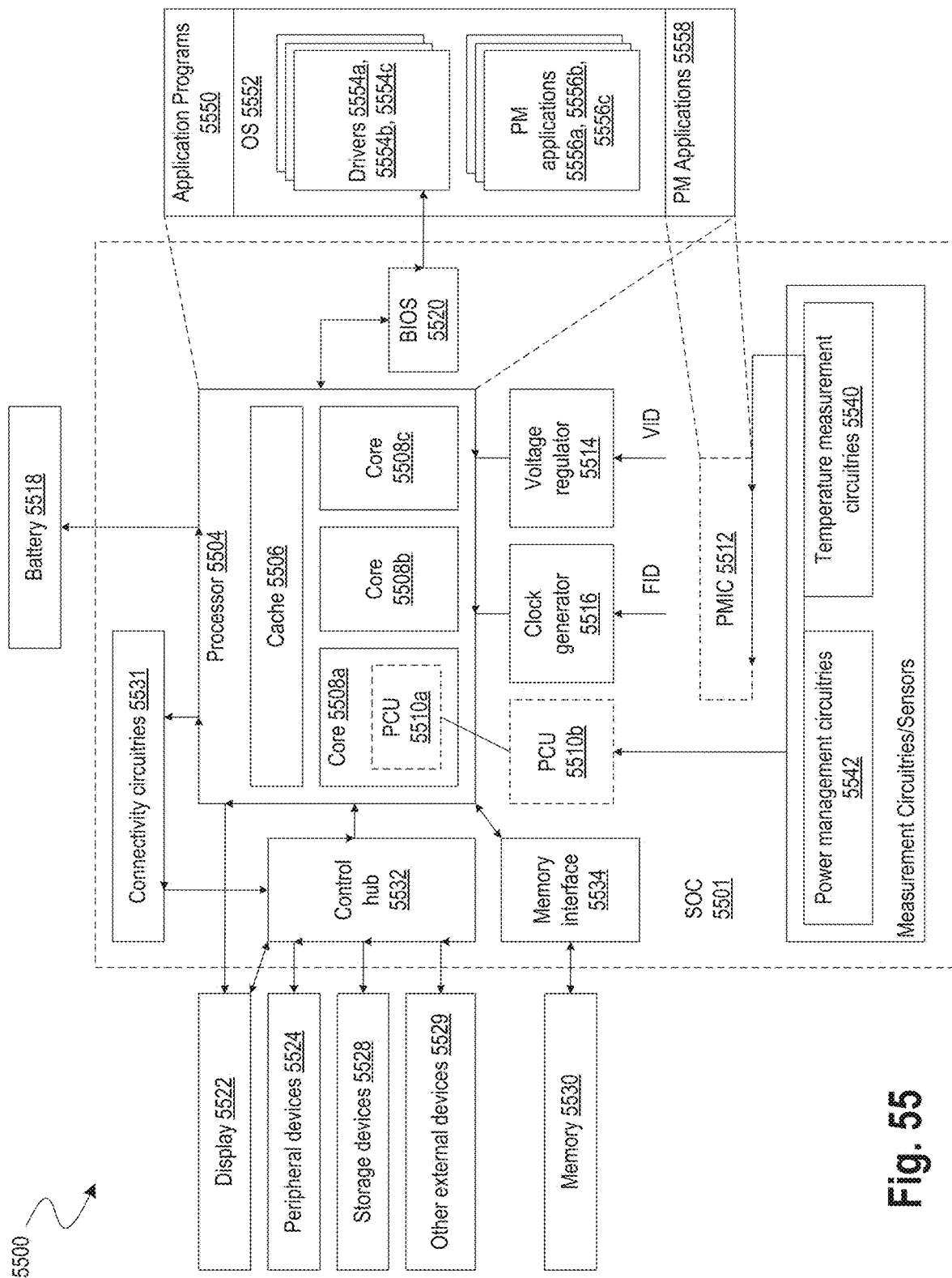
FIG. 55 illustrates a smart device or a computer system or a SoC (System-on-Chip) with HPM, in accordance with some embodiments.

FIG. 55 illustrates a smart device or a computer system or a SoC (System-on-Chip) with HPM, in accordance with some embodiments. In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 55, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing means. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 55, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more cores 5508a, 5508b, 5508c, voltage regulator 5514, memory 5530, a motherboard of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package. Other technical effects will be evident from the various figures and embodiments.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 5510a/b has a capability to enable extra compute and telemetries resources for the runtime support of the pCode. Here pCode refers to a firmware executed by PCU 5510a/b to manage performance of the 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SCO 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the $P_{soc,pk}$ SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level ($P_{soc,th}$) based on the available battery power (which changes slowly) and set the SoC throttling peak power ($P_{soc,th}$). In some embodiments, pCode decides the frequencies and voltages based on $P_{soc,th}$. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a plurality of dies including processor dies and I/O dies; a plurality of power management units, wherein each die of the plurality includes a power management unit such that at least one of the power management units is a supervisor unit and at least two of the power management units are supervisee units, wherein the power management units are arranged in a hierarchical manner such that the supervisor unit controls the at least two supervisee units; a first interconnect fabric coupled to the supervisor unit and the supervisee units; and a second interconnect fabric coupled to the supervisor unit and the supervisee units, wherein the second interconnect fabric is faster than the first interconnect fabric.

Example 2: The apparatus of example 1, wherein the second interconnect fabric comprises a synchronous fabric.

Example 3: The apparatus of example 1, wherein each power management unit has access to a dedicated portion of a memory.

Example 4: The apparatus of example 3, wherein each power management unit executes a firmware which includes a transmitter mailbox and a receiver mailbox.

Example 5: The apparatus of example 4, wherein the receiver mailbox stores received data to the dedicated portion of the memory.

Example 6: The apparatus of example 1, wherein the supervisor unit is a first supervisor unit, and wherein the power management units include a second supervisor unit, wherein the second supervisor unit reports to the first supervisor unit.

Example 7: The apparatus of example 1, wherein the processor dies execute an operating system, wherein the operating system communicates with one power management in the apparatus which is the supervisor unit to control power of the apparatus.

Example 8: The apparatus of example 1, wherein the plurality of dies include plug in cards and platform components.

Example 9: An apparatus comprising: a plurality of dies including compute dies and I/O dies; a plurality of power management units, wherein each die of the plurality includes a power management unit such that at least one of the power management units is a supervisor unit and at least two of the power management units are supervisee units, wherein the power management units are arranged in a hierarchical manner such that the supervisor unit controls the at least two supervisee units; and a plurality of maximum power detectors to detect a droop in a voltage of an input power supply rail, wherein each maximum power detector is positioned in one of the compute dies, wherein a compute die positioned between at least two compute dies is an owner of decisions associated with a maximum power detector of the compute die.

Example 10: The apparatus of example 9, wherein the maximum power detectors in the at least two compute dies are disabled.

Example 11: The apparatus of example 9 comprising a plurality of fast droop detectors, wherein each compute die of the plurality includes a fast droop detector.

Example 12: The apparatus of example 11, wherein the fast droop detector in all compute dies are enabled.

Example 13: The apparatus of example 10, comprising a plurality of fast droop detectors, wherein each maximum power detector includes a fast droop detector, wherein the fast droop detectors are enabled even when the maximum power detectors are disabled.

Example 14: The apparatus of example 9, wherein a power management unit of one of the I/O dies is the supervisor unit, and wherein the power management units of the compute dies are the supervisee units.

Example 15: The apparatus of example 9, wherein the maximum power detector of the compute die is a multi-threshold power detector to detect the droop at multiple thresholds including a fast detect threshold to detect a fast droop in the voltage of the input power supply rail.

Example 16: The apparatus of example 15, wherein upon detection of the fast droop, the maximum power detector is to trigger a hard throttle to all processor cores of all the compute dies.

Example 17: The apparatus of example 16 comprising: a first interconnect fabric coupled to the supervisor unit and the supervisee units; and a second interconnect fabric coupled to the supervisor unit and the supervisee units, wherein the second interconnect fabric is faster than the first interconnect fabric, and wherein the hard throttle is sent via the second interconnect fabric.

Example 18: The apparatus of example 16, wherein the hard throttle comprises reduction in an operating voltage and/or frequency of all the compute dies within a predetermined time, thereafter the supervisor unit to send a global shared frequency ceiling for all the supervisee units within a domain of the supervisor unit.

Example 19: The apparatus of example 18, wherein the supervisee units to send a message to the supervisor unit indicative of the global shared frequency ceiling, and wherein the supervisee units to enforce the global shared frequency ceiling within their respective dies.

Example 20: The apparatus of example 19, wherein the compute die, which is the owner of decisions associated with the maximum power detector of the compute die, is to de-assert the hard throttle after the compute dies indicate to the compute die that the global shared frequency ceiling is enforced and the plurality of compute dies operate at a safe power level.

Example 21: The apparatus of example 20, wherein the supervisor unit is to gradually increase the global shared frequency ceiling for compute dies after a predetermined wait time expires from a time the hard throttle is de-asserted.

Example 22: The apparatus of example 15, wherein upon detection that the voltage of the droop crossed one or more of the multiple thresholds while the voltage of the droop does not cross the fast detect threshold, the maximum power detector is to trigger a soft throttle to all processor cores of all the compute dies.

Example 23: The apparatus of example 22, wherein the soft throttle comprises stretching a duty cycle of one or more clocks to all processor cores of the compute die.

Example 24: An apparatus comprising: a plurality of dies including compute dies and I/O dies, wherein each die includes an interconnect fabric having fabric components and interconnect coupling the fabric components; a plurality of power management units, wherein each die of the plurality includes a power management unit such that at least one of the power management units is a supervisor unit and at least two of the power management units are supervisee units, wherein the power management units are arranged in a hierarchical manner such that the supervisor unit controls the at least two supervisee units, wherein each supervisee unit determines a frequency of its interconnect fabric in consultation with neighboring supervisee units and one or more constraints from the supervisor unit.

Example 25: The apparatus of example 24, wherein an individual supervisee unit determines workload activity of its die based on telemetry data and heuristics.

Example 26: The apparatus of example 25, wherein the telemetry data includes change in value of one or more hardware performance counters.

Example 27: The apparatus of example 25, wherein the individual supervisee unit is part of a die coupled to a memory, wherein the heuristics include traffic on a bus coupled between the die and the memory.

Example 28: The apparatus of example 25, wherein the individual supervisee unit receives a current operation voltage and/or frequency of its neighboring supervisee units via an interconnect between the supervisee units.

Example 29: The apparatus of example 28 wherein the individual supervisee unit resolves a frequency request based on frequency requests of neighboring supervisee units.

Example 30: The apparatus of example 29 wherein the one or more constraints include one or more of: maximum total power limit of a socket, minimum total power limit of the socket, minimum performance level of the socket, thermal constraints, or user limits.

Example 31: The apparatus of example 30 wherein the individual supervisee unit determines the frequency of its interconnect fabric by application of a scale factor that converts a core frequency to a frequency for the interconnect fabric.

Example 32: The apparatus of example 24 wherein the interconnect fabric of a die is coupled to an interconnect fabric of another die.

Example 33: The apparatus of example 24 wherein each die includes at least two power management units.

Example 34: A first integrated circuit (IC) chip comprising: a hardware interface to couple the first IC to a second IC chip; and a first P-unit to communicate with a second P-unit of the second IC chip via the hardware interface, and to determine whether the first P-unit is a supervisor P-unit or a supervisee P-unit, wherein, where the first P-unit is determined to be the supervisor P-unit, the first P-unit to send memory class of service (MCLOS) parameters to the second P-unit, wherein the first P-unit is otherwise to receive the MCLOS parameters from the second P-unit; wherein, at the one of the first IC chip or the second IC chip which comprises the supervisee P-unit, the supervisee P-unit is to signal a memory bandwidth allocator, based on the MCLOS parameters, to apply a plurality of memory bandwidth settings to dynamically adjust priorities of memory bandwidths which are to be allocated to one or more workloads to be processed by a plurality of processor cores.

Example 35: The first IC chip of example 34, wherein the MCLOS parameters comprise an identifier of a type of event to be monitored, wherein, at the one of the first IC chip or the second IC chip which comprises the supervisee P-unit, a performance monitor of a memory controller is to generate performance monitoring statistics, based on the identifier of the type of event, by monitoring performance of the one or more workloads by the plurality of processor cores based at least in part on performance monitoring configuration parameters.

Example 36: The first IC chip of example 35, wherein the first P-unit is further to communicate the performance monitoring statistics with the second P-unit.

Example 37: The first IC chip of example 34, wherein the MCLOS parameters comprise information which identifies a correspondence of different levels of a MCLOS classification scheme each with a respective level of another class of service classification scheme.

Example 38: The first IC chip of example 34, wherein the MCLOS parameters comprise an identifier of a monitoring time window.

Example 39: The first IC chip of example 34, wherein one or more of the plurality of memory bandwidth settings comprises a first value for memory bandwidth allocation for a low priority processor core based on an assigned memory class of service of the low priority processor core.

Example 40: The first IC chip of example 39, wherein one or more of the plurality of memory bandwidth settings comprises a second value for memory bandwidth allocation for a high priority processor core based on an assigned memory class of service of the high priority processor core, the first value being less than the second value.

Example 41: A packaged device comprising: a first IC chip comprising a supervisor P-unit; a second IC chip coupled to the first IC chip, the second IC chip comprising: a supervisee P-unit to receive memory class of service (MCLOS) parameters from the supervisor P-unit; a plurality of processor cores; and a memory bandwidth allocator, coupled to the supervisee P-unit and the plurality of processor cores, to apply a plurality of memory bandwidth settings, based on the MCLOS parameters, to dynamically adjust priorities of memory bandwidths allocated for one or more workloads to be processed by the plurality of processor cores.

Example 42: The packaged device of example 41, wherein the MCLOS parameters comprise an identifier of a type of event to be monitored, wherein, at the second IC chip, a performance monitor of a memory controller is to generate performance monitoring statistics, based on the identifier of the type of event, by monitoring performance of the one or more workloads by the plurality of processor cores based at least in part on performance monitoring configuration parameters.

Example 43: The packaged device of example 42, wherein the first P-unit is further to communicate the performance monitoring statistics with the second P-unit.

Example 44: The packaged device of example 41, wherein the MCLOS parameters comprise information which identifies a correspondence of different levels of a MCLOS classification scheme each with a respective level of another class of service classification scheme.

Example 45: The packaged device of example 41, wherein the memory class of service parameters comprise a plurality of sets of parameters, each set for a selected memory class of service including a priority, a minimum delay value, and maximum delay value, and an identifier of the selected memory class of service.

Example 46: The packaged device of example 41, wherein the first P-unit comprises: a proportional-integral-derivative (PID) controller to continuously calculate an error value as a difference between a set point and a process variable of the performance monitoring statistics; and a memory bandwidth balancer to generate the memory bandwidth settings based at least in part on the error value.

Example 47: The packaged device of example 46, wherein the performance monitoring configuration parameters comprise the set point, a time window, a plurality of events, and a plurality of enable bits corresponding to the plurality of events.

Example 48: A method comprising: determining whether a first P-unit of a first integrated circuit (IC) chip is a supervisor P-unit or a supervisee P-unit; and where the first P-unit is determined to be the supervisor P-unit, sending memory class of service (MCLOS) parameters from the first P-unit to a second P-unit of a second IC chip; or where the first P-unit is determined to be the supervisee P-unit, receiving with the first P-unit the MCLOS parameters from the second P-unit; wherein, at the one of the first IC chip or the second IC chip which comprises the supervisee P-unit, the supervisee P-unit signals a memory bandwidth allocator, based on the MCLOS parameters, to apply a plurality of memory bandwidth settings to dynamically adjust priorities of memory bandwidths which are allocated to one or more workloads processed by a plurality of processor cores.

Example 49: The method of example 48, wherein the MCLOS parameters comprise an identifier of a type of event to be monitored, wherein, at the one of the first IC chip or the second IC chip which comprises the supervisee P-unit, a performance monitor of a memory controller is generates performance monitoring statistics, based on the identifier of the type of event, by monitoring performance of the one or more workloads by the plurality of processor cores based at least in part on performance monitoring configuration parameters.

Example 50: The method of example 49, further comprising the first P-unit communicating the performance monitoring statistics with the second P-unit.

Example 51: The method of example 48, wherein the MCLOS parameters comprise information which identifies a correspondence of different levels of a MCLOS classification scheme each with a respective level of another class of service classification scheme.

Example 52: The method of example 48, wherein one or more of the plurality of memory bandwidth settings comprises a first value for memory bandwidth allocation for a low priority processor core based on an assigned memory class of service of the low priority processor core.

Example 53: The method of example 52, wherein one or more of the plurality of memory bandwidth settings comprises a second value for memory bandwidth allocation for a high priority processor core based on an assigned memory class of service of the high priority processor core, the first value being less than the second value.

Example 54: A packaged device comprising: a first integrated circuit (IC) die comprising a first P-unit and a first processor; and a second IC die coupled to the first IC die, the second IC die comprising a second P-unit and a second processor; wherein the first P-unit comprises circuitry to: evaluate a difference between a metric of power consumption, and a power threshold which is equal to or greater than a thermal design power specification of the packaged device; determine a first power budget and a second power budget based on the difference and on respective weights of classes of service to be provided with the first processor and the second processor; apply the first power budget with a first one or more frequency thresholds each corresponding to a respective one of a first one or more cores of the first processor; and indicate the second power budget to the second P-unit; and wherein the second P-unit comprises circuitry to apply the second power budget with a second one or more frequency thresholds each corresponding to a respective one of a second one or more cores of the second processor.

Example 55: The packaged device of example 54, wherein the first P-unit and the second P-unit are to enable a frequency allocation scheme which is to assign a minimum frequency threshold to all cores of the packaged device, and which is to apportion a remaining frequency budget among multiple cores of the packaged device based on the respective weights of classes of service.

Example 56: The packaged device of example 54, wherein cores of the packaged device each belong to a respective one of multiple CLOS groups; and wherein the first P-unit and the second P-unit are to enable a frequency allocation scheme which is to allocate, to each core of a highest priority one of the multiple CLOS groups, a respective highest possible frequency threshold, and which is to then allocate a remaining power budget to one or more cores of another one of the multiple CLOS groups.

Example 57: The packaged device of example 54, wherein a first core of the packaged device is to execute instructions of a first instruction set; and wherein the first P-unit and the second P-unit are to enable a frequency allocation scheme which is to assign a frequency threshold to the first core based on the first instruction set.

Example 58: The packaged device of example 54, wherein the metric of power consumption is a first metric, and the power threshold is a first power threshold, and wherein the first P-unit is to: perform first evaluations of the first metric based on the first power threshold; perform second evaluations of a second metric of the power consumption, wherein the second metric is less than the maximum power limit specification, wherein a first frequency of the first evaluations is less than a second frequency of the second evaluations; and based on the second evaluations, to successively throttle one or more frequencies of the first processor and the second processor to cycle the second metric between the second power threshold and a third power threshold.

Example 59: The packaged device of example 58, wherein the first metric represents an average of power consumption over a first period of time, and wherein the second metric represents an average of power consumption over a second period of time which is less than the first period of time.

Example 60: The packaged device of example 54, further comprising a third IC die comprising a third P-unit and a third processor, wherein: the first P-unit is to operate as a global supervisor P-unit of a power management hierarchy, the global supervisor P-unit to control the second P-unit; and the second P-unit is to operate as a local supervisor P-unit of the power management hierarchy, the local supervisor P-unit to control the third P-unit.

Example 61: The packaged device of example 54, wherein: the first P-unit is to apply the first power budget further with a third one or more frequency thresholds each corresponding to a respective accelerator of the first IC die; or the second P-unit is to apply the second power budget further with a fourth one or more frequency thresholds each corresponding to a respective accelerator of the second IC die.

Example 62: A method at packaged device, the method comprising: with a first P-unit of a first integrated circuit (IC) die: evaluating a difference between a metric of power consumption, and a power threshold which is equal to or greater than a thermal design power specification of the packaged device; determining a first power budget and a second power budget based on the difference and on respective weights of classes of service to be provided with a first processor the first IC die and a second processor of a second IC die; applying the first power budget with a first one or more frequency thresholds each corresponding to a respective one of a first one or more cores of the first processor; and indicating the second power budget to the second P-unit; and with a second P-unit of the second IC die, applying the second power budget with a second one or more frequency thresholds each corresponding to a respective one of a second one or more cores of the second processor.

Example 63: The method of example 62, wherein the first P-unit and the second P-unit enable a frequency allocation scheme which assigns a minimum frequency threshold to all cores of the packaged device, and which apportions a remaining frequency budget among multiple cores of the packaged device based on the respective weights of classes of service.

Example 64: The method of example 62, wherein cores of the packaged device each belong to a respective one of multiple CLOS groups; and wherein the first P-unit and the second P-unit enable a frequency allocation scheme which allocates, to each core of a highest priority one of the multiple CLOS groups, a respective highest possible frequency threshold, and which then allocates a remaining power budget to one or more cores of another one of the multiple CLOS groups.

Example 65: The method of example 62, wherein a first core of the packaged device executes instructions of a first instruction set; and wherein the first P-unit and the second P-unit enable a frequency allocation scheme which assigns a frequency threshold to the first core based on the first instruction set.

Example 66: The method of example 62, wherein the metric of power consumption is a first metric, and the power threshold is a first power threshold, and wherein the first P-unit; performs first evaluations of the first metric based on the first power threshold; performs second evaluations of a second metric of the power consumption, wherein the second metric is less than the maximum power limit specification, wherein a first frequency of the first evaluations is less than a second frequency of the second evaluations; and based on the second evaluations, successively throttles one or more frequencies of the first processor and the second processor to cycle the second metric between the second power threshold and a third power threshold.

Example 67: The method of example 66, wherein the first metric represents an average of power consumption over a first period of time, and wherein the second metric represents an average of power consumption over a second period of time which is less than the first period of time.

Example 68: The method of example 62, further comprising a third IC die comprising a third P-unit and a third processor, wherein: the first P-unit operates as a global supervisor P-unit of a power management hierarchy, the global supervisor P-unit to control the second P-unit; and the second P-unit operates as a local supervisor P-unit of the power management hierarchy, the local supervisor P-unit to control the third P-unit.

Example 69: A system comprising: a packaged device comprising: a first integrated circuit (IC) die comprising a first P-unit and a first processor; and a second IC die coupled to the first IC die, the second IC die comprising a second P-unit and a second processor; wherein the first P-unit comprises circuitry to: evaluate a difference between a metric of power consumption, and a power threshold which is equal to or greater than a thermal design power specification of the packaged device; determine a first power budget and a second power budget based on the difference and on respective weights of classes of service to be provided with the first processor and the second processor; apply the first power budget with a first one or more frequency thresholds each corresponding to a respective one of a first one or more cores of the first processor; and indicate the second power budget to the second P-unit; and wherein the second P-unit comprises circuitry to apply the second power budget with a second one or more frequency thresholds each corresponding to a respective one of a second one or more cores of the second processor; and a display device coupled to the packaged device, the display device to display an image based on a signal communicated with the first IC die.

Example 70: The system of example 69, wherein the first P-unit and the second P-unit are to enable a frequency allocation scheme which is to assign a minimum frequency threshold to all cores of the packaged device, and which is to apportion a remaining frequency budget among multiple cores of the packaged device based on the respective weights of classes of service.

Example 71: The system of example 69, wherein cores of the packaged device each belong to a respective one of multiple CLOS groups; and wherein the first P-unit and the second P-unit are to enable a frequency allocation scheme which is to allocate, to each core of a highest priority one of the multiple CLOS groups, a respective highest possible frequency threshold, and which is to then allocate a remaining power budget to one or more cores of another one of the multiple CLOS groups.

Example 72: The system of example 69, wherein a first core of the packaged device is to execute instructions of a first instruction set; and wherein the first P-unit and the second P-unit are to enable a frequency allocation scheme which is to assign a frequency threshold to the first core based on the first instruction set.

Example 73: The system of example 69, wherein the metric of power consumption is a first metric, and the power threshold is a first power threshold, and wherein the first P-unit is to: perform first evaluations of the first metric based on the first power threshold; perform second evaluations of a second metric of the power consumption, wherein the second metric is less than the maximum power limit specification, wherein a first frequency of the first evaluations is less than a second frequency of the second evaluations; and based on the second evaluations, to successively throttle one or more frequencies of the first processor and the second processor to cycle the second metric between the second power threshold and a third power threshold.

Example 74: A packaged device comprising: a first integrated circuit (IC) die comprising a first processor and a first P-unit; and a second IC die comprising a second processor and a second P-unit coupled to the first P-unit, wherein the first P-unit and the second P-unit are to operate as a supervisor P-unit and a supervisee P-unit, respectively, of a hierarchical power management architecture; wherein the first P-unit comprises circuitry to: provide an interface to communicate with a power management process to be executed with the first processor; and communicate a message to the second P-unit based on an input received from the power management process via the interface, wherein the message indicates a configuration of one or more cores of the second processor; and wherein the second P-unit comprises circuitry to modify one or more operational parameters of the second processor based on the message.

Example 75: The packaged device of example 74, wherein the one or more operational parameters comprise a base frequency parameter.

Example 76: The packaged device of example 74, wherein the one or more operational parameters comprise a turbo frequency parameter.

Example 77: The packaged device of example 74, wherein the message identifies an association of the one or more cores with a core group of multiple core groups, and wherein the second P-unit is to modify the one or more operational parameters based on the association.

Example 78: The packaged device of example 74, wherein the message identifies a weight of a core group relative to one or more other core groups, and wherein the second P-unit is to modify the one or more operational parameters based on the weight.

Example 79: The packaged device of example 74, wherein the message is to indicate to the second P-unit a power budget to be distributed among multiple cores of the second processor.

Example 80: The packaged device of example 74, wherein any access to the second P-unit by the power management process to be via the first P-unit.

Example 81: The packaged device of example 74, further comprising: a third IC die comprising a third processor and a third P-unit coupled to the third P-unit, wherein the third P-unit is to operate as another supervisee P-unit of the hierarchical power management architecture; wherein the first P-unit comprises further circuitry to: communicate a second message to the third P-unit based on the input received from the power management process, wherein the second message indicates a second configuration of a second one or more cores of the third processor; and wherein the third P-unit comprises circuitry to modify a second one or more operational parameters of the third processor based on the second message.

Example 82: A system comprising: a packaged device comprising: a first integrated circuit (IC) die comprising a first processor and a first P-unit; and a second IC die comprising a second processor and a second P-unit coupled to the first P-unit, wherein the first P-unit and the second P-unit are to operate as a supervisor P-unit and a supervisee P-unit, respectively, of a hierarchical power management architecture; wherein the first P-unit comprises circuitry to: provide an interface to communicate with a power management process to be executed with the first processor; and communicate a message to the second P-unit based on an input received from the power management process via the interface, wherein the message indicates a configuration of one or more cores of the second processor; and wherein the second P-unit comprises circuitry to modify one or more operational parameters of the second processor based on the message; and a display device coupled to the packaged device, the display device to display an image based on a signal communicated with the first processor.

Example 83: The system of example 82, wherein the one or more operational parameters comprise a base frequency parameter.

Example 84: The system of example 82, wherein the one or more operational parameters comprise a turbo frequency parameter.

Example 85: The system of example 82, wherein the message identifies an association of the one or more cores with a core group of multiple core groups, and wherein the second P-unit is to modify the one or more operational parameters based on the association.

Example 86: The system of example 82, wherein the message identifies a weight of a core group relative to one or more other core groups, and wherein the second P-unit is to modify the one or more operational parameters based on the weight.

Example 87: The system of example 82, wherein the message is to indicate to the second P-unit a power budget to be distributed among multiple cores of the second processor.

Example 88: The system of example 82, wherein any access to the second P-unit by the power management process to be via the first P-unit.

Example 89: The system of example 82, the packaged device further comprising: a third IC die comprising a third processor and a third P-unit coupled to the third P-unit, wherein the third P-unit is to operate as another supervisee P-unit of the hierarchical power management architecture; wherein the first P-unit comprises further circuitry to: communicate a second message to the third P-unit based on the input received from the power management process, wherein the second message indicates a second configuration of a second one or more cores of the third processor; and wherein the third P-unit comprises circuitry to modify a second one or more operational parameters of the third processor based on the second message.

Example 90: A method at a packaged device, the method comprising: with a first P-unit of a first integrated circuit (IC) die, providing an interface to communicate with a power management process executing with a first processor of the first IC die, wherein a second IC die comprises a second processor and a second P-unit coupled to the first P-unit, wherein the first P-unit and the second P-unit are to operate as a supervisor P-unit and a supervisee P-unit, respectively, of a hierarchical power management architecture; based on an input received from the power management process via the interface, communicating a message from the first P-unit to the second P-unit, the message indicating a configuration of one or more cores of the second processor; and with the second P-unit, modifying one or more operational parameters of the second processor based on the message.

Example 91: The method of example 90, wherein the one or more operational parameters comprise a base frequency parameter.

Example 92: The method of example 90, wherein the one or more operational parameters comprise a turbo frequency parameter.

Example 93: The method of example 90, wherein the message identifies an association of the one or more cores with a core group of multiple core groups, and wherein the second P-unit is to modify the one or more operational parameters based on the association.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a plurality of dies including compute dies and I/O dies;
   a plurality of power management units, wherein each die of the plurality includes a power management unit such that at least one of the power management units is a supervisor unit and at least two of the power management units are supervisee units, wherein the power management units are arranged in a hierarchical manner such that the supervisor unit controls the at least two supervisee units; and
   a plurality of maximum power detectors to detect a droop in a voltage of an input power supply rail, wherein each maximum power detector is positioned in one of the compute dies, wherein a compute die positioned between at least two compute dies is an owner of decisions associated with a maximum power detector of the compute die.

2. The apparatus of claim 1, wherein the maximum power detectors in the at least two compute dies are disabled.

3. The apparatus of claim 2, comprising a plurality of fast droop detectors, wherein each maximum power detector includes a fast droop detector, wherein the fast droop detectors are enabled even when the maximum power detectors are disabled.

4. The apparatus of claim 1 comprising a plurality of fast droop detectors, wherein each compute die of the plurality includes a fast droop detector.

5. The apparatus of claim 4, wherein the fast droop detector in all compute dies are enabled.

6. The apparatus of claim 1, wherein a power management unit of one of the I/O dies is the supervisor unit, and wherein the power management units of the compute dies are the supervisee units.

7. The apparatus of claim 1, wherein the maximum power detector of the compute die is a multi-threshold power detector to detect the droop at multiple thresholds including a fast detect threshold to detect a fast droop in the voltage of the input power supply rail.

8. The apparatus of claim 7, wherein upon detection of the fast droop, the maximum power detector is to trigger a hard throttle to all processor cores of all the compute dies.

9. The apparatus of claim 8 comprising:
a first interconnect fabric coupled to the supervisor unit and the supervisee units; and
a second interconnect fabric coupled to the supervisor unit and the supervisee units, wherein the second interconnect fabric is faster than the first interconnect fabric, and wherein the hard throttle is sent via the second interconnect fabric.

10. The apparatus of claim 8, wherein the hard throttle comprises reduction in an operating voltage and/or frequency of all the compute dies within a predetermined time, thereafter the supervisor unit to send a global shared frequency ceiling for all the supervisee units within a domain of the supervisor unit.

11. The apparatus of claim 10, wherein the supervisee units to send a message to the supervisor unit indicative of the global shared frequency ceiling, and wherein the supervisee units to enforce the global shared frequency ceiling within their respective dies.

12. The apparatus of claim 11, wherein the compute die, which is the owner of decisions associated with the maximum power detector of the compute die, is to de-assert the hard throttle after the compute dies indicate to the compute die that the global shared frequency ceiling is enforced and the plurality of compute dies operate at a safe power level.

13. The apparatus of claim 12, wherein the supervisor unit is to gradually increase the global shared frequency ceiling for compute dies after a predetermined wait time expires from a time the hard throttle is de-asserted.

14. The apparatus of claim 7, wherein upon detection that the voltage of the droop crossed one or more of the multiple thresholds while the voltage of the droop does not cross the fast detect threshold, the maximum power detector is to trigger a soft throttle to all processor cores of all the compute dies.

15. The apparatus of claim 14, wherein the soft throttle comprises stretching a duty cycle of one or more clocks to all processor cores of the compute die.

* * * * *